(12) United States Patent
Scripp

(10) Patent No.: US 11,790,800 B2
(45) Date of Patent: Oct. 17, 2023

(54) METHODOLOGY AND TOOLKIT FOR MUSIC LITERACY LEARNING

(71) Applicant: MindChamps Music Pte. Limited, Singapore (SG)

(72) Inventor: Lawrence Richard Scripp, Brighton, MA (US)

(73) Assignee: MindChamps Music Pte. Limited, Singapore (SG)

( * ) Notice: Subject to any disclaimer, the term of this patent is extended or adjusted under 35 U.S.C. 154(b) by 0 days.

(21) Appl. No.: 17/644,293

(22) Filed: Dec. 14, 2021

(65) Prior Publication Data

US 2022/0309946 A1     Sep. 29, 2022

(30) Foreign Application Priority Data

Mar. 26, 2021    (SG) .......................... 10202103163W

(51) Int. Cl.
*G09B 15/00*     (2006.01)

(52) U.S. Cl.
CPC ................................. *G09B 15/004* (2013.01)

(58) Field of Classification Search
CPC ........... G09B 15/04; G10D 7/03; G10D 13/03
See application file for complete search history.

(56) References Cited

U.S. PATENT DOCUMENTS

| 145,622 | A | * | 12/1873 | Brown et al. | ........ | G09B 15/026 |
| | | | | | | 84/471 R |
| 702,298 | A | * | 6/1902 | Frederickson | ......... | G09B 15/02 |
| | | | | | | 283/44 |

(Continued)

FOREIGN PATENT DOCUMENTS

| JP | 2010057909 | | 3/2010 |
| JP | 2010057909 A | * | 3/2010 |
| KR | 20080005234 U | | 11/2008 |

OTHER PUBLICATIONS

Fujioka et al., "One year of musical training affects development of auditory cortical-evoked fields in young children," Brain, Sep. 7, 2006, vol. 129, pp. 2593-2608.

(Continued)

*Primary Examiner* — Robert W Horn
(74) *Attorney, Agent, or Firm* — Kilpatrick Townsend & Stockton LLP

(57) ABSTRACT

The present disclosure provides a methodology and toolkit for music literacy learning, comprising a plurality of tools for developing, practicing and understanding the elements, functions and dynamics of music reading, composing, listening, critiquing and ensemble performing skills. The kit comprises: a receptacle configured to represent a music note or rhythm, the receptacle comprising a slot; and a modifier card configured to be inserted into the slot of the receptacle for modifying an accent, volume, articulation, or chromatic alteration of the music note or rhythm based on a design of the modifier card, wherein the receptacle and modifier card serves as an indication for a user to vocally perform the modified music note or rhythm. Other kits detailed in this application contain charts, repertoire matrixbooks, and practice instruments that include detailed instructions as to how preschool children music literacy skills and how these skills can be transferred to the invented silent practice musical instruments that finally lead to reading, performing and composition with standard notation and performance on conventional music musical instruments.

18 Claims, 106 Drawing Sheets

(56) References Cited

U.S. PATENT DOCUMENTS

| | | | | |
|---|---|---|---|---|
| 972,335 A * | 10/1910 | Church | A63F 1/00 | 273/301 |
| 1,021,345 A * | 3/1912 | Welch | G10D 13/09 | 84/422.4 |
| 1,114,139 A * | 10/1914 | Hoffmann | A63F 3/00 | 283/44 |
| 1,319,919 A * | 10/1919 | Barker | G09B 15/026 | 84/484 |
| 1,325,251 A * | 12/1919 | Kelles | G10D 3/166 | 84/283 |
| 1,623,633 A * | 4/1927 | Morris | G10D 3/166 | 984/122 |
| 1,803,630 A * | 5/1931 | Lossie | G09B 15/026 | 84/471 R |
| 1,841,398 A * | 1/1932 | Bergh | G10D 1/02 | 984/103 |
| 2,072,511 A * | 3/1937 | Ross | G09B 15/02 | 84/479 A |
| 2,082,432 A * | 6/1937 | Von Der Linden | G09B 15/026 | 40/620 |
| 2,231,020 A * | 2/1941 | McCaulley | G09B 15/004 | 273/301 |
| 2,239,579 A * | 4/1941 | Solodar | G10D 3/166 | 84/283 |
| 2,740,314 A * | 4/1956 | Weinstein | G10D 13/08 | 984/155 |
| 2,977,835 A * | 4/1961 | Hornseth | G10D 1/02 | 984/103 |
| 3,186,292 A * | 6/1965 | Burns | G10G 1/00 | D19/64 |
| 3,188,901 A * | 6/1965 | Baderak | G10D 3/166 | 984/122 |
| 3,264,926 A * | 8/1966 | Belli | G10D 13/03 | 984/150 |
| 3,264,927 A * | 8/1966 | Fischetti | G10D 13/03 | 84/411 R |
| 3,438,298 A * | 4/1969 | Thompson | G10D 7/03 | D17/10 |
| 3,453,924 A * | 7/1969 | Merton | G10D 13/03 | 84/411 R |
| 3,715,951 A * | 2/1973 | Lanaro | G09B 15/02 | 84/472 |
| 3,750,521 A * | 8/1973 | Dolmetsch | G10D 7/03 | 84/384 |
| 3,921,493 A | 11/1975 | Leonard | | |
| 3,981,219 A * | 9/1976 | Johns | G10D 1/02 | 984/103 |
| 4,402,249 A | 9/1983 | Zankman | | |
| 4,736,665 A * | 4/1988 | Sorribes Arambul | G09B 15/026 | 84/476 |
| 4,741,240 A * | 5/1988 | Kawano | G10H 3/00 | 84/723 |
| 4,819,539 A * | 4/1989 | Searing | G09B 15/023 | 84/476 |
| D319,650 S * | 9/1991 | Hart | 84/411 P | |
| 5,670,727 A * | 9/1997 | Xiao | G09B 15/06 | 84/283 |
| 6,111,180 A * | 8/2000 | DiGiulio | G09B 15/026 | 84/471 R |
| 6,175,069 B1 * | 1/2001 | Longacre | G09B 15/004 | 84/476 |
| 6,362,407 B1 * | 3/2002 | Dennis | G10D 13/03 | 84/411 R |
| 6,967,274 B2 * | 11/2005 | Hanington | G09B 15/02 | 84/484 |
| 7,408,101 B2 * | 8/2008 | Shelton | G10D 3/10 | 84/297 S |
| 7,482,524 B1 * | 1/2009 | Hanington | G09B 15/02 | 84/470 R |
| 7,605,317 B2 * | 10/2009 | Chen | G09B 15/06 | 84/283 |
| 7,638,701 B2 * | 12/2009 | May, Jr. | G10D 13/03 | 84/411 R |
| 7,709,721 B2 * | 5/2010 | Suganuma | G09B 15/00 | 84/476 |
| 7,763,790 B2 * | 7/2010 | Robledo | G09B 15/02 | 84/483.2 |
| 7,985,908 B1 * | 7/2011 | Howard | G10D 13/03 | 84/411 P |
| 8,188,356 B2 * | 5/2012 | Rose | G09B 15/02 | 84/447 |
| 9,530,390 B1 * | 12/2016 | Hildner | G10D 13/03 | |
| 9,728,099 B2 * | 8/2017 | Armstrong | G09B 15/023 | |
| 10,224,015 B2 * | 3/2019 | Hsu | G10H 1/342 | |
| 10,504,378 B1 * | 12/2019 | Weston | G09B 15/001 | |
| 10,559,219 B1 * | 2/2020 | Davies | G09B 15/023 | |
| 10,916,227 B1 * | 2/2021 | Yeates | G10D 13/10 | |
| 11,295,710 B1 * | 4/2022 | Hirasawa | G10D 13/11 | |
| 2006/0278063 A1 * | 12/2006 | Liao | G09B 15/06 | 84/465 |
| 2009/0025535 A1 * | 1/2009 | Montgomery | G09B 15/004 | 84/477 R |
| 2009/0142738 A1 * | 6/2009 | Suganuma | G09B 19/025 | 434/191 |
| 2009/0173212 A1 * | 7/2009 | Wold | G09B 15/02 | 84/483.2 |
| 2022/0005375 A1 * | 1/2022 | Carter | G09B 15/06 | |
| 2022/0309946 A1 * | 9/2022 | Scripp | G09B 15/002 | |

OTHER PUBLICATIONS

Lappe et al., "Cortical Plasticity Induced by Short-Term Unimodal and Multimodal Musical Training," J. Neurosci., Sep. 24, 2008, vol. 28(39), pp. 9632-9639.

De Manzano & Ullen, "Genetic and environmental influences on the phenotypic associations between intelligence, personality, and creative achievement in the arts and sciences," Intelligence, 2018, vol. 69, pp. 123-133.

Australian Application No. 2022202096, Examination Report No. 2, dated Feb. 28, 2023, 3 pages.

Australian Application No. 2022202096, Examination Report No. 1, dated Nov. 9, 2022, 5 pages.

United Kingdom Application No. GB 2204307.9, Search Report, dated Sep. 28, 2022, 4 pages.

* cited by examiner

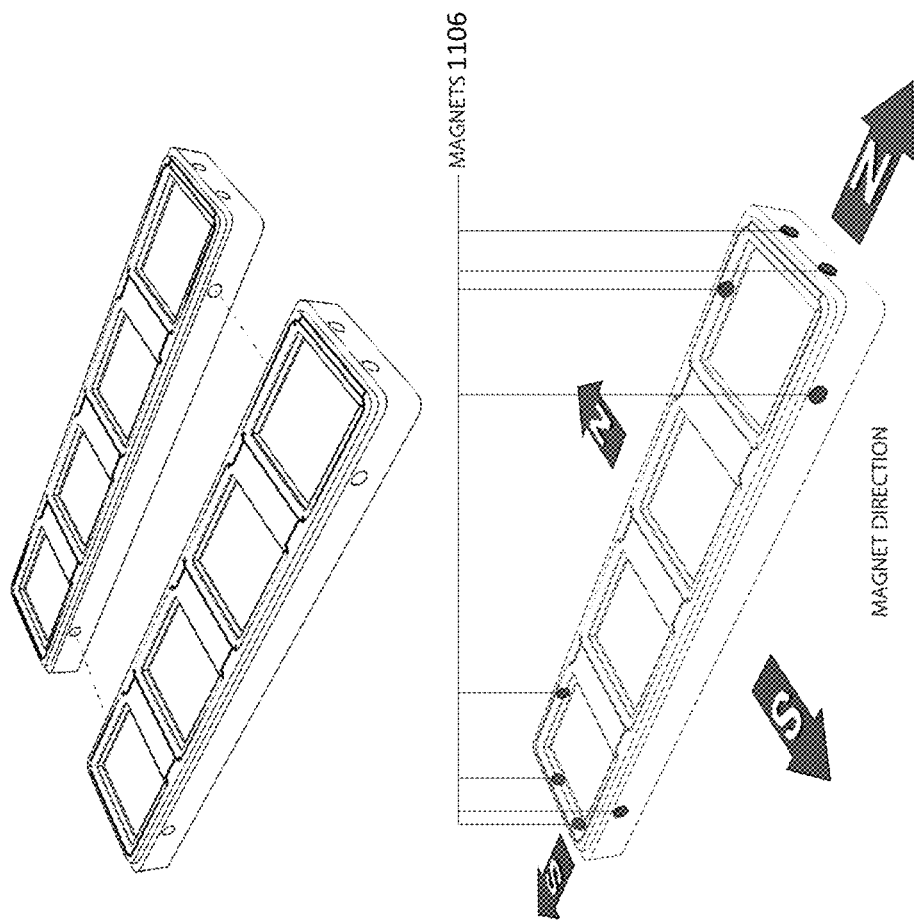
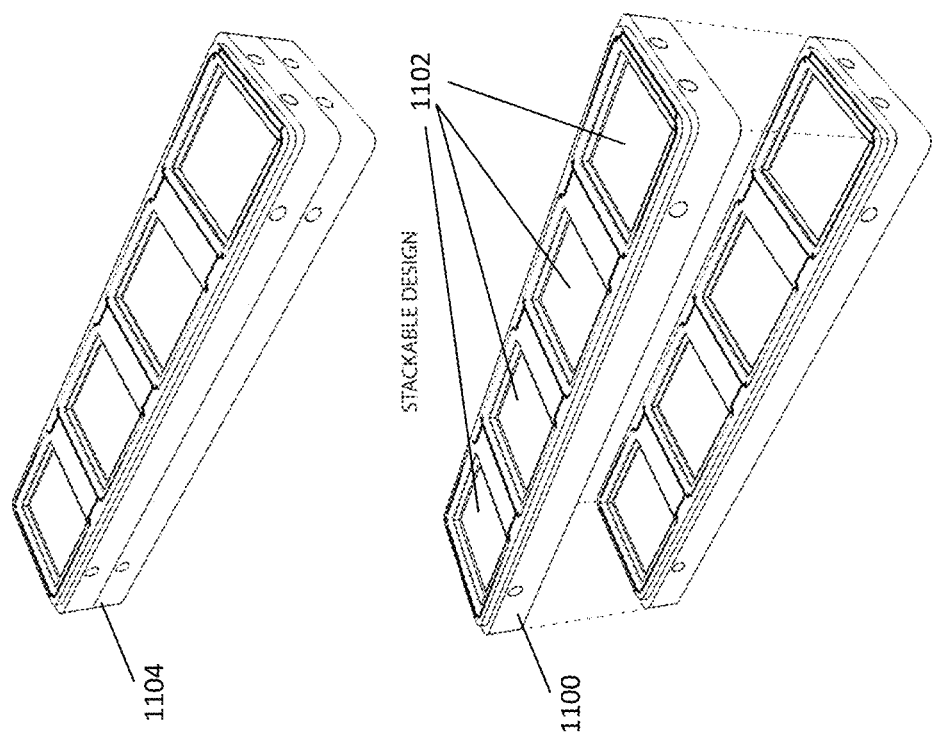
Figure 11A

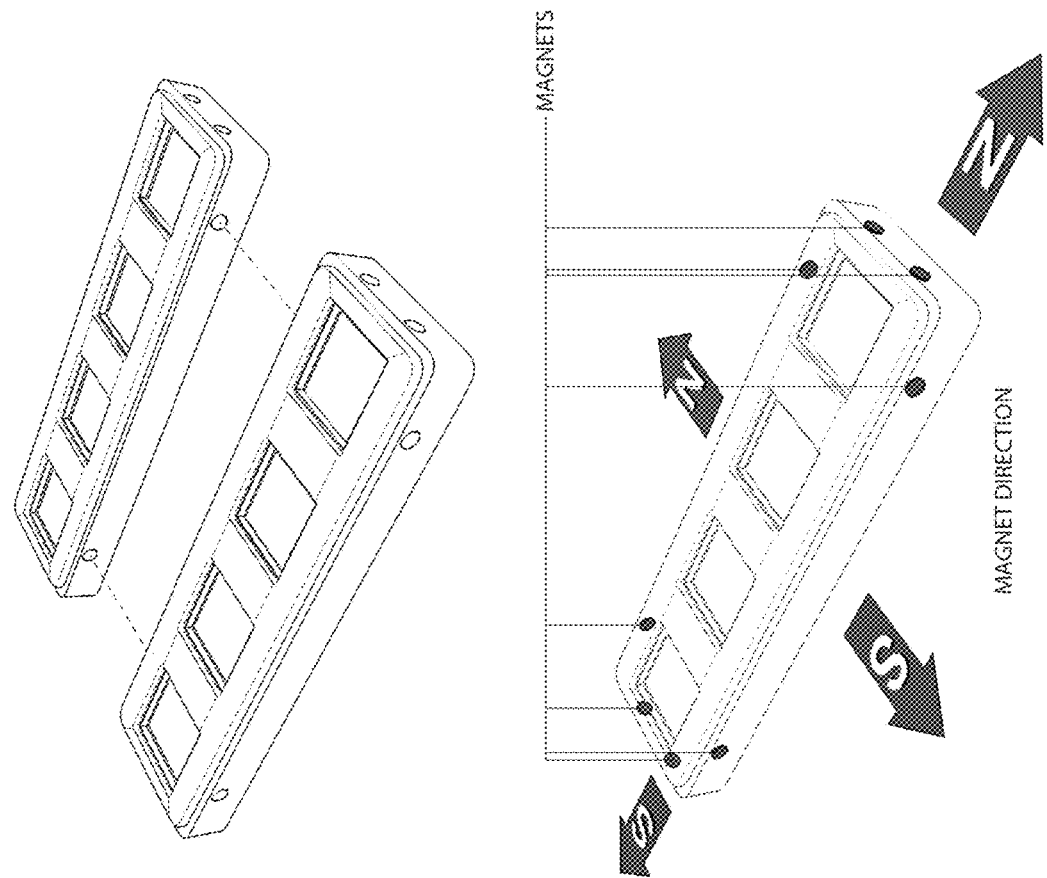
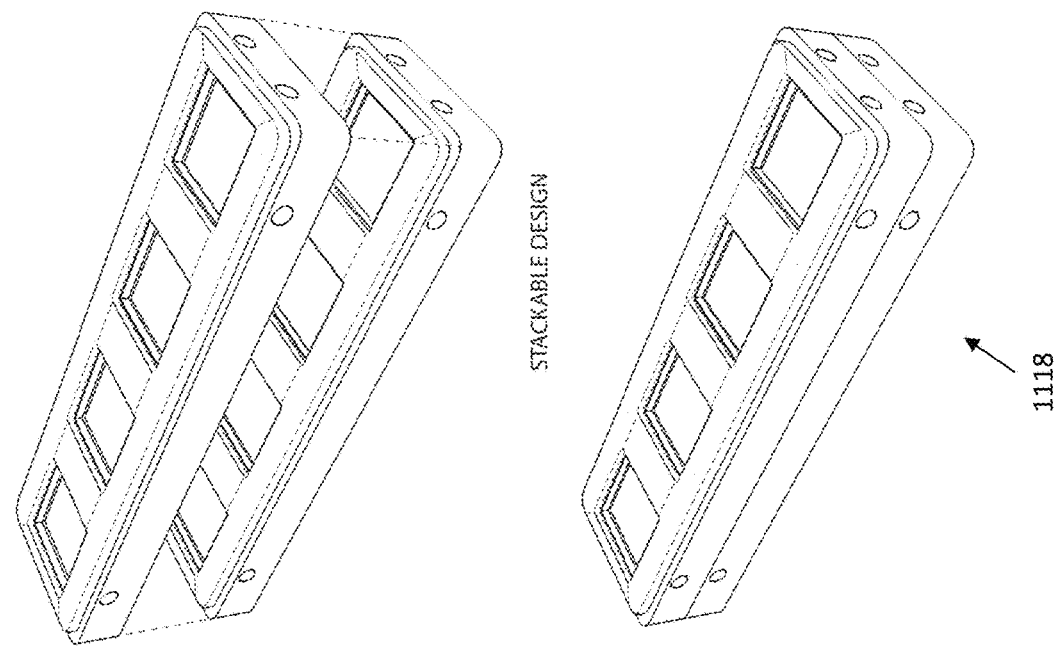
Figure 11G

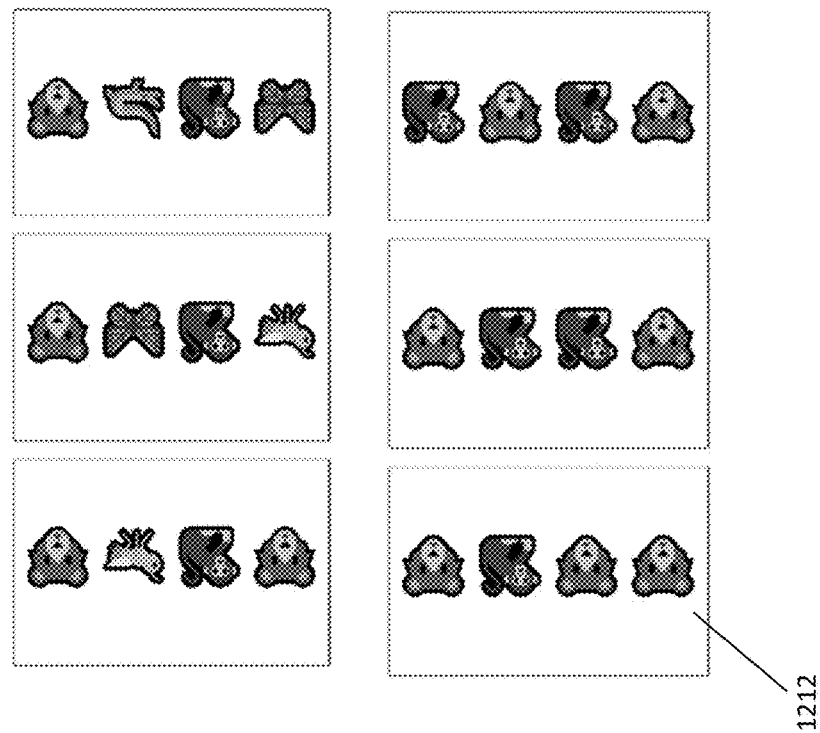
Figure 12D

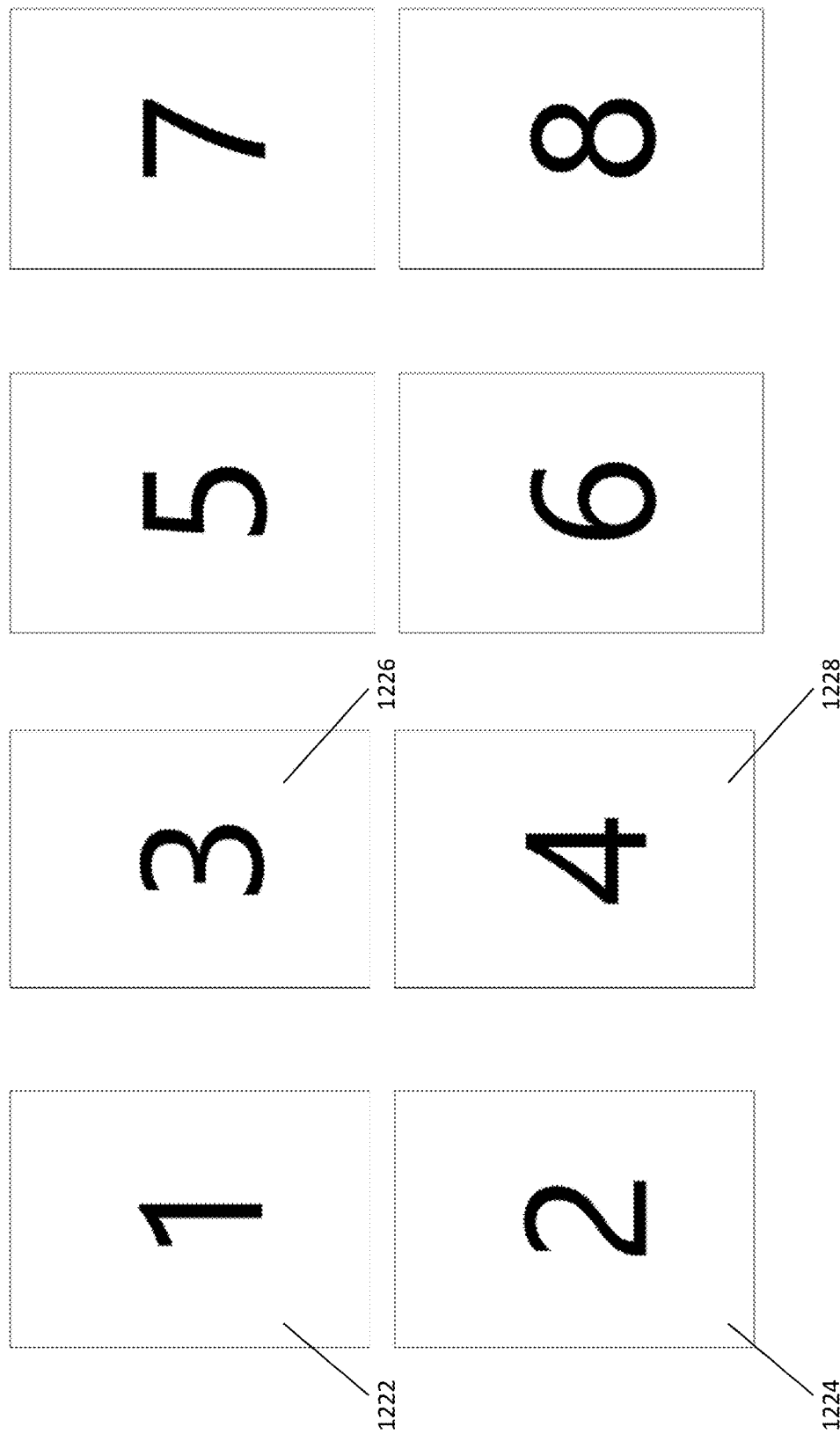

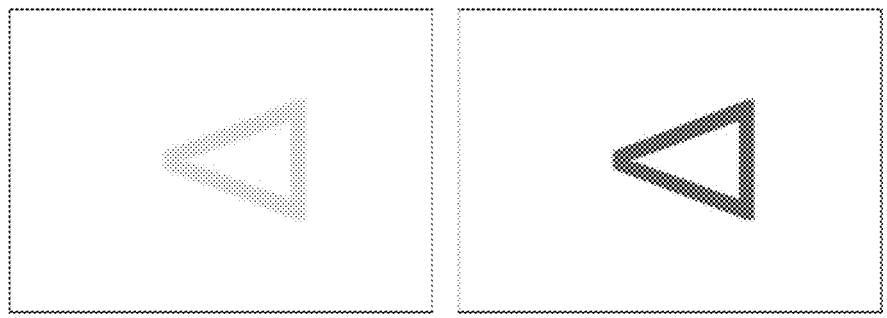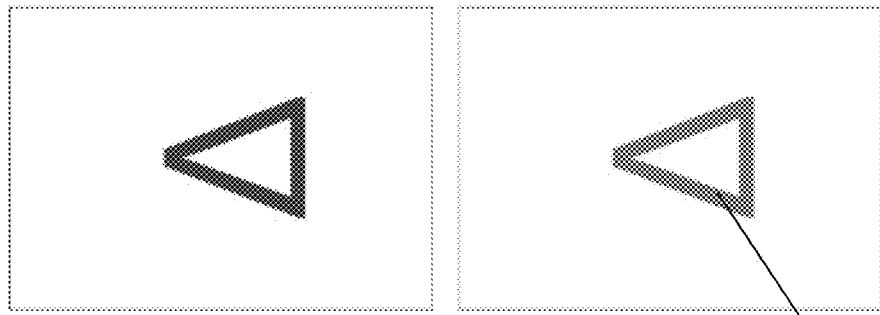
Figure 12N

| Add SHORT Articulation *perform your pattern making sure each rhythm is short* | Add LONG Articulation *perform your pattern making sure each rhythm is long* |
|---|---|
| Add SOFT Dynamic *perform your pattern at a softer volume* | Add ACCENT *perform one or more elements of your pattern at a louder volume* |
| Substitute Rest *swaps in a blank card for another card in your pattern to create a silent rest* | Add LOUD Dynamic *perform your pattern at a louder volume* |
| Reverse *instead of performing left to right, go right to left* | Reorder *change the order of your MusicCard pattern by moving one card* |

1250 →

Continued on next page →

Figure 12O

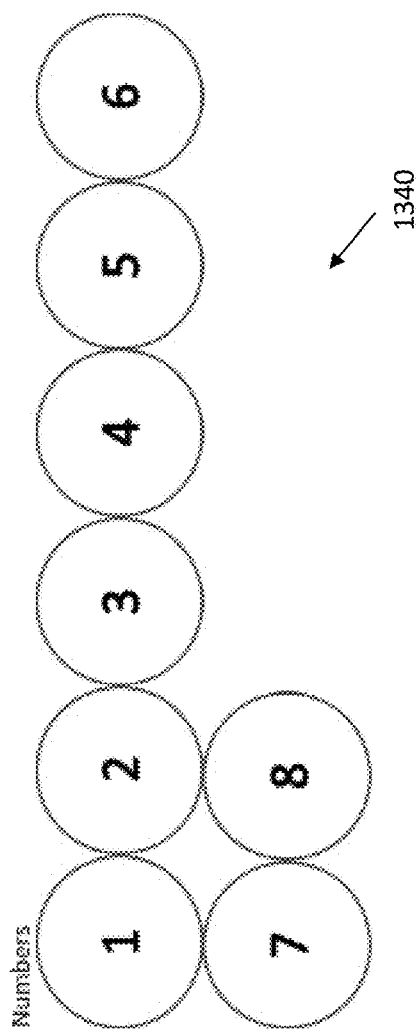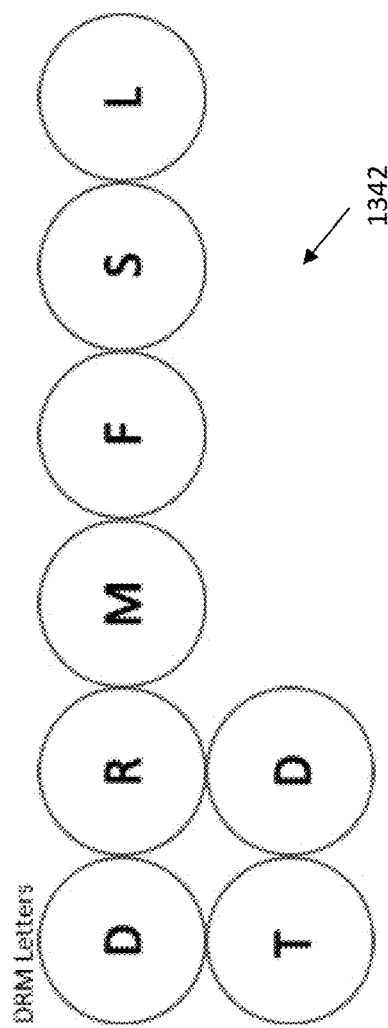

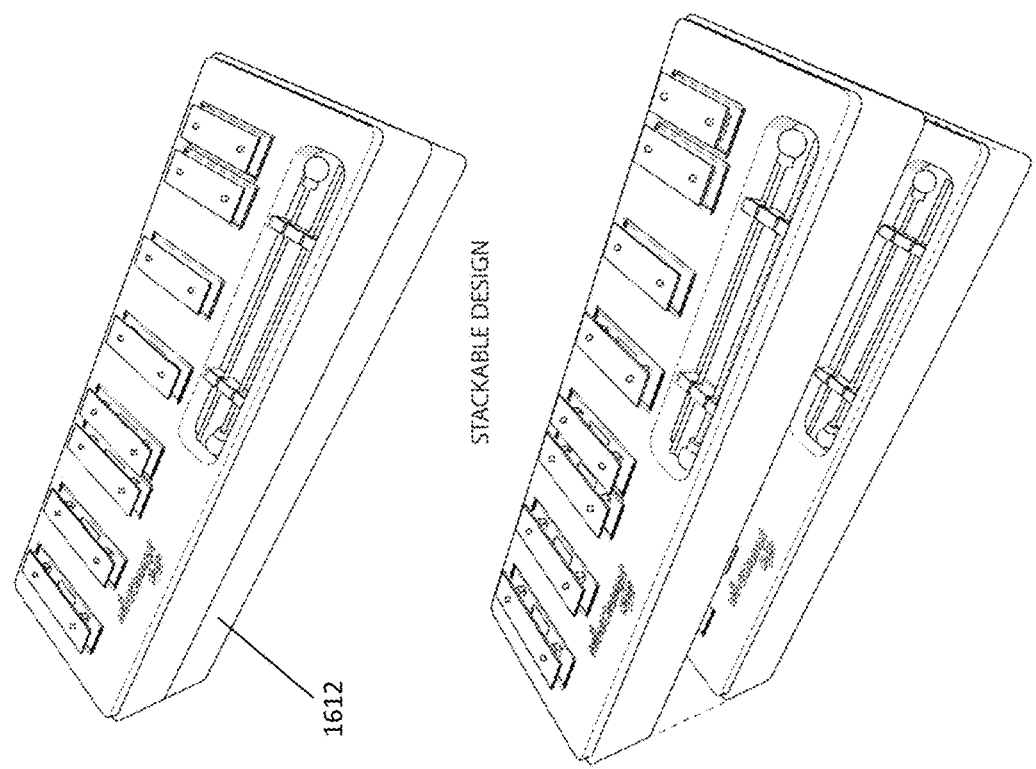
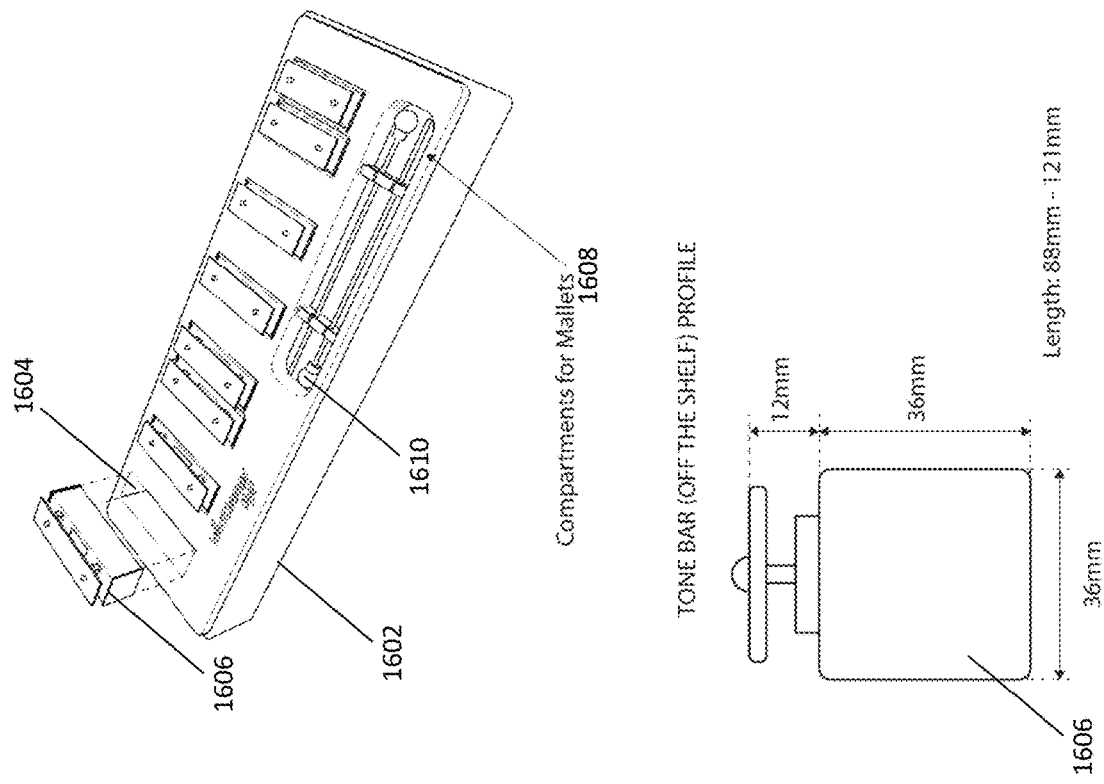
Figure 16A

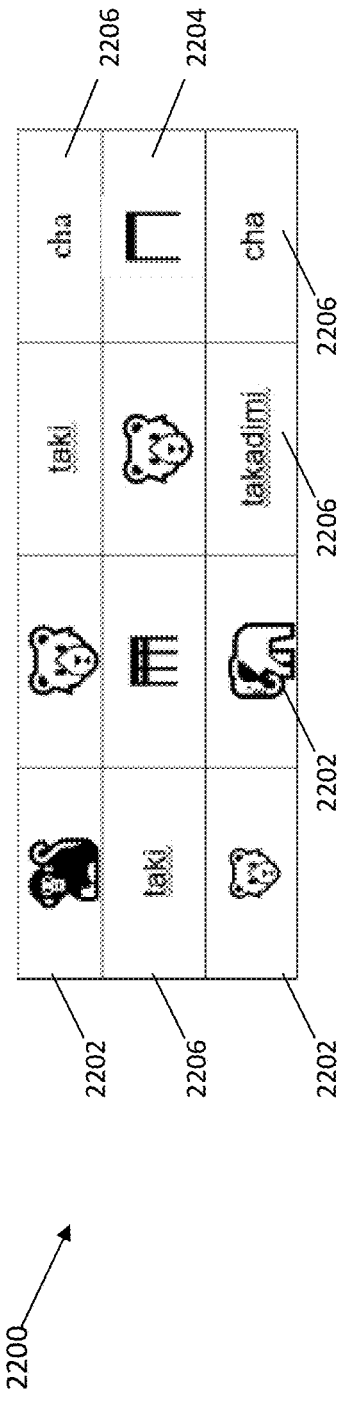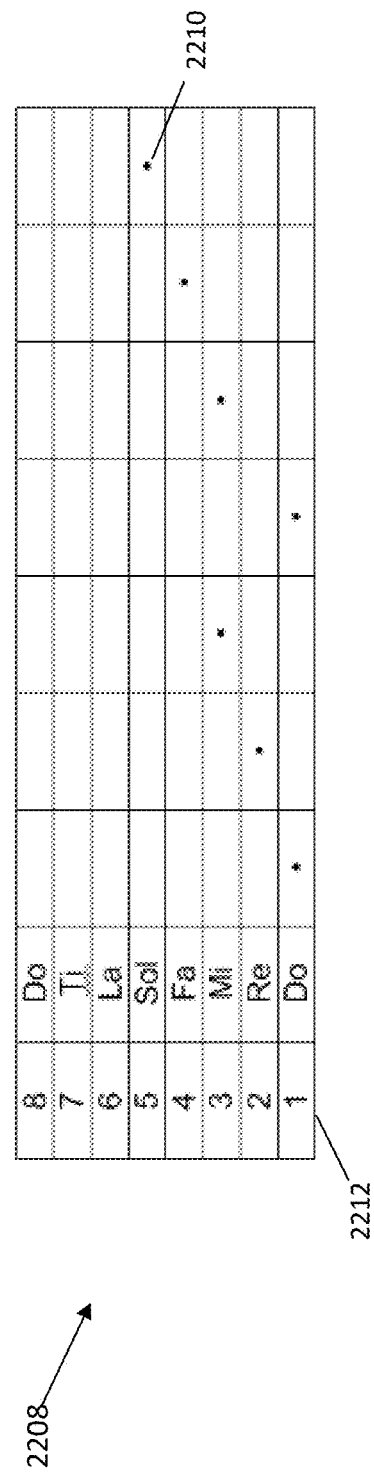
Figure 22

METHODOLOGY AND TOOLKIT FOR MUSIC LITERACY LEARNING

RELATED APPLICATIONS

The present application claims priority benefit of Singapore patent application no. 10202103163W titled "Combined Music Literacy Matrix Manipulative System (MLMMS) and Integrated Multiple Musical Instrument Learning System (IMMILS)" filed on 26 Mar. 2021. The subject matter of the foregoing is herein incorporated by reference in its entirety.

FIELD OF INVENTION

The present disclosure relates broadly, but not exclusively, to a music learning methodology and toolkit for music literacy learning.

BACKGROUND

Conventional music education practices are based on the assumption that preschool age children are typically not expected to learn musical literacy skills at the same level of competency as language and math literacy skills learned in school or at home. This viewpoint of including music at the periphery, rather than the center, of the preschool curriculum unfortunately results in a missed opportunity for preschool children to develop multiple literacies skills that researchers now know are optimized by simultaneous integration of study and practice of music literacy skill development in conjunction with virtually all subjects across the school curriculum.

When conventional musical instruction remains inadequate and counterproductive by the lack of integrative and internalized musical literacy skills, many parents and music teachers are left with the common misunderstanding that some sort of exceptional innate ability (implied by the loosely defined word "talent") is a necessary prerequisite for being able to benefit from a comprehensive education in music. Furthermore, many parents mistakenly assume that preschool children should only choose a single instrument and stick with it or quit, thus prematurely cutting short any hope for the life-long benefit of comprehensive, integrated multiple musical instrument learning. When music is relegated to the periphery of the core curriculum and inadequately supports music reading, composition, and is limited to one musical instrument, it is typically only those children arbitrarily judged to be innately talented who will be provided the privilege of a significant music education.

Further, narrowly focused literacy and instrumental instruction on traditional instruments—typically taught by music teachers who do not take responsibility for teaching children to sing the music they are learning on an instrument—results in the inability of young children to coordinate the many elements of instrumental performance that become difficult to master without first establishing internalized sight singing-based music literacy skills.

A need therefore exists to provide a solution that seek to overcome or at least minimize the above mentioned challenges.

SUMMARY

According to an aspect of the present disclosure, there is provided a kit for music literacy learning comprising a plurality of tools for developing, practicing and understanding the elements, functions and dynamics of music reading, composing, listening, critiquing and ensemble performing skills, the kit comprising a receptacle configured to represent a music note or rhythm, the receptacle comprising a slot; and a modifier card configured to be inserted into the slot of the receptacle for modifying an accent, volume, articulation, or chromatic alteration of the music note or rhythm based on a design of the modifier card, wherein the receptacle and modifier card serves as an indication for a user to vocally perform the modified music note or rhythm.

BRIEF DESCRIPTION OF THE DRAWINGS

Embodiments and implementations are provided by way of example only, and will be better understood and readily apparent to one of ordinary skill in the art from the following written description, read in conjunction with the drawings, in which:

FIGS. 11A-11L depict various illustrations of CupHolders according to various embodiments.

FIGS. 13L-13T show example illustrations of MusicDots in accordance with various embodiments.

FIGS. 16A-16C show illustrations of an instrument model resembling a percussion instrument such as a xylophone in accordance with various embodiments.

FIG. 22 shows example rhythm and pitch tasks for music literacy assessment in accordance with various embodiments.

Figure 1A:
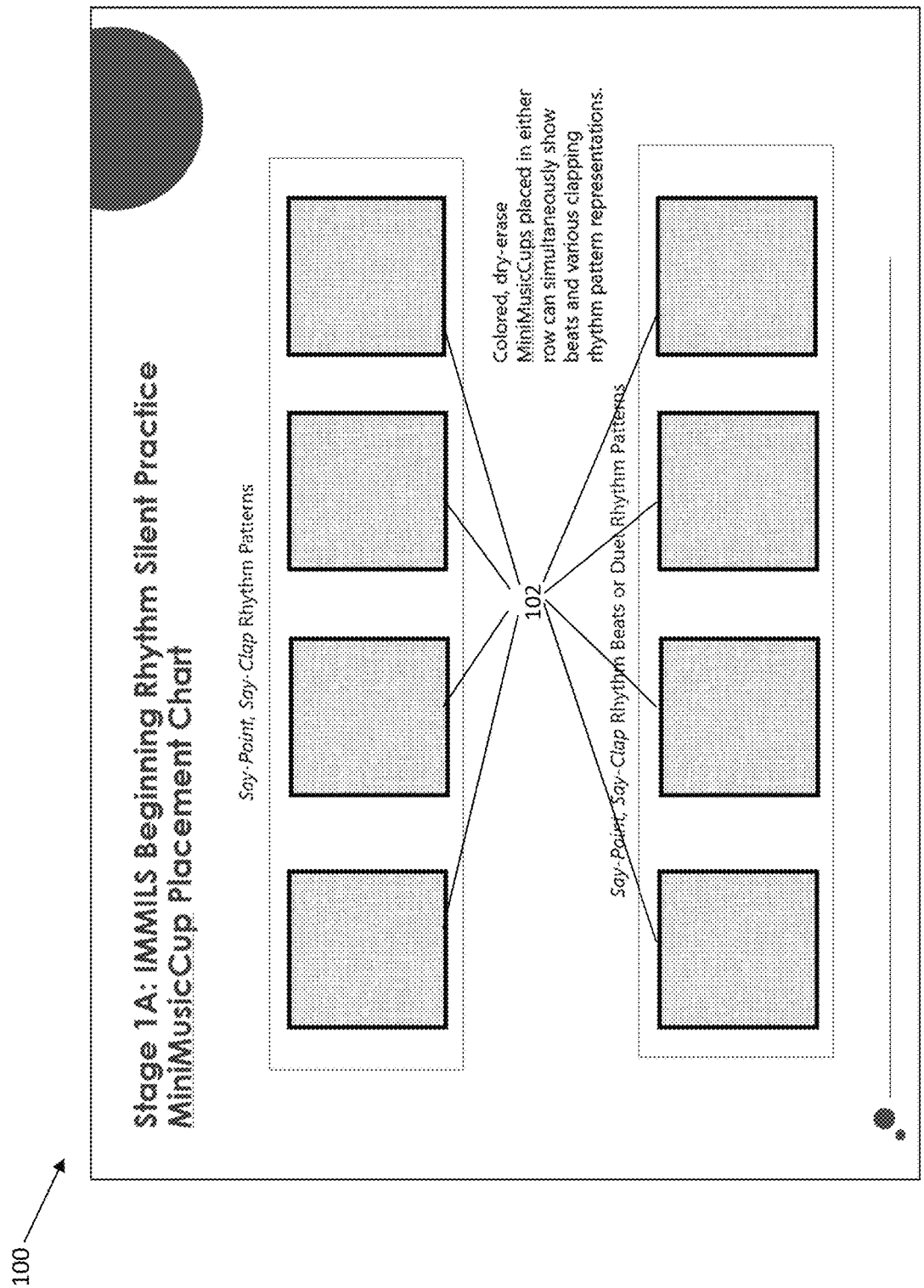
FIGS. 1A-1B show example Silent Practice Charts for practicing rhythm, according to various embodiments of the present disclosure.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Embodiments will be described, by way of example only, with reference to the drawings. Like reference numerals and characters in the drawings refer to like elements or equivalents.

The methodology and toolkit for music literacy learning combines "Music Literacy Matrix Manipulative System" (MLMMS) and the "Integrated Multiple Musical Instrument Learning System" (IMMILS), and is developed as a comprehensive preschool music literacy and multiple instrument learning system. It is a kit that comprises four sets of MLMMS-IMMILS learning tools and methods designed to advance both music literacy and multiple instrument skills for users such as, for example, preschool children ages eighteen months to six years. Taken as a whole, this wide-ranging, innovative system includes four major assets: (a) a set of 30 MLMMS (linguistic and mathematical-visual) Symbolic Interdisciplinary Multi-Representation Systems, (b) 15 MLMMS (say-finger, sing-finger) Music Literacy Music-Matrix Manipulatives, (c) 12 IMMILS (say-finger, sing-finger) Beginning Silent Practice Charts, and (d) 8 IMMILS (say-finger, sing-finger-play) Transitional Silent Practice Instruments. Increasingly skillful application of MLMMS-IMMILS synchronous integration of musical literacy skill development with multiple instrumental technique is achieved by a rigorous MLMMS-IMMILS Music Literacy Digital Curriculum that includes hundreds of embedded matrices, sound files and access to (21) MLMMS-IMMILS (say-finger, sing-finger) MatrixBooks. The MLMMS-IMMILS also features a MLMMS-IMMILS Multiple Music Literacy Skills Performance Assessment System (MMLSPAS) that can be used for determining the impact and efficacy of the MLMMS-IMMILS program implementation.

MLMMS (linguistic and mathematical-visual) Symbolic Interdisciplinary Multi-Representation Systems are used to establish and familiarize with values of various music literacy rhythm and pitch matrix manipulatives that are part of the MLMMS-IMMILS learning tools. Because musical literacy skills are inextricably related to shared fundamental concepts in language and math, these representations serve as foundational representations of the elements of musical pitch and rhythm. For example, a user may be taught to 'say-sing-clap, tap' various representations such as letters (e.g. consonants, vowels), syllables, words, phrases, sentences, form, syntactical markers, stress, accents, prosodic forms, names, and other similar representations.

Throughout the methodology and toolkit for music literacy learning program, a user will be required to perform vocally, non-vocally, or both based on various representations of music. Such performance may be described in various forms throughout the present disclosure. For example, a user may be required to 'say, sing, clap, tap' in response to a picture of a monkey which may mean various combinations, such as to say the word 'monkey', to sing the word 'monkey' based on a music note, rhythm, pitch or melody pattern, to clap or tap twice since monkey has two syllables, to sing the word 'monkey' based on a music note, rhythm, pitch or melody pattern while clapping or tapping once per syllable, or other possible combinations, depending on the curriculum. Other variations include 'finger' (e.g. positioning one or more fingers to replicate an indicated music note on a music instrument, as if a user is actually playing the music note on the music instrument), 'conduct' (e.g. a hand action that replicates a musical conductor's hand movement), 'pluck' (e.g. to pluck or mimic plucking a string of a music instrument), 'bow' (e.g. to play or mimic playing a violin with a violin bow), 'point' (e.g. to point at a representation, manipulative, instrument, etc, for example to indicate a correct source of a music note, rhythm, pitch, melody pattern or other similar music element) or other similar variations.

MLMMS Manipulatives are a set of tools comprising MusicMats, MusicCups, CupHolders, MiniMusicCups, MiniCup Holders, MusicCards, MiniMusicCards, Magnetic MusicDots, MatrixBoards and ConductingFlags. Each of these manipulatives may indicate an image, number, letter, symbol, shape, coordinate system, or other representations which, based on the curriculum or context, can be used to represent a music note, rhythm, pitch, melody pattern, a modification thereof, or other similar musical element. The modification may be, for example, modifying at least one of an accent, volume, articulation, or chromatic alteration of the music note, rhythm, pitch, melody pattern or other similar musical element. One or more manipulatives may also be configured to interact with other manipulatives to indicate different variations of a musical element.

Beginning Silent Practice Charts are charts that depict instructions and pictures that guide a user to familiarize with, for example, the Symbolic Interdisciplinary Multi-Representation Systems, as well as basic hand-placement finger skills of various music instruments and their corresponding music notes, rhythm, pitch, or melody pattern. These charts may be used alone or with one or more MLMMS Manipulatives to familiarize a user with the Symbolic Interdisciplinary Multi-Representation Systems, or establish the vocal literacy link with basic hand-finger placement skills that will be transferred across various instrument types on both silent practice instruments (e.g. stage 2) and then traditional music instruments (e.g. stage 3). Using Beginning Silent Practice Charts provide an opportunity for users like preschool children to simultaneously process the vocal decoding of diverse musical literacy symbol systems in coordination with technical hand-finger skills that will later transfer smoothly to musical instrument techniques. For example, when users such as preschool age children say, then sing-finger depictions of MLMMS rhythm and pitch patterns on IMMILS fingering charts, they will be establishing, coordinating, and myelinating increasingly complex music literacy skills underlying musical instrument performance skills.

The silent practice instruments are instrument models that are modelled to resemble music instruments such as a violin, pan drum, xylophone, recorder, tubano, and other similar instruments. Each silent practice instrument facilitates learning how to play a music instrument that it resembles, and may be further modelled with additional parts like cushions, thumb rest, or other similar parts to, for example, make holding the silent practice instrument more comfortable for children.

The methodology and toolkit for music literacy learning is unprecedented in its scope of use in preschools, its suitability for integration with preschool math and language classroom instruction, its compatibility with social-emotional personal development, its potential for music and music integration education reform, assessment and research, and its general applicability to parent home music learning and learning reinforcement practices. It is designed to establish a foundation for musical literacy skill development for all young children (e.g. ages 18 months to 6 years) to parallel, if not exceed, expectations for math and language literacies and their impact of children's cognitive and neurological growth throughout their preschool years. The essential idea of the methodology and toolkit for music literacy learning curriculum is to treat music as a core subject at the center of the preschool curriculum by designing a 4-day a week program aimed at developing progressively complex, stabilized, and internalized understanding of musical literacy skills that then can be transferred to the learning of multiple musical instruments (e.g. percussion, tonebars, keyboards, recorders, and violin) over, for example, five years of preschool instruction. This is advantageous over and in contrary to conventional preschool programs that only relegate music to once a week enrichment classes with little or no expectations for learning or understanding how to decode, compose, perform, or recognize rhythm, pitch, melodic or ensemble music, let alone children learning the same extensive repertory of music on five different multiple instruments.

The methodology and toolkit for music literacy learning combined MLMMS-IMMILS kits will challenge 21st century "music in education" teachers to guide children joyfully through a uniquely resourced classroom of myriad music literacy manipulatives and linguistic-mathematical-musical symbolic representations (all later described in detail in the present disclosure). The tools and method of this system are based on many new tools and methods discovered and developed by Dr. Scripp as a result of his decades of research into children's musical development. The new methodology and toolkit for music literacy learning MLMMS-IMMILS kits are, based on the investigation into fundamental concepts and symbolic representations shared between music, math, and language, shows how leveraging the inextricable inter-relationships among these domains constitutes a breakthrough in understanding the value of crossing the barriers among these cognitive domains. Thus, the MLMMS-IMMILS tools and methods are designed to enable virtually all children to stabilize and then internalize the integrative understanding of music literacy skills that then can be applied to reading, performing, transcribing and composing literacy skills in music, language, and analogously, reasoning, numeracy, seriation, proportion, order, sequence, hierarchy and other quantitative reasoning skills in mathematics.

Research reported on the development of Music Plus Music Integration programs (Scripp & Gilbert, 2016) shows that when music becomes a core focus of young children's learning in schools, it benefits learning in other areas of the curriculum such that it becomes a hotbed for teaching for learning transfer through interdisciplinary inquiry-based practices. According to MindChamps CEO David Chiem, putting music at the center of preschool curriculum—rather than as a weekly afterschool enrichment class—represents the cornerstone of the integrated multiple literacies mindset and thereby optimizes the extraordinary potential value and efficacy of music in 21st Century education.

The combined MLMMS-IMMILS kits, by making available to all preschool children the empowerment of musical literacy skills and access to multiple instruments, can, for the first time, create a new equity in music education for all students and, as recent advances in neuroscience now suggest (Fujioka, et al., 2006; Lappe, et al., 2008; Manzano & Ullen, 2018), provide new opportunities for optimizing brain growth and the concomitant cognitive benefits of comprehensive musical literacy skill instruction. That is, MLMMS-IMMILS trained children can be expected to benefit from an empowering music literacy learning process that leads smoothly to the acquisition of complex integrated literacy-based performance skills on five types of music instruments: vocal, percussion, tonebars/keyboards, recorders, and violin. Sadly, when private instrumental instruction does not support the integration of basic literacy skills with instrumental performance skill development on a single instrument (let alone the five instruments of IMMILS), musical understanding is both limited and compromised. That is, the lack of internalized comprehensive literacy skills that guide intonation, tempo, rhythm, and pitch pattern processing impairs musical development for most students as they go forward with musical studies often throughout their lifetime.

As in language and math preschool instruction, music students deserve equal opportunity for comprehensive, richly empowering literacy skill development, and school populations deserve the opportunity for an education that benefits from a multiple, integrated literacies-based curriculum. That is, if preschool children are expected to develop language concepts through oral, listening, writing and reading comprehension skills—and similarly expected to develop comprehensive math numeracy skills, quantitative reasoning, computation and problem solving skills—the methodology and toolkit for music literacy learning MLMMS-IMMILS kits will ensure that 21st century preschool students can also be expected to develop parallel aural, listening, reading, analytic music literacy skills—that actually depend in part of shared language and math concepts and processes—that are not at present expected, let alone provided systematically in preschools worldwide.

Therefore, the effective adaptation of the research-based methodology and toolkit for music literacy learning in preschools not only will optimize children's brain growth and minds but will also optimize the entire preschool curriculum by virtue of its integration of shared fundamental concepts and effective social-personal learning Up to now, conventional music teachers or administrators have not known how to design, offer, and evaluate comprehensive music literacy-based multiple-instrumental study that is optimized by its close association with concepts shared with math, language, or social-emotional skill development. The adoption of the MLMMS-IMMILS combined kits promise to solve the challenge of putting music literacy skills development at the core of the 21st century preschool curriculum.

The combined MLMMS-IMMILS is best understood by the purpose and function of its tools and how the focus of comprehensive skill development shifts according to the 3-stage development of its principal strands and their application to learning transfer:

Stage 1: Use of Multiple Representations, Beginning Silent Practice Charts

Stage 2: Matrix-Manipulatives, Transitional Silent Practice Instruments

Stage 3: Application to traditional instruments, ability to process Curriculum Repertoire MatrixBooks In stage 1, the principal focus is the development of foundational vocal and kinesthetic music literacy skills through the use of multiple representations and Beginning Silent Practice Charts. Shared interdisciplinary representations such as images, numbers, letters, coordinate systems, dice, projected or displayed on magnetic white boards, and other similar representations can be used to establish the values of the music literacy rhythm and pitch matrix manipulatives. Because musical literacy skills are inextricably related to shared fundamental concepts in language and math, these representations serve as foundational representations of the elements of musical pitch and rhythm. In stage 1, users are also provided with a simple introduction to hand/finger placement and movement, as well as music production of various music instruments such as a drum, violin, recorder, tonebar, keyboard and other variations.

Using stage 1 Silent Practice charts provide an opportunity for users like preschool children to simultaneously process the vocal decoding of diverse musical literacy symbol systems in coordination with technical hand-finger skills that will later transfer smoothly to musical instrument techniques. For example, when preschool age children say, then sing-finger depictions of MLMMS rhythm and pitch patterns on IMMILS fingering charts, they will be establishing, coordinating, and myelinating increasingly complex music literacy skills underlying musical instrument performance skills.

In stage 2, the principal focus is that of deepening music literary skills through the use of Multiple Matrix-Manipulatives and mastery of Transitional Silent Practice Instruments. These various tools in the MLMMS-IMMILS kit are primarily used to organize, facilitate, and precisely replicate a greatly expanded array of speech-driven rhythm, vocal pitch and melodic patterns on a large array of matrices. Stage 2 musical literacy hands-on manipulatives (MusicMats, MusicCups, MusicCards, Magnet MusicDots/MatrixBoards, ConductingFlags) are deployed to establish a fluent and flexible understanding of how musical literacy skills represent multiple ways of understanding fundamental concepts and processes embedded in musical design and how translation into performance is a problem-solving process that can lead to multiple forms of translation, interpretation, and deliberate variation of musical design. Understanding music as a literacy skill, and not a rote memory skill, involves a series of problem-solving skills that can be infinitely varied through exploring changes in the original design of the music as a process by which the musical literacy processes become more precise and stable. When music manipulatives are framed by matrix systems, users such as children skilled in musical literacy are empowered to continually construct, deconstruct, vary, and reconstruct musical patterns through their understanding of literacy skill development while developing a multi-faceted, reinforced understanding of the musical inter-relationships that can exist between the initial decoding and interpretation of musical content through variation and rearrangement.

The MLMMS-IMMILS kit prepare users like preschool age children for the translation of the vocal and body rhythm music into instrumental performance by way of an invented set of transitional silent practice instruments. The IMMILS Beginning Practice Charts (PanDrum, ToneBar, GlockBars, Keyboards, Recorders, Violin) and Transitional Silent Practice Instruments (PanDrum, ToneBar Interval Box, Recorder, Violin & Bow) provide the pivotal intermediary step between the stage 1 silent practice finger charts and their application to purchased traditional instruments. That is, mastery of stage 2 IMMILS silent instruments demonstrates how vocal music literacy skills govern the technical skill development required to simultaneously finger a silent musical instrument and sing what an increasingly musically literate user such as a preschool student eventually expects to produce on a real musical instrument.

The MLMMS-IMMILS supports young children's internally generated musical understanding and skills learned by sing-fingering the IMMILS stage 1 charts while transitioning smoothly to sing-fingering-bowing the stage 2 silent practice instruments. As a result of practicing on transitional silent replications of the real instruments, the preschool age child heads toward the final step of playing the real instrument with the positive growth mindset of integrated learning transfer. Furthermore, the systematic and strategic use of charts and practice instruments helps the children to learn instruments more rapidly, assuredly, and effortlessly as they successfully meet the challenges of the step-by-step multiple instrument learning and processing increasingly complex repertoire bolstered by underlying, previously established music literacy skills.

In stage 3, the MLMMS-IMMILS now focus on learning to adapt Transitional Silent Practice Instrument skills to purchased traditional instruments together with the further development of music literacy-based reading, analyzing, interpreting, and recomposing skills now processed through decoding the form and detail of musical literature represented in one of a plurality of MatrixBooks for voice, hand drums, keyboards, recorder, violin, ensembles, active listening, theme books, and technical exercises. This stage of application is defined by the culmination of two complementary forms of integrative learning transfer. First, the broad base of literacy skill development is now focused on a vast number of occasions for the music reading process to flourish as time is taken to perform musical segments "ten different ways, rather than perform ten songs in one way." Second, music reading and other literacy processes are emerging from stable, yet flexible, internalized grasp of music literacy skills. At this stage, the young preliterate students are now directed toward their application and integration within the process of learning transfer of finger patterns across seemingly disparate instruments. Energized by the process discovering how solving technical skills needed to sing-play one conventional instrument reinforces another similar sing-fingering pattern on another musical instrument. For example, the hand position needed for the left hand of the keyboard, the recorder, and the violin are physically similar in hand-finger shape and coordination, a realization that the young students discover as they proceed through the curriculum. By insisting that vocal music literacy skills continue to guide instrumental performance development, practicing say-sing-play performance methods continue to be the norm for mastery of instrumental rhythmically driven techniques and vocally derived intonation and the ability to noticing similarity in musical patterns across different songs in the MLMMS-IMMILS based curriculum.

Rather than discarding Stage 1-2 fingering Beginning Silent Practice Charts and Transitional Silent Practice Instruments after turning toward instrument performance on real instruments, the MLMMS-IMMILS empowered users such as preschool children continue to benefit from their music literacy, sing-point practice charts and transitional silent practice instrument problem solving skills as they alternate between silent and sounding instrumental performance. This methodology of continual variants in instruments or songs results in many opportunities for learning transfer in ways that builds confidence in all champs that they can use to overcome the challenges of performing increasingly sophisticated repertoire in tandem with continuing to value and nurture their music literacy skill development achievements.

Lastly, because of the musical preparation that the MLMMS-IMMILS kits provide, preschool age children can enjoy using all the constituent components to promote the creation of music literacy infused performance practices in conjunction with learning transfer boost that comes from freely transitioning "from chart to practice instrument to real instrument" as the musical instrument skills remain constant enabling students to experience a greater depth of musical expression and understanding as they progress.

Figure 1B:
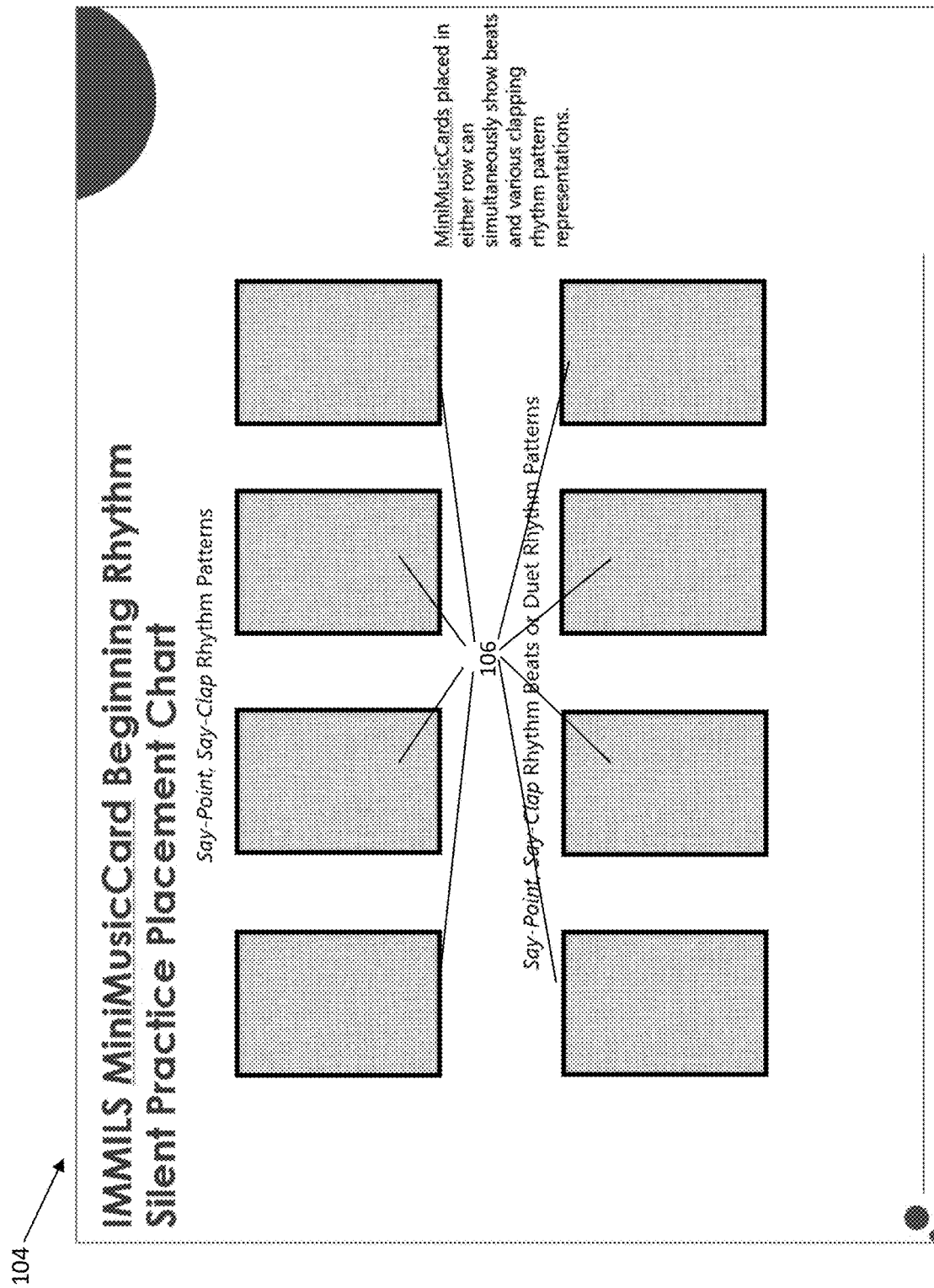

Silent Practice Sheets facilitate learning of music throughout the 3 stages as mentioned above, and are divided into Stage 1 Silent Practice Sheets, Stage 2 Silent Practice Sheets and Stage 3 Silent Practice Sheets, with increasing levels of detail, complexity and difficulty from stage 1 to stage 3. An example of a Silent Practice Chart 100 for practicing rhythm is shown in FIG. 1A. Silent Practice Chart 100 comprises two rectangles 102 and 104, each rectangle further comprising linearly aligned squares 106. One or more MiniMusicCups may be placed in the one or more squares to represent beats, various clapping rhythm pattern representations and other similar musical representations depending on the curriculum to facilitate learning rhythm and rhythm patterns. A user may be guided to vocally perform a rhythm or rhythm pattern that is represented by a MiniMusicCup and its position on the Silent Practice Chart 100. In another variation, Silent Practice Chart 104 of FIG. 1B provides one or more rectangles 106 on which MusicCards may be placed to represent beats, various clapping rhythm pattern representations and other similar musical representations depending on the curriculum to facilitate learning rhythm and rhythm patterns. It will be appreciated that other variations of the illustrations are possible for learning rhythm, with varying levels of details, complexity and difficulty from stage 1 to stage 3.

Figure 2A:
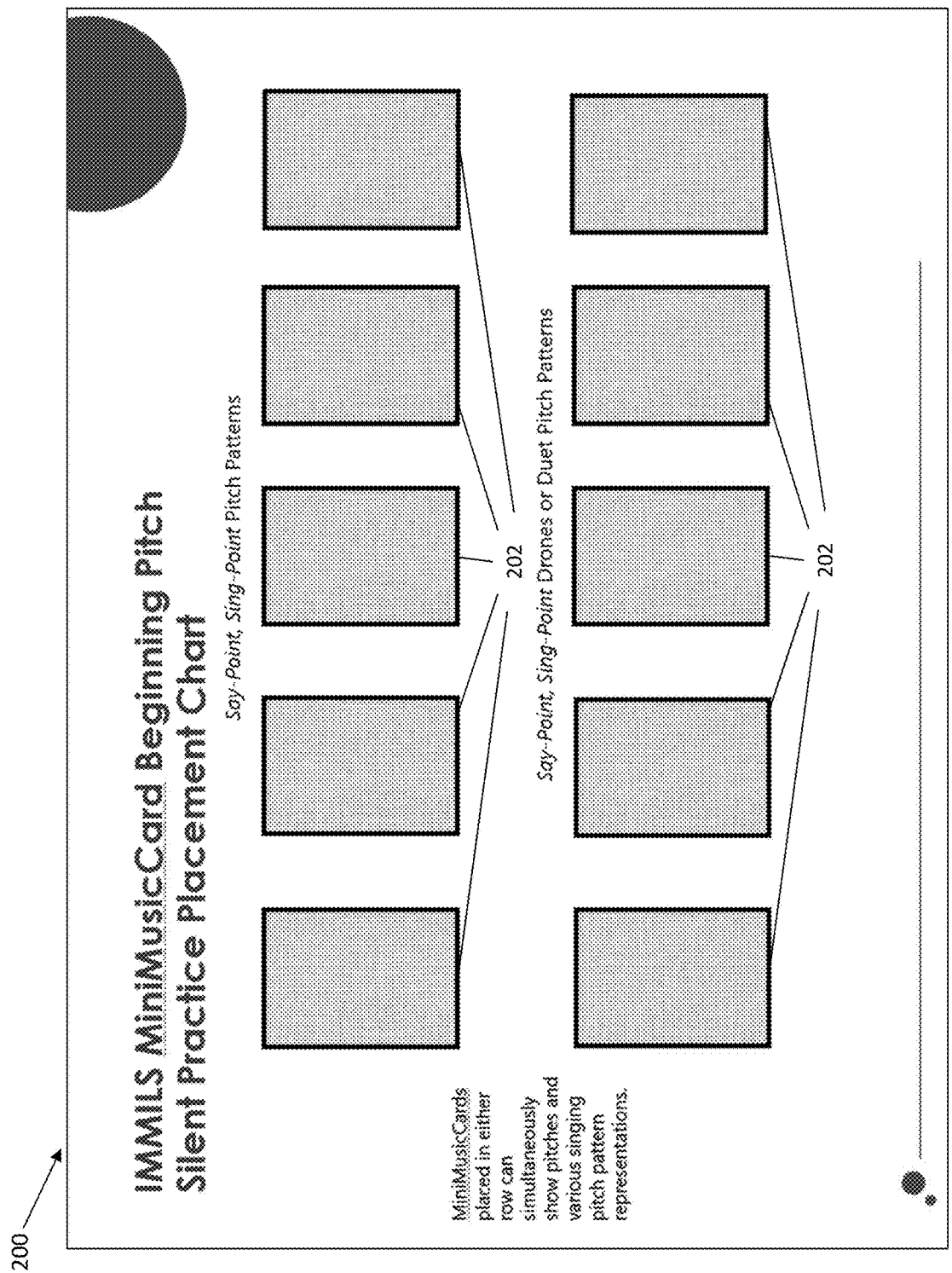
FIGS. 2A-2B show example Silent Practice Charts for practicing pitch, according to various embodiments.
Figure 2B:
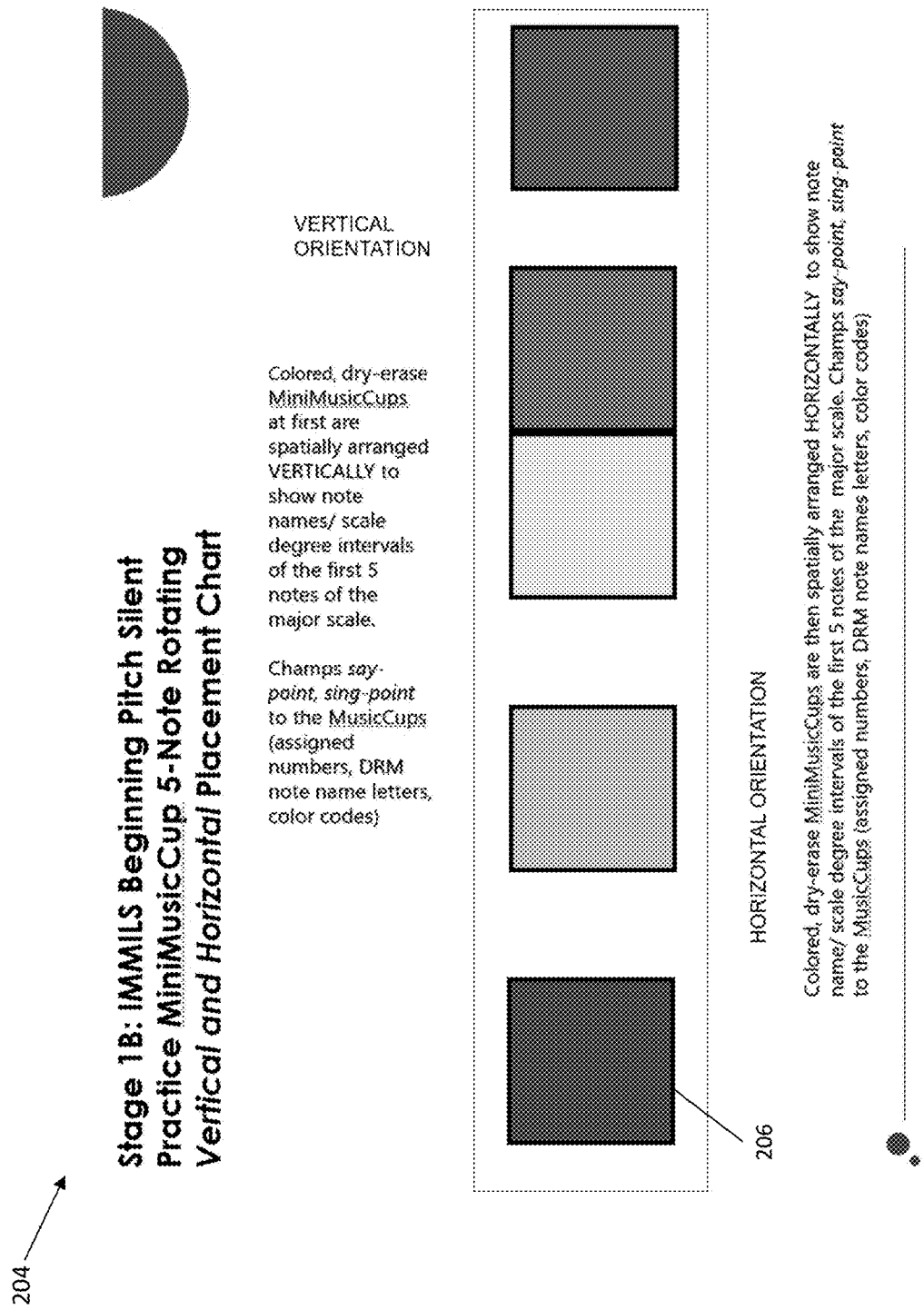

FIG. 2A shows another example Silent Practice Chart 200 for practicing pitch. Silent Practice Chart 200 comprises a plurality of rectangles 202 arranged in 2 rows, wherein one or more MiniMusicCards can be placed in either row to simultaneously show pitches and various singing pitch pattern representations depending on the curriculum to facilitate learning pitch and pitch patterns. A user may be guided to vocally perform a pitch or pitch pattern that is represented by a MiniMusicCard and its position on the Silent Practice Chart 200. In another variation, Silent Practice Chart 204 of FIG. 2B provides one or more squares 206 on which MiniMusicCups may be placed to represent pitches and various singing pitch patterns depending on the curriculum to facilitate learning pitch and pitch patterns. It will be appreciated that other variations of the illustrations are possible for learning pitch, with varying levels of details, complexity and difficulty from stage 1 to stage 3.

Figure 3:
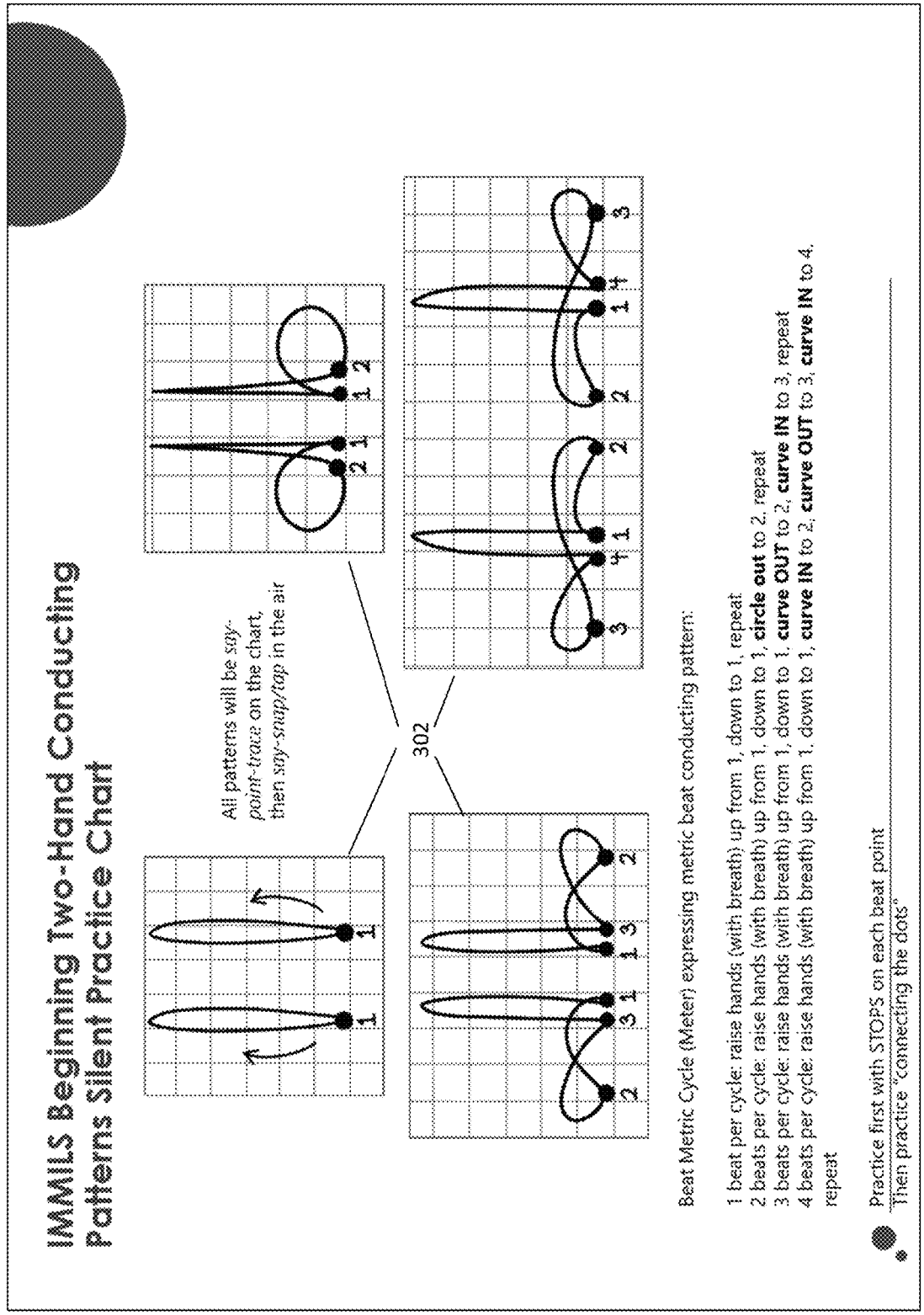
FIG. 3 shows an example Silent Practice Chart for practicing two-hand conducting movements, according to various embodiments.

FIG. 3 shows another example Silent Practice Chart 300 for practicing two-hand conducting movements, wherein a user is guided by illustrations 302 and instructions on how to move his or her hands in coordination with, for example, a musical note, beat or rhythm, depending on the curriculum. It will be appreciated that other variations of the illustrations are possible for learning conducting movements, with varying levels of details, complexity and difficulty from stage 1 to stage 3.

Figure 4:
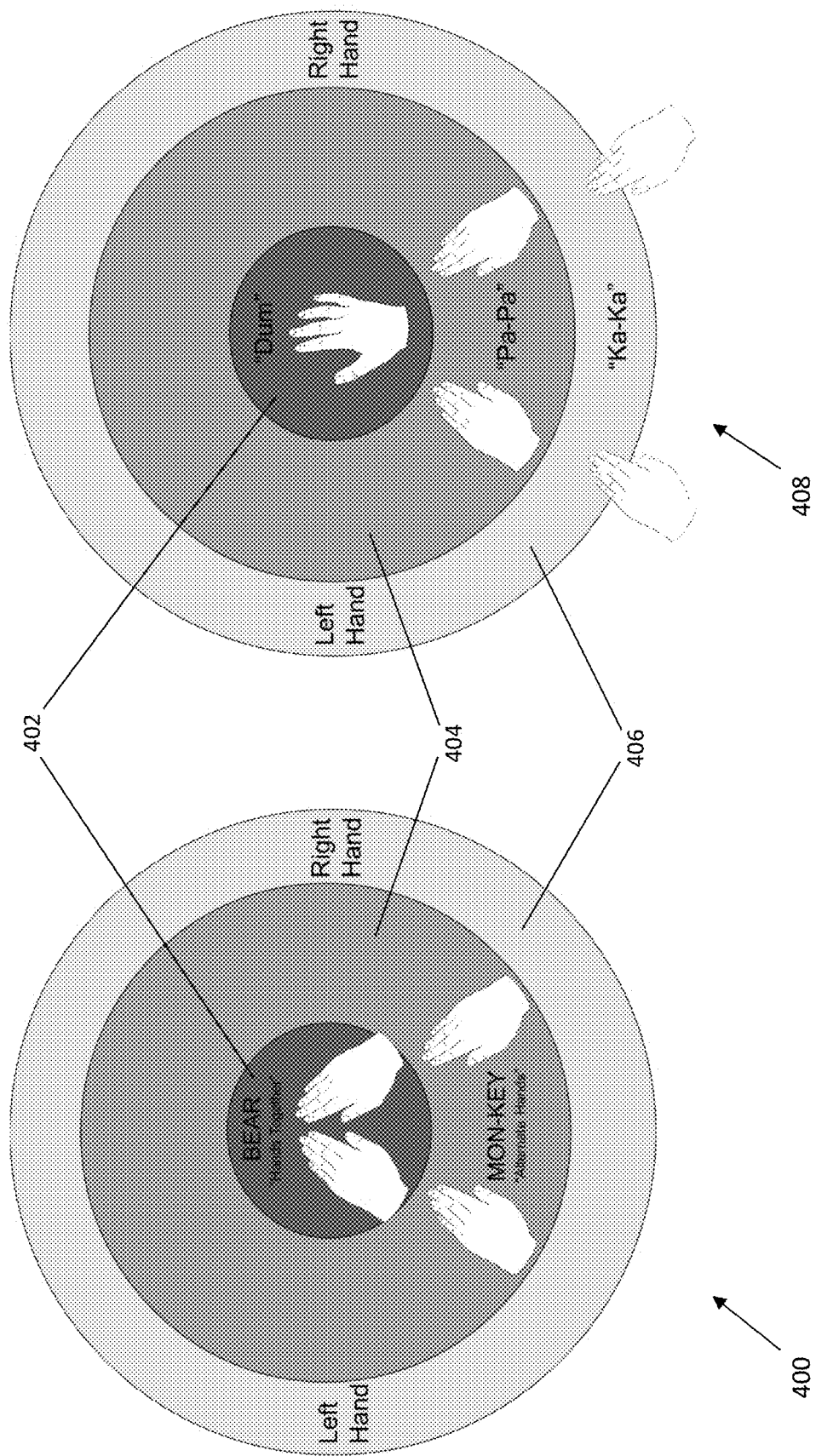
FIG. 4 shows example illustrations for a Silent Practice Chart that facilitates learning how to play a pan drum or djembe drum, according to various embodiments.

FIG. 4 shows example illustrations for a silent Practice Chart that facilitates learning how to play a pan drum or tubano (djembe) drum. Illustrations 400 and 408 shows a top of a drum such as a pan drum or tubano, and indicates 3 portions 402, 404 and 406 of the top of the drum, each portion having a different colour. Depictions of hands are also shown to indicate how a user should position his hands over the illustrations 400 and 408 to mimic playing a drum. The illustrations may also include indications on what to vocally perform when mimicking hitting a drum with hands, for example to say or sing 'bear' or 'dum' when hitting portion 402, or say or sing 'mon-key' or 'pa-pa' when hitting portion 404 twice, each time with an alternate hand. Illustration 400 features a 2-tone practice guide in which a user's hands are guided to mimic hitting only 2 portions 402 and 404, while illustration 408 features a more advanced 3-tone practice guide in which a user's hands are guided to mimic hitting all 3 portions 402, 404 and 406. It will be appreciated that other variations of the illustrations are possible for guiding how to play a drum, with varying levels of details, complexity and difficulty from stage 1 to stage 3.

Figure 5A:
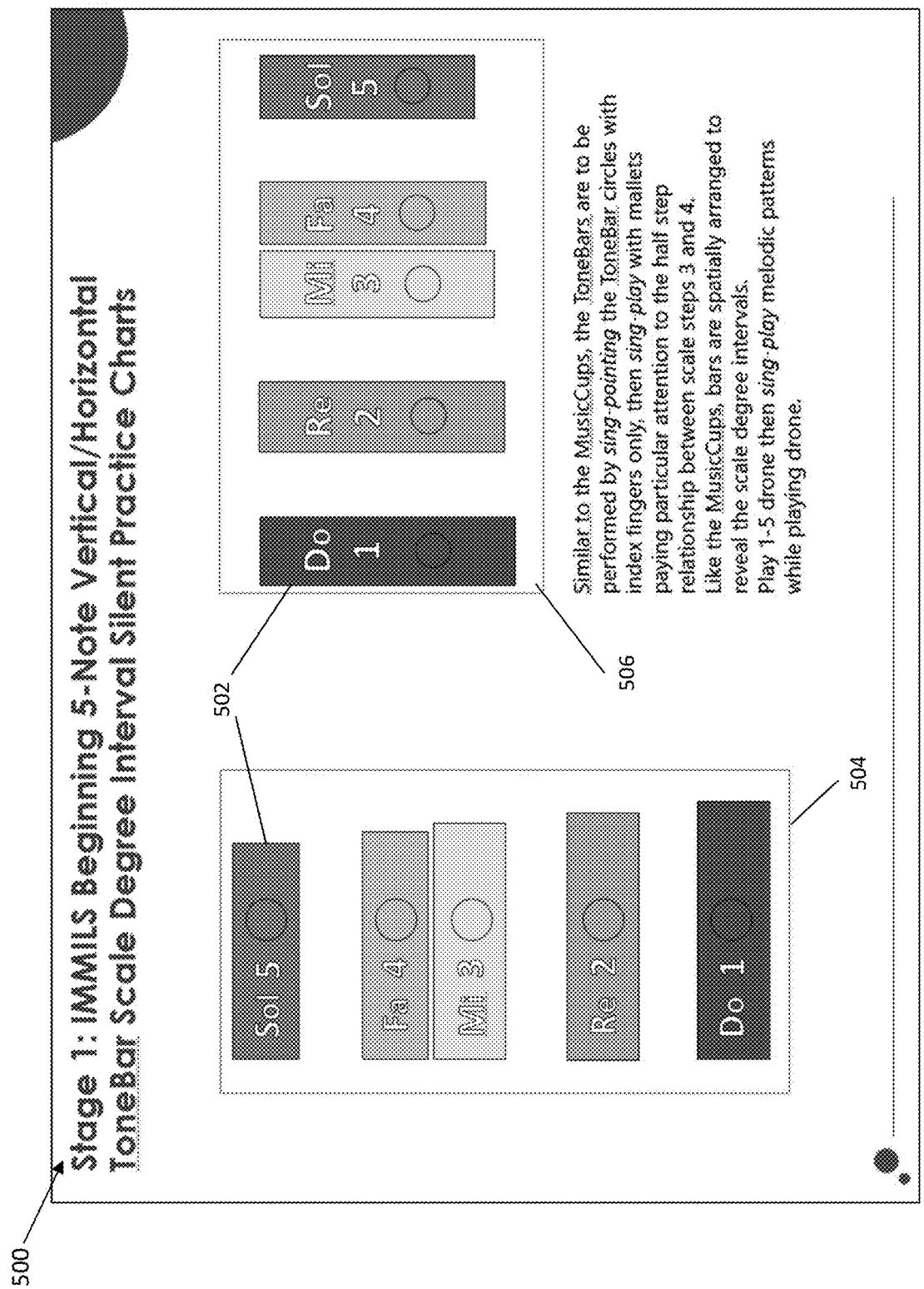
FIGS. 5A-5C show example Silent Practice Charts for learning tonebars according to various embodiments.
Figure 5B:
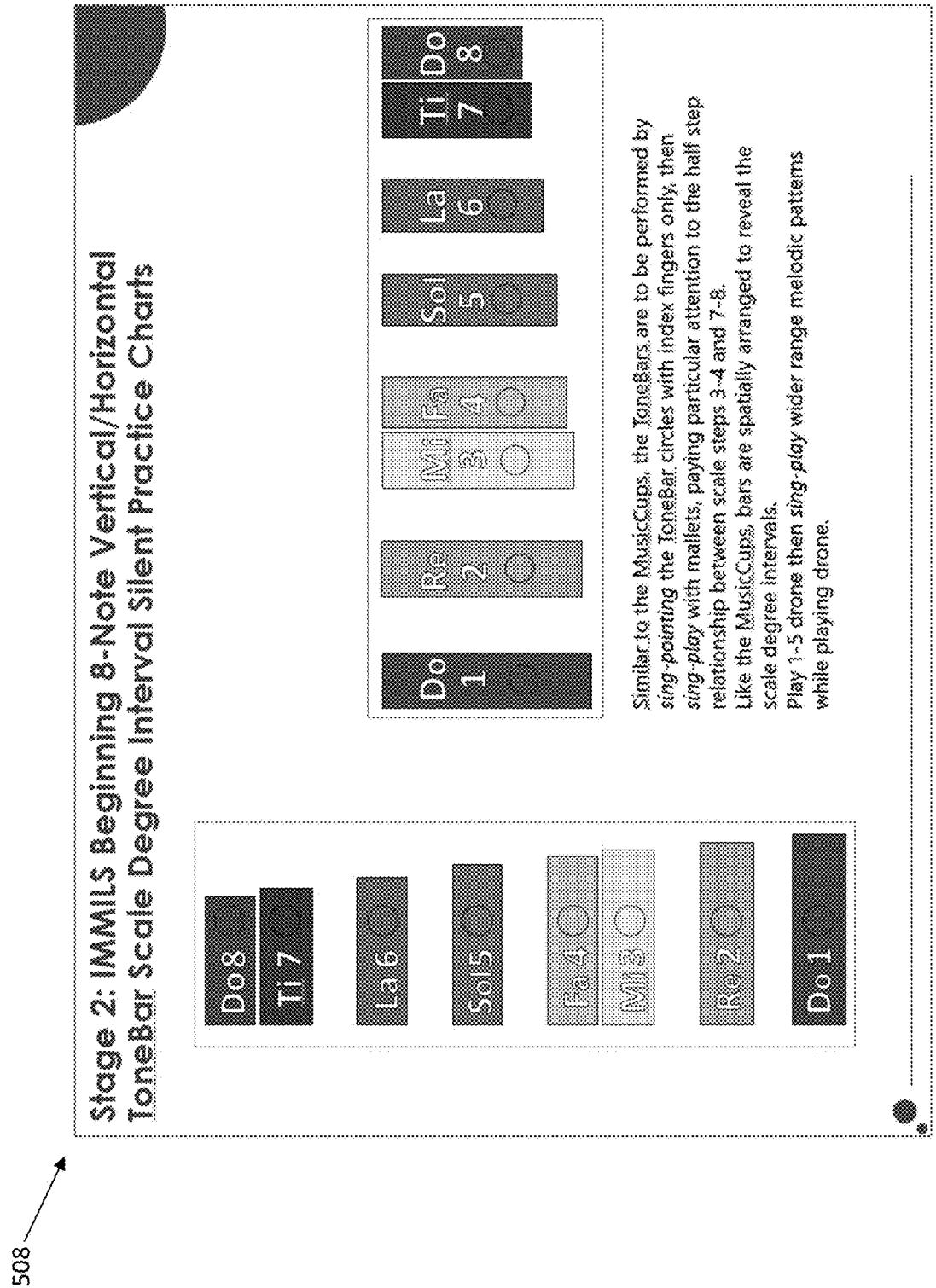
Figure 5C:
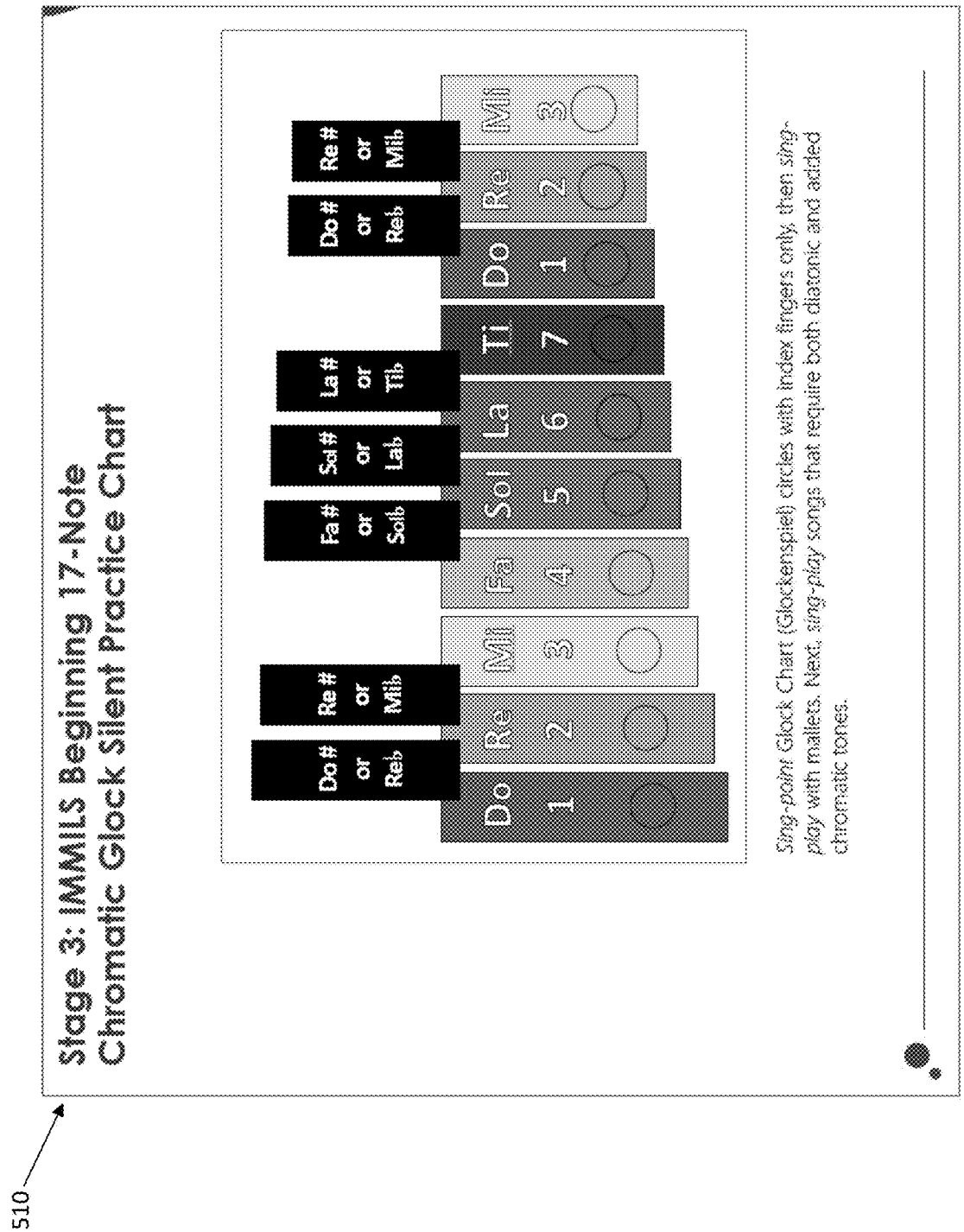

FIGS. 5A-5C show example Silent Practice Charts for learning tonebars. In Silent Practice Chart 500, one or more rectangles 502 each representing a tonebar that emits a music note may be arranged in a vertical manner as shown in rectangle 504 or horizontally like in rectangle 506. Each rectangle 502 may have a different colour to facilitate guidance e.g. through indication of colours. The rectangles 502 may be spatially arranged to reveal scale degree intervals. For example, rectangles 502 that are spaced closely to each other indicate a half-step or semitone relationship with each other, while rectangles 502 spaced farther apart have a one step relationship with one another. With the Silent Practice Chart 500, a user may be guided to 'perform' with the rectangles 502 by sing-pointing them (e.g. pointing at a rectangle 502 and singing out a music note that should be emitted by a tonebar that the rectangle 502 represents), while paying close attention to the half-step relationships between closely-spaced rectangles 502. While Silent Practice Chart 500 features a 5-note tonebar scale degree interval (e.g. 5 rectangles 502 in each rectangle 504 and 506), it will be appreciated that other variations such as 8-note, 17-note, etc are possible (e.g. for learning how to play a xylophone, glock chart/glockenspiel, or other similar music instrument), with varying levels of details, complexity and difficulty from stage 1 to stage 3. For example, FIG. 5B shows a more complicated 8-note Silent Practice Chart 508, while FIG. 5C shows an even more advanced 17-note Silent Practice Chart 510 for learning how to play a glock chart/glockenspiel.

Figure 6A:
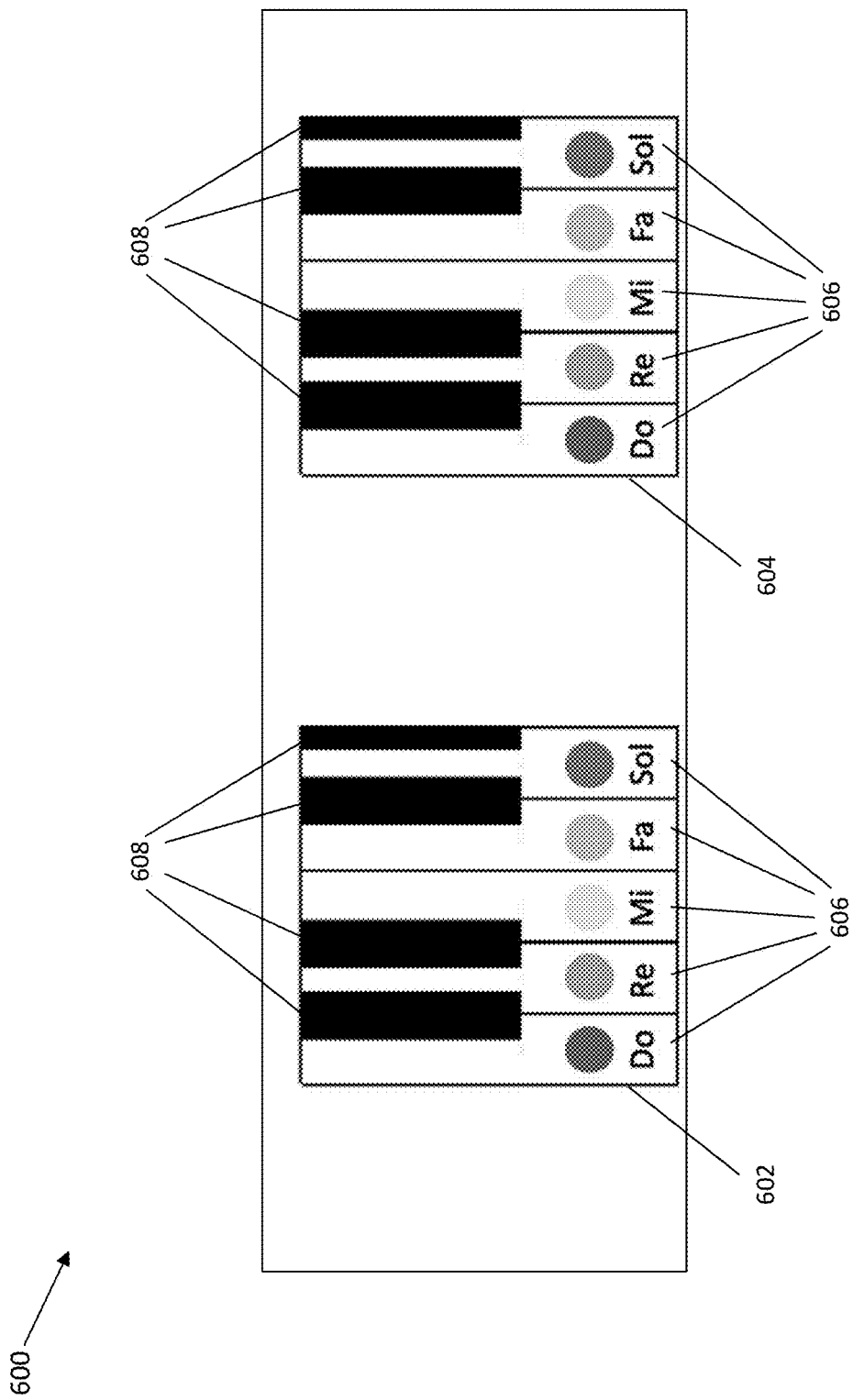
FIGS. 6A-6C show example Silent Practice Charts for learning keyboard fingering according to various embodiments.
Figure 6B:
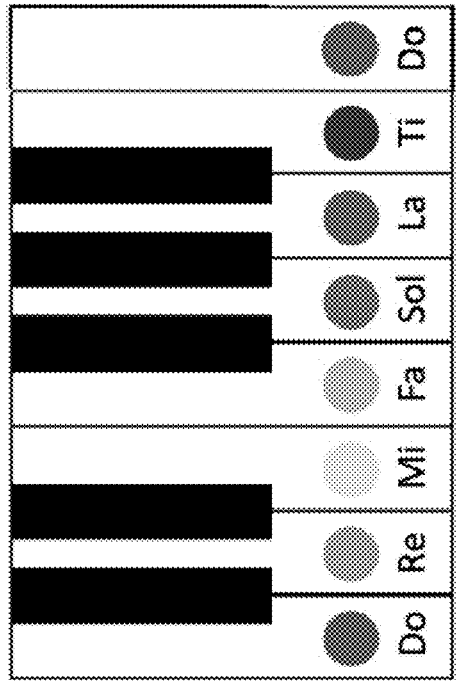
Figure 6C:
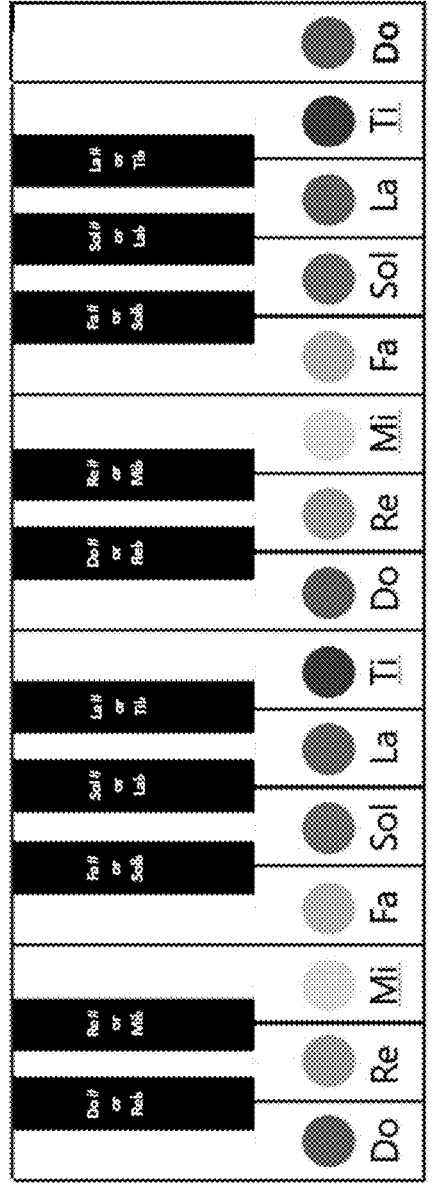

FIGS. 6A-6C show example Silent Practice Charts for learning keyboard fingering. Chart 600 of FIG. 6A shows 2 rectangles 602 and 604, each representing a 5-note diatonic portion of a keyboard, wherein each rectangle 602 and 604 comprises 5 long rectangles 606 which are positioned to resemble white keys of a keyboard and 4 short rectangles 608 that are positioned to resemble corresponding black keys of a keyboard. The long rectangles 606 may each be labelled with a corresponding music note, and a coloured circle which may serve as an indication of where a finger should be placed. A user may be guided by the chart 600 to learn left-hand finger placement on each of the long rectangles 606 in rectangle 602, and learn right-hand finger placement on each of the long rectangles 606 in rectangle 604. The user may also learn to 'say-finger' or 'sing-finger' on each of the long and short rectangles, or practice finger dexterity through mimicking playing a keyboard or piano while vocally singing out an appropriate music note when a long or short rectangle is 'pressed'. It will be appreciated that other variations of chart 600 are possible with varying levels of details, complexity and difficulty from stage 1 to stage 3. For example, chart 610 of FIG. 6B features an eight-key diatonic 1-octave keyboard representation 612 and chart 614 of FIG. 6C features a chromatic scale 2-octave keyboard representation 616 for guiding keyboard or piano learning.

Figure 7A:
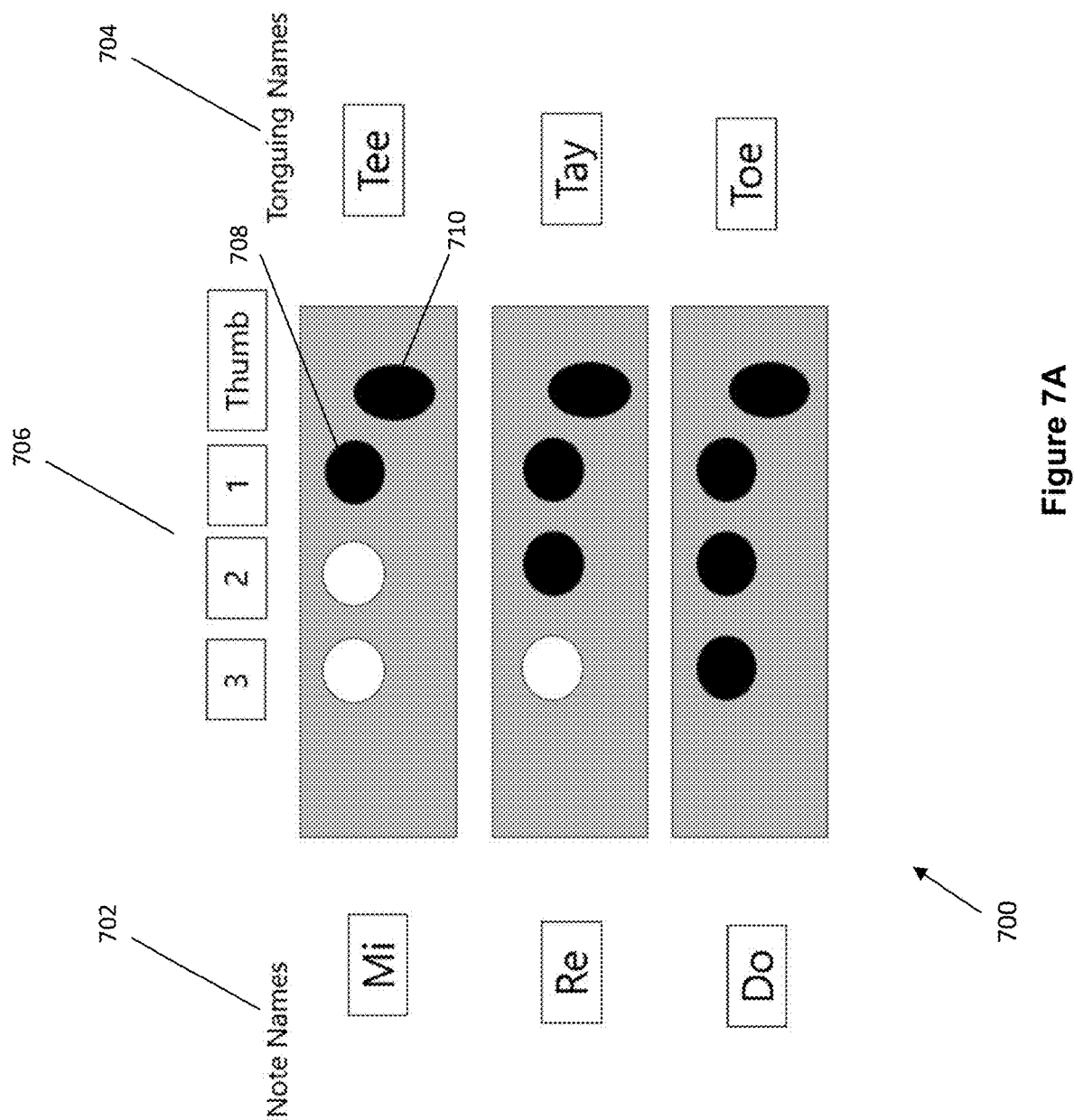
FIGS. 7A-7D show example Silent Practice Charts for learning how to play a recorder according to various embodiments.
Figure 7B:
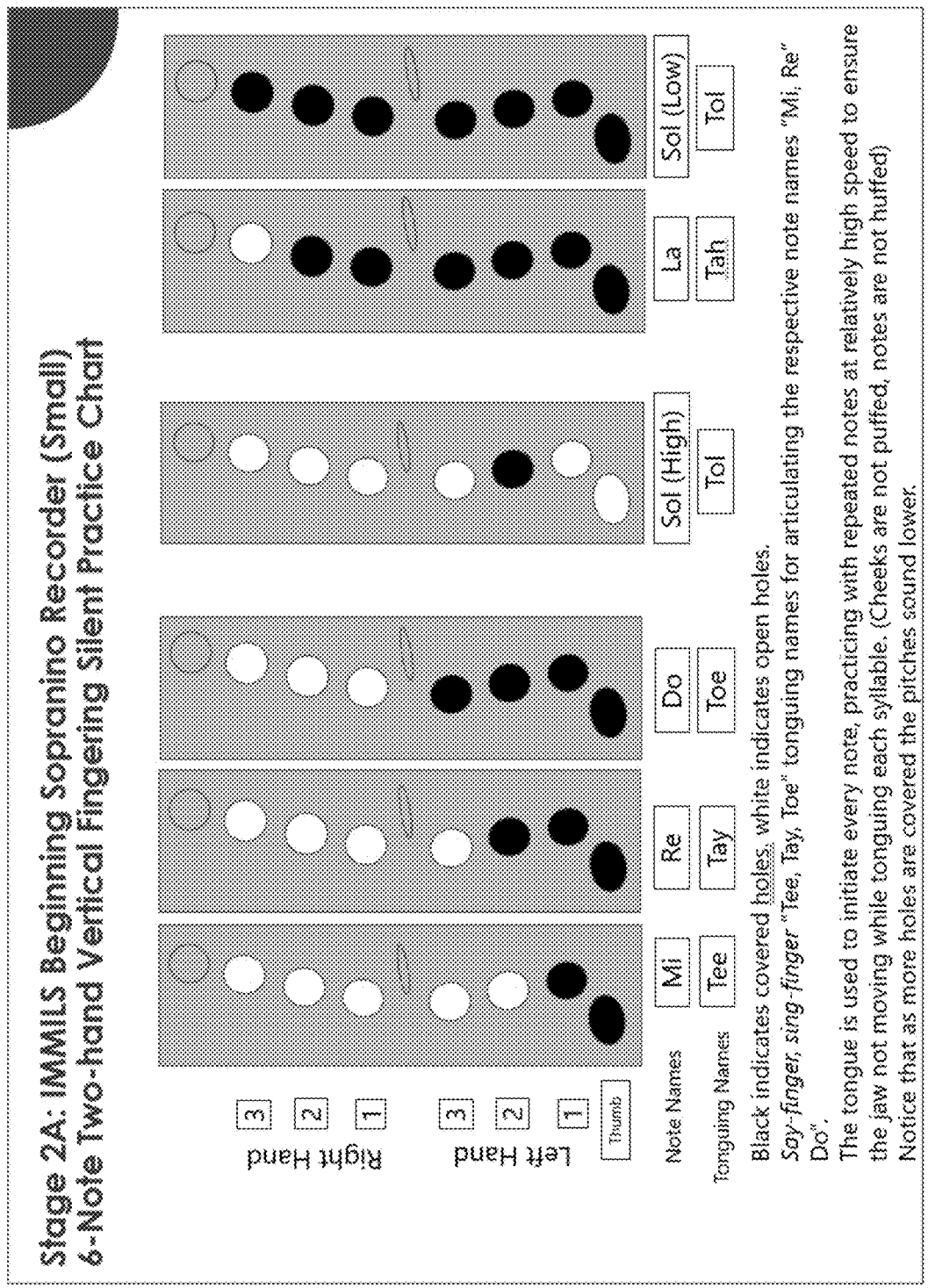
Figure 7C:
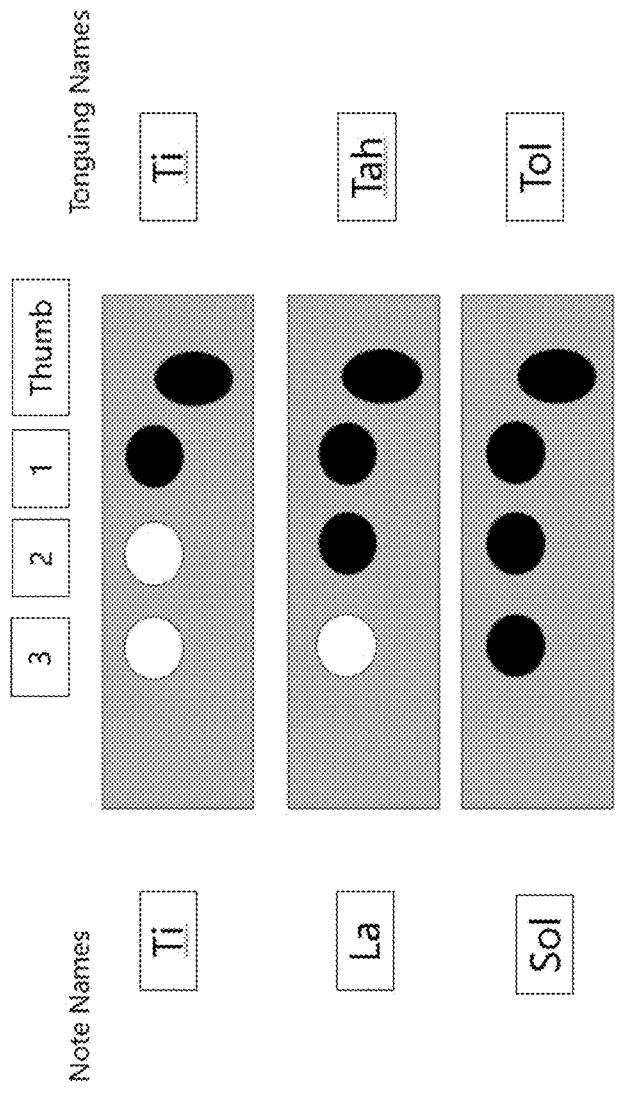
Figure 7D:
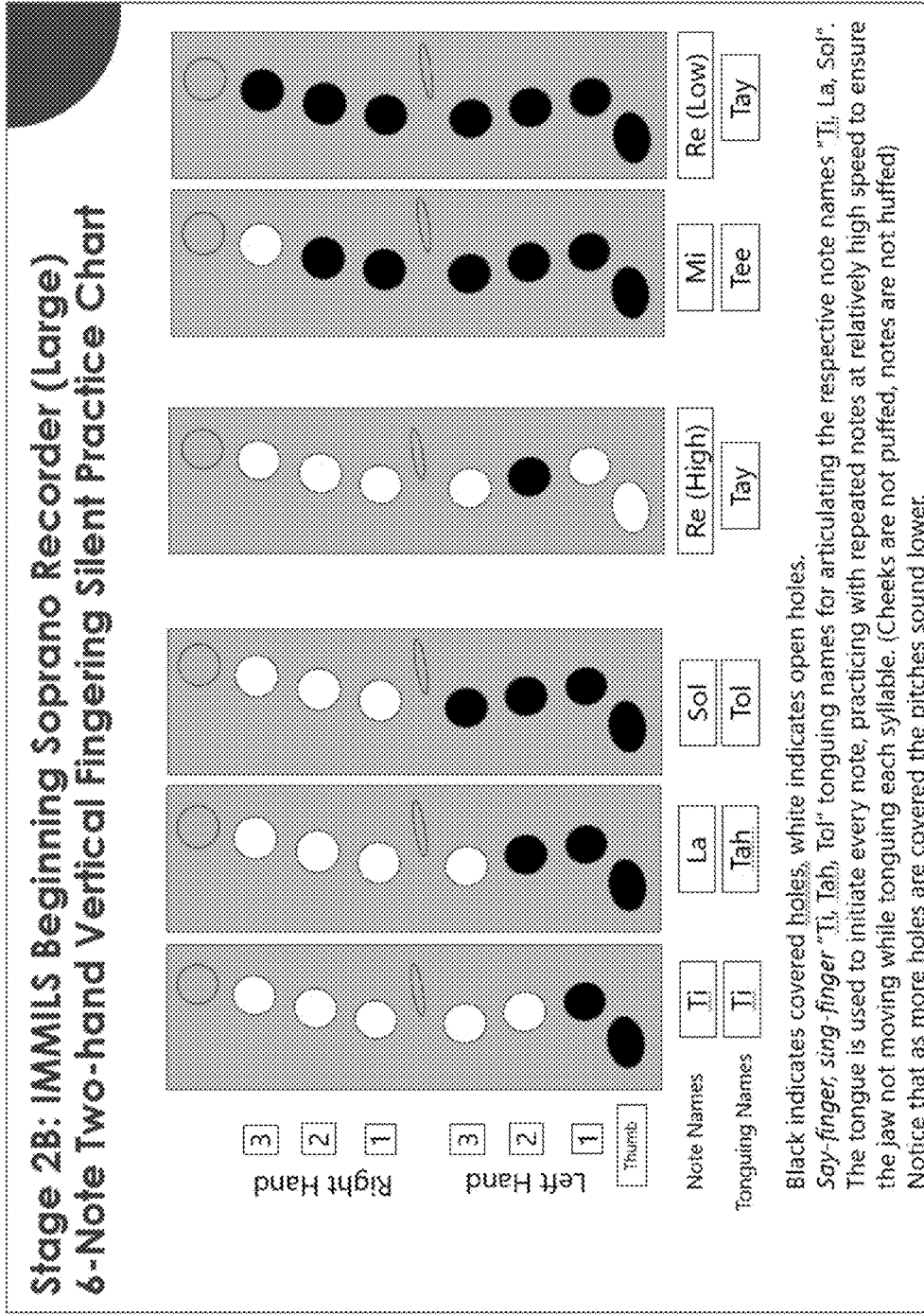
Figure 8A:
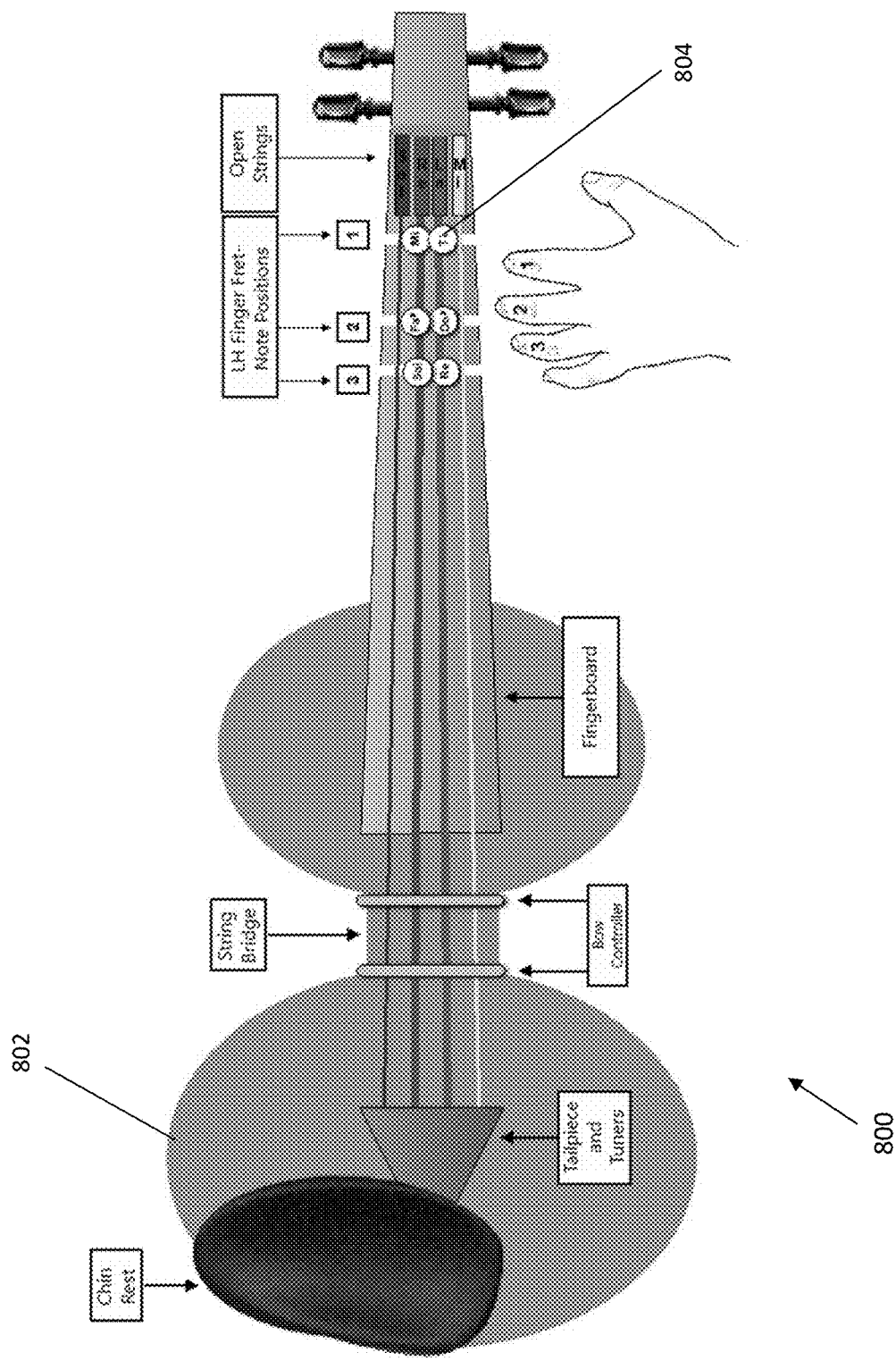
FIGS. 8A-8E show example Silent Practice Charts for learning how to play a violin according to various embodiments.
Figure 8B:
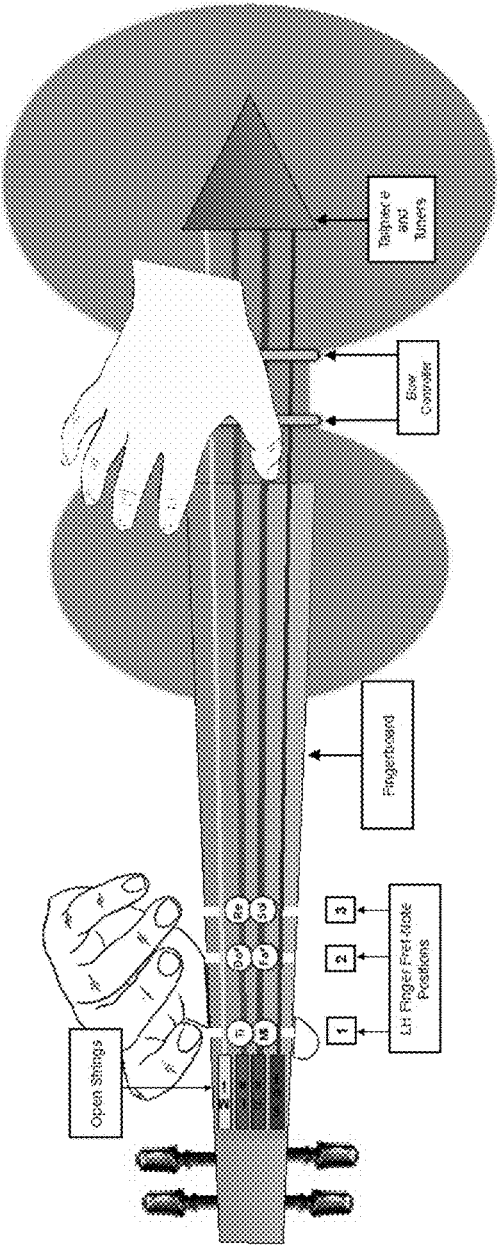
Figure 8C:
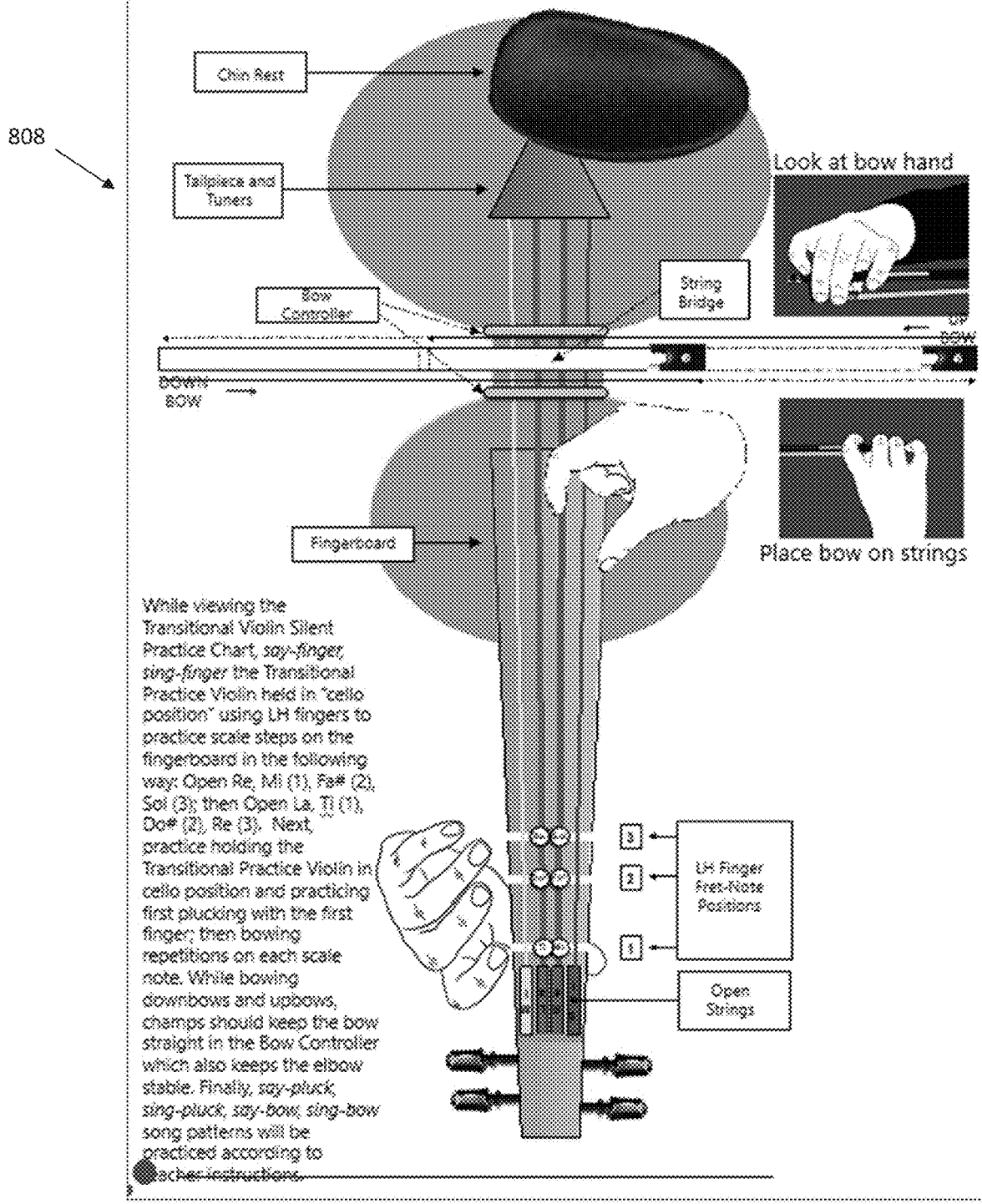
Figure 8D:
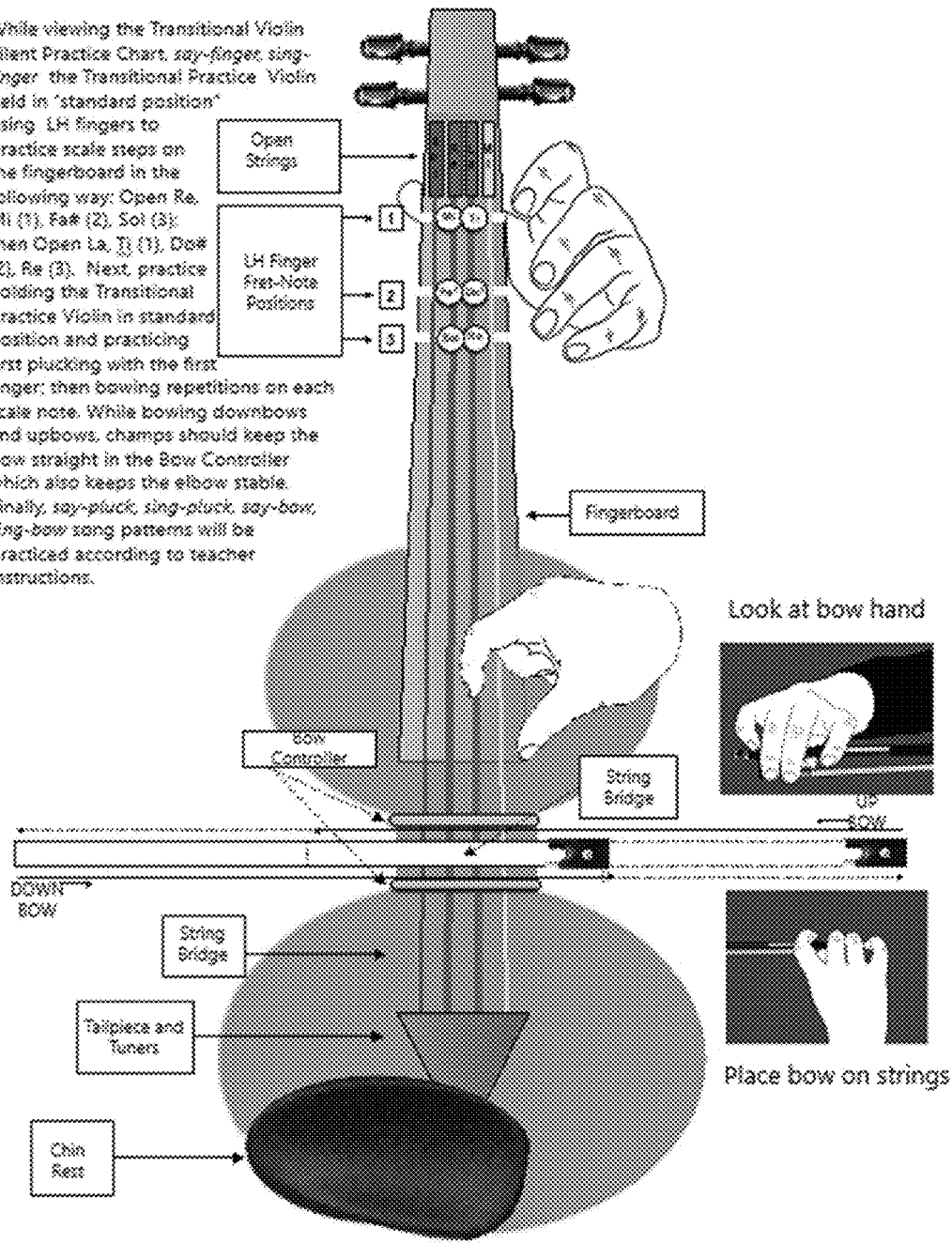
Figure 8E:
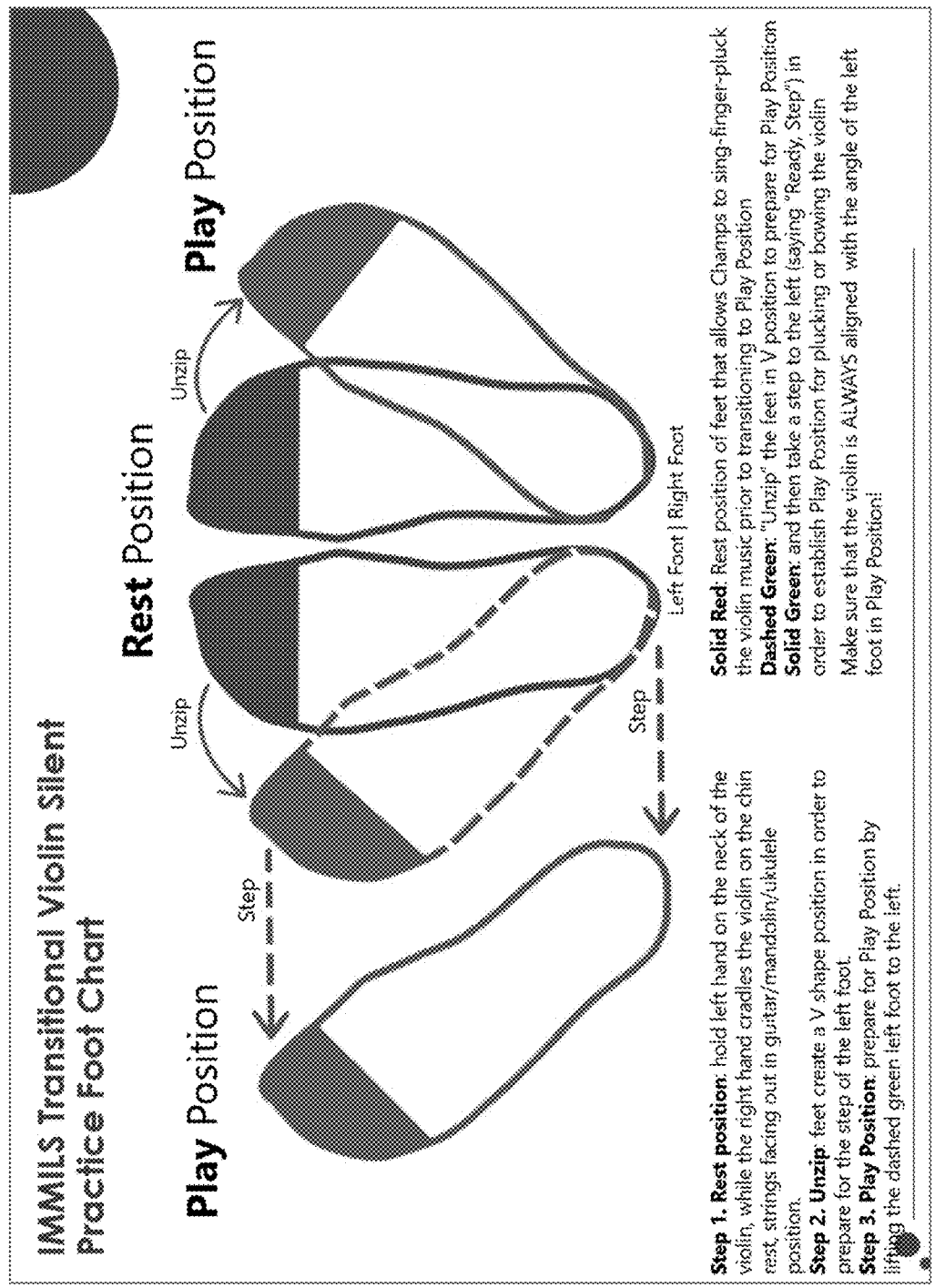

FIGS. 7A-7D illustrate example Silent Practice Charts for learning how to play a recorder. Chart 700 of FIG. 7A depicts a note name 702, a corresponding tonguing name 704 and an illustration 706 showing how to perform the note on a recorder. A tonguing name refers to how a note indicated in the note name would sound like, when vocally performed while ensuring the jaw is not moving. The illustration 706 may show a plurality of holes whose position resembles that of fingering holes of a recorder, and further indicate which holes should be covered (e.g. through colouring a covered hole differently or other similar indications) in order to perform a corresponding music note on a recorder, as well as which finger to use for covering each hole. For example, for a music note 702 of note name 'Mi', its 'tonguing name 704 will be Tee'. Further, the corresponding illustration 706 will show that holes 708 and 710 should be covered by the index finger and thumb respectively in order to reproduce the note 'Mi' on a recorder. Accordingly, a user can be guided by the chart 700 to use appropriate fingers to cover the appropriate holes illustrated on the chart, or on a silent instrument or a real recorder based on a music note, and also be guided to vocally perform the note by tonguing, as if a mouthpiece of a recorder is in front of the user's mouth and the user is blowing into the mouthpiece (e.g. without moving the jaw) of the recorder to play it. It will be appreciated that other variations of chart 700 are possible with varying levels of details, complexity and difficulty from stage 1 to stage 3. For example, chart 700 features a 3-note, left-hand horizontal fingering illustration for learning a small soprano recorder, chart 712 of FIG. 7B features a 6-note, two-handed, eight holes vertical fingering illustration for learning a small soprano recorder with instructions on which holes to cover to perform a wider variety of music notes. Further, chart 714 of FIG. 7C and chart 716 of FIG. 7D show equivalent illustrations of chart 700 and 712 respectively for learning how to play a large soprano recorder.

FIGS. 8A-8E shows example Silent Practice Charts for learning how to play a violin. In chart 800 of FIG. 8A, a violin 802 may be illustrated with each of its strings having a different colour to facilitate guidance of a user, as well as indications to guide a user on where and which finger to place on each string. The chart 800 may further indicate a music note that is produced when a string is pressed at a particular point. For example, a user may be guided to press a string with his or her left index finger at an indication 804, wherein the indication further indicates that the note 'Ti' is produced when the associated string is pressed at that point. The user may be further guided to vocally perform the note 'Ti' when pressing down on the indication 804, or when mimicking plucking or bowing of the associated string while pressing down on indication 804. In further examples, chart 806 of FIG. 8B features illustrations and guidance instructions for learning how to play a violin while holding it in a guitar position, chart 808 of FIG. 8C features illustrations and guidance instructions for learning how to play a violin while holding it in a cello position, and chart 810 of FIG. 8D features illustrations and guidance instructions for learning how to play a violin while holding it in a standard violin position. In a further variation, chart 812 of FIG. 8E features illustrations and guidance instructions for feet position and placement when learning how to play a violin. It will be appreciated that other variations of the charts in FIGS. 8A-8E are possible with varying levels of details, complexity and difficulty from stage 1 to stage 3.

The Music MatrixMats are one of the first opportunities in the MLMMS-IMMILS for users to respond precisely to the representation of pitch, rhythm, or coordinated pitch and rhythm patterns by clapping, singing and/or display finger number rhythm or pitch patterns. MatrixMats can be used to challenge users to physically align their feet with basic musical elements such as relative pitch scale degree numbers, fixed pitch names and basic rhythm animal and fruit subdivision pattern (animal name syllables), depending on the MatrixMat used and the corresponding curriculum.

Figure 9A:
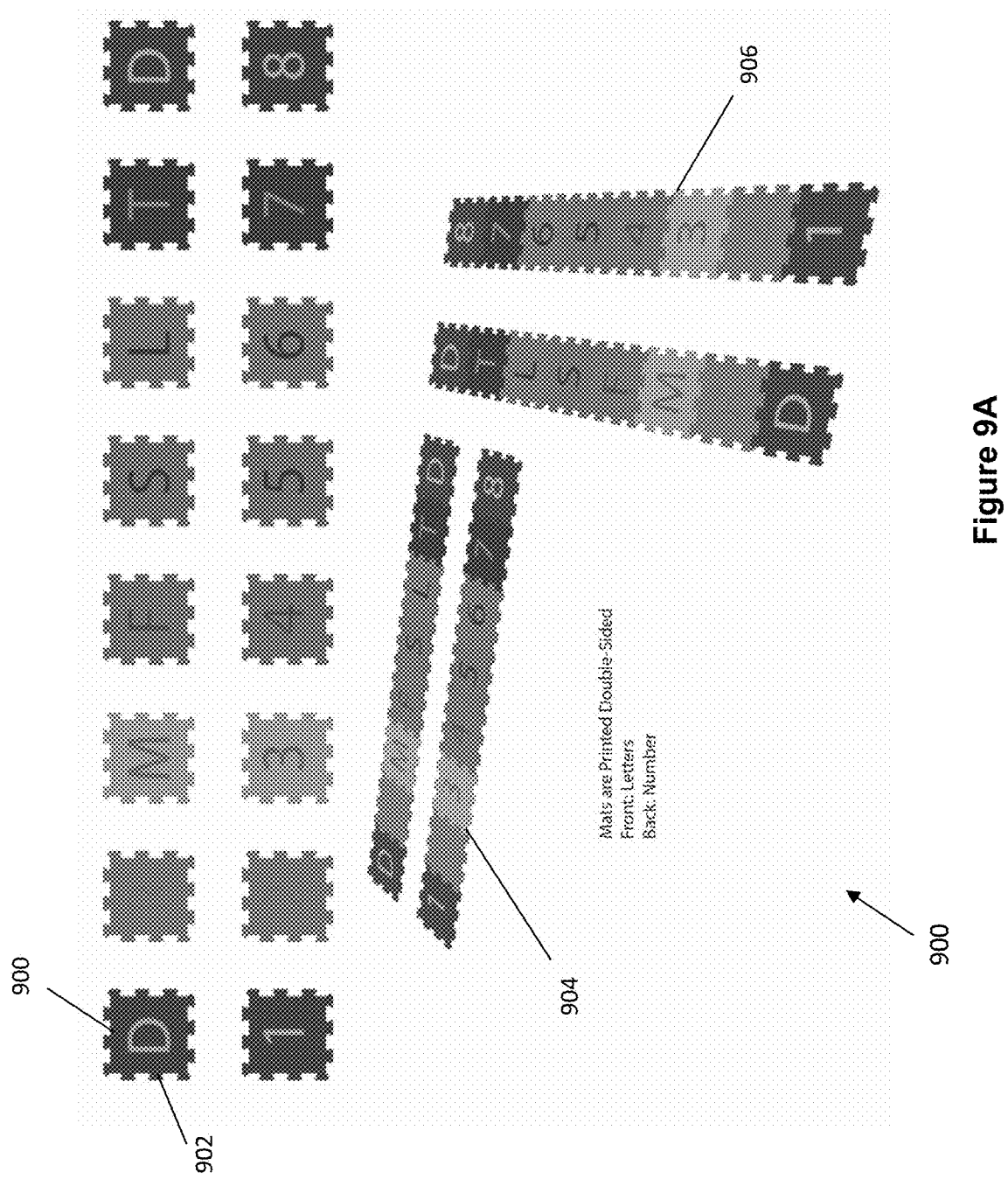
FIGS. 9A-9C show illustrations of Music MatrixMats according to various embodiments.
Figure 9B:
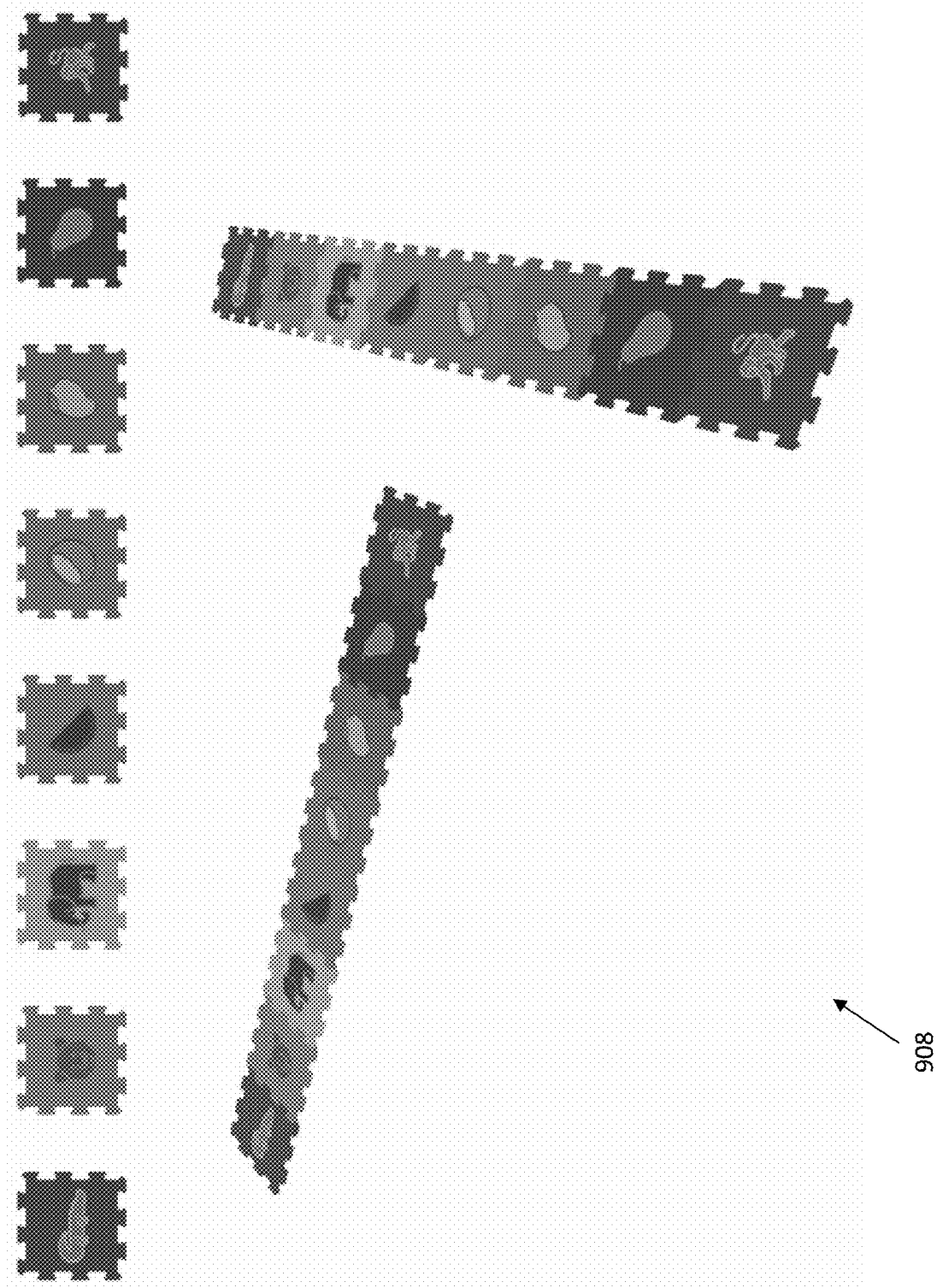
Figure 9C:
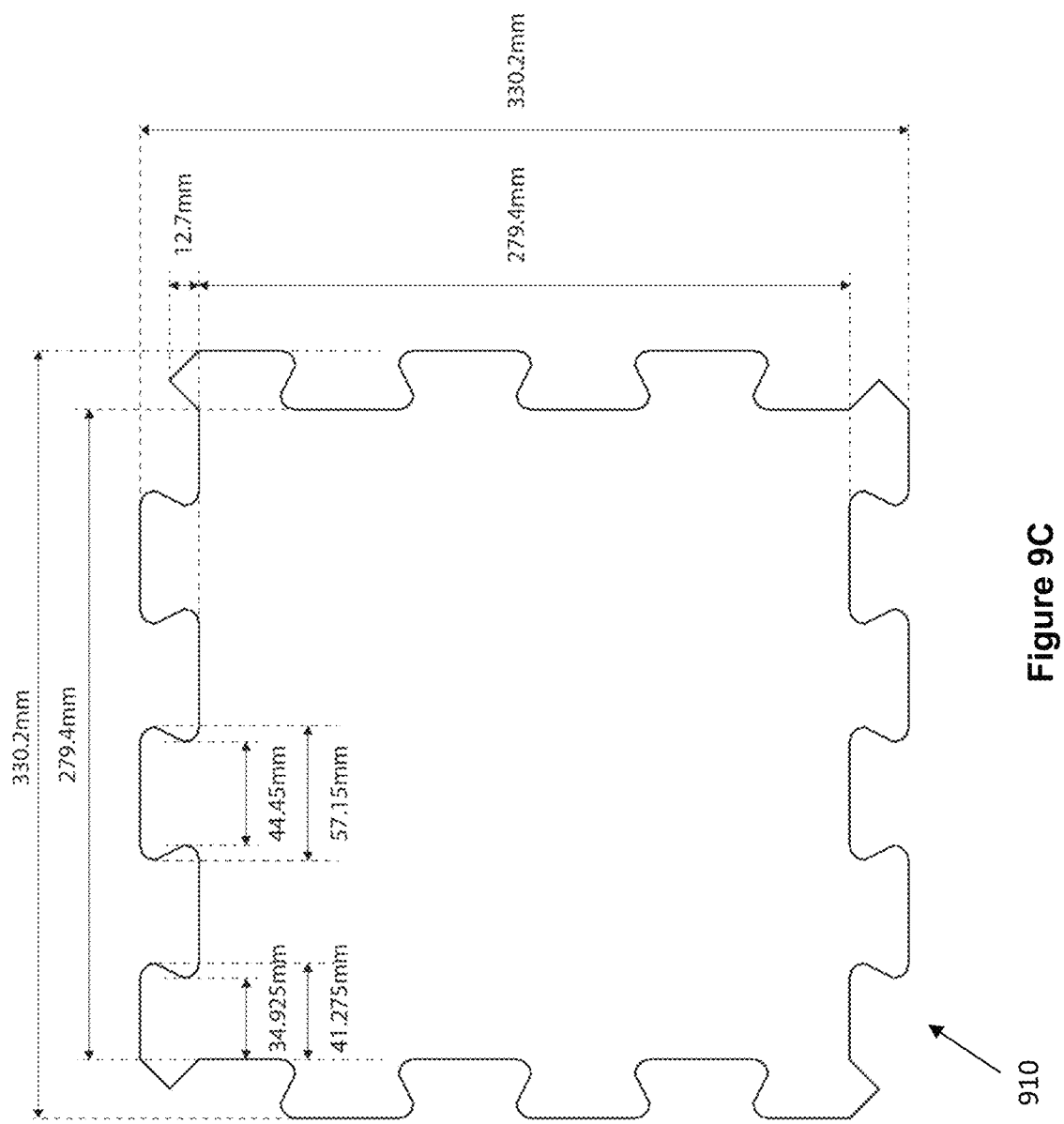

FIG. 9A-9C show illustrations of Music MatrixMats according to various embodiments. The MatrixMat is a mat that are substantially square in shape and may be sized such that it can accommodate one or more feet of users utilizing the MatrixMat. An example size and dimensions of a MatrixMat is shown in illustration 910 of FIG. 9C. The mat is preferably made of a soft but firm material, for example rubber, that provides some cushioning for a foot of a user when the mat is placed on the floor and stepped on, and are configured to be releasably interlocked with one or more other MatrixMats at either side of the mat. For example, mat 900 comprise a plurality of protusions 902 along each of its four sides that enables it to be interlocked with other mats to form, for example, a horizontal sequence 904, vertical sequence 906, or even other shapes such as a square, rectangle, or other shapes. The mats may be configured to be of different colours to facilitate guidance of a user, as well as feature depictions of letters, numbers, animals, fruits, and other similar representations for facilitating music learning. For example, mat 902 depicts the letter 'D', while mat 908 depicts the number '1'. In a further example, illustration 908 of FIG. 9B features mats depicting animals and fruit pictures. In an embodiment, each MatrixMat may be double-sided and depict same or different representations on each face of the mat. For example, a mat may be configured to display the letter 'R' on one face of the mat and display the number '2' on the other face. It will be appreciated that other variations of the MatrixMats in FIGS. 9A-9C are possible with varying levels of details, complexity and difficulty.

MusicCup manipulatives serve as effective problem-solving learning tools to guide users to assign and manipulate a variety of musical representations, values, and modifiers, such as single musical elements, musical patterns, melodic extracts, or structural units of music. All MusicCup manipulatives are lightweight and stackable for ease of storage and use, come in a variety of colors for creating an extensive variety of variable assigned music literacy values, have slots for MusicCards to be inserted on the sides, and a top floor for placing other assigned modifiers (e.g. MiniMusicCups, figurines, dice, and other similar modifiers).

FIGS. 10A-10D depict various illustrations of MusicCups according to various embodiments. MusicCup 1000 may be a receptacle that is configured to represent a music note, and may comprise four side walls, wherein a first end of the four side walls forms a base of the receptacle and a second end of the four side walls opposite the first end forms a top of the receptacle. The receptacle four side walls may be sloped at an angle and hollow at the base such that one or more receptacles can be stacked on top of one another. The MusicCup 1000 may comprise a slot, wherein a card such as a modifier card 1002 may be configured to be inserted into the slot of the receptacle for modifying at least one of an accent, volume, articulation, or chromatic alteration of the music note represented by the MusicCup 1000 based on a design of the modifier card, wherein the receptacle and modifier card serves as an indication for a user to vocally perform the modified music note. The slot may be disposed at the top of the receptacle such as slot 1004, or disposed at one or more of the four side walls such as slot 1006. The design of the modifier card 1002 may comprise a colour of a plurality of colours, wherein each colour of the plurality of colours indicates a different modification of at least one of an accent, volume, articulation, or chromatic alteration of a music note. Renderings of various MusicCups of varying colours, shades and with or without modifier cards are shown in illustration 1008 of FIG. 10B.

The MusicCup 1000 may come in a variety of colours to facilitate guiding users for learning music, and may also come in a variety of sizes. For example, MiniMusicCups refer to small-sized MusicCups that may serve the same function as a standard-sized MusicCup (e.g. for representing a music note), or may be assigned a modifier value for modifying a music note, rhythm, pitch, melody patterns, or other similar musical element. An example size and dimensions of a MusicCup is shown in illustration 1010 of FIG. 10C, and example size and dimensions of a MiniMusicCup is shown in illustration 1012 of FIG. 10D. For example, the MusicCup 1000 may comprise a surface at the top of the MusicCup 1000 for placing other modifiers such as Mini-MusicCups, figurines, dice, or other similar modifiers to modify the music note represented by the MusicCup 1000.

A set of MusicCups manipulatives may include a plurality of stackable, top slotted and 2-sided slotted squared MusicCups that are color-coded (for example, 8 red, 8 blue, 4 yellow, 4 green, 4 black, 4 white, 8 white dry-erase surface hands-on manipulatives classroom teachers use to represent to set performance order, vary and revise rhythm, pitch, and melody patterns, and designate musical structural features and compositional form). The MusicCup manipulatives can be used in multiple contexts: placed freely on a table, in a MusicCup Holder which displays organizes the MusicCups into a fixed sequential intervallic order in, for example, a 4 hole or indentation CupHolder (for rhythm and pitch patterns, or 13 hole or indentation CupHolder (for whole-half step scalar patterns), or CupHolders with different numbers of holes or indentations.

Figure 10A:
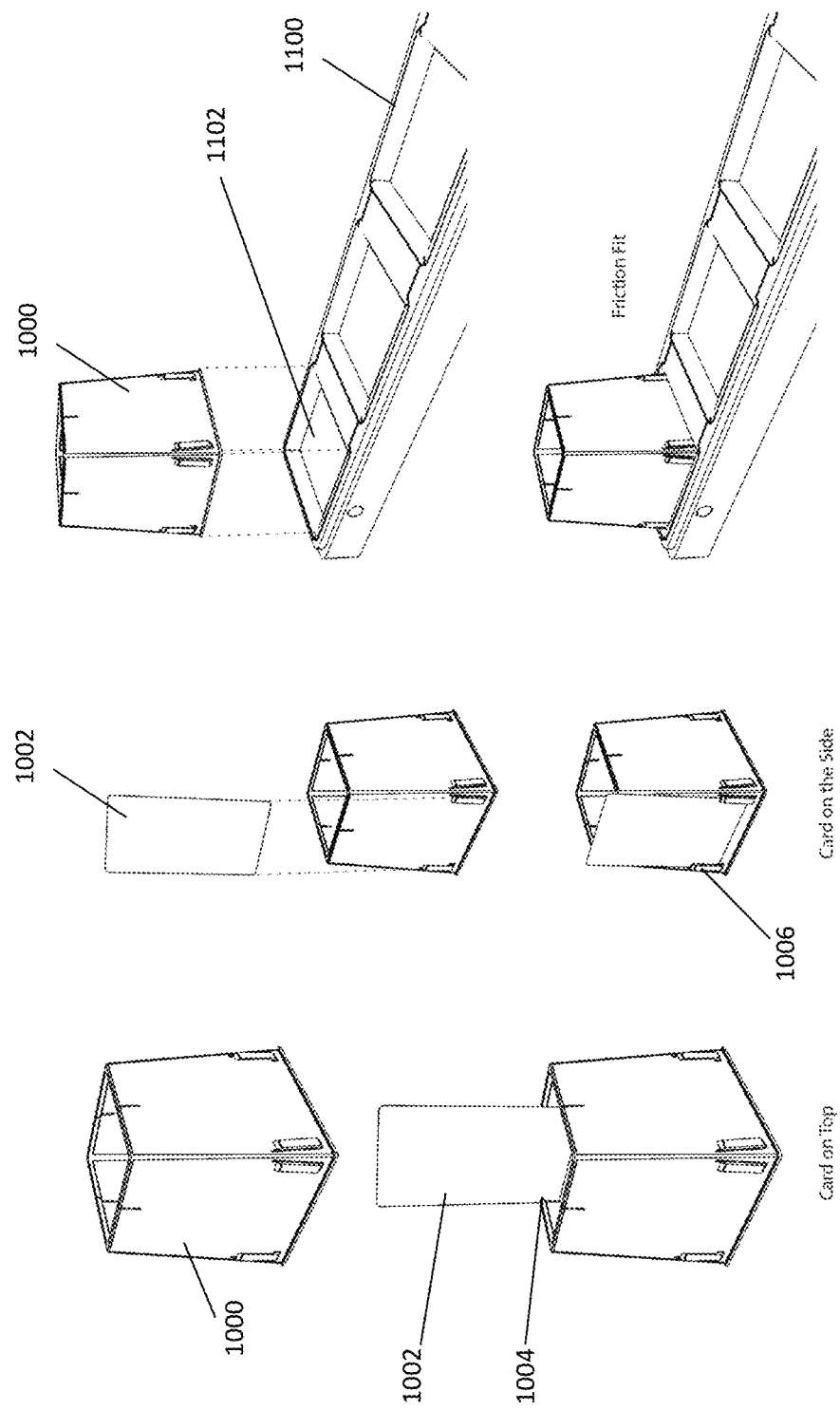
FIGS. 10A-10D depict various illustrations of MusicCups according to various embodiments.
Figure 10B:
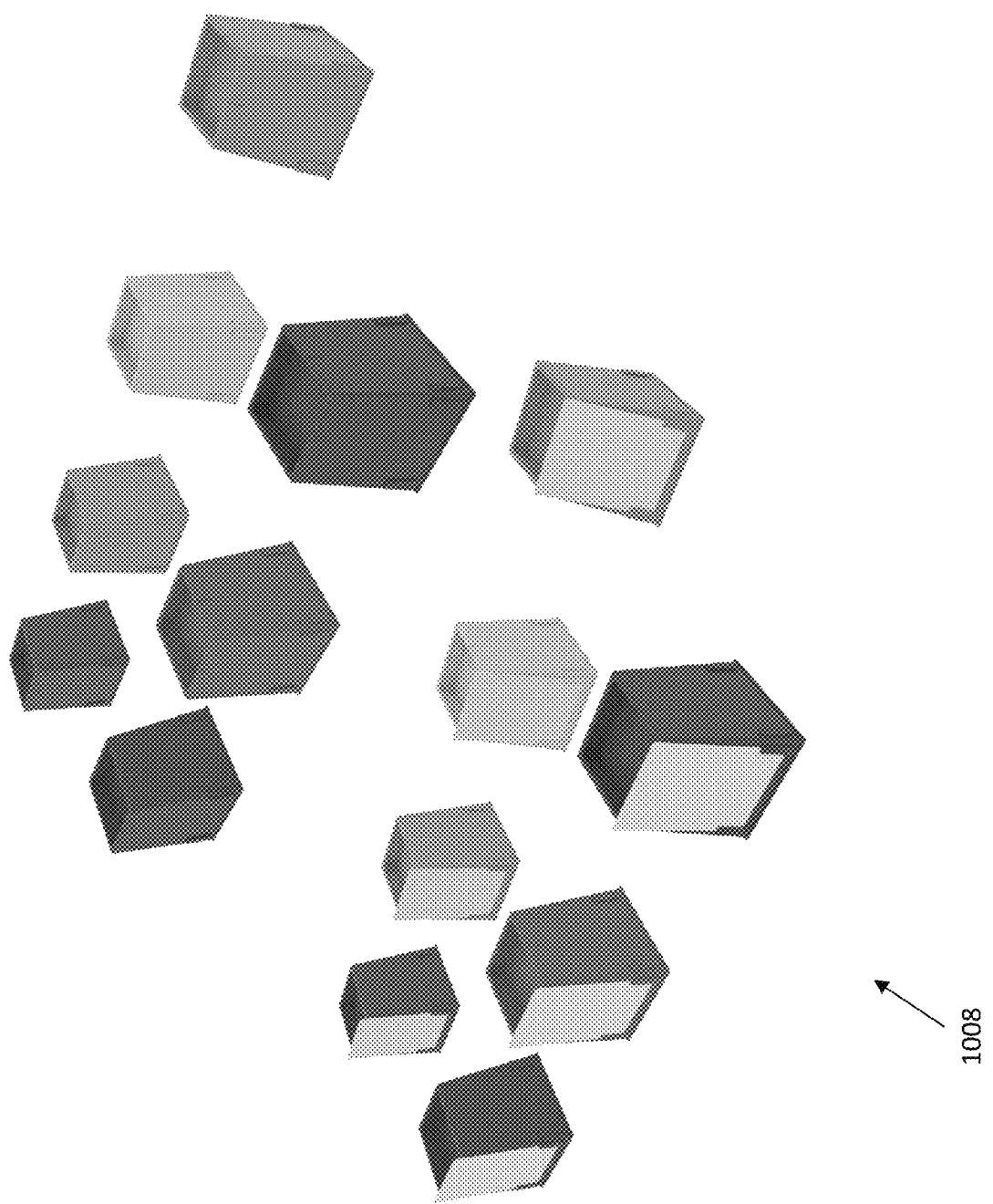
Figure 10C:
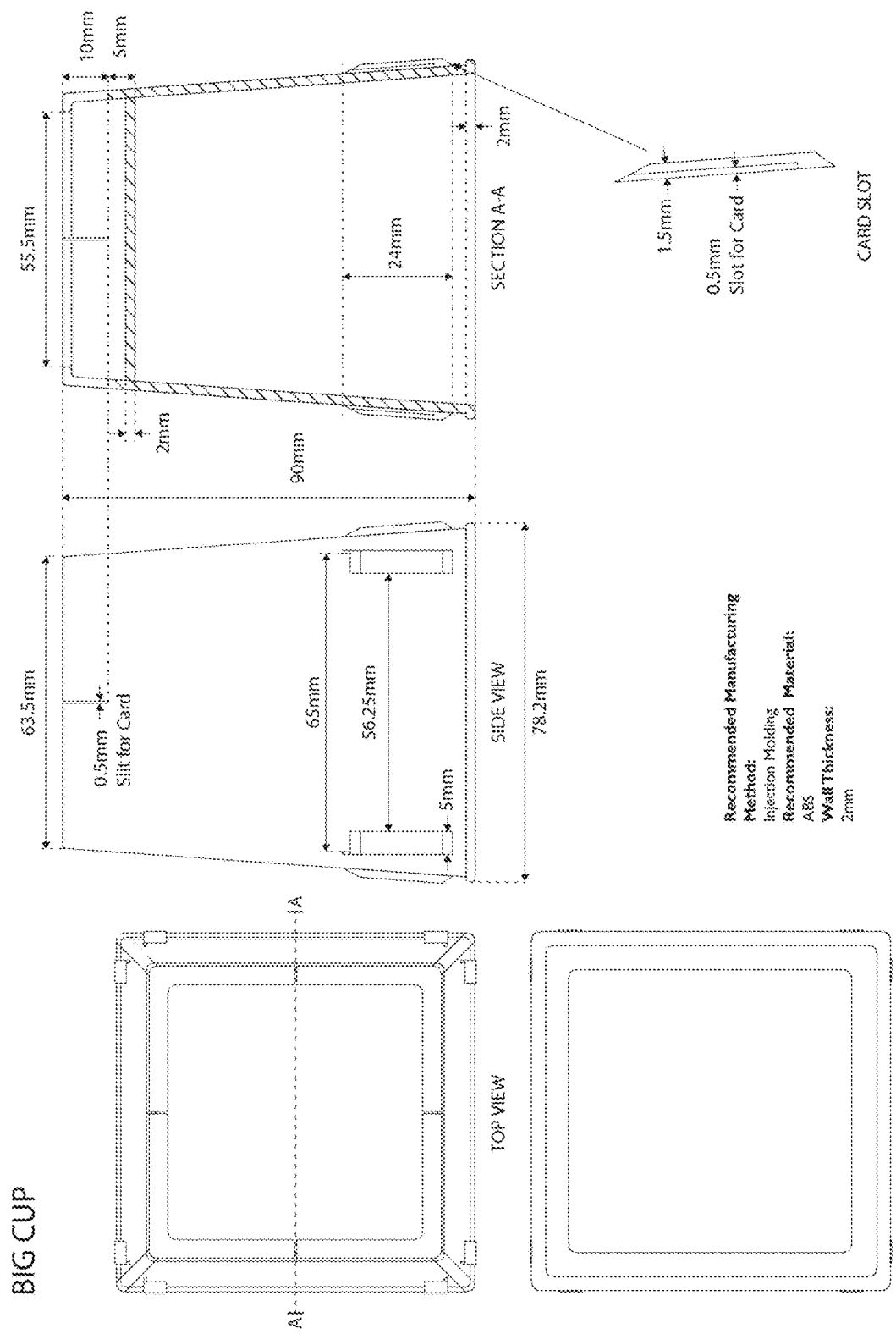
Figure 10D:
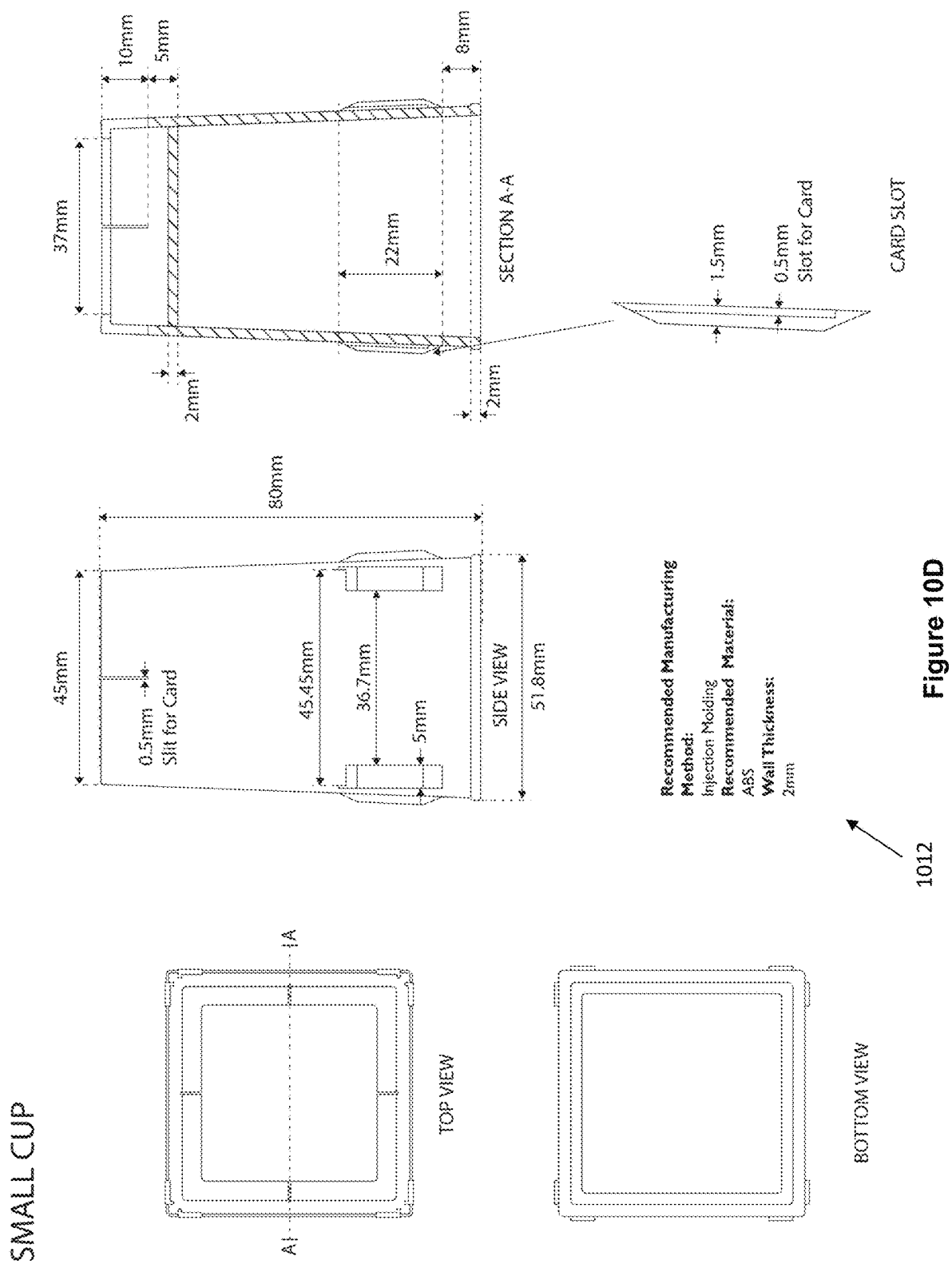
Figure 11B:
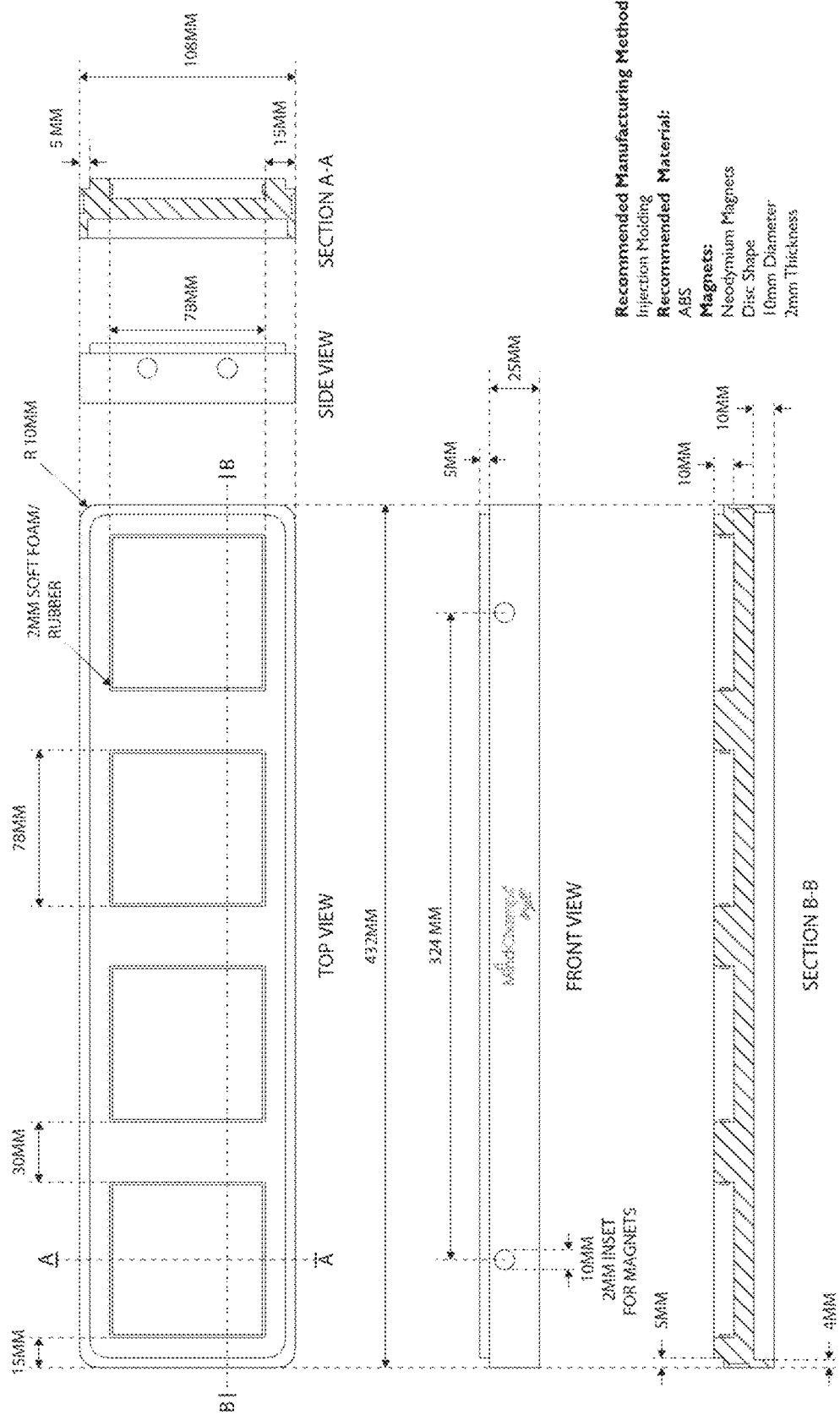
Figure 11C:
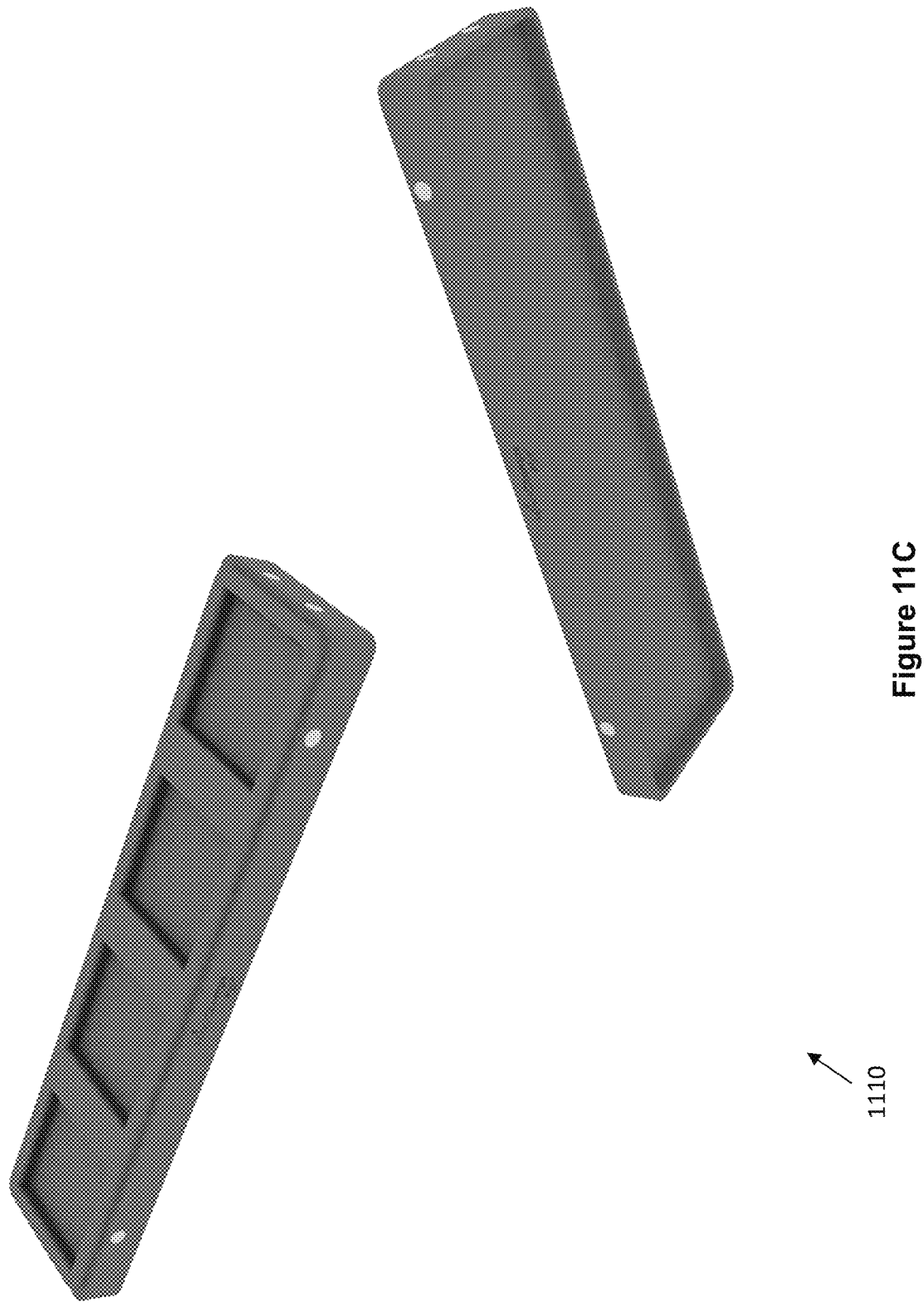
Figure 11D:
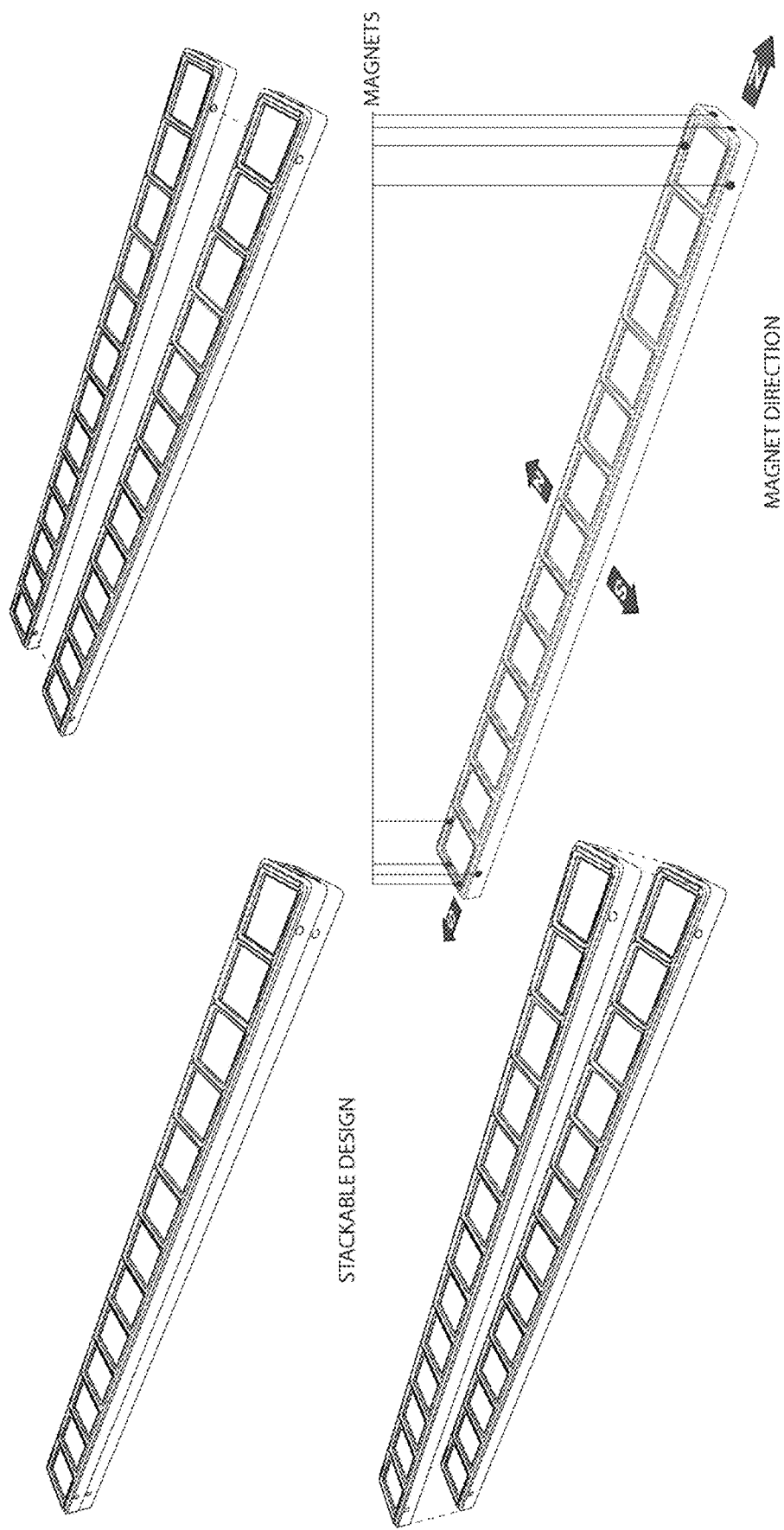
Figure 11E:
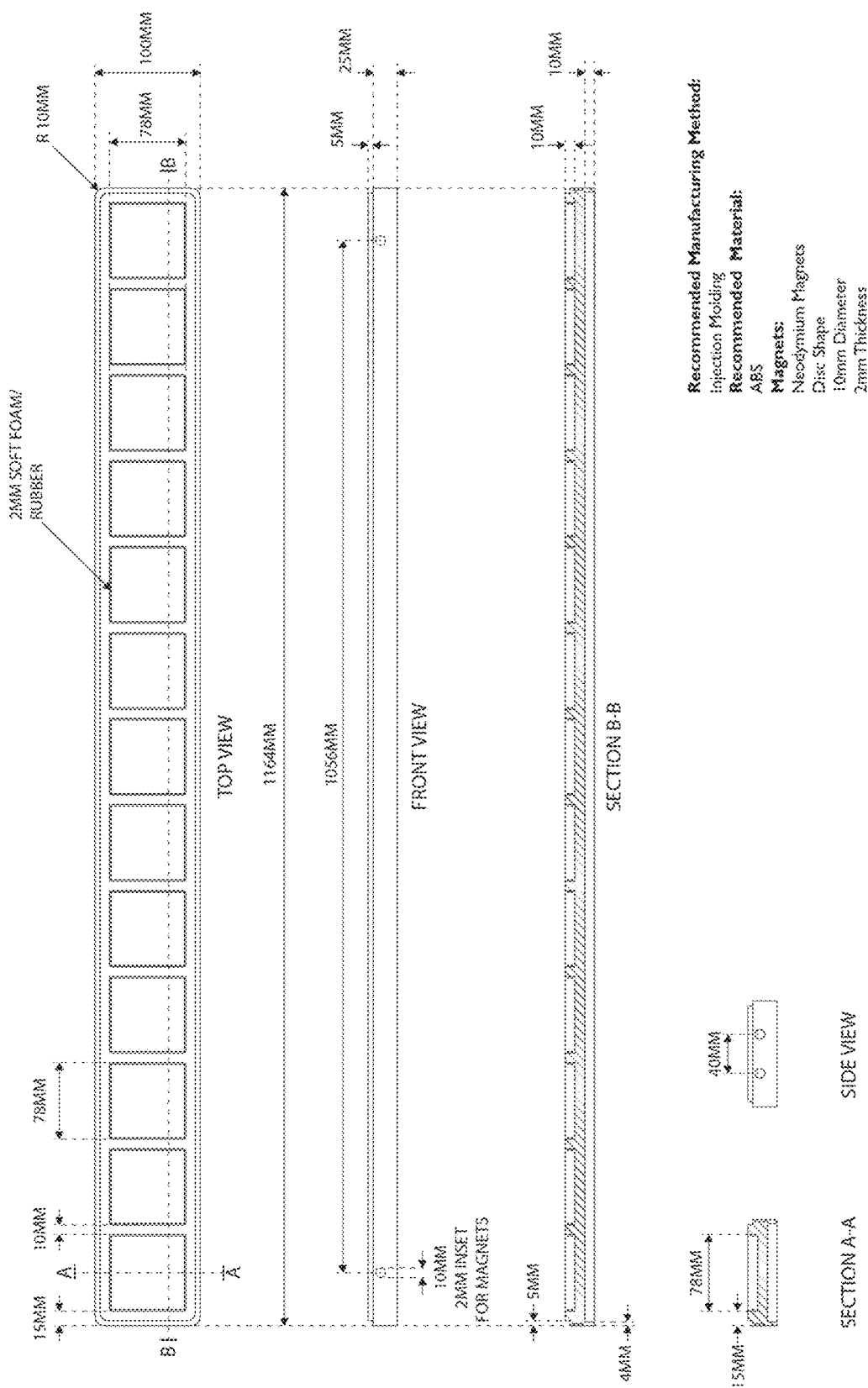
Figure 11F:
Figure 11H:
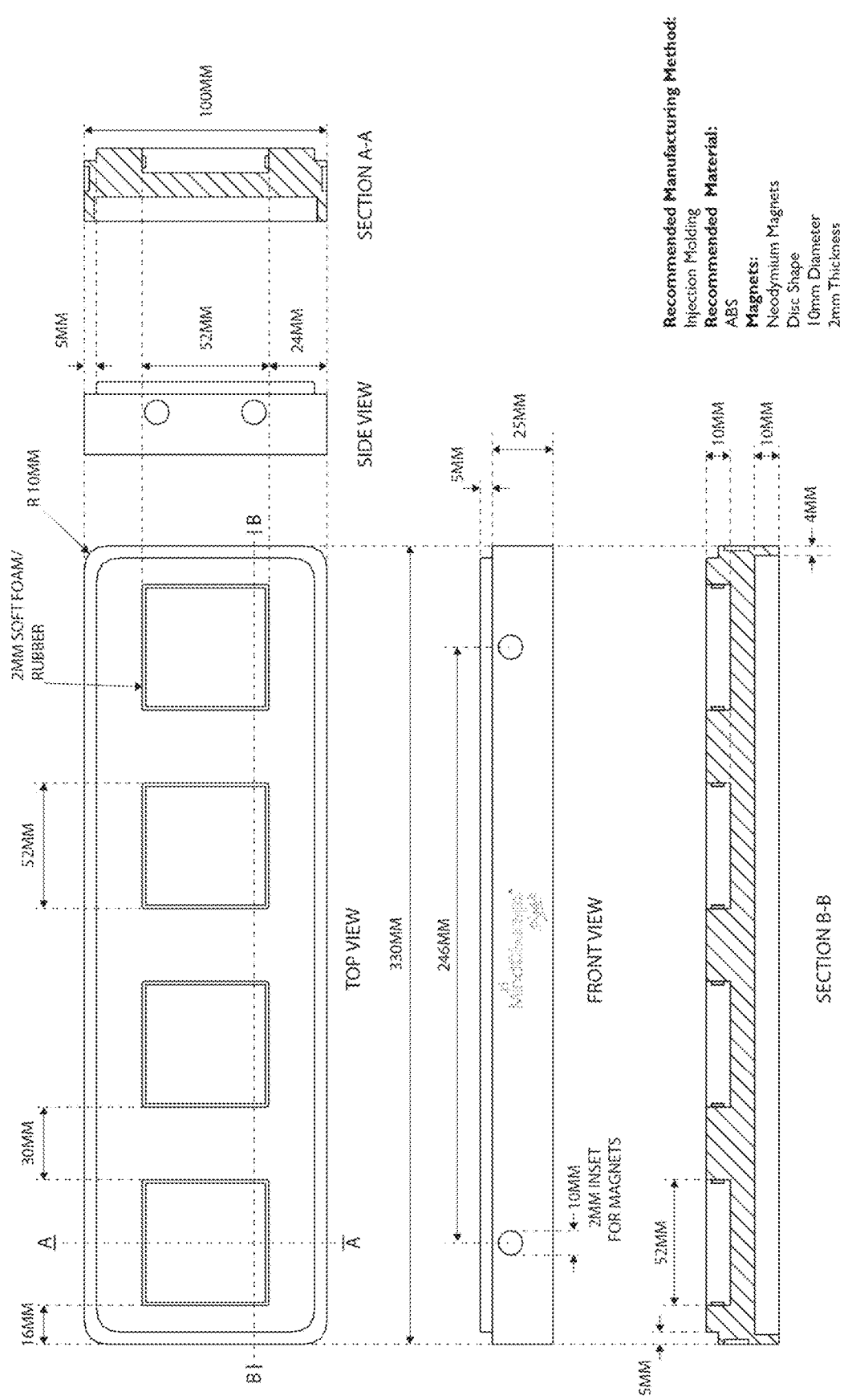
Figure 11I:
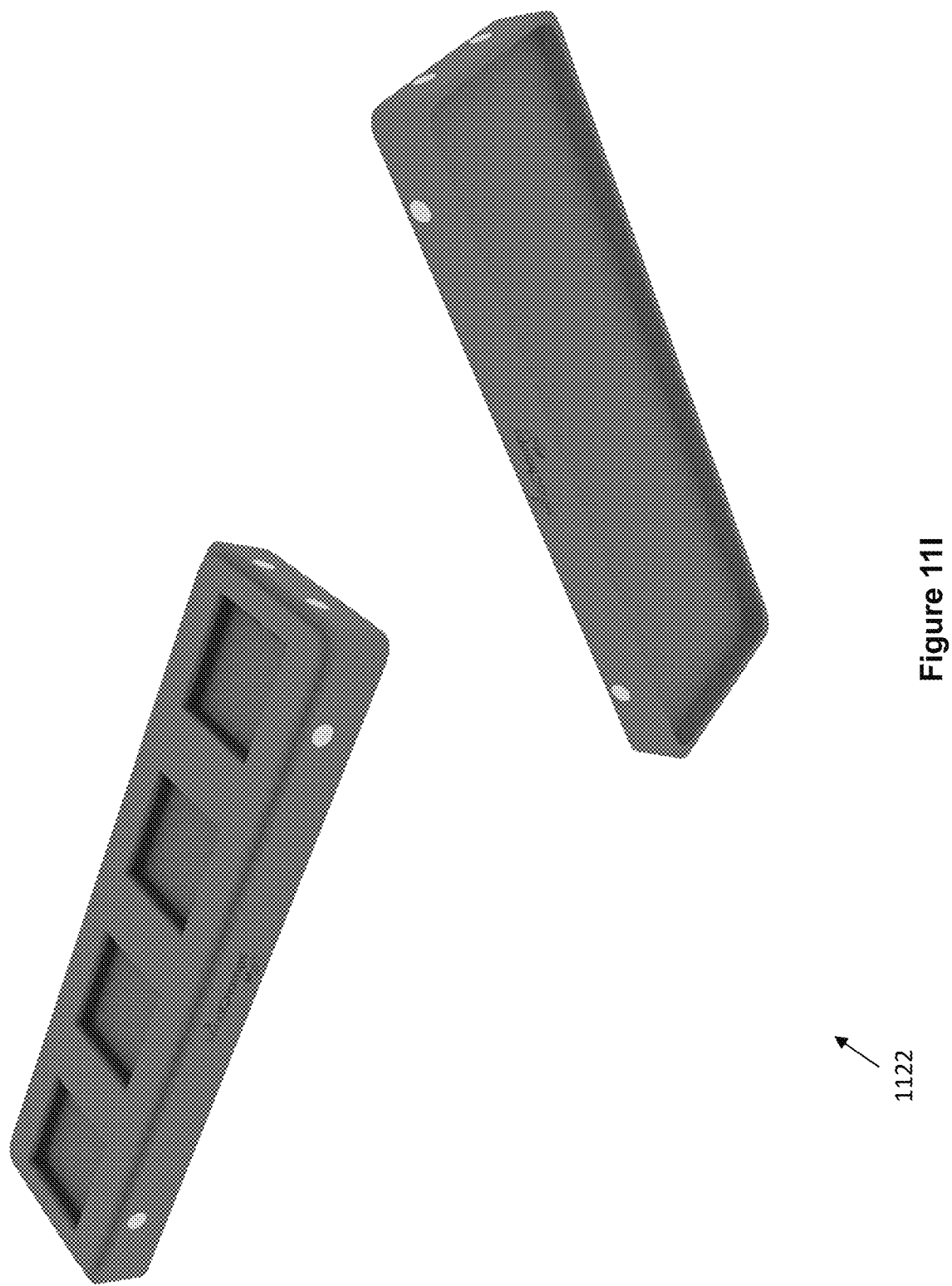
Figure 11J:
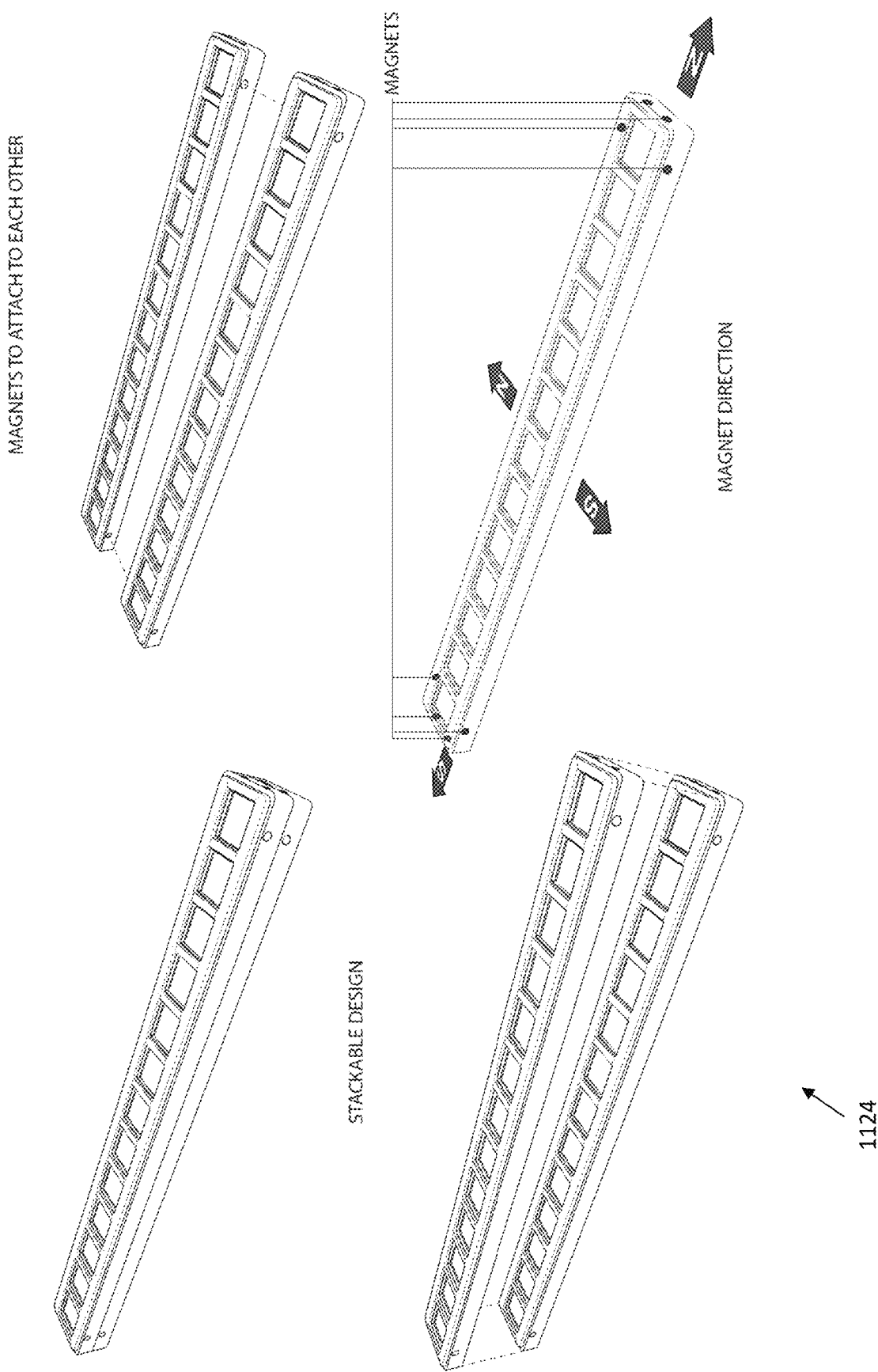
Figure 11K:
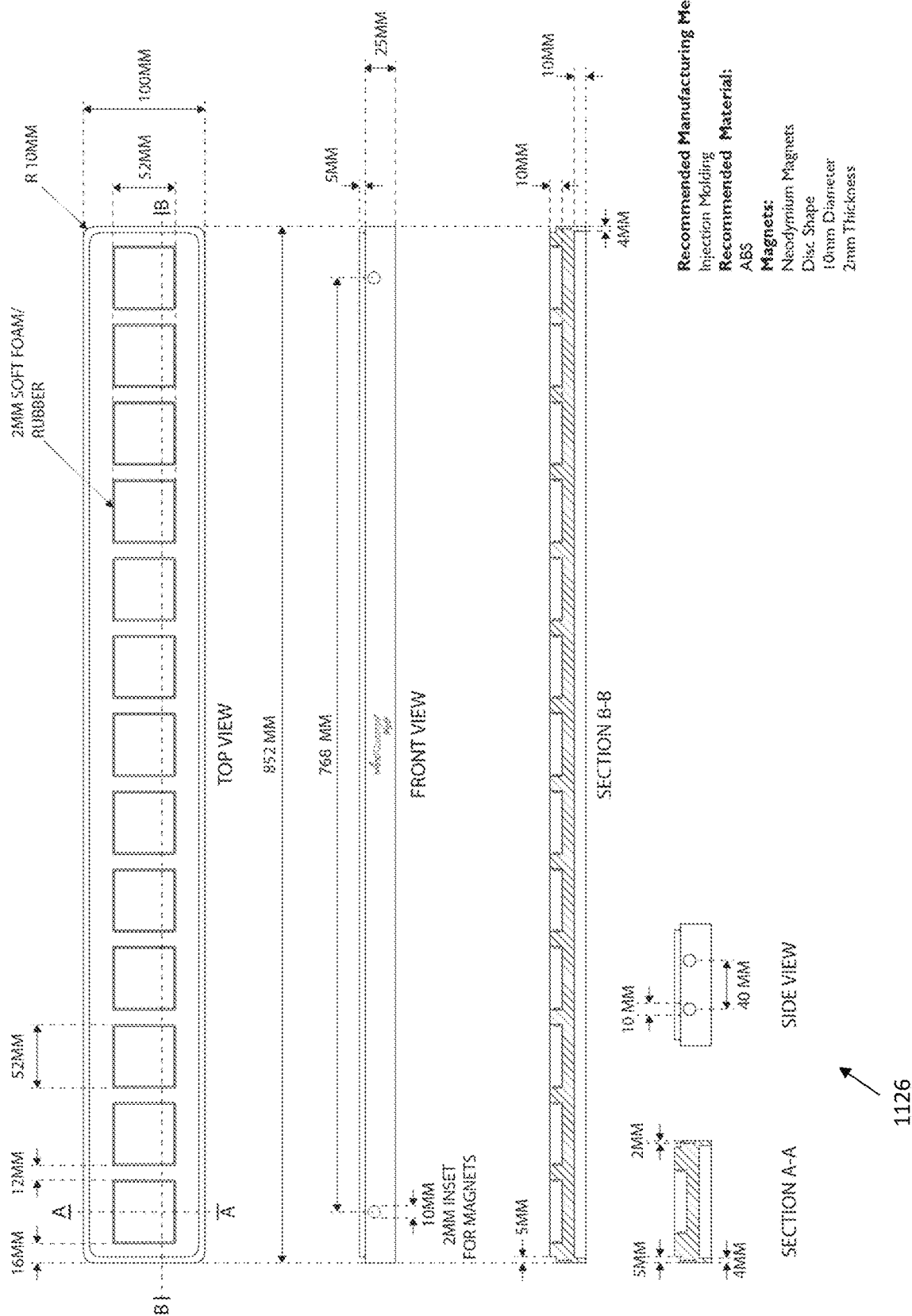
Figure 11L:
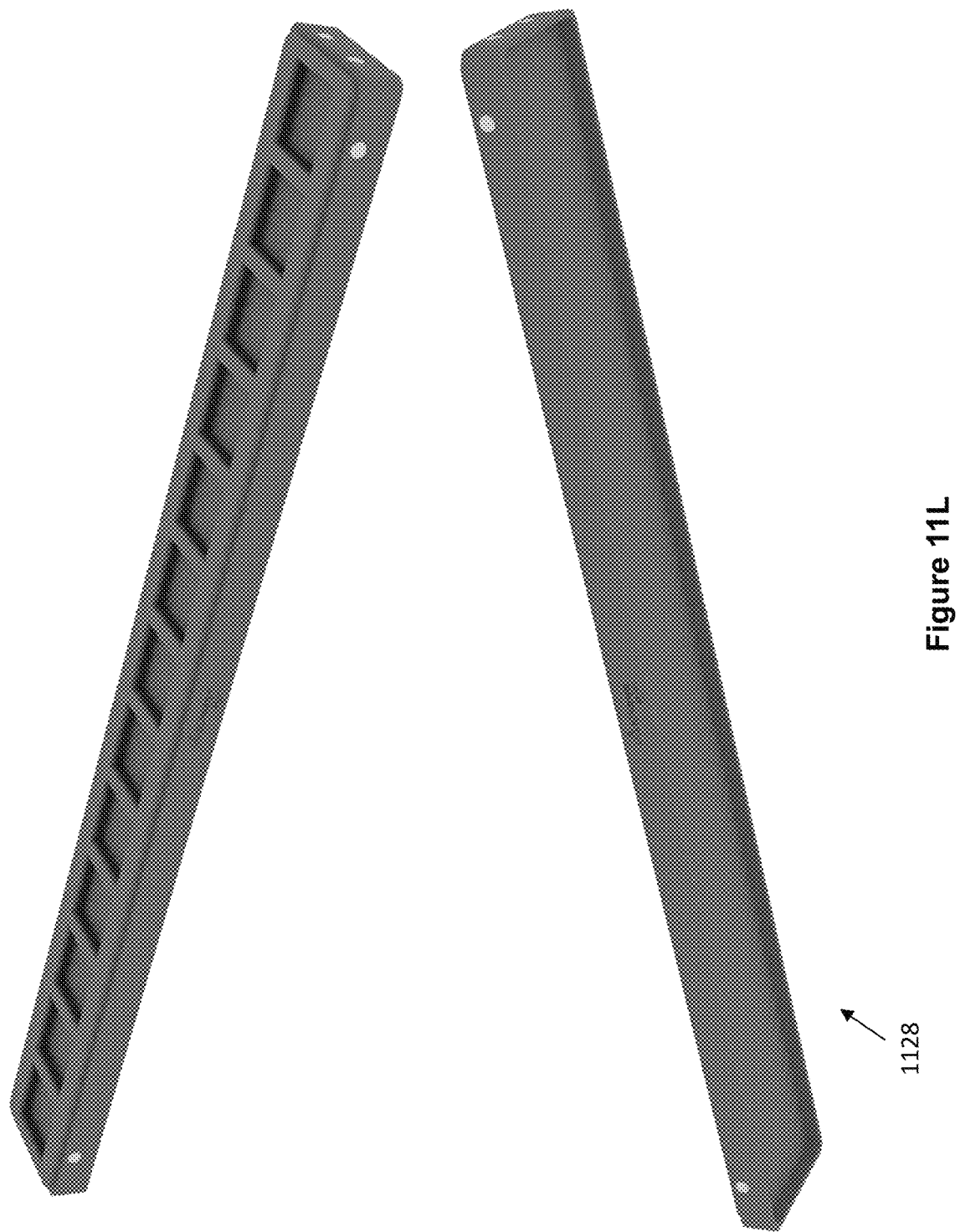

Various illustrations of CupHolders are shown in FIGS. 11A-11L. A Cupholder may be a board comprising one or more linearly aligned indentations, wherein the one or more linearly aligned indentations representing a rhythm, pitch pattern or a whole-half step scale structure. For example, a CupHolder 1100 in FIG. 11A comprises one or more indentations 1102, and a MusicCup may be configured to be placed in any one of the indentations 1102 as an indication for a user to vocally perform the music note represented by the receptacle and its position on the Cupholder. As also shown in FIG. 10A, MusicCup 1000 may be placed into an indentation 1102 of CupHolder 1100, and may be held in place in the indentation 1102 via a friction fit. Further, an example size and dimensions of CupHolder 1100 is shown in illustration 1108 of FIG. 11B, and renderings of CupHolder 1100 are shown in illustration 1110 of FIG. 11C.

The CupHolder may come in different sizes. For example, MiniCupHolders refer to small-sized CupHolders that may serve the same function as a standard-sized CupHolder (e.g. for representing a rhythm, pitch pattern or a whole-half step scale structure), and may be configured to enable MiniMusicCups to be placed in its one or more indentations. While CupHolder 1100 is depicted to comprise four indentations 1102, it will be appreciated that it is possible for a CupHolder to comprise varying numbers of indentations depending on learning needs and curriculum. For example, a CupHolder may also be configured to comprise 13 indentations. Further, each Cupholder or board may comprise one or more magnets 1106 disposed on each side of the board for magnetically linking one or more boards together to extend the rhythm, pitch pattern or whole-half step scale structure represented by the one or more boards. Each Cupholder may also be configured to be stackable on top on one another, such as shown with the two stacked Cupholders 1104. Such stacking may be done with or without MusicCups being placed into the indentations. For example, one or more CupHolders may be stacked on top of one another with one or more CupHolders (fitted into indentations) between each CupHolder.

While CupHolder 1100 is depicted to comprise four indentations 1102, it will be appreciated that it is possible for a CupHolder to comprise varying numbers of indentations depending on learning needs and curriculum. For example, FIGS. 11A-11C feature illustrations for a 4-cup CupHolder, FIGS. 11D-11F feature illustrations 1112, 1114 and 1116 corresponding to FIGS. 11A-11C respectively for a 13-cup CupHolder, FIGS. 11G-11I feature illustrations 1118, 1120 and 1122 corresponding to FIGS. 11A-11C respectively for a 4-cup MiniCupHolder, and FIGS. 11J-11L feature illustrations 1124, 1126 and 1128 corresponding to FIGS. 11A-11C respectively for a 13-cup MiniCupHolder.

Musical skill development and understanding during, for example, the preschool years is therefore optimized through continued flexible use of the MusicCup manipulatives, as users such as children construct and transform musical elements and processes, such as ordering-reordering, adding/subtracting, changing tempos, adding modifying accents, etc. (white cups may function as rests). For example, more than one array or linear sequence of MusicCups manipulatives can be combined to create and perform intricate rhythm, pitch, and melodic patterns.

Large-sized MusicCups manipulatives are often ideal for cooperative large group activities and classroom teacher demonstrations, whereas small-sized MiniMusicCups manipulatives are used for the students' personal or small-group work. Large MusicCups manipulatives can also be used with, for example, magnetically linked linear 4-Cup-Holders with 4 indentations (for expanded linear or stacked simultaneously linked rhythm or pitch patterns) or a 13-CupHolder with 13 indentations can be used to demonstrate various kinds of whole-half step scale structures. In the MLMMS, the Matrix Manipulative System can advantageously expand the range of musical contrast and variability of large and small MusicCups manipulatives can be expanded through MusicCup modifiers, such as MusicCards from any of the rhythm or pitch patterns, slotted into the sides of the MusicCups, or MiniMusicCups modifiers slotted on the top of the MusicCups, musical content & symbols hand-written onto dry-erase surface of the white MusicCups or dry-erase cards slotted into the MusicCups.

MiniMusicCups manipulatives may be square, stackable, top-slotted, or dry-erase labeled or colored-coded (e.g. 8 red, 8 blue, 4 yellow, 4 green, 4 black, 4 white, and 8 white dry-erase) cups. MiniMusicCups advantageously make it easier for small groups of children to use to compose, modify, re-order, decode, perform, and reflect on musical content or changes in rhythm, pitch, and melody patterns and/or volume dynamics, articulation, accents. In addition, these same manipulatives can serve as a medium for expressing musical form or musical structural analysis. MiniMusicCups may also be configured for use with Silent Practice Chart 100 of FIG. 1, wherein one or more MiniMusicCups may be placed in the one or more squares to represent beats, various clapping rhythm pattern representations and other similar musical representations depending on the curriculum to facilitate learning rhythm and rhythm patterns. Further, MiniMusicCups may also be configured for use with Silent Practice Chart 204 of FIG. 2B, wherein one or more MiniMusicCups may be placed in the one or more squares to represent pitches and various singing pitch patterns depending on the curriculum to facilitate learning pitch and pitch patterns.

Figure 12A:
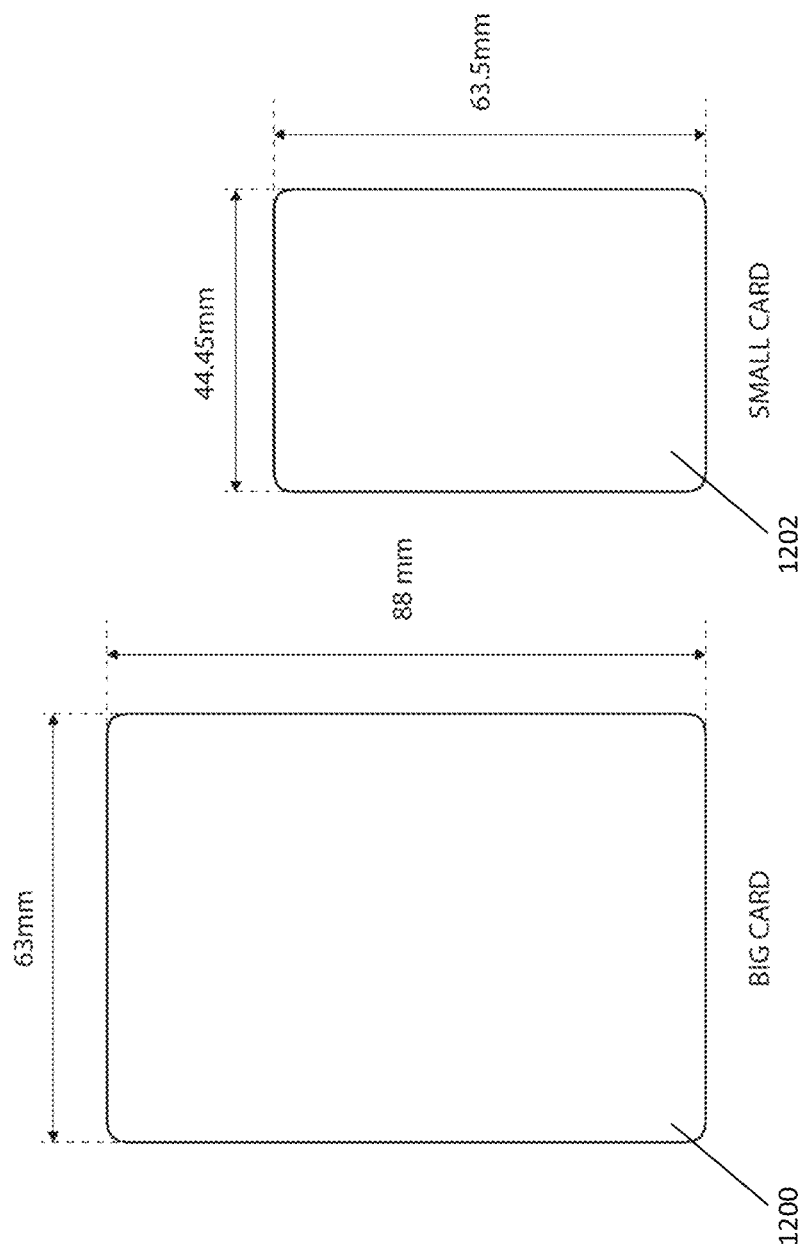
FIGS. 12A-12R depict various illustrations of MusicCards and MiniMusicCards according to various embodiments.

Referring to FIG. 12A, MLMMS Musical Literacy Card Decks (for example comprising 8-10 decks) contain both standard "poker" size (3.5"×2.5") MusicCards (as shown in example card 1200) and smaller-sized MiniMusicCards (as shown in card 1202) to be printed on sturdy plastic or heavy cardstock. It will be appreciated that sizes and materials of the MusicCards and MiniMusicCards may be varied in accordance with design and/or curriculum needs. The MusicCards constitute a medium for manipulating rhythm, pitch, and melodic musical content in the MLMMS. Like the MusicCups, MusicCards are also used to represent, order, manipulate, perform, and reflect on musical content. Unlike the MusicCups, MusicCards manipulatives can depict fixed content as both single musical elements and longer patterns (rhythm and pitch patterns, and whole melodies).

MusicCard Manipulatives can be:
used to show a variety of musical elements, including rhythm, pitch, melodic patterns, musical "actions", questions, social actions, reflections on learning mindsets, and excerpts of musical repertoire;
arrayed into large and complex musical forms, allowing for deeper analysis of music;
shuffled to randomize musical content, and used to create sequences of musical elements or patterns;
physically attached to the MusicCup slots as performance modifiers or as alternative representations that designate what the cups stand for when used as hands-on manipulatives. For example, a modifier card may be inserted into a slot of a MusicCup to represent a modification of at least one of an accent, volume, articulation, or chromatic alteration of a music note represented by the MusicCup based on a design of the modifier card, wherein the MusicCup and modifier card serves as an indication for a user to vocally perform the modified music note In addition, dry erase white MusicCards (e.g. MusicCards that have a blank, dry-erase surface) can be used to invent new ways to express progressively complex rhythms and pitches. 4-beat RhythmCard or PitchCard patterns (e.g. MusicCard illustrations representing 4-beat rhythm or pitch patterns) can expanded horizontally to create longer rhythm or pitch patterns. Further, 4-phrase MelodyCard patterns (e.g. MusicCard illustrations representing 4-phrase melody patterns) can be expanded to create more complex musical phrases.

Figure 12B:
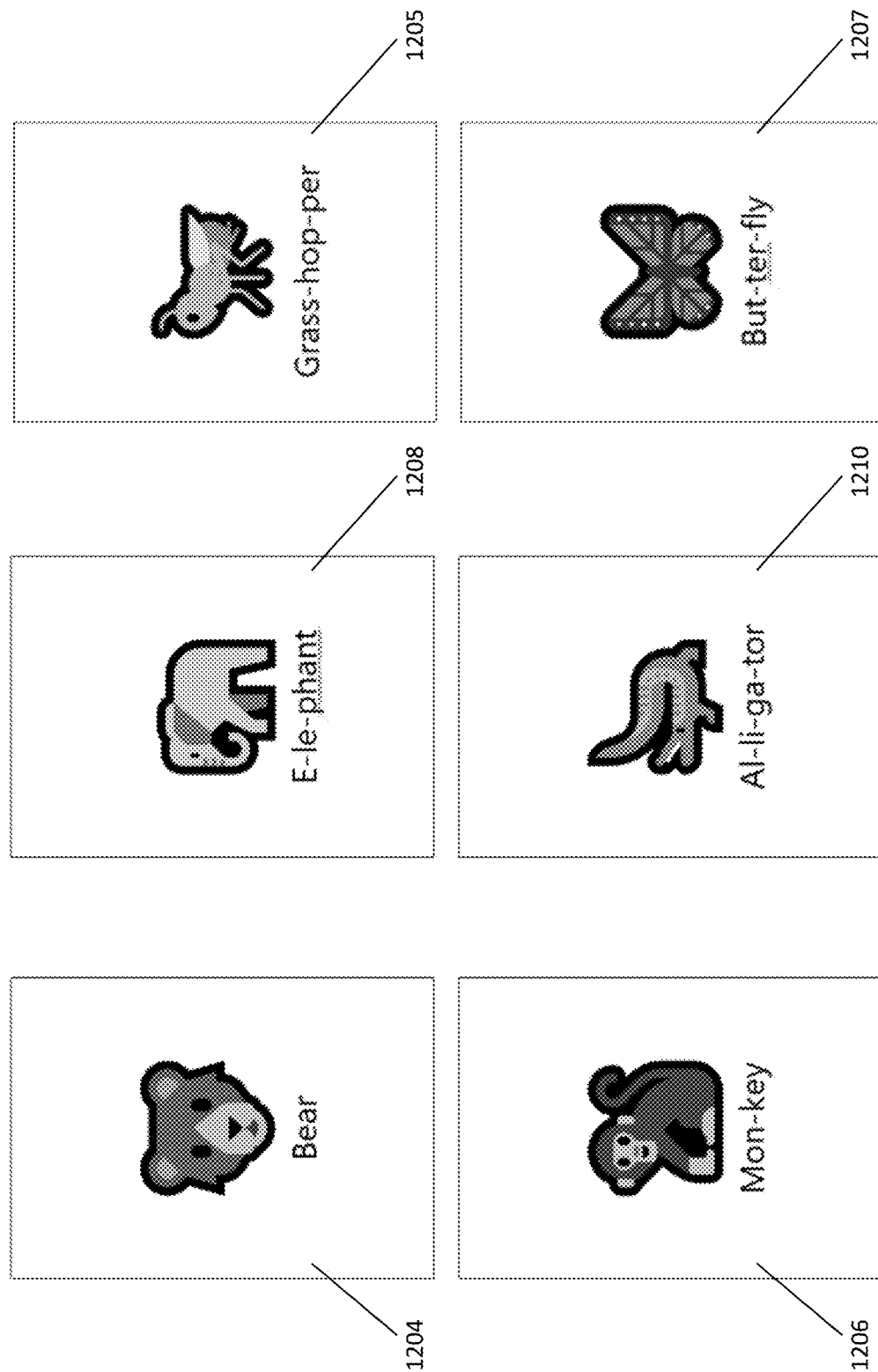

Referring to FIG. 12B illustrating MusicCards featuring animals for example, MusicCard 1204 depicts a bear that may be used for 1-beat challenges (e.g. say-playing or say-clapping 'bear' in 1 beat rhythm), MusicCard 1206 depicts a monkey that may be used for 2-beat challenges (e.g. say-playing or say-clapping 'mon-key' in 2-beats rhythm), MusicCard 1208 depicts an elephant that may be used for 3-beat challenges (e.g. say-playing or say-clapping 'e-le-phant' in 3-beats rhythm), and MusicCard 1210 depicts an alligator that may be used for 4-beat challenges (e.g. say-playing or say-clapping 'al-li-ga-tor' in 4-beats rhythm). Further examples include MusicCard 1205 depicting a grasshopper and MusicCard 1207 depicting a butterfly. The animals may also be depicted together with a required number of beats or claps (e.g. 1 beat or clap represented by a clapping hand 1209) as shown in the various illustrations of FIG. 12C. For example, a MusicCard 1211 may show an illustration of a caterpillar, the word 'ca-ter-pil-lar', and four clapping hands 1209, as indication for a user to say-play or say-clap 'ca-ter-pil-lar' in a 4-beat rhythm while doing a clap, drum beat or playing a music note at each beat. The animals may also be represented in a form of a pattern as shown in illustrations of FIG. 12D such as MusicCard 1212, wherein a plurality of animals may be depicted. For example, a user may be required to say-play or say-clap 'bear, bear, mon-key, bear' in a rhythmic pattern in accordance with a lesson or curriculum objective.

Figure 12C:
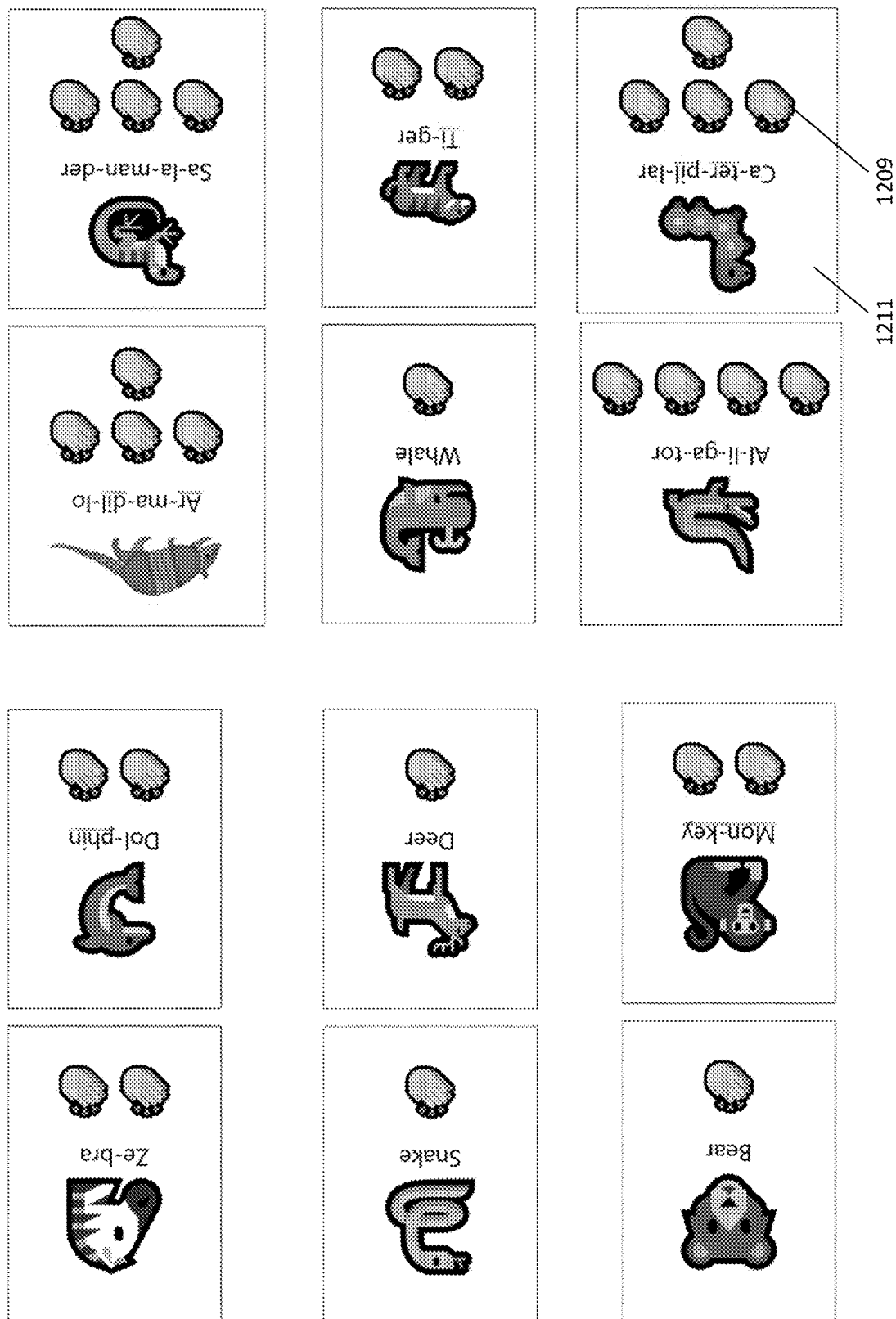
Figure 12E:
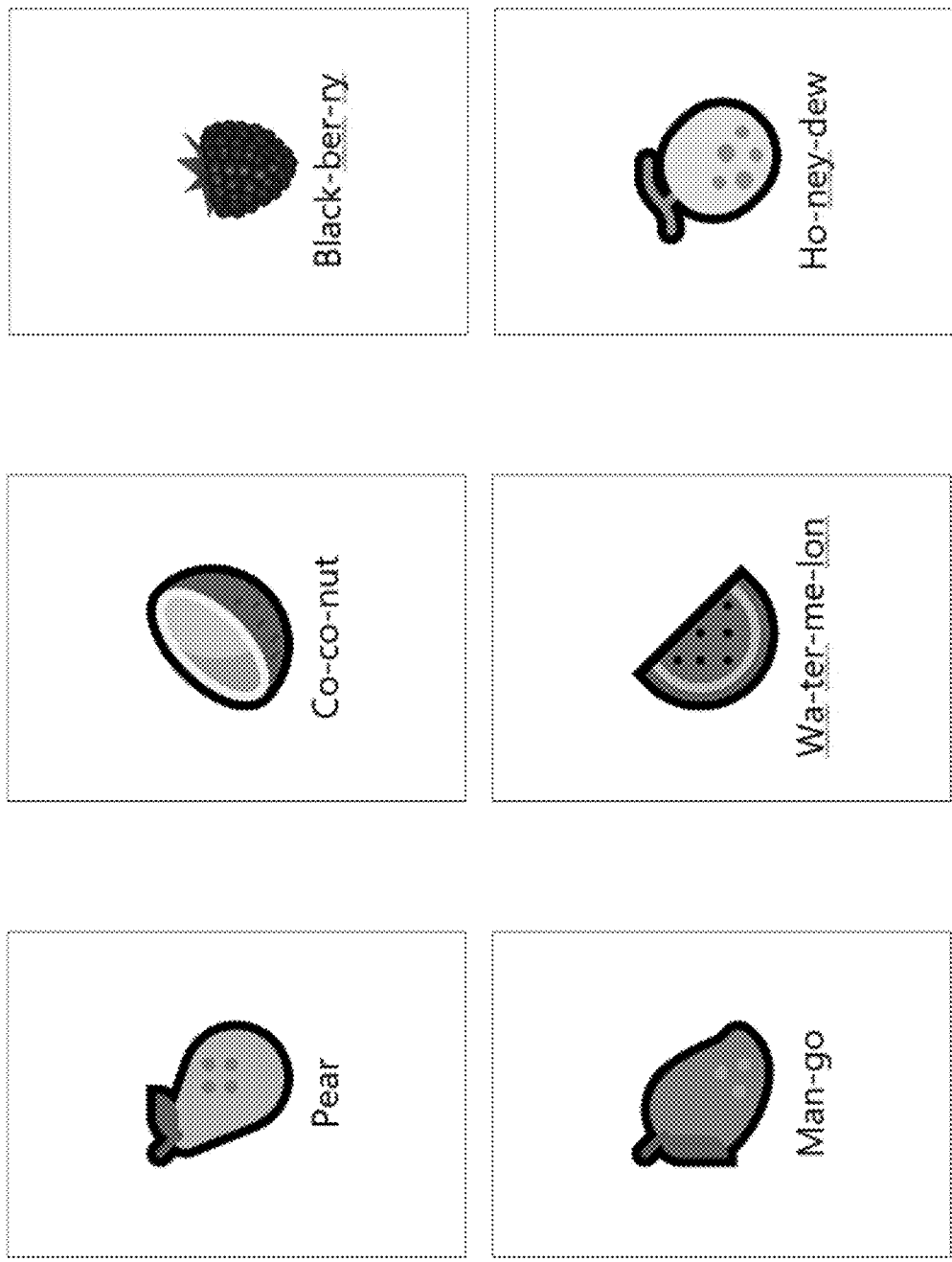
Figure 12F:
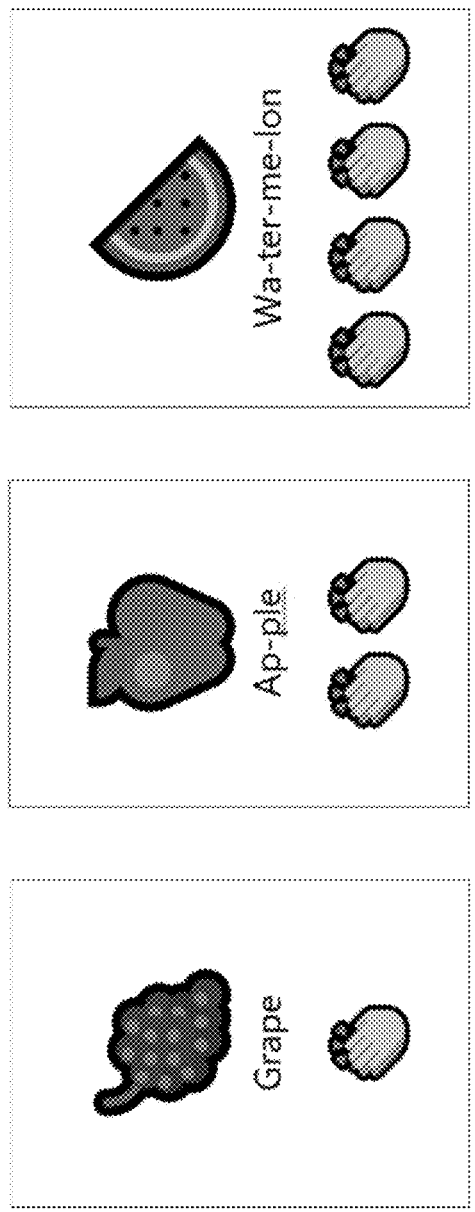
Figure 12G:
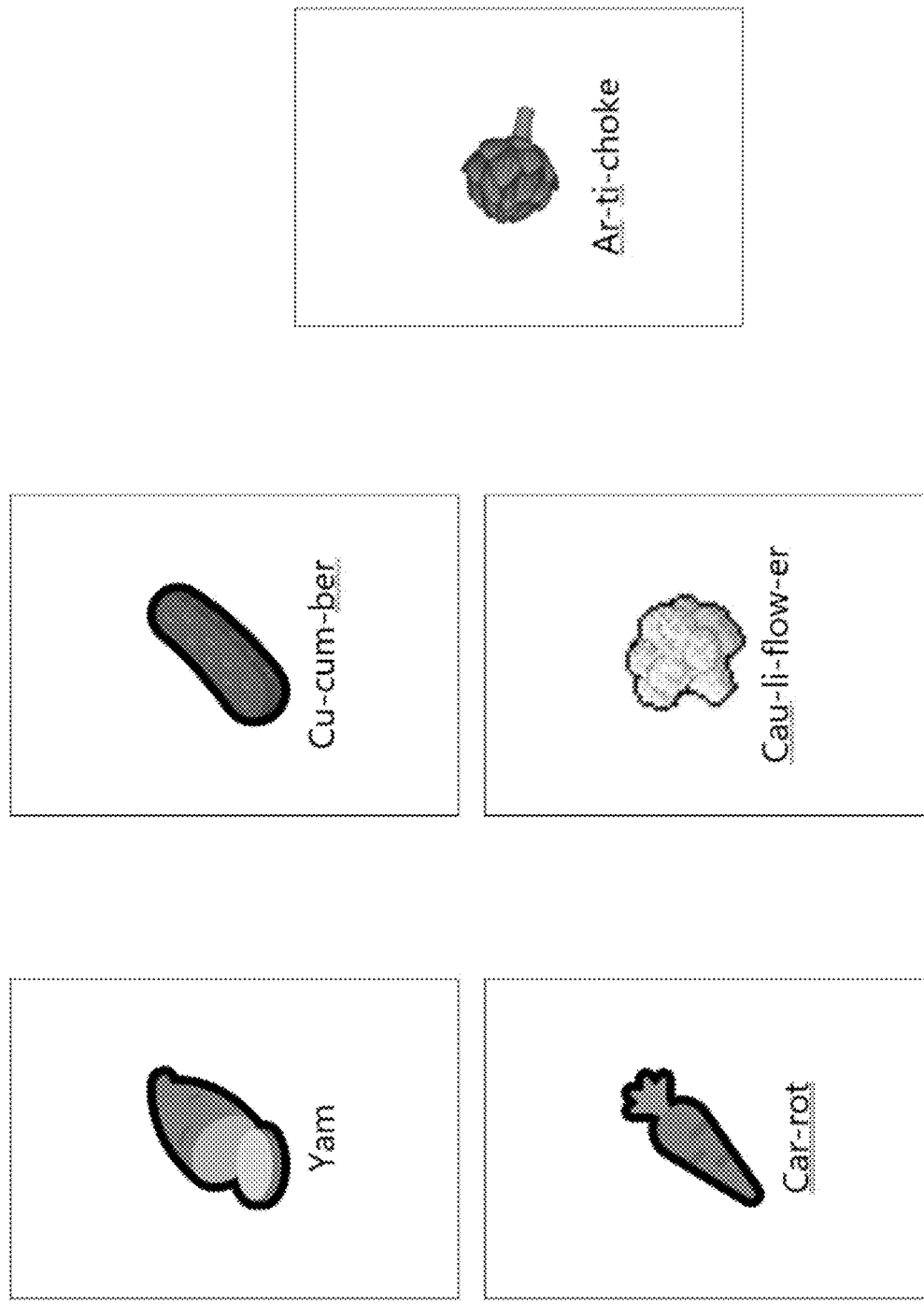

While the MusicCard illustrations in FIGS. 12B-12D depict animals, it will be appreciated that other types of representations are also possible to advantageously provide variety and keep the lessons fresh and interesting especially for children. For example, illustrations 1213 and 1215 of FIGS. 12E-12F feature MusicCard illustrations corresponding to FIGS. 12B-12C respectively that depict fruits, while illustration 1217 of FIG. 12G feature MusicCard illustrations corresponding to FIG. 12B that depict vegetables. The fruit and vegetable illustrations may also be represented in a form of a pattern similar to that shown in FIG. 12C, wherein a plurality of fruit and/or vegetable illustrations may be depicted on a MusicCard to represent a rhythmic pattern.

Figure 12H:
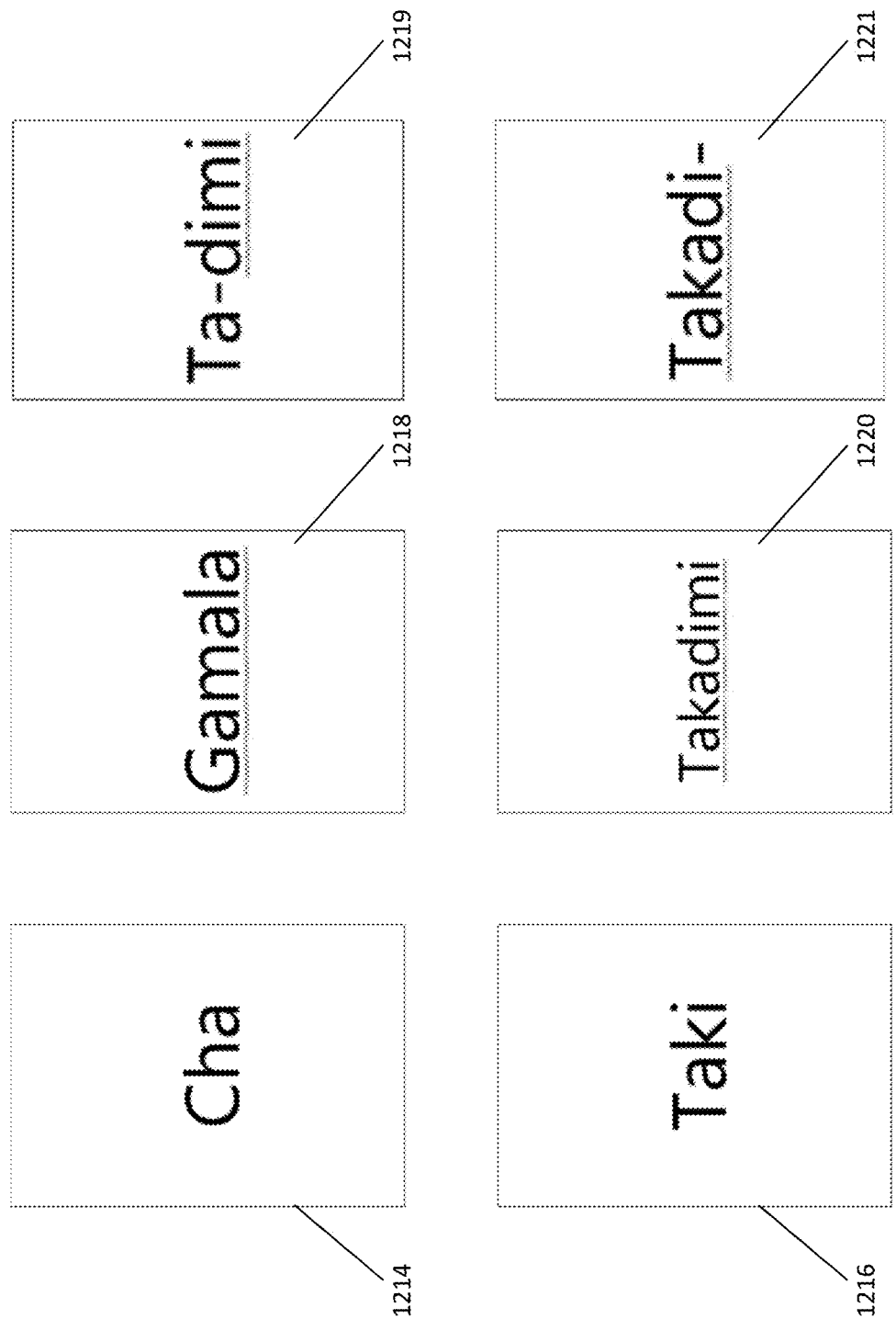

Referring to FIG. 12H illustrating MusicCards featuring ChaTaki syllables for example, MusicCard 1214 depicts a syllable 'Cha' that may be used for 1-beat challenges (e.g. say-playing or say-clapping 'cha' in 1 beat rhythm), MusicCard 1216 depicts a 2-syllable 'Taki' that may be used for 2-beat challenges (e.g. say-playing or say-clapping 'ta-ki' in 2-beats rhythm), MusicCard 1218 depicts a 3-syllable 'Gamala' that may be used for 3-beat challenges (e.g. say-playing or say-clapping 'ga-ma-la' in 3-beats rhythm), and MusicCard 1220 depicts a 4-syllable 'Takadimi' that may be used for 4-beat challenges (e.g. say-playing or say-clapping 'ta-ka-di-mi' in 4-beats rhythm). Further examples include MusicCard 1219 depicting 'Ta-dimi' that may be used for 4-beat challenges (e.g. say-playing or say-clapping 'ta-( )-di-mi' in 4-beats rhythm such that there is a silence or no vocal during the second beat that is between 'ta' and 'mi') and MusicCard 1221 depicting 'Takadi-' that may be used for 4-beat challenges (e.g. say-playing or say-clapping 'ta-ka-di-( )' in 4-beats rhythm such that there is a silence or no vocal during the last beat that is after 'di'). The syllables may also be represented in a form of a pattern similar to that shown in FIG. 12C, wherein a plurality of syllables may be depicted on a MusicCard to represent a rhythmic pattern.

Figure 12J:
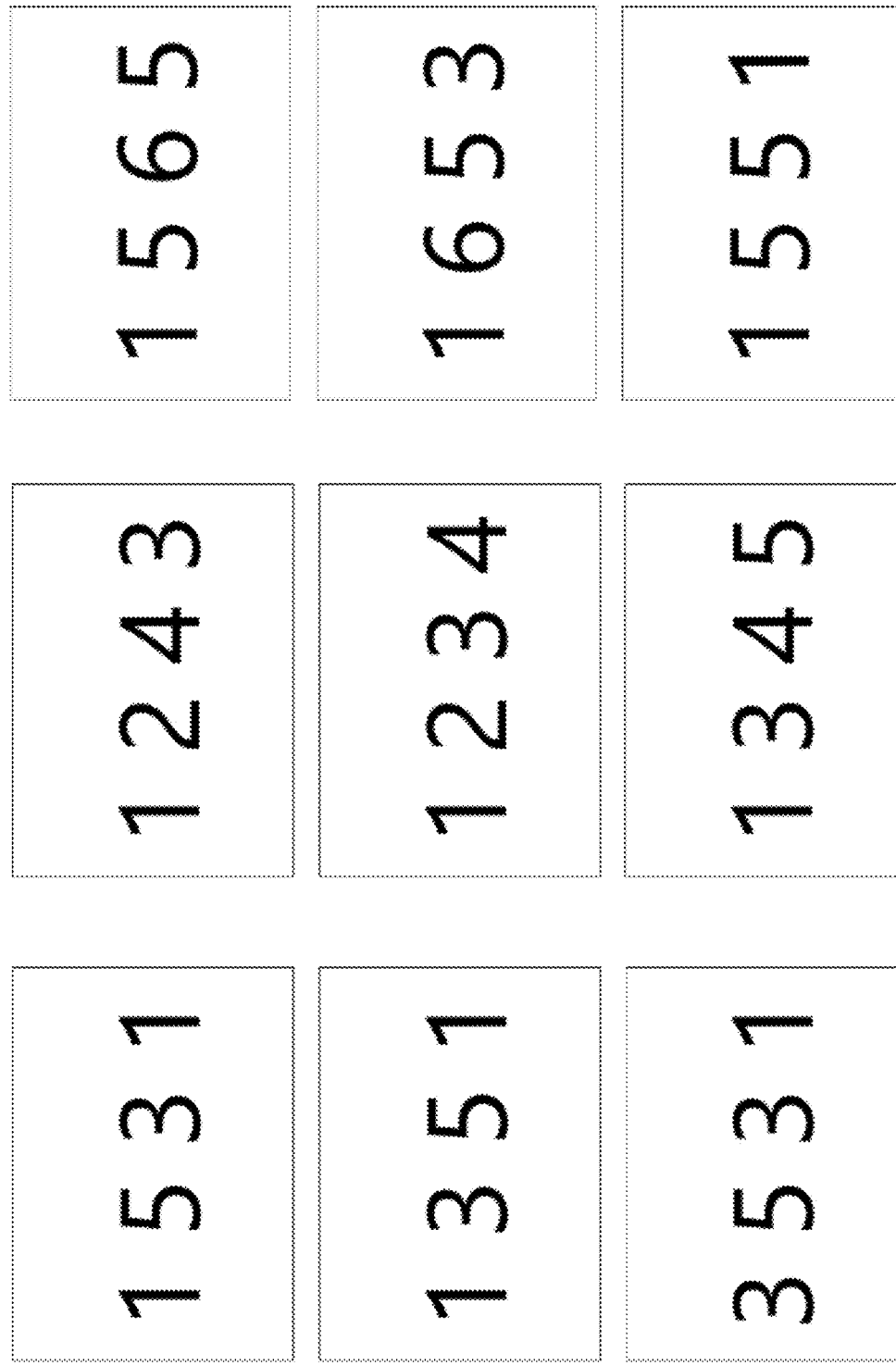

Referring to FIG. 12I illustrating MusicCards featuring scale degree numbers for example, MusicCard 1222 depicts a number '1' that may represent a first pitch that a user may be guided to say-play or say-sing, MusicCard 1224 depicts a number '2' that may represent a second pitch that a user may be guided to say-play or say-sing, MusicCard 1226 depicts a number '3' that may represent a third pitch that a user may be guided to say-play or say-sing, and MusicCard 1228 depicts a number '4' that may represent a fourth pitch that a user may be guided to say-play or say-sing. The scale degree numbers may also be represented in a form of a pattern similar to that shown in FIG. 12C, for example as shown in illustration 1223 of FIG. 12J wherein a plurality of scale degree numbers may be depicted on each MusicCard to represent a pitch pattern that a user may be guided to perform.

Figure 12K:
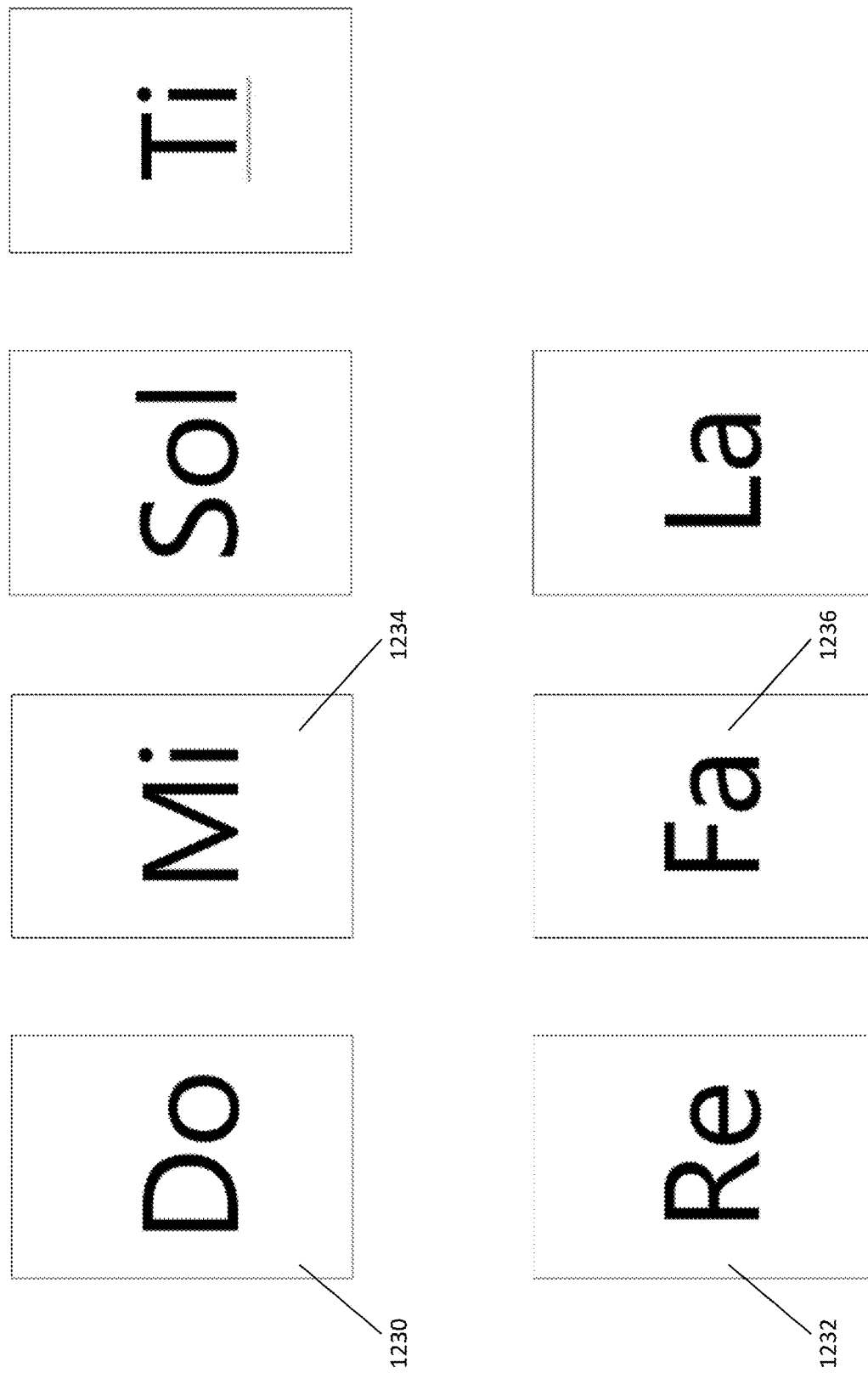

Referring to FIG. 12K illustrating MusicCards featuring do-re-mi syllables from 'do' up to 'ti' for example, MusicCard 1230 depicts a syllable 'Do' that may represent the music note 'do' wherein a user may be guided to say-play or say-sing, MusicCard 1232 depicts a syllable 'Re' that may represent the music note 're' wherein a user may be guided to say-play or say-sing, MusicCard 1234 depicts a syllable 'Mi' that may represent the music note 'mi' that a user may be guided to say-play or say-sing, and MusicCard 1236 depicts a syllable 'Fa' that may represent the music note 'fa' that a user may be guided to say-play or say-sing. The do-re-mi syllables may also be represented in a form of a pattern similar to that shown in FIG. 12C, wherein a plurality of do-re-mi syllables may be depicted on a MusicCard to represent a melody pattern that a user may be guided to perform.

Figure 12L:
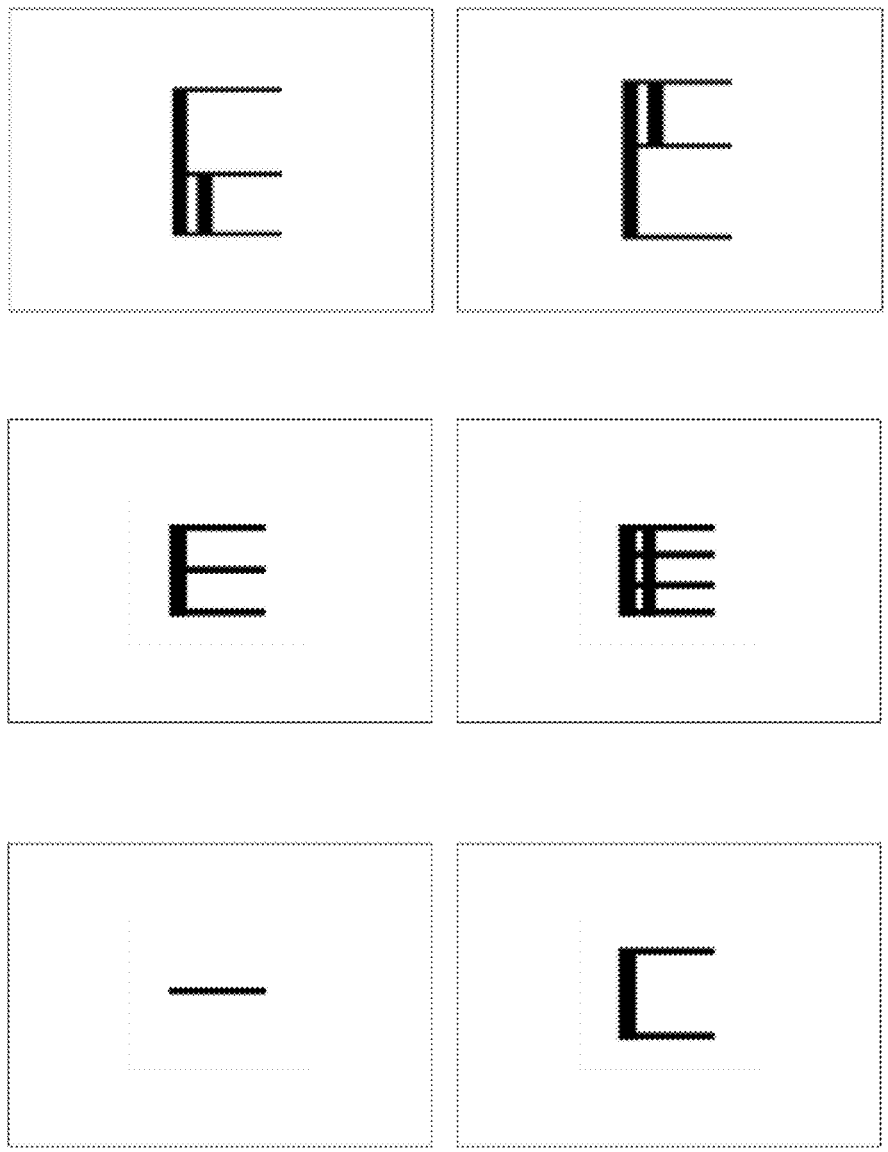

There may also be representations of stick notations in the MusicCards, such as shown in illustration 1225 of FIG. 12L, wherein a user may be guided to sing-play the stick notation depicted in the MusicCard. The stick notations may also be represented in a form of a pattern similar to that shown in FIG. 12C, wherein a plurality of stick notations may be depicted on a MusicCard to represent a melody pattern that a user may be guided to perform.

Figure 12M:
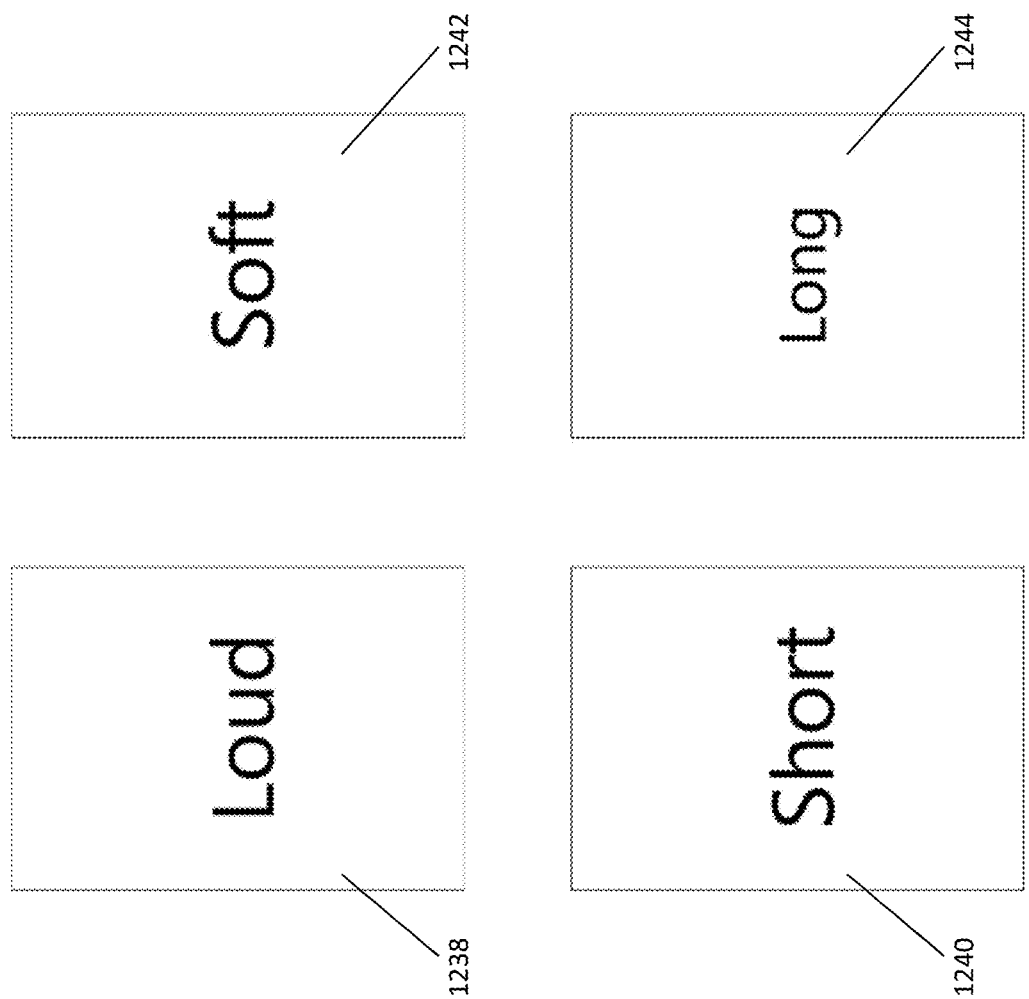

Referring to FIG. 12M illustrating MusicCards featuring accent, volume or length modifiers for example, MusicCard 1238 depicts a word 'Loud' that may represent an indication for a user to perform a music note, rhythm, pitch, melody pattern, or part thereof, such that the volume is higher or the accent is stronger. MusicCard 1240 depicts a word 'Short' that may represent an indication for a user to perform a music note, rhythm, pitch, melody pattern, or part thereof, such that a time taken to complete the performance is quickened or shortened. MusicCard 1242 depicts a word 'Soft' that may represent an indication for a user to perform a music note, rhythm, pitch, melody pattern, or part thereof, such that the volume is lower or the accent is softer. MusicCard 1244 depicts a word 'Long' that may represent an indication for a user to perform a music note, rhythm, pitch, melody pattern, or part thereof, such that a time taken to complete the performance is slowed or lengthened. The accent, volume or length modifiers may also be represented in a form of a pattern similar to that shown in FIG. 12C, wherein a plurality of accent, volume or length modifiers may be depicted on a MusicCard to represent a pattern that a user may be guided to perform on one or more music note, rhythm, pitch, melody pattern, or part thereof.

FIG. 12N shows an illustration 1246 of MusicCards that may be used as, for example, a modifier card for use with MusicCups or MiniMusicCups. Each of the MusicCards in illustration 1246 may depict a shape such as a triangle 1248 that is colour-coded with a colour from a plurality of colours such that each colour of the plurality of colours indicates a different modification of at least one of an accent, volume, articulation, or chromatic alteration of a music note represented by the MusicCup or MiniMusicCup.

Figure 12O:
Figure 12P:
Figure 12Q:

FIG. 12O shows an illustration 1250 of MusicCards depicting a variety of instructions that a user may be required to execute, such as performing patterns in reverse, performing patterns at half or double speed, extend or shorten rhythm patterns by adding or subtracting cards, adding various modifications (e.g. adding a loud or soft dynamic, accent, shorter or longer articulation, and other similar modifications) when performing a pattern, and other types of instructions. There may also be MusicCards depicting questions of who, what, when, where, how, why, and other similar questions as shown in illustration 1252 of FIG. 12P, as well as MusicCards that depict social emotional messages such as shown in illustration 1254 of FIG. 12Q. The MusicCard variations shown in FIG. 12O-12Q can advantageously be used to enhance gameplay aspects of the MusicCards to promote user engagement in the lessons and make learning music through use of MusicCards more interesting and fun.

Figure 12R:
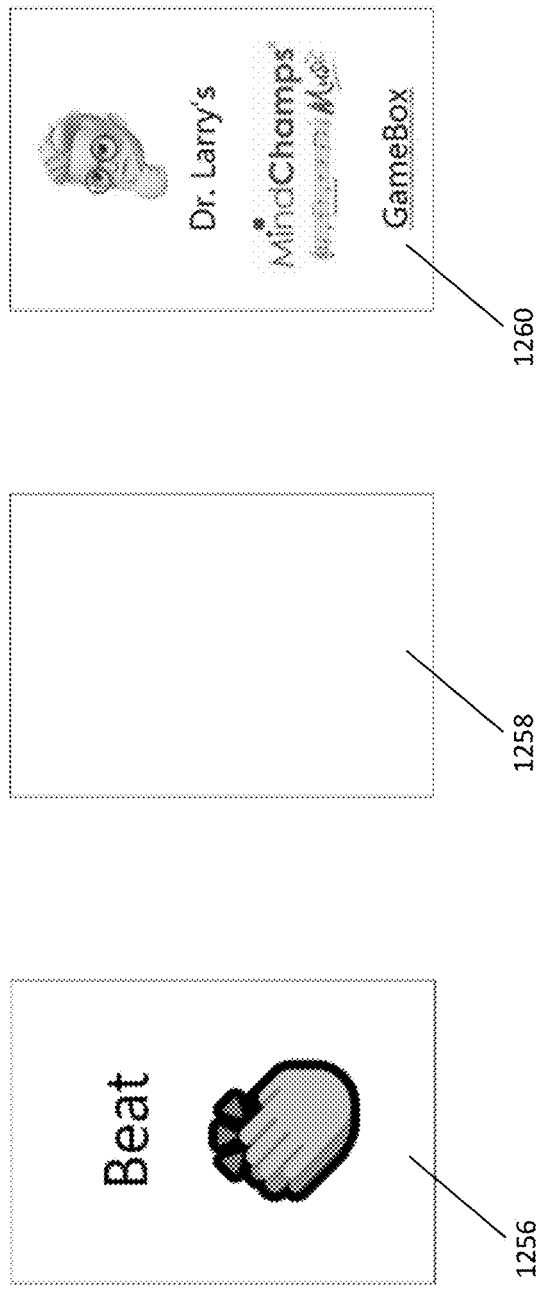

Further, FIG. 12R shows illustration 1256 that may be presented on a MusicCard to depict a single beat or clap wherein, for example, a user may be guided to perform a single beat using an instrument model or via clapping hands. Illustration 1258 features a blank surface that may be presented on a dry surface of a MusicCard (e.g. a dry erase MusicCard) to enable writing or drawing on the MusicCard, for example to provide new instructions or introduce a different type of modification or performance. This advantageously enables users such as a teacher, facilitator or student to introduce new and different elements to the MusicCards. Furthermore, illustration 1260 that may be used as a design for a back of a MusicCard.

The illustrations of MusicCards as shown in FIGS. 12B-12R may also be depicted in MiniMusicCards, for example for use in the same way as MusicCards and/or for use in Silent Practice Chart 200 of FIG. 2. It will be appreciated that other variations such as other animal names, fruit names, vegetable names, numbers, letters, dash-dot, ChaTaki syllables, stick notation, section boxes, and other similar representations are possible with varying levels of detail, difficulty and complexity.

There may be three types or sets of MusicCard decks. A first set of cards may be configured to facilitate teaching rhythm patterns, each card of the first set of cards representing at least one of a syllable, music note, or a rhythm modifier for performing along with or modifying a rhythm, wherein each card serves as an indication for a user to vocally perform the at least one of a syllable, music note, or modified rhythm represented by the card. A second set of cards may be configured to facilitate teaching pitch, each card of the second set of cards representing at least one of a syllable, music note, or a pitch modifier for performing along with or modifying a pitch, wherein each card serves as an indication for a user to vocally perform the at least one of a syllable, music note, or modified pitch represented by the card. A third set of cards may be configured to facilitate teaching melody patterns, each card of the third set of cards representing at least one of a syllable, music note, or a pitch modifier for performing along with or modifying a melody pattern, wherein each card serves as an indication for a user to vocally perform the at least one of a syllable, music note, or modified melody pattern represented by the card. Each type or set of cards may be further divided into two or more decks of cards in order of difficulty of modifying the rhythm, pitch or melody pattern. Further, the ModifierCard 1002 in FIG. 10 may be a card from the first or second set of cards, wherein the modification is based on the syllable, music note, pitch modifier, or rhythm modifier represented by the card.

In the first type or set of cards, 'Say-Play' MLMMS Rhythm MusicCards may be used and performed by saying rhythm patterns with syllables, say-playing rhythm by clapping and using rhythm sticks, shakers, Transitional Silent Practice PanDrums, electronic keyboards that are turned off (e.g. for silent practicing), recorder (tonguing), violin plucking and bowing, and other similar accessories, as well as say-playing Traditional tubanos (djembe) hand drums, keyboards that are turned on, recorders (tonguing), violins (plucking, bowing), and other similar accessories.

The Rhythm MusicCard Decks may depict individual rhythm elements in progressively more complex rhythm patterns (say-clapping, say drumming) by rising complexity both within and across 4 beat or longer patterns, and may be further divided into decks A, B and C of increasing difficulty and complexity. In Rhythm MusicCard Deck A, after establishing a slow, steady beat, the rhythm reader may be challenged to precisely render rhythm patterns that contain simple evenly distributed subdivisions of beats into 1, 2, 4, 3 part groupings on individual cards using animal names (bear, monkey, elephant, alligator), fruit names (pear, mango, coconut, watermelon), vegetable names (yam, pepper, broccoli, avocado), numbers, letters, dash-dot, ChaTaki syllables, stick notation, section boxes.

Further, Rhythm MusicCard Deck B may contain relatively more complex, uneven, permutated subdivisions of the beat, using complex names (butterfly, grasshopper) (cantaloupe, blackberry) (bell pepper, artichoke), and abstract symbol systems such as stick notation, ChaTaki syllables (ta-dimi, taka--mi), dash-dot (-.. -), section boxes (4 section black patterned), and Rhythm MusicCard Deck C: Features advanced syncopated subdivision patterns using symbol systems, abstract symbols such as stick notation, ChaTaki syllables (taka-mi, --ka-mi), dash-dot (.-.), section boxes (4 section black patterned, and other similar representations.

In a second type or set of cards, Sing-Play MLMMS Pitch MusicCards may be performed by say-sing-fingering scale degree numbers, doremi syllables; by say-sing-play IMMILS Transitional Silent Practice ToneBars, (turned OFF) electronic keyboards, recorders (tonguing), violin plucking and bowing; by say-playing traditional tubanos (djembe) hand drums, (turned ON) keyboards, recorders (tonguing), violins (plucking, bowing). The pitch playing card decks may contain individual pitch elements and patterns (sing-finger numbers, pitch names, graphic placement) that become progressively more complex when choosing Pitch Pattern MusicCards from:

Pitch MusicCard Deck A: After establishing a stable pitch reference note determined by a single note (after listening to middle C or Do, a 1-5 sustained drone, possibly in the context of a recorded tambura in C major), the reader is challenged to precisely render simple, limited range pitch patterns that require the reader to say-sing-finger, then say-sing-play scalar patterns starting with a compact range of pitches, etc.) groupings on individual cards using scale degree numbers, letters, syllable, hand sign with occasional leaps (1, 2, 3, 1, 2, 3, 4, 1, 2, 3, 4, 5, 1; 121, 12321, 12345, 151, 1231, 32121, and other similar patterns.)

Pitch MusicCard Deck B: Contains more complex, varied, permutated musical contours due to increasing presence of rapidly changing intervals, more frequent leaps away from the scalar passages and more distantly related over time to the reference tone (memory tone), thus requiring occasional insertion of verification notes to reduce "guessing mistakes" in the musical performance.

Pitch MusicCard Deck C: Features advanced, abstract and vocally challenging pitch patterns that also more expansive requiring more stamina while encountering even more extensive leaping patterns.

In a third type or set of cards, Melodic Say-Sing-Play IMMILS (Rhythm+Pitch) Melody Pattern MusicCardMatrix Decks performed by individual or small groups say-sing-fingering-conducting scale degree numbers, doremi syllables or lyrics placed in a Music Matrix, then by say-sing-playing MMILS Transitional Silent Practice toneBars, (turned OFF) electronic keyboards, recorders (tonguing), violin plucking and bowing; by say-playing traditional tubanos (djembe) hand drums, (turned ON) keyboards, recorders (tonguing), violins (plucking, bowing). The Melody Pattern MusicCardMatrix decks contain melodic patterns to be decoded as simultaneous sing-finger combinations of rhythm and multiple pitch symbol system representations graphically framed in a MusicCardMatrix Card. The melodic content become progressively more complex choosing Melody Pattern MusicCards from:

Melody MusicCard Deck A: After establishing both a steady metric (conducted) beat and a stable pitch reference pitch determined by a single note, the reader is challenged to precisely render scale step number, note names, or colored block patterns in XY coordinate matrices (linked with graphic, stick notation, ChaTaki or animal name rhythm patterns) that represent simple, limited range melodic patterns that require the performer to say-sing-finger, then say-sing-play simultaneously processed simple rhythm+limited pitch contour patterns while pointing to the pitches in the MelodyMatrix and/or by strictly maintaining a constant metric beat.

Melodic MusicCard Deck B: Contains more complex, varied, permutated melodic contours due to increasing presence of rapidly changing rhythm subdivisions, pitch interval leaps, that requires more attention to instances of simultaneous changes in representations melodic patterns and alternative verification of rhythm, pitch pattern and lyrical content.

Melody MusicCard Deck C: Features advanced, abstract rhythm and vocal reading and performance challenges while the melodies may become also more expansive requiring more cognitive processing and metacognitive reflection.

Similar with the previous MLMMS matrix-manipulatives, Magnet MusicDots/Magnet MatrixBoard System promotes young children's music literacy by providing opportunities and tools for manipulating multiple representation of rhythm, pitch, and melodic musical content. Like the MusicCups and MusicCards, the MusicDots can be used to represent, order, manipulate, perform, and reflect on musical content. Unlike the MusicCups and MusicCards, the MusicDots can depict fixed elements and configurations of both rhythm and pitch patterns when placed inside a permanent XY coordinate system of a Magnet MatrixBoard. The MatrixBoard may be a magnetic board comprising a grid having one or more cells arranged in a X and Y axis, each axis representing a measure of beats in a rhythm or a measure of a pitch. The MusicDots may be one or more magnets configured to be placed in the one or more cells for plotting or modifying a rhythm pattern, pitch pattern or melodic pattern with reference to the X and Y axis, wherein each of the one or more magnets represents at least one of a syllable, music note, stick notation, start of a rhythm or start of a scalar pattern, wherein the rhythm pattern, pitch pattern or melodic pattern is plotted on the grid or modified based on the represented syllable, music note, stick notation, start of a rhythm or start of a scalar pattern, wherein the one or more magnets placed on the grid serves as an indication for a user to vocally perform the plotted or modified rhythm pattern, pitch pattern or melodic pattern.

Figure 13A:
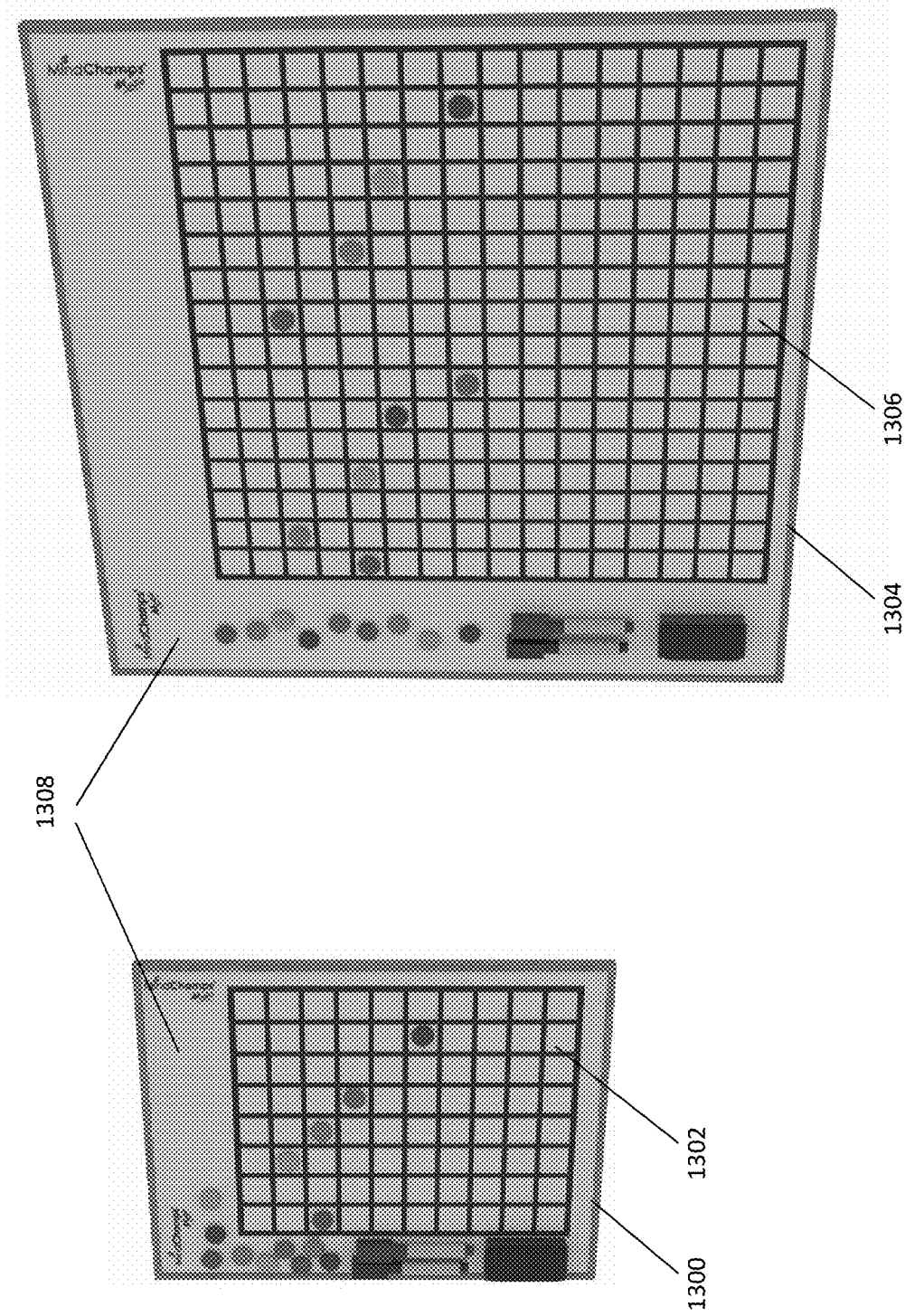
FIGS. 13A-13K show example illustrations of MatrixBoards in accordance with various embodiments.

Referring to FIG. 13A, a magnetic flipside of a small MatrixBoard 1300 may contain an 8×10 XY grid (e.g.

10"×12") comprising one or more cells such as coordinate matrix system 1302 and a large MatrixBoard 1304 may contain an 16×16 XY grid (e.g. 20"×20") comprising one or more cells such as coordinate system 1306 that can be applied for larger scale range pitch, rhythm, and melodic patterns, instrumentation and rhythm accompaniment. It is also possible to place the two or more MatrixBoards together to afford twice as much space for longer collaborative compositions and say-sing-finger vocal or instrumental performances. Blank margins may allow space for storage of pens, erasers, and a large amount of MusicDots, and dry erase labeling of pitch names, scale degree numbers, stick rhythm, text. The magnetic, dry-erase flipside of the MatrixBoard can also be used for placing magnet animals, letters, numbers, and any configuration of MusicCards affixed by a supply of circle magnets.

Figure 13B:
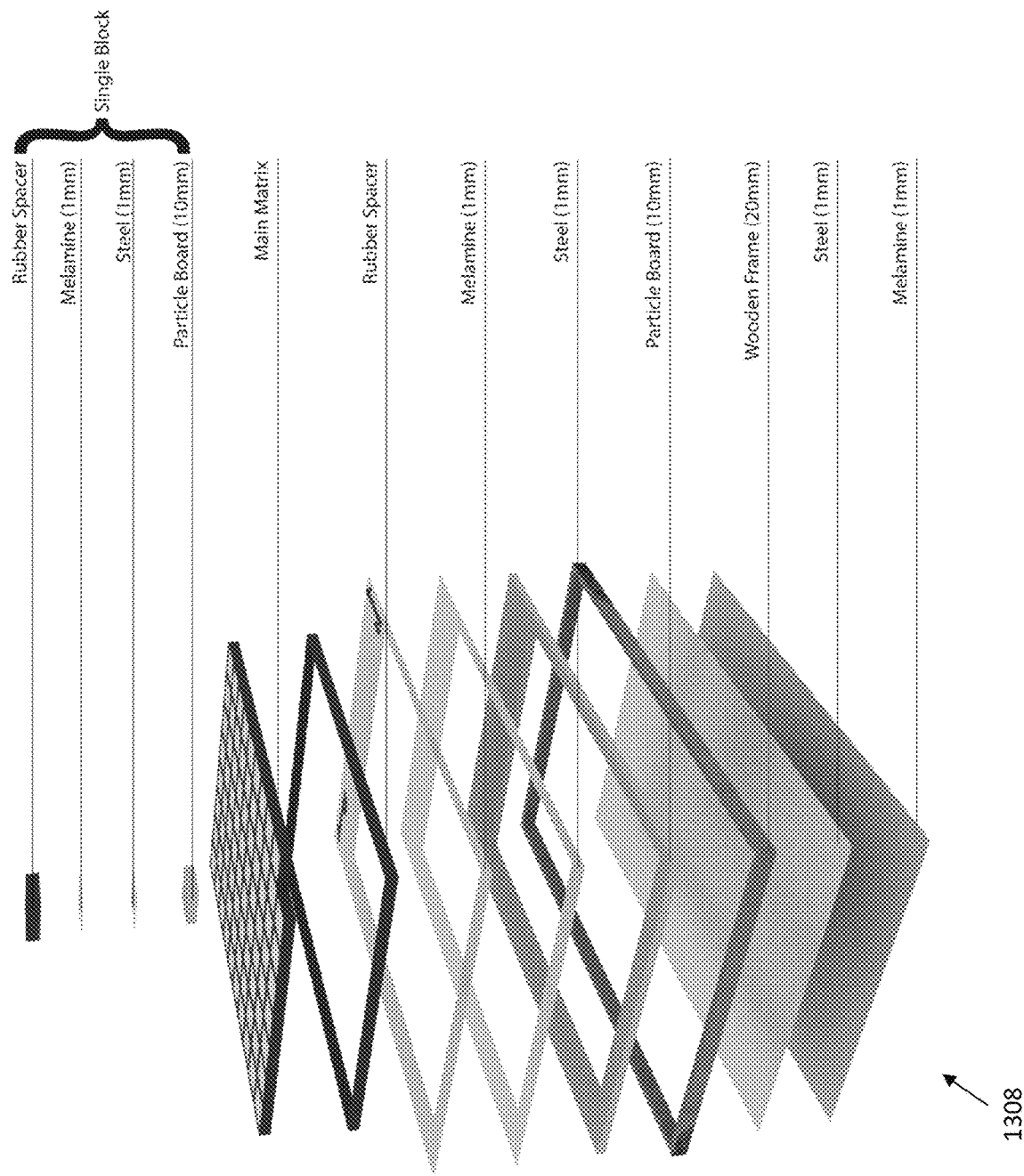
Figure 13C:
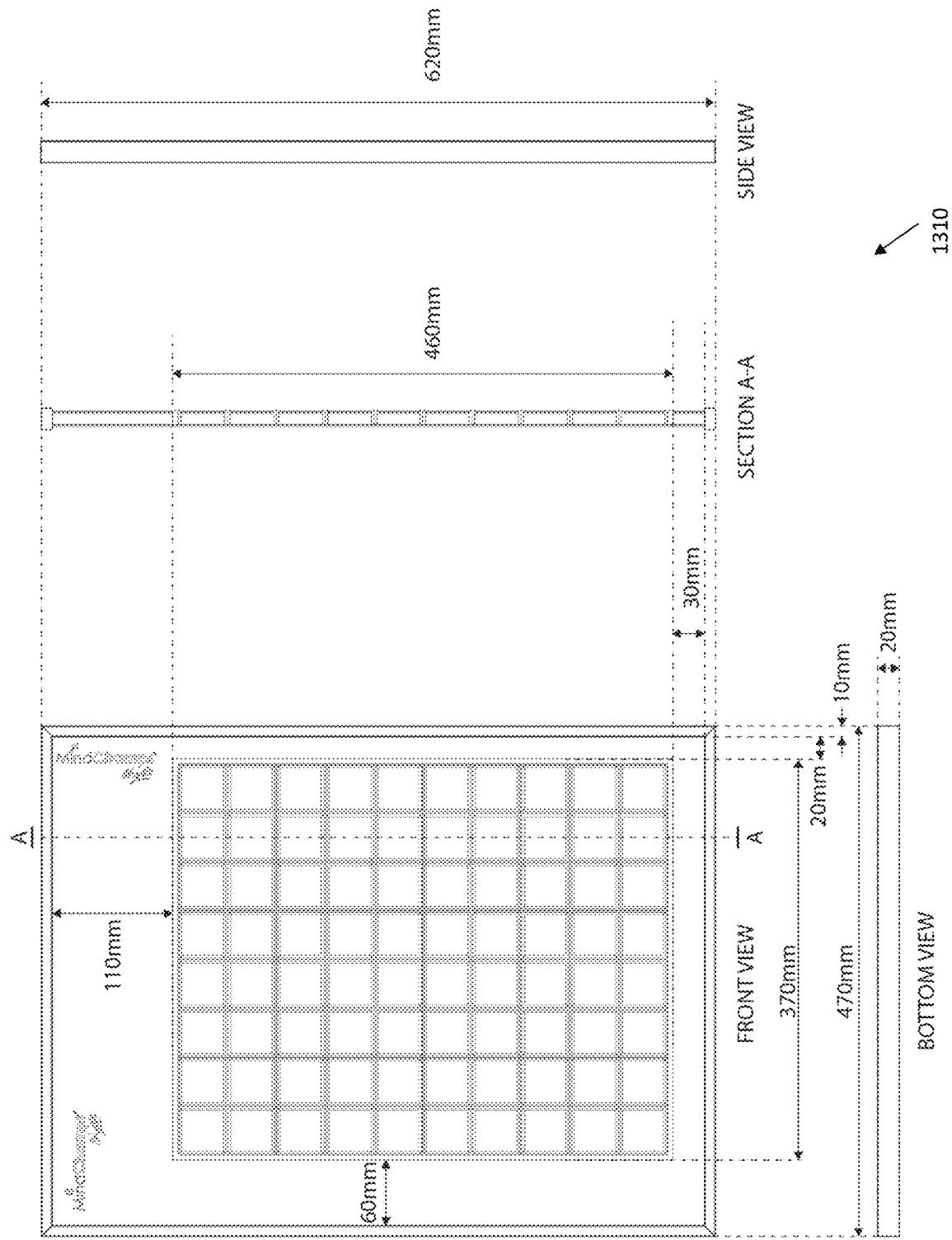
Figure 13D:
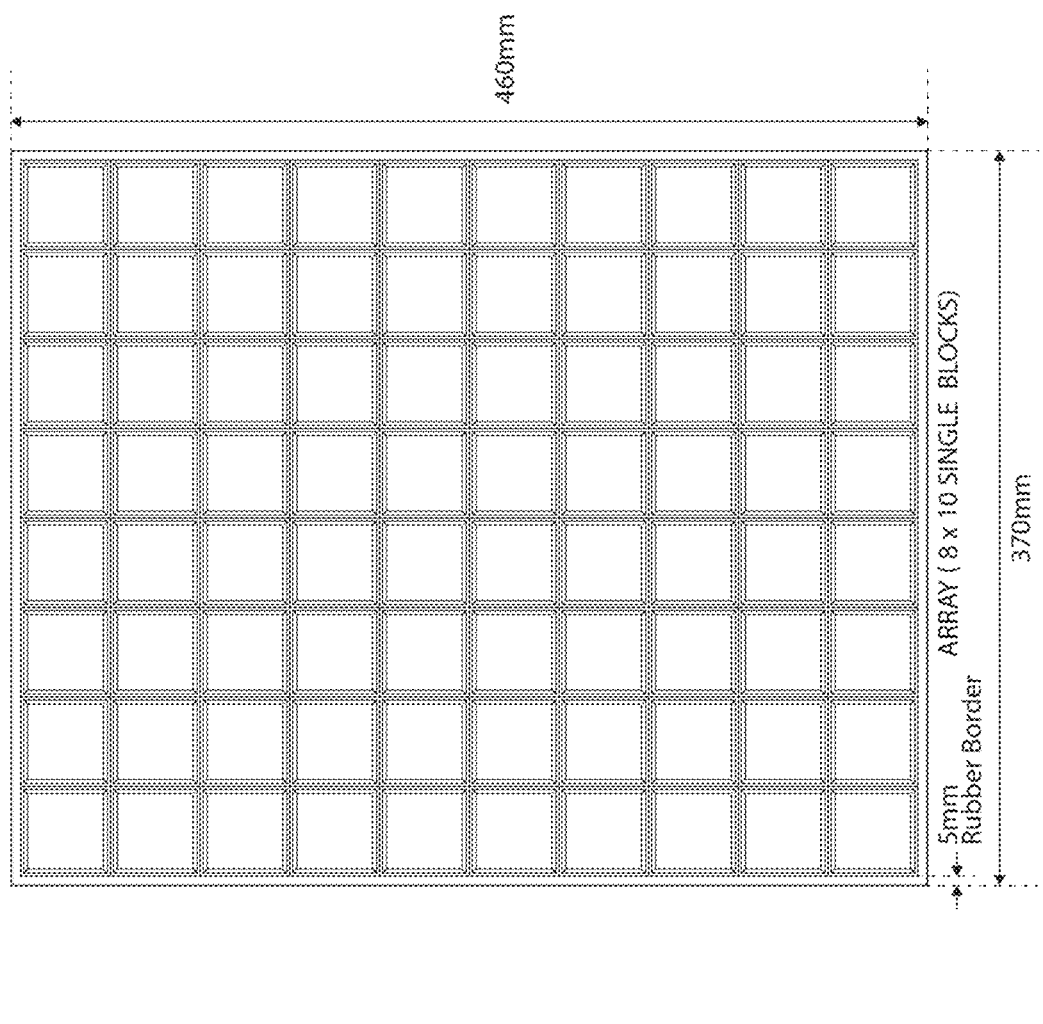
Figure 13E:
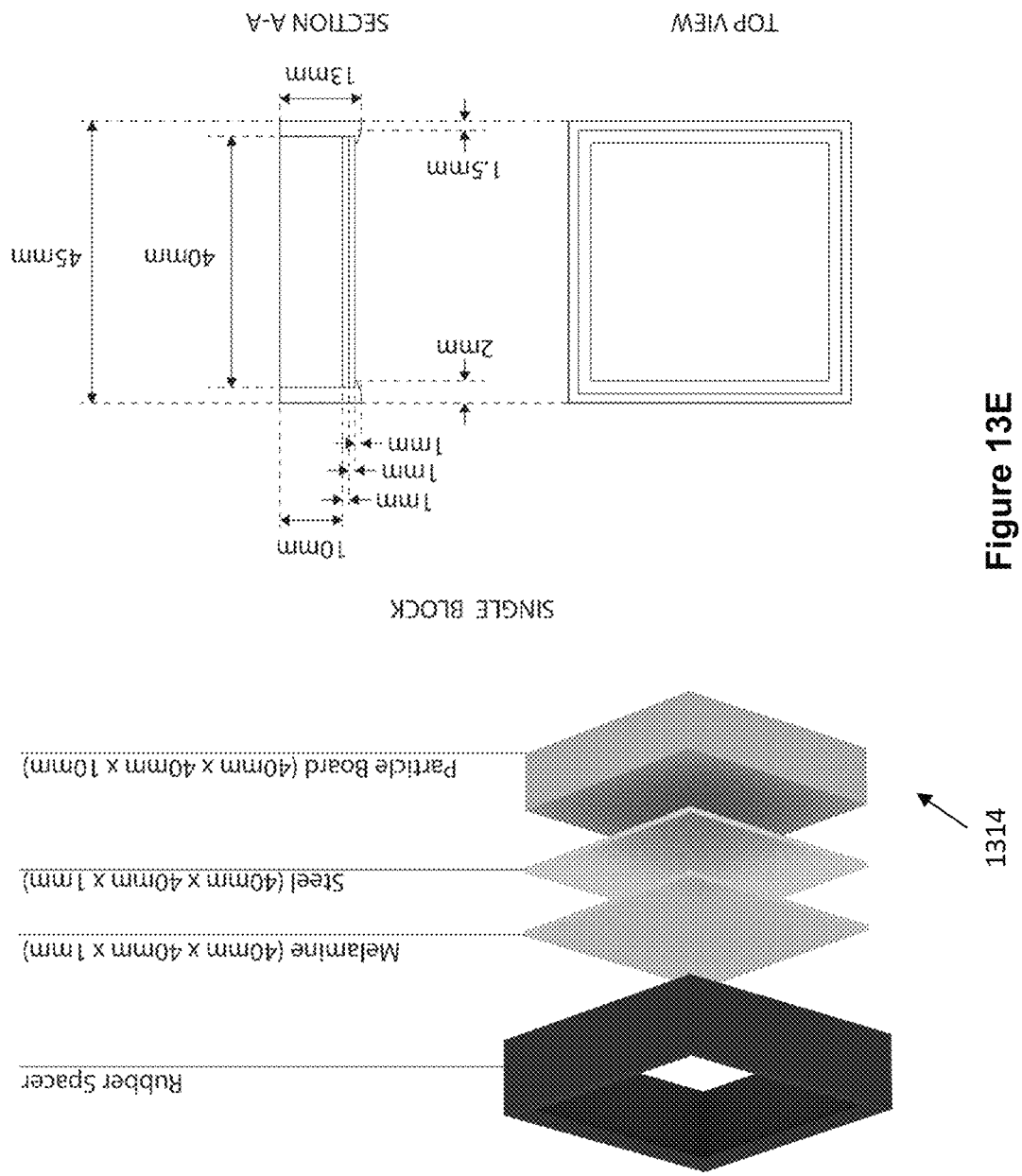
Figure 13F:
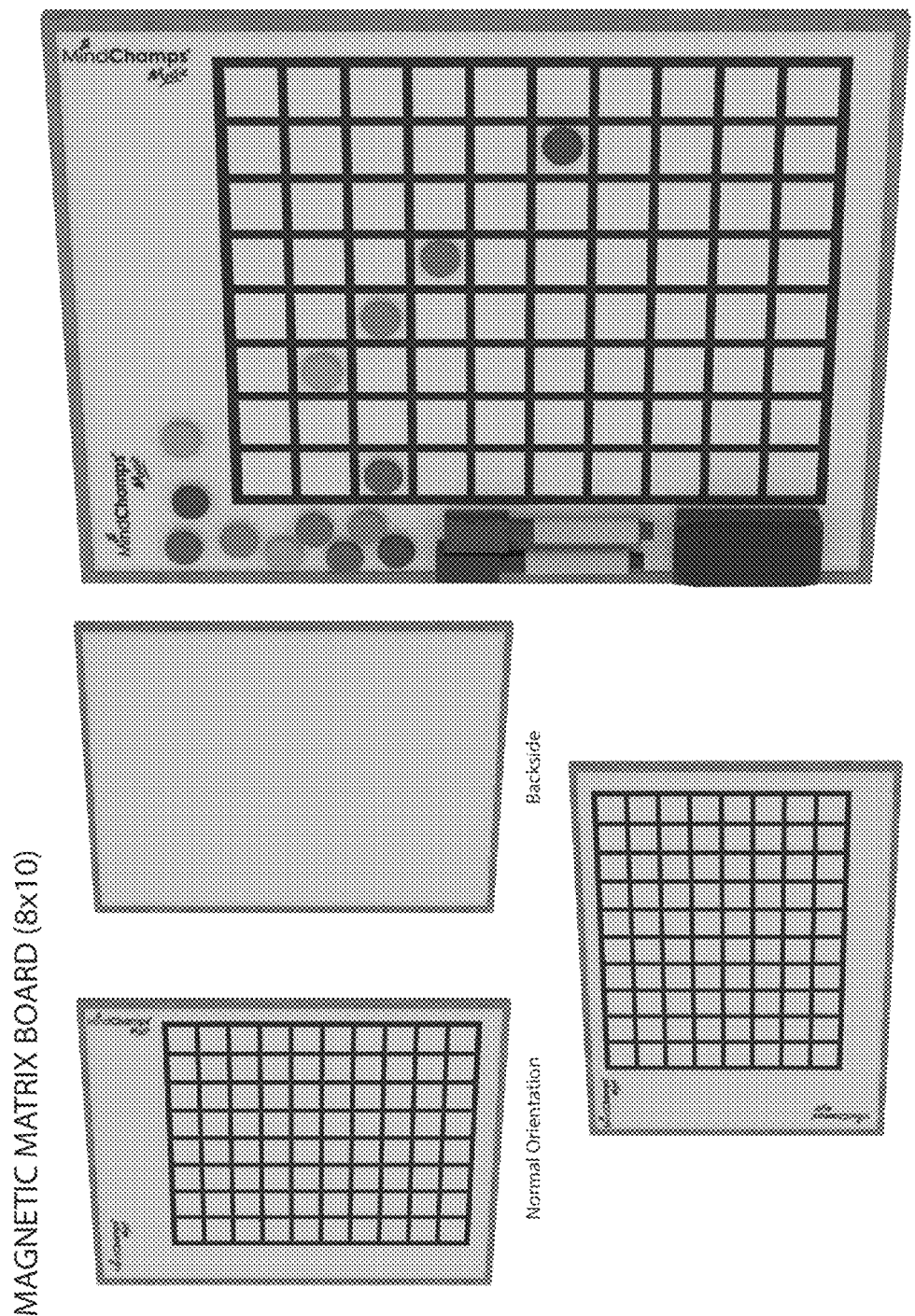

Illustration 1308 of FIG. 13B shows an overview of example materials and constructional components that make up a small MatrixBoard such as MatrixBoard 1300, illustration 1310 of FIG. 13C shows example dimensions for a small MatrixBoard such as MatrixBoard 1300, illustration 1312 of FIG. 13D shows example dimensions of coordinate system 1302, and illustration 1314 of FIG. 13E shows example dimensions, materials and constructional components that make up each cell of, for example, coordinate system 1302. For example, as shown in illustration 1314 of FIG. 13E, each cell may be made up of a particle board as a base, a steel sheet on top of the particle board, a melamine sheet on top of the steel sheet, and a rubber spacer enclosing the particle board, steel sheet and melamine sheet. This enables a magnetic MusicDot to magnetically stick onto each cell of the coordinate system 1302. Further, illustration 1316 in FIG. 13F shows various renderings of the small MatrixBoard 1300 in various views according to various embodiments.

Figure 13G:
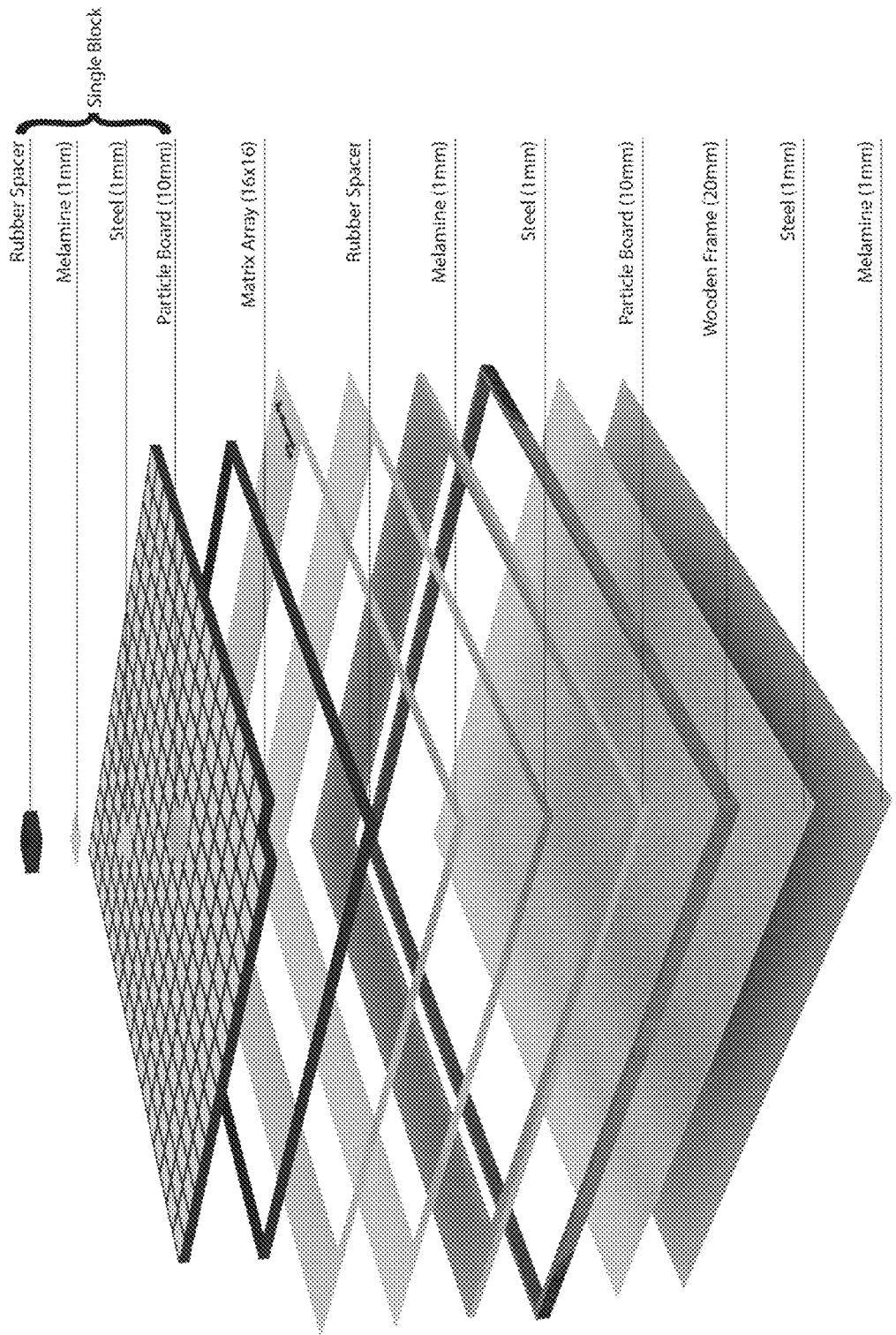
Figure 13H:
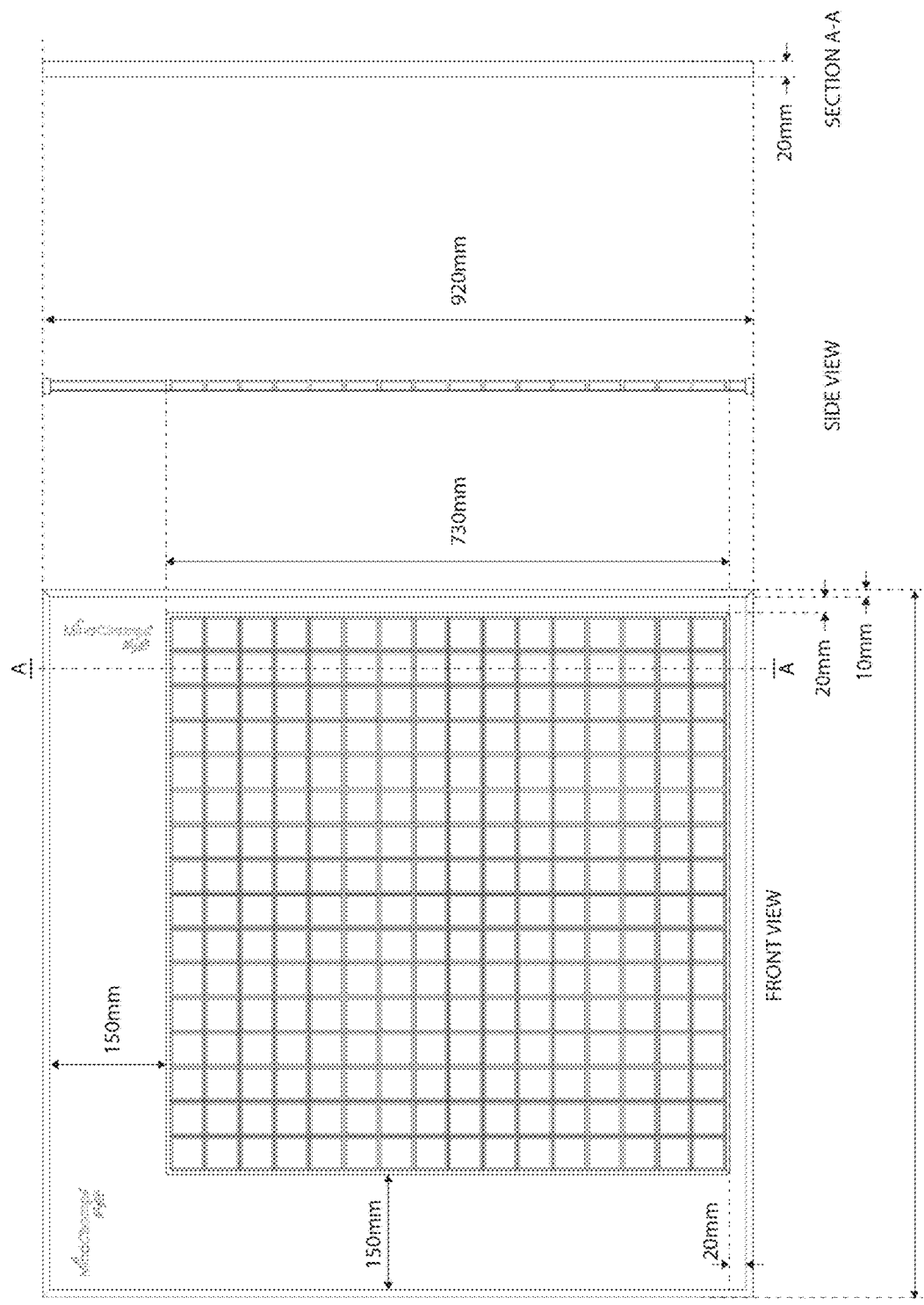
Figure 13I:
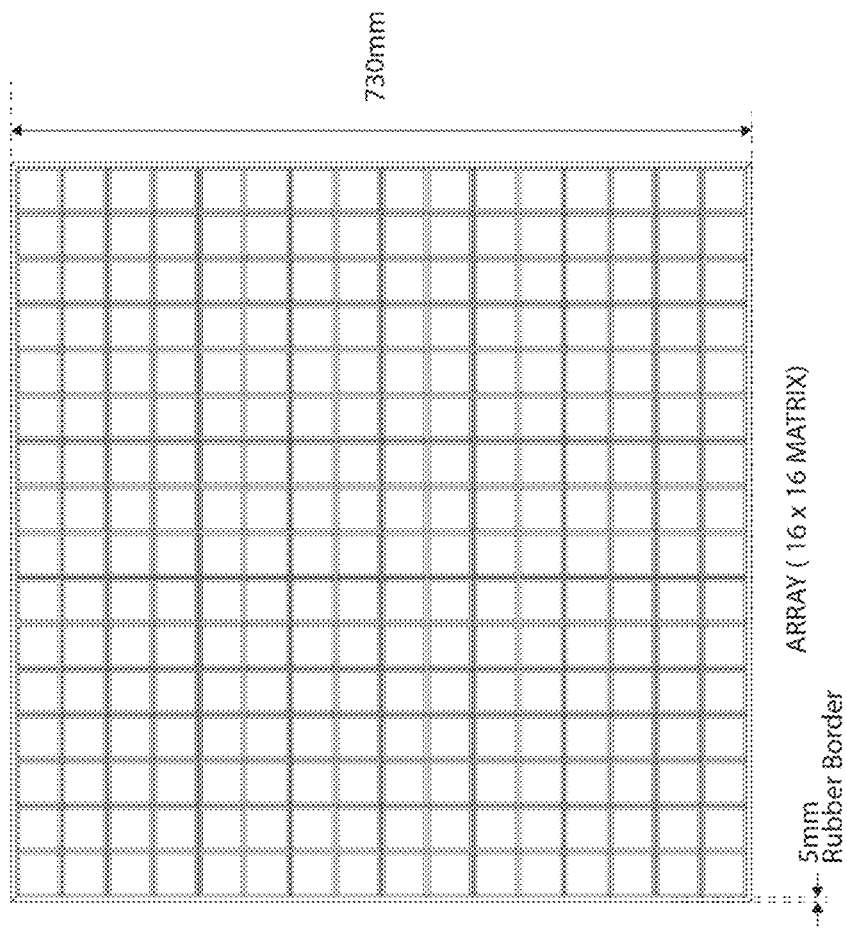
Figure 13J:
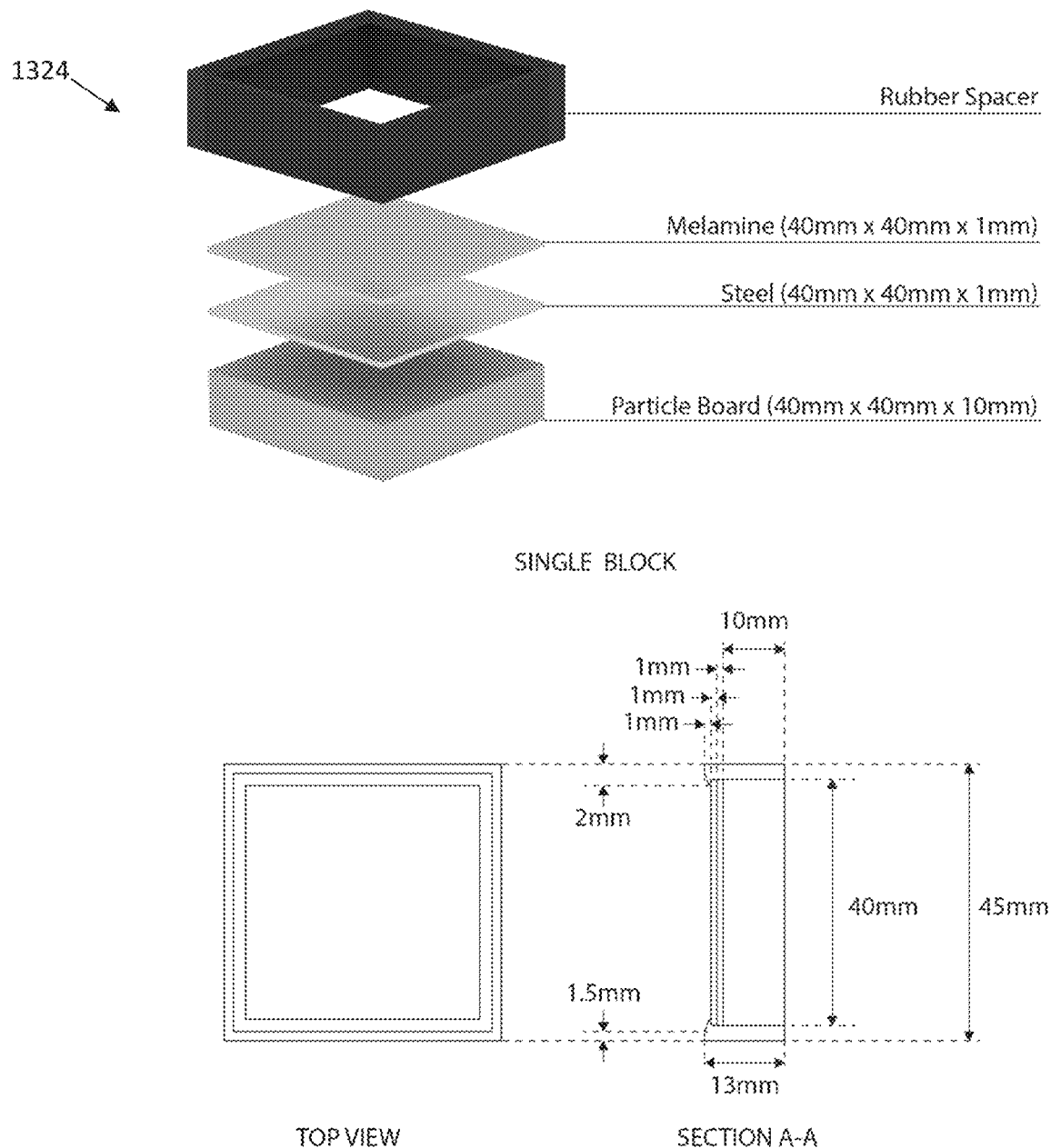
Figure 13K:
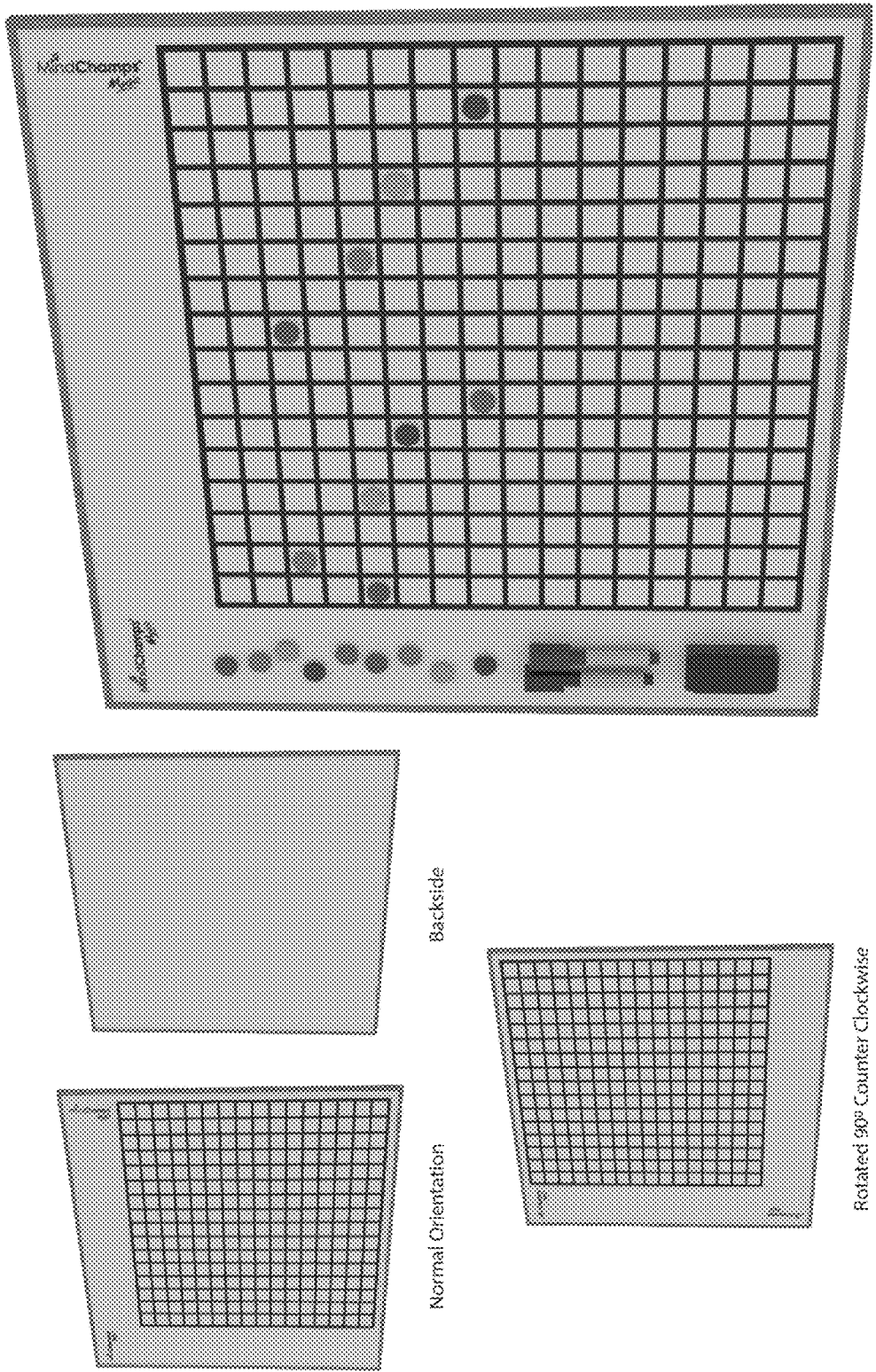

Illustration 1318 of FIG. 13G shows an overview of example materials and constructional components that make up a large MatrixBoard such as MatrixBoard 1304, illustration 1320 of FIG. 13H shows example dimensions for a large MatrixBoard such as MatrixBoard 1304, illustration 1322 of FIG. 13I shows example dimensions of coordinate system 1306, and illustration 1324 of FIG. 13J shows example dimensions, materials and constructional components that make up each cell of, for example, coordinate system 1306. For example, as shown in illustration 1324 of FIG. 13J, each cell may be made up of a particle board as a base, a steel sheet on top of the particle board, a melamine sheet on top of the steel sheet, and a rubber spacer enclosing the particle board, steel sheet and melamine sheet. This enables a magnetic MusicDot to magnetically stick onto each cell of the coordinate system 1306. Further, illustration 1326 in FIG. 13K shows various renderings of the large MatrixBoard 1304 in various views according to various embodiments.

Figure 13L:
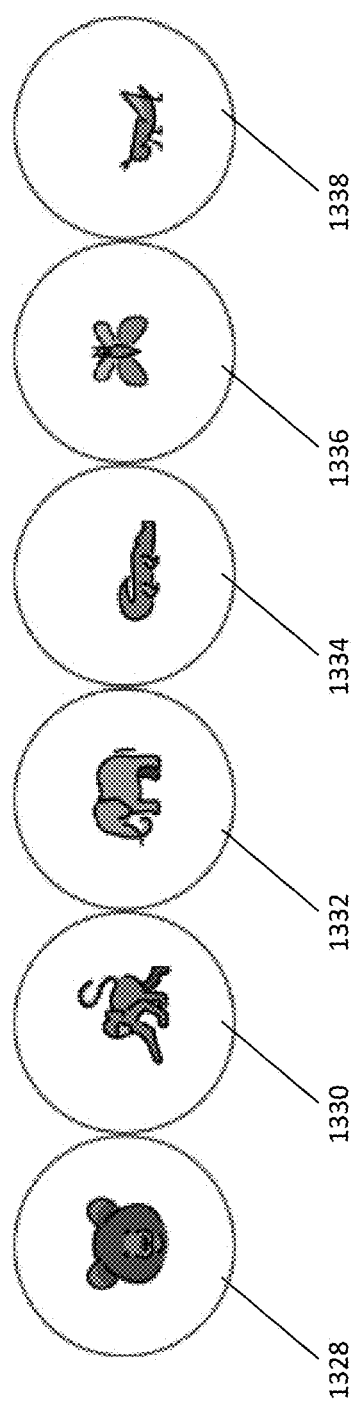
Figure 13O:
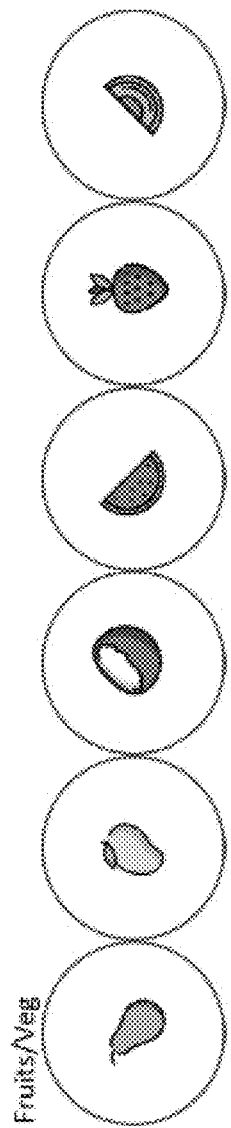
Figure 13P:
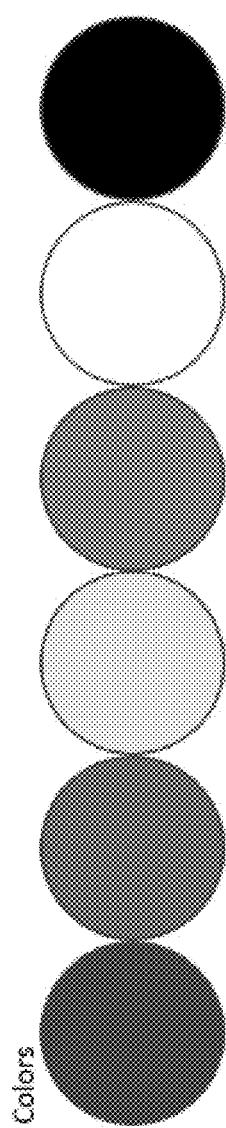
Figure 13Q:
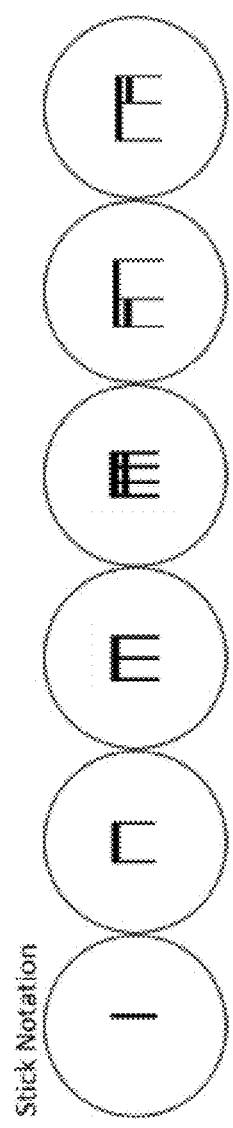
Figure 13R:
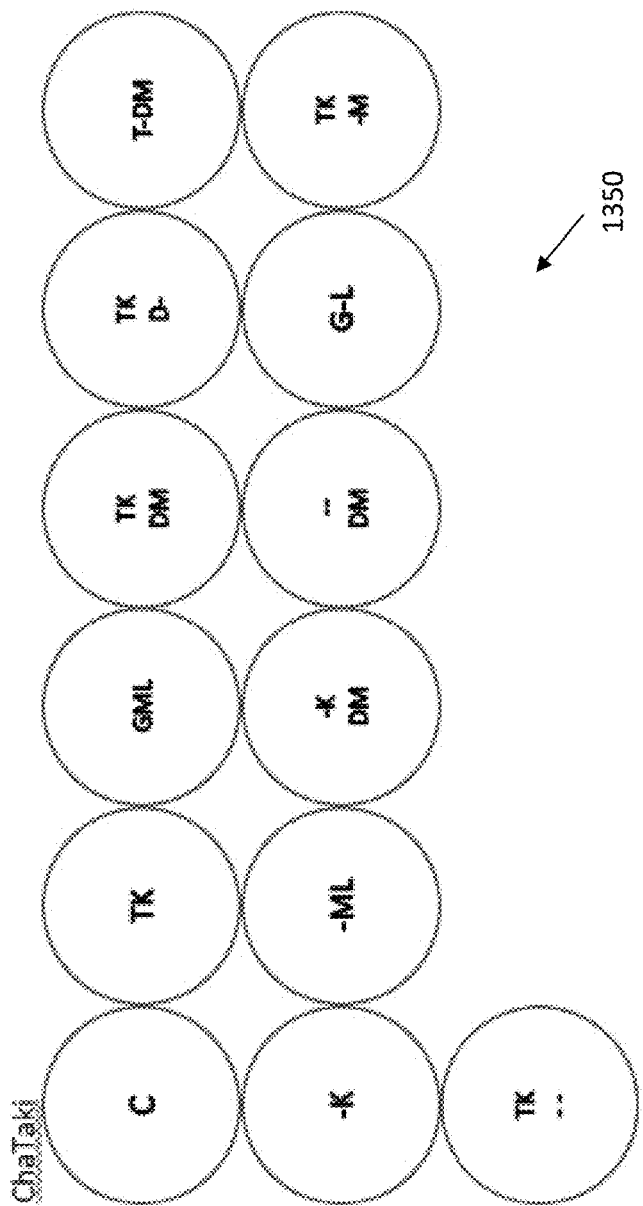
Figure 13S:
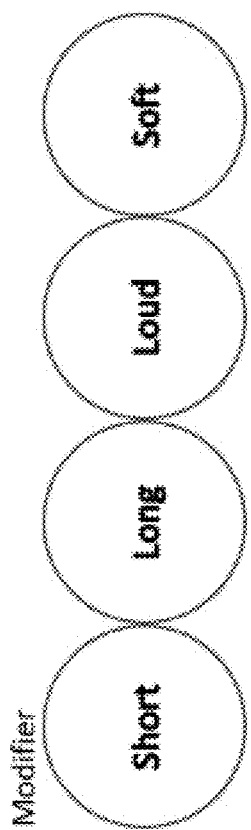
Figure 13T:
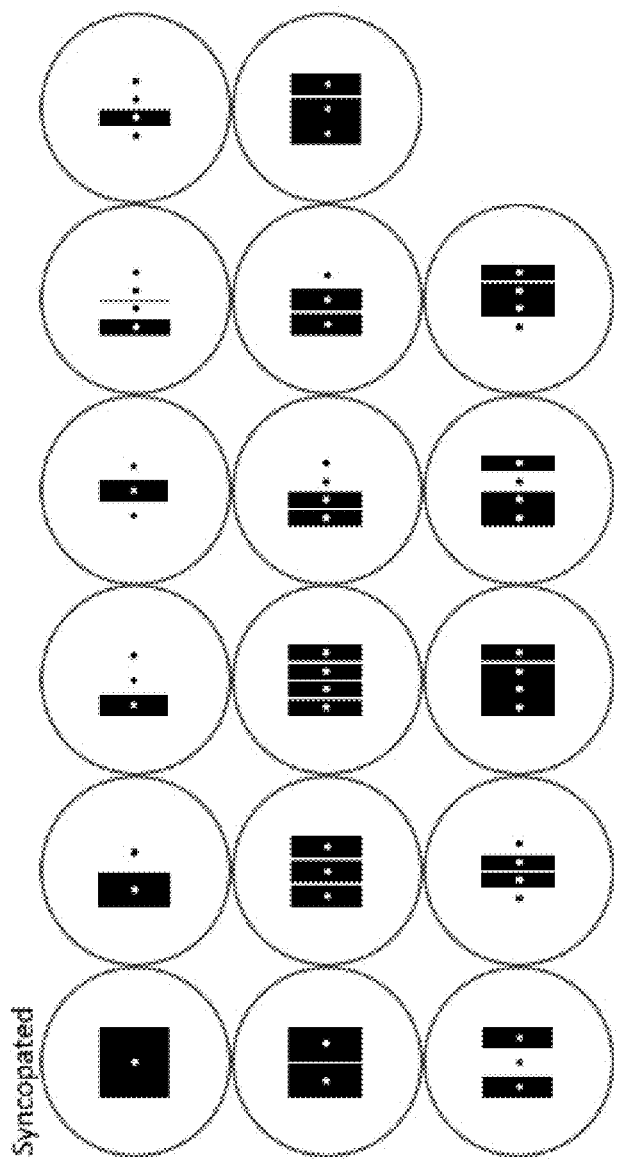

As with the previous hands-on manipulatives, the Music-Dot/Magnet MatrixBoard supports growth and productivity of problem-solving skills that establishes music literacy skills based on decoding rhythm representations (e.g., animal name syllables) as the essential building block for young preschool children's musical development without the benefit of previous musical training. The MusicDots may be color-coded for assigned variable rhythms (like the MusicCups) and/or labeled with virtually the same range of symbol systems as the MusicCards for rhythm and pitch pattern purposes. Referring to FIG. 13L for example, Music-Dots may depict illustrations of animals such as a bear 1310, a monkey 1312, an elephant 1314, an alligator 1316, a butterfly 1318, a grasshopper 1320, or other similar representations. It will be appreciated that the MusicDots may also feature the various representations for MusicCards as illustrated in FIGS. 12B-12R. For example, illustration 1340 of FIG. 13M shows MusicDots depicting numbers, illustration 1342 of FIG. 13N shows MusicDots depicting do-re-mi letters (e.g. D='Do', R='Re', M='Mi' and so on), illustration 1344 of FIG. 13O shows MusicDots depicting fruits and vegetables, illustration 1346 of FIG. 13P shows MusicDots depicting various colours, illustration 1348 of FIG. 13Q shows MusicDots depicting stick notations, illustration 1350 of FIG. 13R shows MusicDots depicting cha-taki syllables, and illustration 1352 of FIG. 13S shows MusicDots depicting modifiers (e.g. 'Short', 'Long', 'Loud', 'Soft', and other similar modifiers). MusicDots may also depict syncopated rhythm patterns as shown in illustration 1354, wherein a user may, for example, perform a beat or music note with a stronger accent, emphasis, higher volume, etc for beats that are shaded.

Unique to the MusicDot/MatrixBoard System is the opportunity to use many small-size, easy to place and move rhythm and pitch labelled MusicDots for both more expanded range of composition that also allows for far more editing flexibility and transportability of longer melodic patterns. Because of these advantageous features, the Music-Dot/MatrixBoard System can be used to replicate and vary music from, for example, 21 MLMMS Repertoire Matrix-Books, compose multitextured accompaniments to the music, and compose new melodies and ensemble pieces from scratch.

In various examples of use of the MusicDot/MatrixBoard system, based on X=rhythm and Y=pitch on the coordinate system 1302 and 1306, one small 8X×10Y coordinate board 1302 can flexibly represent anywhere from 0 to 5 (stacked) 8-beat linear rhythm pattern(s) (X axis) to anywhere from 5 to 10 scale step 8-beat diatonic pitch contour patterns (Y axis). When rotated 90 degrees, coordinate board 1302 can flexibly represent anywhere from 0 to 5 (stacked) 10-beat linear rhythm pattern(s) (X axis) to anywhere from 3 to 8 10-beat linear diatonic pitch contour patterns (Y axis). Further, one large 16X×16Y coordinate board 1306 can flexibly represent anywhere from 3 to 5 (stacked) 16-beat linear rhythm pattern(s) (X axis) to anywhere from 8 to 13 intervallic diatonic/chromatic scale step 16-beat diatonic pitch contour patterns (Y axis) simultaneously.

The blank dry-erase MLMMS magnetic whiteboard space 1308 can be used to flexibly designate scale degree numbers, pitch note-names (DoReMi letters), accents, lyrics, etc. to particular linear (or stacked) rhythm pattern(s), pitch pattern(s) or melodic sequences translated from the rhythm pattern MusicCards and then varied as described above. The flip side of the whiteboard may have a magnetic, dry erase surface used for drawings or managing other Music Manipulatives.

There may be three or more ways of employing MLMMS Magnet MusicDots/Magnet MatrixBoard manipulative systems are as follows. A first way involves plotting or altering MusicDot Linear Rhythm Patterns on a Magnet Matrix-Board. For example, Magnetic MatrixBoards featuring a painted 8×10 or 16×16 XY axis coordinate system (squares), sized to insert Magnet MusicDots into the XY axis squares can be used to plot (e.g. to construct, compose) rhythm patterns. Six-colored MusicDots in red, blue, green, yellow, black (e.g. representing various type of beat), white (e.g. representing silence or a rest) enable the user to translate rhythm patterns from all three of the progressively complex Rhythm MusicCard Decks to compose or vary MusicDot patterns.

A second way involves plotting or altering XY Axis Pitch Patterns without rhythm on the Magnetic MatrixBoard. Magnetic MatrixBoards featuring a 8×10 or 16×16 grid can be sized to insert MusicDots into the XY axis coordinate system (squares). Green Magnet MusicDots are used to designate pitch key reference and black dots to create pitch order and contour. In addition, red-coloured MusicDots can be assigned to represent the first pitches of scalar patterns remaining colors to enable the user to extracted pitch patterns from active listening melodies patterns from the card decks or MatrixBooks and/or compose new pitch patterns. Further, a third way involves plotting XY Axis Melodic Patterns (pitch plus rhythm) coordinated on the Magnet MatrixBoard. Expanding the use of the MusicDot/MagnetMatrixBoards system to account for the coordination of both rhythm and pitch requires the availability of extracted linear rhythm matrices under the pitch representations that are intended to be coordinated with rhythm patterns. The verification pitch representations can be integrated with the verification of rhythm placement within the simultaneously conducted meter of the melody.

The complexity of the musically literate say-sing-finger-conducting processing of melodic patterns can advantageously increase according to the order of melodic complexity in the MatrixBook repertoire for voice and instruments. The final stages of expert translation of the Melodic Magnetic MatrixBoard representations prepare users such as preschool age children to sightread the Matrix-Book and MusicCard renditions (below) of the Curriculum MatrixBook Repertoire.

Figure 14A:
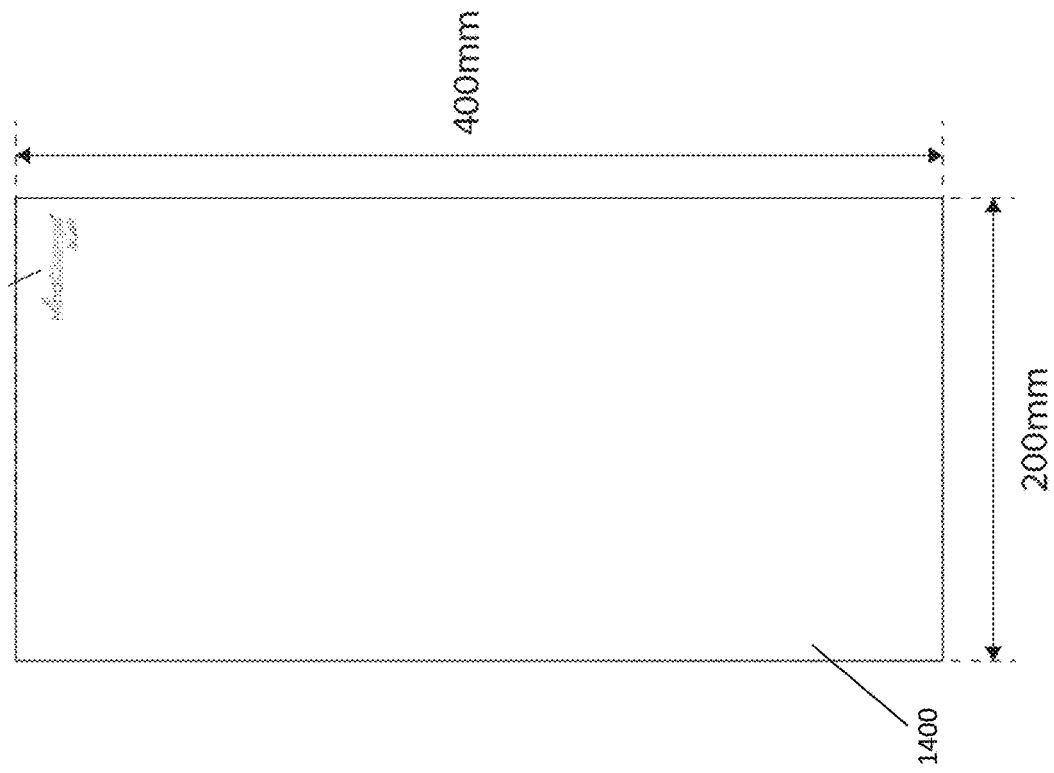
FIGS. 14A-14B illustrate example illustrations of a transitional ConductingScarf in accordance with various embodiments.
Figure 14B:
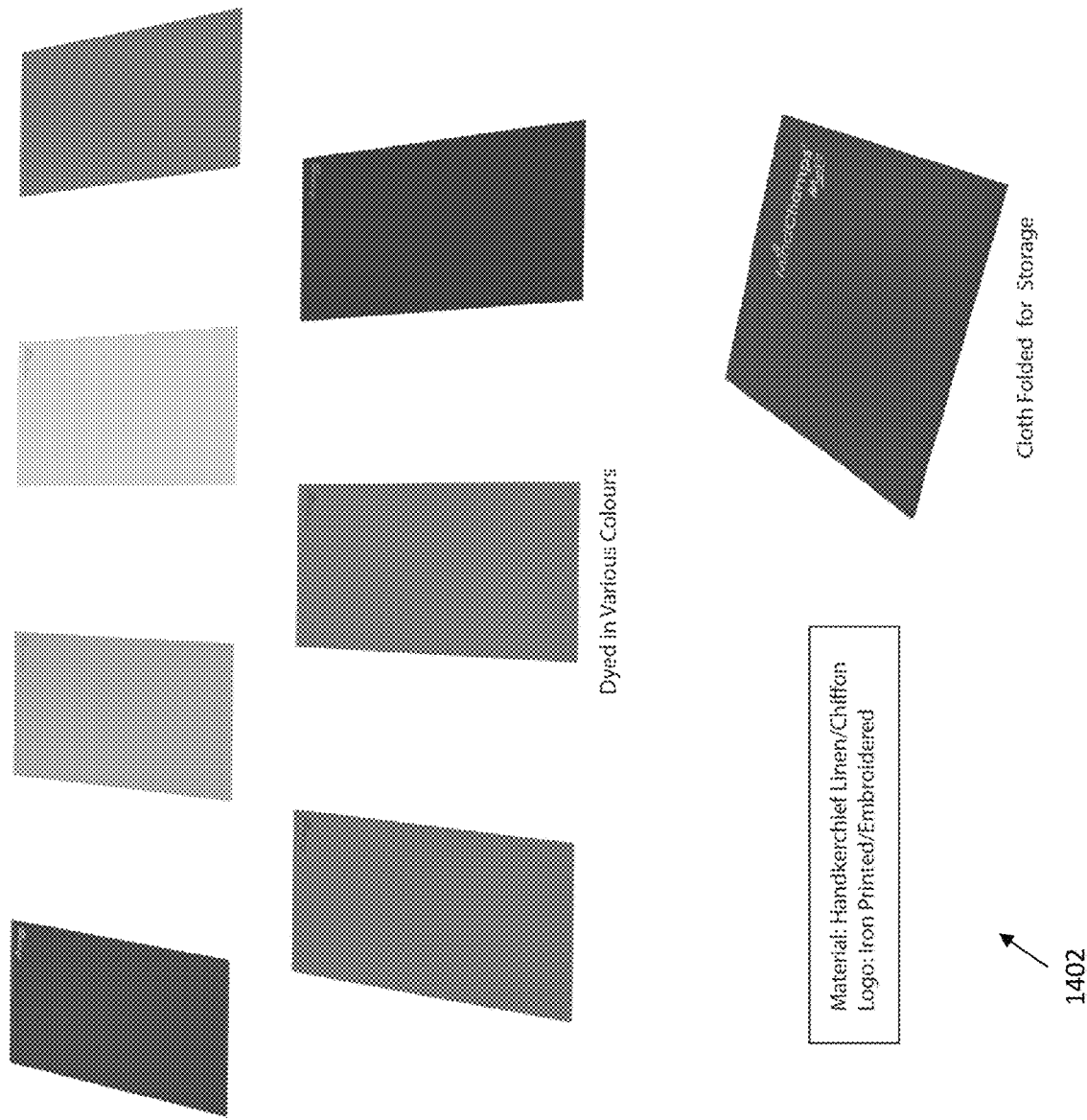

Conducting is an essential music literacy skill because it establishes the metric frame into which all rhythms or melodies belong. More powerful than simply keeping the beat through foot tapping or clapping, conducting patterns organize rhythms into direct associations of the meter of the music, analogous to keeping the pitches in a musical key. The MLMMS-IMMILS conducting lessons may begin by using Beginning Two-Hand practice conducting charts such as chart 300 of FIG. 1C to trace and then independently shape conducting patterns linked to the 1, 2, 3, 4 beats in a measure. An example of a ConductingScarf 1400 with dimensions is shown in FIG. 14A. The ConductingScarf 1400 may be a piece of fabric or handkerchief that may be held by the fingers or tied to a stick for performing the conducting movements. Various renderings of ConductingScarf are depicted in illustration 1402 of FIG. 14B, wherein each ConductingScarf may be dyed in a colour of a plurality of colours to facilitate guidance based on colours, which is useful for instructing a plurality of users.

For example, a user may be guided to follow the following steps toward rhythm-contour musical literacy by:
- A. Starting with beginning "up and down" 1-beat patterns, the user may say-point to trace the shape of a 2-hand conducting pattern in the chart and then replicate the action while walking to the tempo of a tempo castanet, and then conclude with an inside-out "tie the ribbon" gesture to indicate a spoken "STOP"! Over time, the user learns 2, 3, 4 beat patterns while counting aloud the numbers of beats in the meter at a steady, pulse while walking in a circle waiting for a designated conductor or a lesson facilitator to say "STOP"!
- B. Next, the user may use one or more of a transitional ConductingScarf 1400 as shown in FIG. 14A to keep the tempo flowing and in synchrony with say-conducting beat numbers (1,2,3,4), or basic conducting verbal gestures (down, inside, outside, inside) four times and then "STOP" after delineating the meter while walking or marching to the beat and simultaneously listening to melodies selected from the MLMMS-IMMILS Active Listening MatrixBook (repeating at least four times before stopping).
- C. Finally, the user will use one or more of the ConductingScarf 1400, then single fingers, then hands to musically shape the metric conducting patterns. Variations in the kinetic shapes going from beat to beat can be reduced or enlarged to suggest loud and soft dynamic fluctuations in the music. Other expressive gestures that can indicate short-long, light-heavy, accented-smooth, articulation of the notes or phrases can also be added.

The different elements of the MLMMS fit together to allow young children to execute, understand, and internalize the underlying principles of music literacy skill development and how the matrices and manipulatives can guide the course of development from the earliest stage of the MLMMS-IMMILS curriculum. The ingredients of the MLMMS part of the combined system are as follows:

The MLMMS includes multiple flexible, patterned representations of each rhythm, pitch, and melodic musical element identified and fully operationalized by way of future teachers guiding users' engagement through a distinct set of newly invented manipulative systems: the MusicMats, MusicCups, MusicCards, MusicDots/Magnetic MatrixBoards, and the ConductingScarfs.

This generative set of MLMMS tools allow users to cultivate fundamental musical literacies socially, personally, aurally, visually, kinesthetically by way of
active listening & response,
questioning & investigation,
variation & creativity,
performance & interpretation,
self-assessment & reflective understanding, As it progresses over five years, the disciplined, ongoing engagement with the MLMMS tools and methods will advantageously increasingly:
serve to optimize multiple literacy skills in music, language and math simultaneously;
enable users such as young children to vary and physically manipulate musical patterns, resulting in constant variation, cognitive flexibility, and limitless creative possibilities music literacy skill;
enable music teachers and their students to understand comprehensive music literacies as a vehicle for learning musical repertoire from cultures across the world through the development of music literacy skills rather than unstructured general exposure or narrowly focused rote learning; and
bring music and classroom teachers, parents and administrators into direct experience with the multidisciplinary materials organized precisely according to complexity of age-appropriate tasks and integrated by means of fundamental concepts shared between music, language and math concepts and skills and leveraged across the whole preschool curriculum.

MLMMS will provide ongoing methods that can be subject to rigorous accountability methods (e.g. the MLMMS-IMMILS Multiple Music Literacy Skills Performance Assessment System (MMLSPAS)) for tracking levels of musical literacy development that serve objectively tracking and assessing the MLMMS musical literacy skill development progress of, for example, children ages 18 months to 6 years.

In sum, the MLMMS components dynamically engage music literacy skill building processes that enable the continually varying use of powerful manipulatives and framing matrices that ultimately support musical literacy skill-based method of musical instrument instruction, via the application of MLMMS skills into the IMMILS.

The IMMILS, the second part of the MLMMS-IMMILS Combined invention, is a sequential approach to developing musical performance expertise leveraged by the previous acquisition of MLMMS music literacy skills from, for example, ages 18 months to 6 years. Once the MLMMS inventions build the foundation of early childhood music literacy skills in children by first establishing preliminary kinesthetic rhythm and vocal pitch literacy skills, the function and role and function of the IMMILS is to explicitly apply musical literacy skills toward the goal of musical instrument performance skills guided precisely by the synthesis of music literacy concepts and instrumental practice and performance.

Thus, providing developmentally appropriate tools for the cultivation of internalized and myelinated MLMMS rhythm and pitch literacy skills is the key factor in guiding rapid and secure IMMILS instrumental skill development. That is, the IMMILS Silent Practice Charts and aurally internalized Transitional Silent Practice Instruments will help young children to eventually merge their foundational music literacy skills (body/rhythm, vocal/pitch skills) into the challenge of mastering the techniques of conventional musical instruments (hand drums, keyboard, recorder, and violin). The Transitional Silent Practice Instruments are instrument models that are configured to resemble actual musical instruments, and the IMMILS Silent Practice Charts (such as illustrations and charts 400 to 800 as shown in FIGS. 4 to 8 respectively) comprise guidance via illustrations and instructions for hand placement and movement on the associated instrument models that mimic playing of the resembled musical instrument.

Figure 15A:
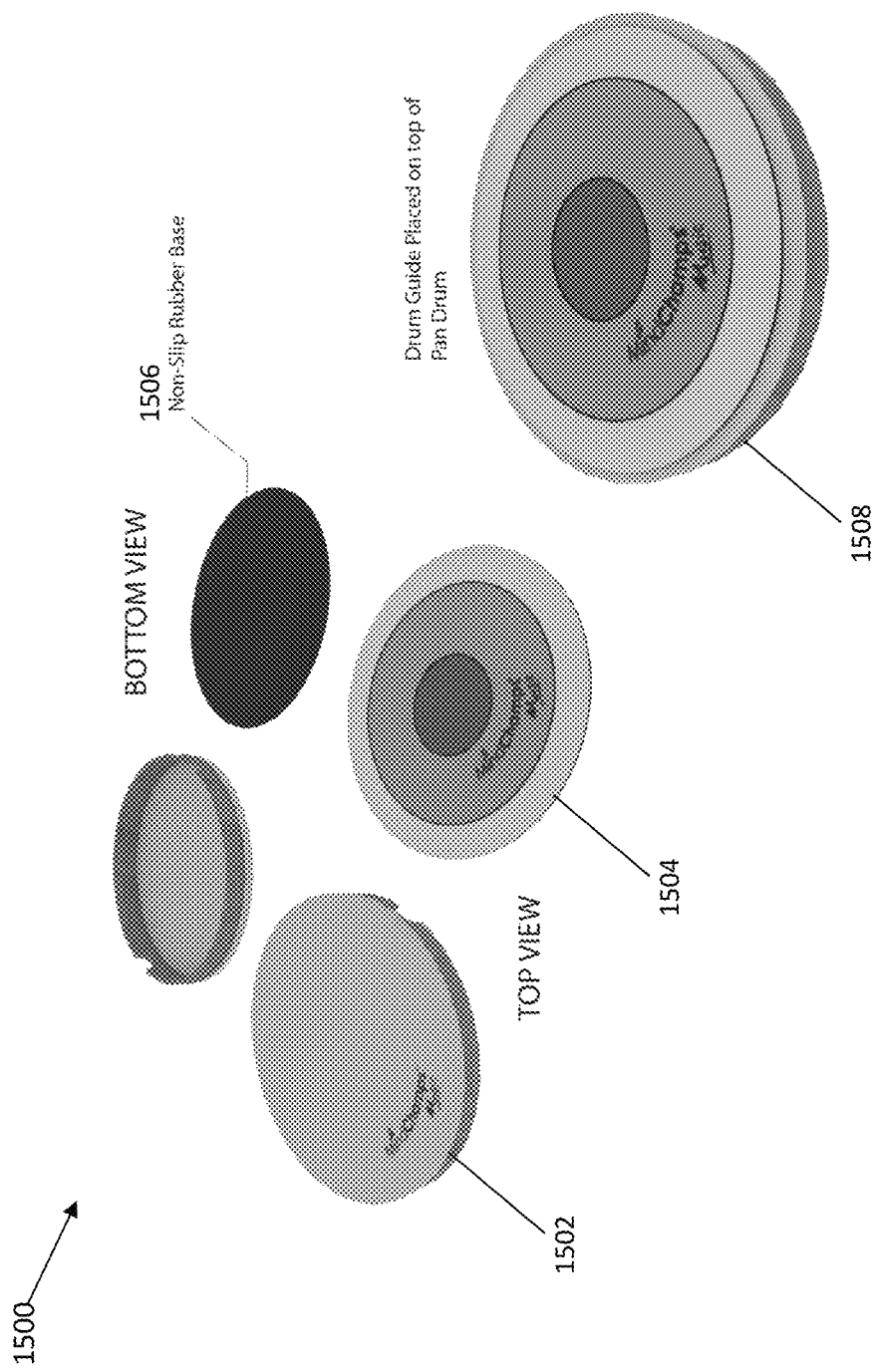
FIGS. 15A-15C show illustrations of an instrument model resembling a drum in accordance with various embodiments.

FIG. 15A shows an illustration of an instrument model 1500 resembling a drum. The instrument model 1500 may comprise a drum cover 1502 and a drum guide 1504. The drum guide 1504 may be a piece of fabric, paper, plastic or other similar material that is configured to be placed over the drum cover 1502, wherein the drum guide 1504 may comprise two or more colours indicating parts of the drum cover 1502 that should be struck to mimic playing a drum. The underside of the drum guide 1504 may comprise a non-slip rubber base 1506 to prevent the drum guide 1504 from falling off the drum cover 1502. The drum cover 1502 and drum guide 1504 combination as shown by setup 1508 may be set on the floor for mimicking, for example, playing a pan-drum. The drum cover 1502 may be configured to be fittingly placed over a top of a drum such as a tubano to prevent sound from being emitted by the tubano when the drum cover 1502 is struck, so that the instrument model 1500 can advantageously be used for silent practice by placing the setup 1508 on a tubano. In an embodiment, the instrument model 1500 may further comprise a cylindrical part (not shown) resembling a tubano (djembe), wherein the drum cover 1502 may be fittingly placed over a top of the cylindrical part for silent practice.

Figure 15B:
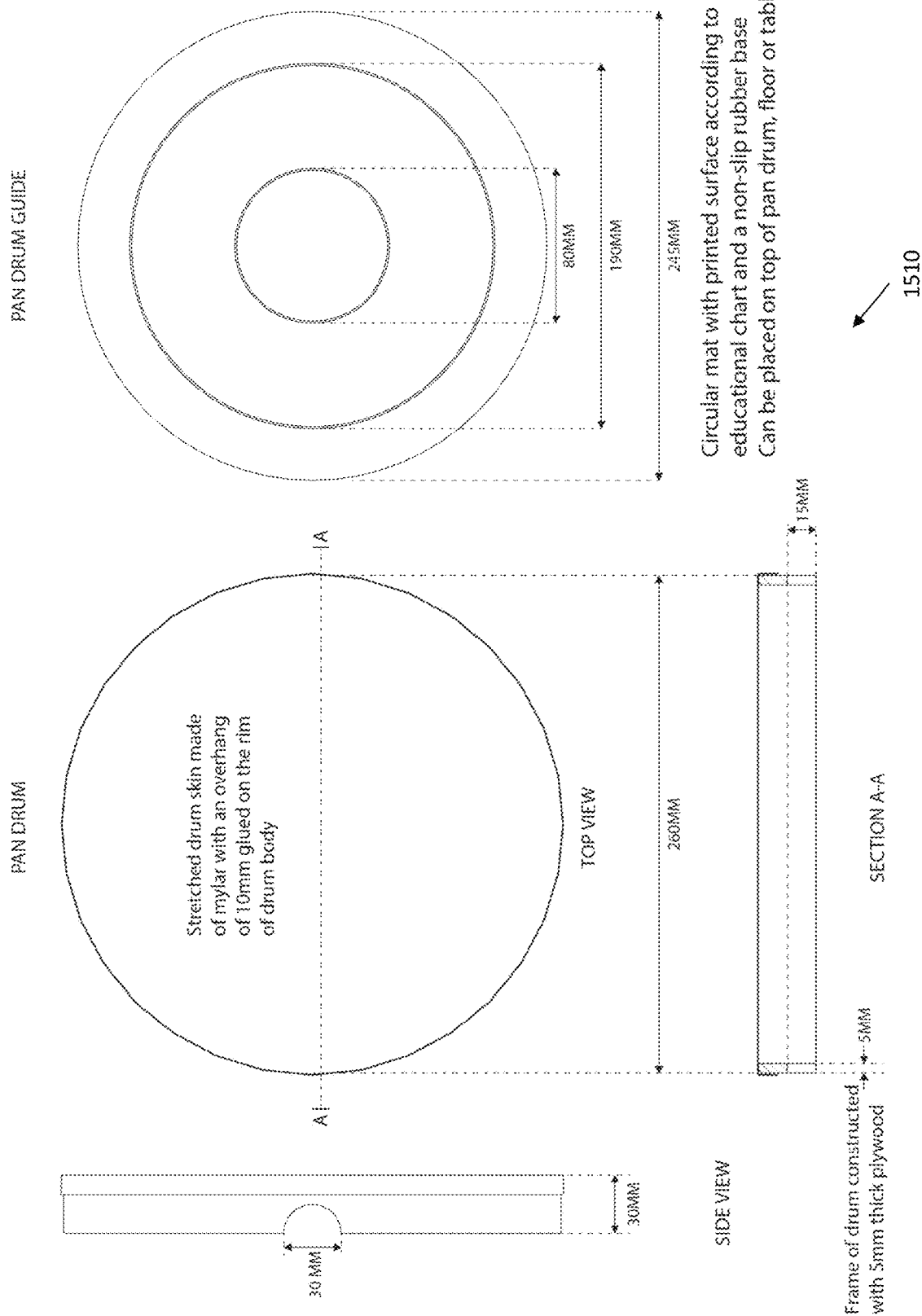
Figure 15C:
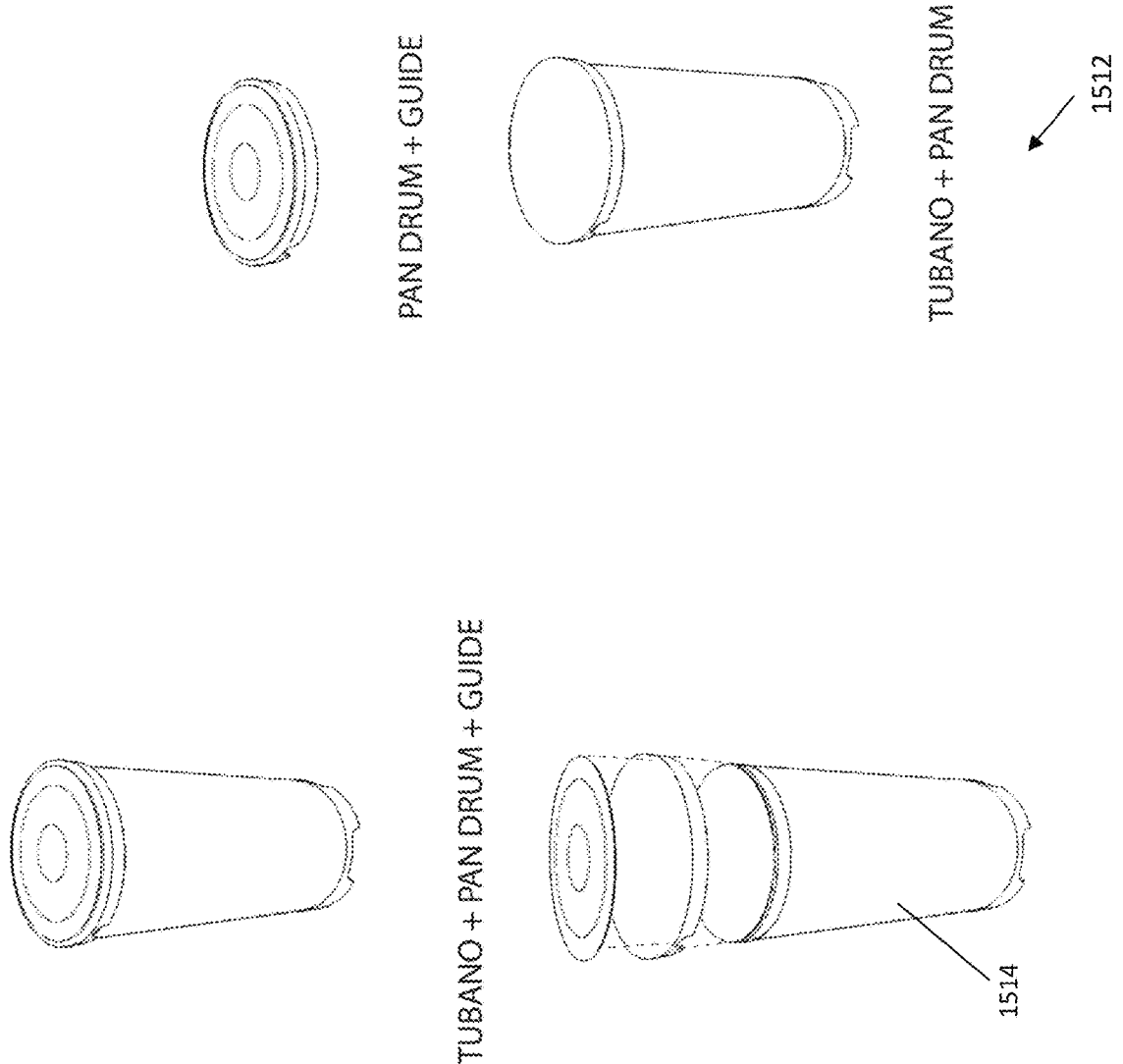

Further, illustration 1510 of FIG. 15B shows example measurements, dimensions and materials that make up the instrument model 1500, and illustration 1512 of FIG. 15C shows various renderings of the instrument model 1500 with and without a Tubano (djembe) 1514. In the MLMMS-IMMILS curriculum, the instrument model 1500 may be used together with illustrations 400 and 408 of FIG. 4 for learning how to play a drum, and may also be used with other similar charts for learning how to play a drum with increasing detail, difficulty and complexity.

FIG. 16A shows an illustration of an instrument model 1600 resembling a percussion instrument such as a xylophone. The instrument model 1600 may comprise a main body 1602. The main body 1602 may comprise a plurality of indentations 1604 that correspond to positions of tone-bars in a percussion instrument such as a xylophone. A plurality of tone-bars 1606 may be configured to be placed in the plurality of indentations 1604, wherein the plurality of tone-bars 1606 can be easily removed from the main body 1602 when required. The main body 1602 may further comprise a compartment 1608 for holding a pair of mallets 1610, wherein the mallets 1610 may be configured for striking on the plurality of tone-bars 1606 for producing music, or over the plurality of indentations 1604 to mimic playing on a percussion instrument such as a xylophone.

Figure 16B:
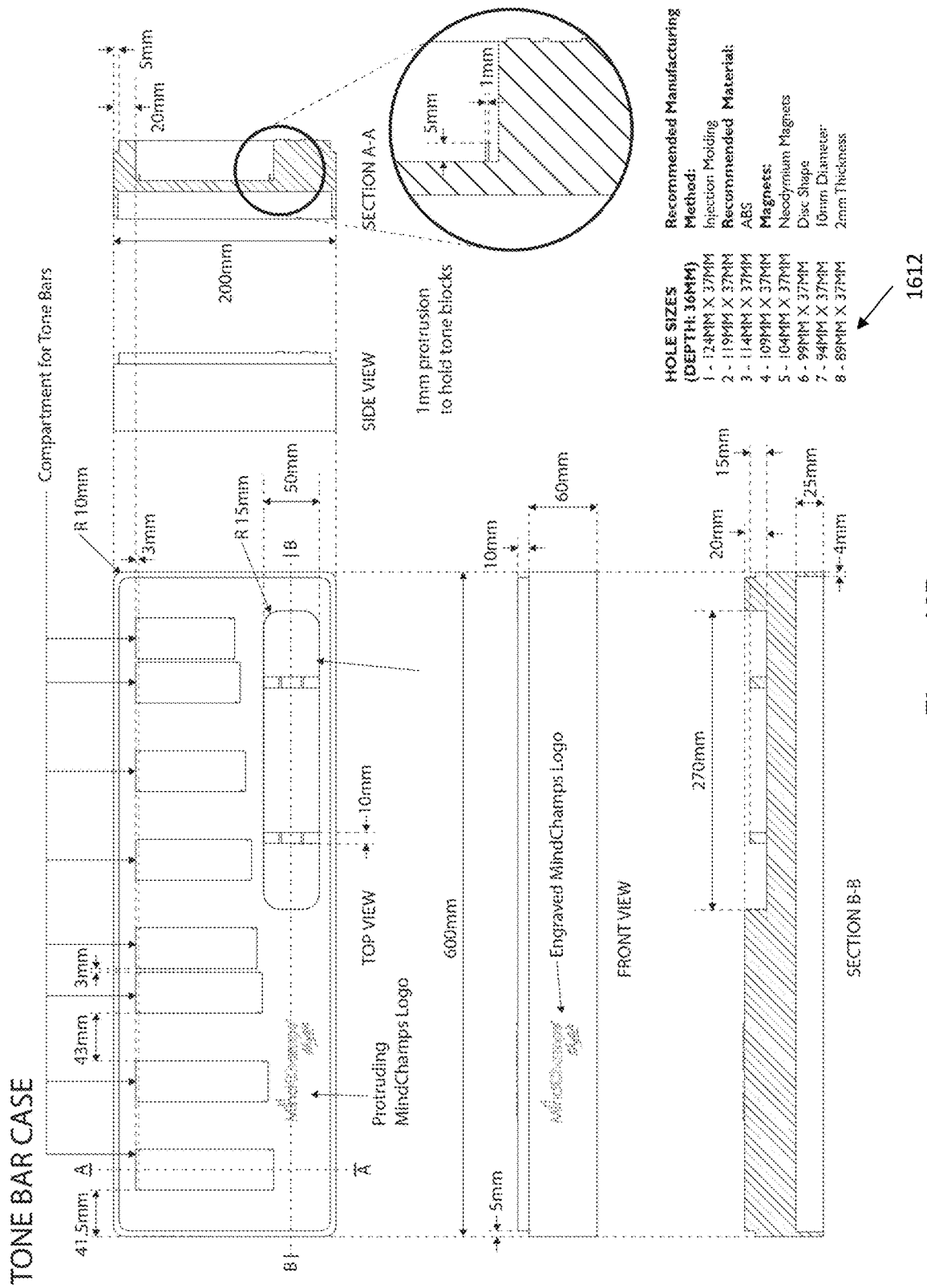
Figure 16C:
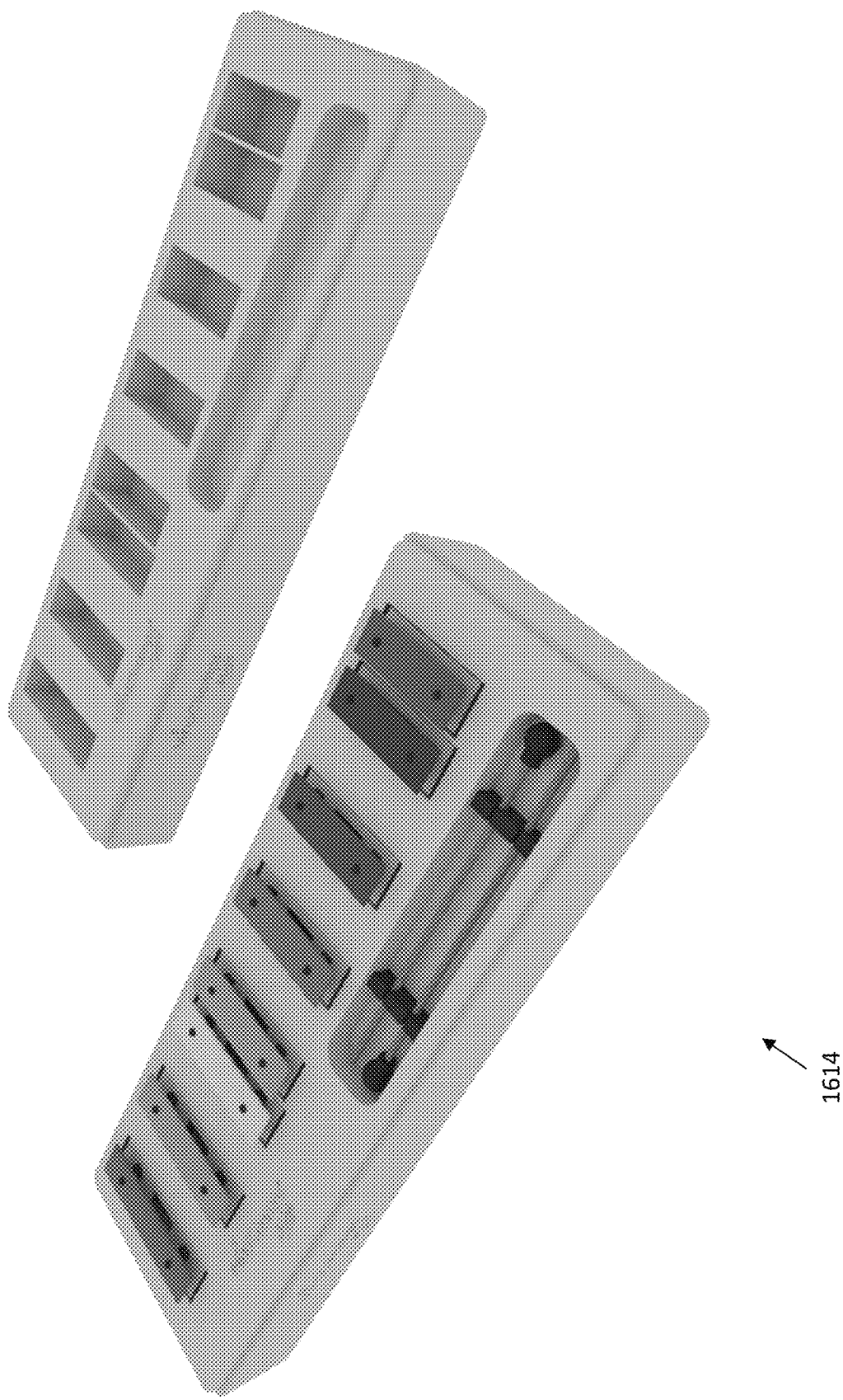

Further, illustration 1612 of FIG. 16B shows example measurements, dimensions and materials that make up the instrument model 1600, and illustration 1614 of FIG. 16C shows various renderings of the instrument model 1600. In the MLMMS-IMMILS curriculum, the instrument model 1600 may be used together with illustrations 500, 508 and 510 of FIGS. 5A-5C for learning how to play a percussion instrument such as a xylophone, and may also be used with other similar charts of increasing detail, difficulty and complexity.

Figure 17A:
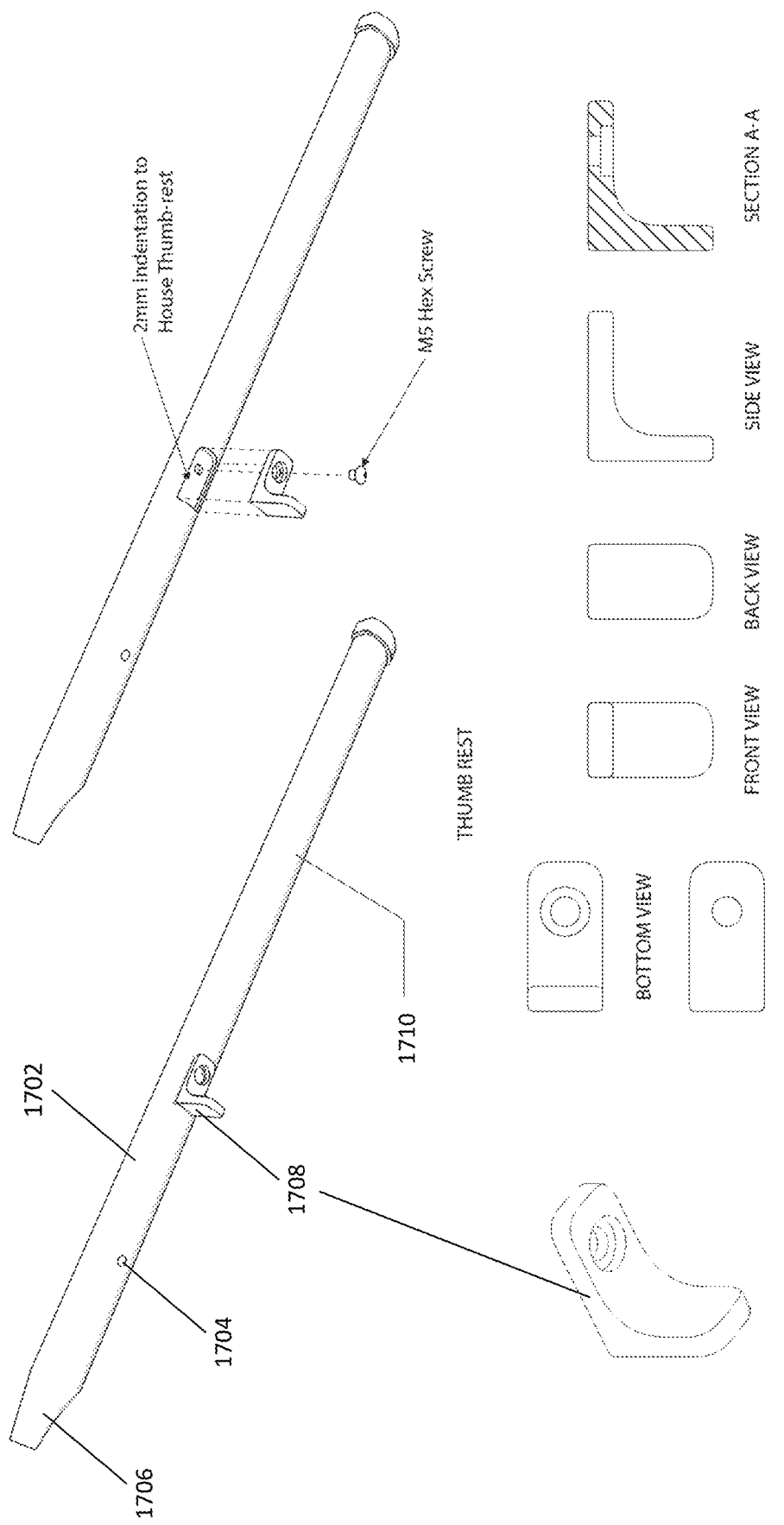
FIGS. 17A-17E show illustrations of an instrument model resembling a recorder in accordance with various embodiments.
Figure 17B:
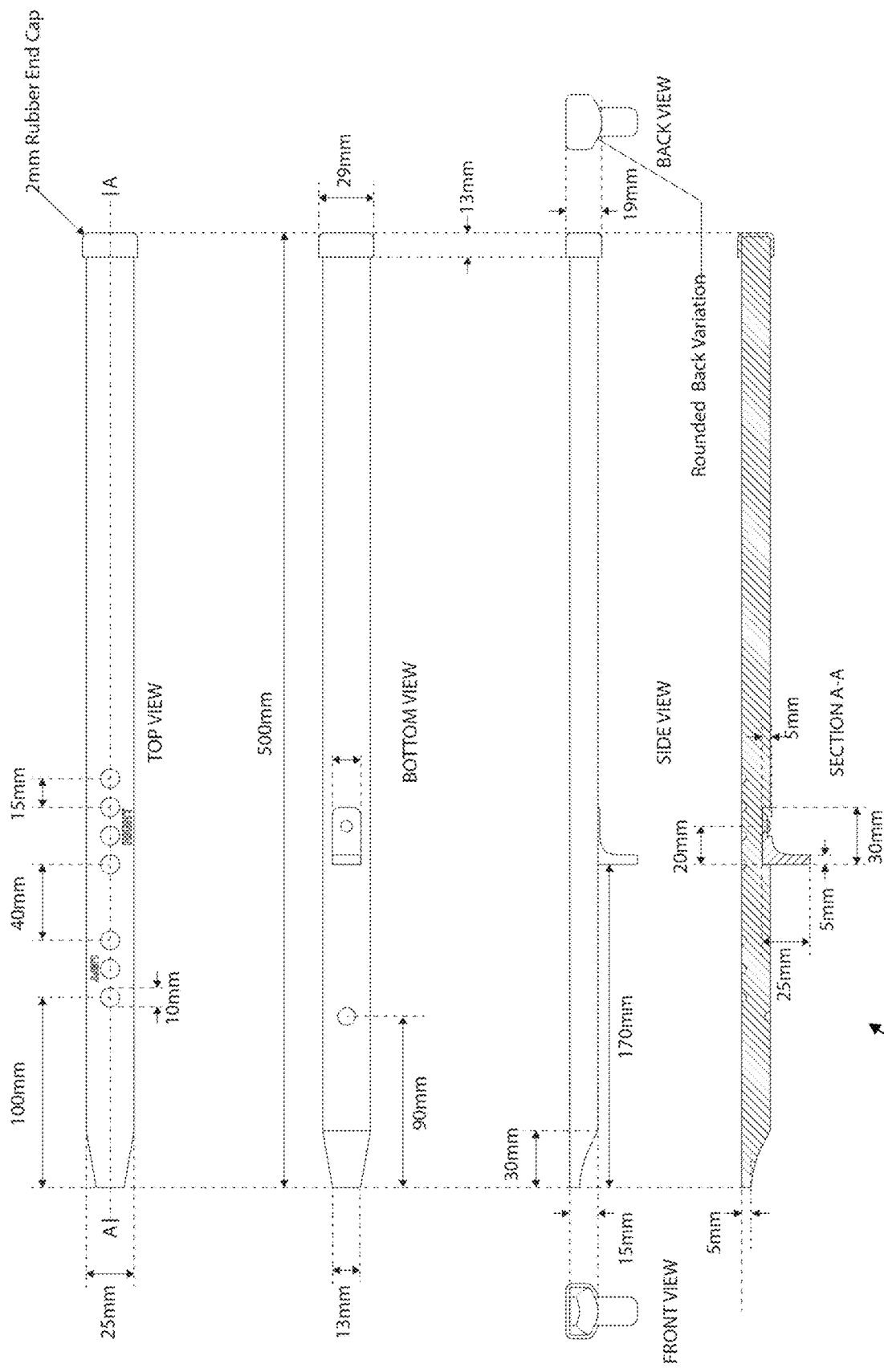

FIGS. 17A-17E show illustrations of an instrument model 1700 resembling a recorder according to various embodiments. Referring to FIG. 17A, the instrument model 1700 may comprise a main body 1702. The main body 1702 may be a straight body, such that the topside of the main body 1702 is flat while the underside 1710 of the main body 1702 is rounded. The main body 1702 may further comprise a plurality of indentations 1704 along the main body 1702 that correspond to position of holes in a recorder, the indentations 1704 configured to guide finger placement to mimic playing a recorder. The main body 1702 may further comprise a tapered end 1706 on one end of the main body 1702 that resembles a recorder mouthpiece, and may further comprise a ledge 1708 for resting a thumb of a user of the instrument model 1700. The instrument model 1700 may also comprise a supporting rod (not shown) for support the recorder on the floor, for example to assist a user of small build such a small child to hold the instrument model 1700 more easily. Further, illustration 1710 of FIG. 17B shows example measurements and dimensions of the instrument model 1700 wherein the underside 1710 is rounded.

Figure 17C:
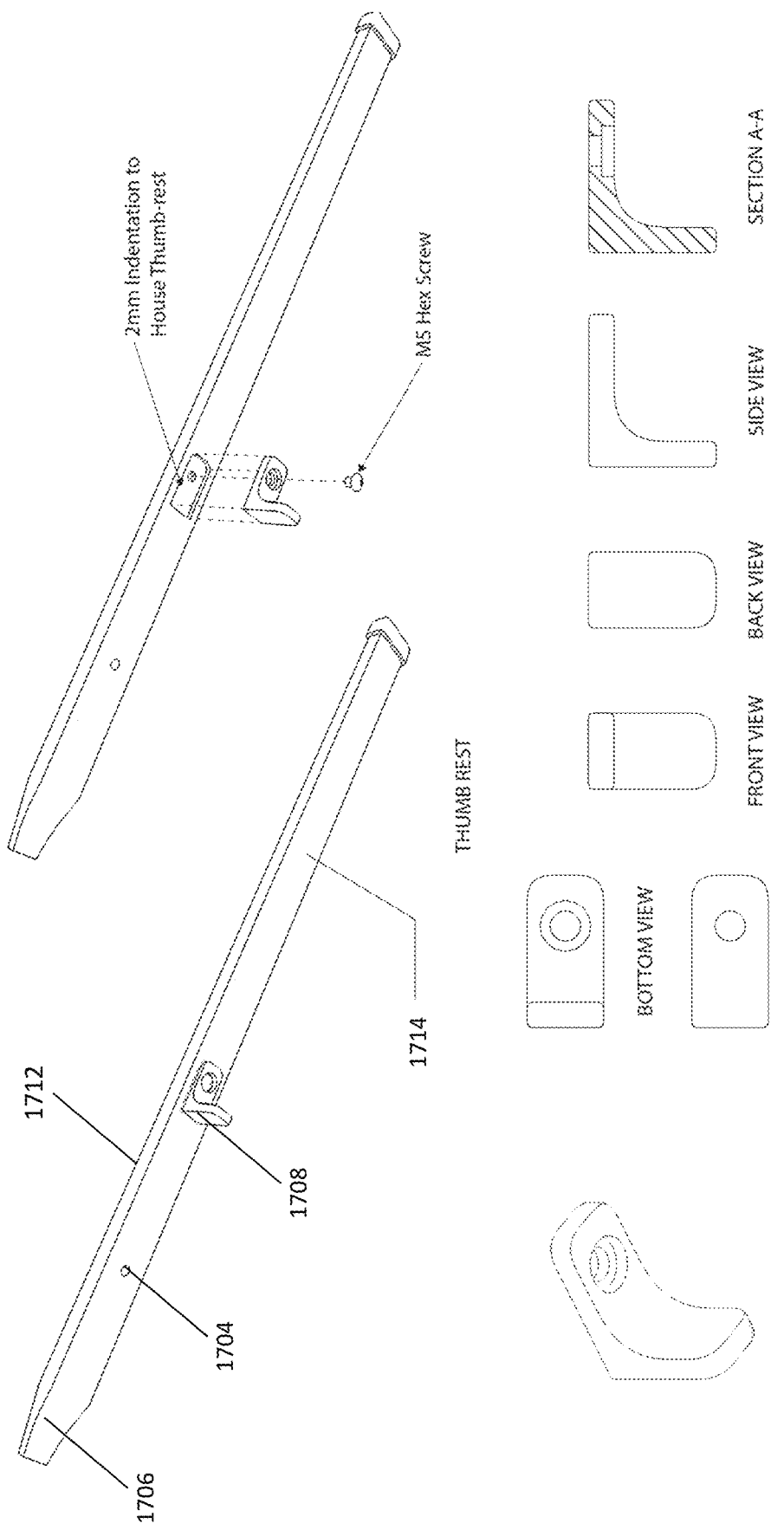
Figure 17D:
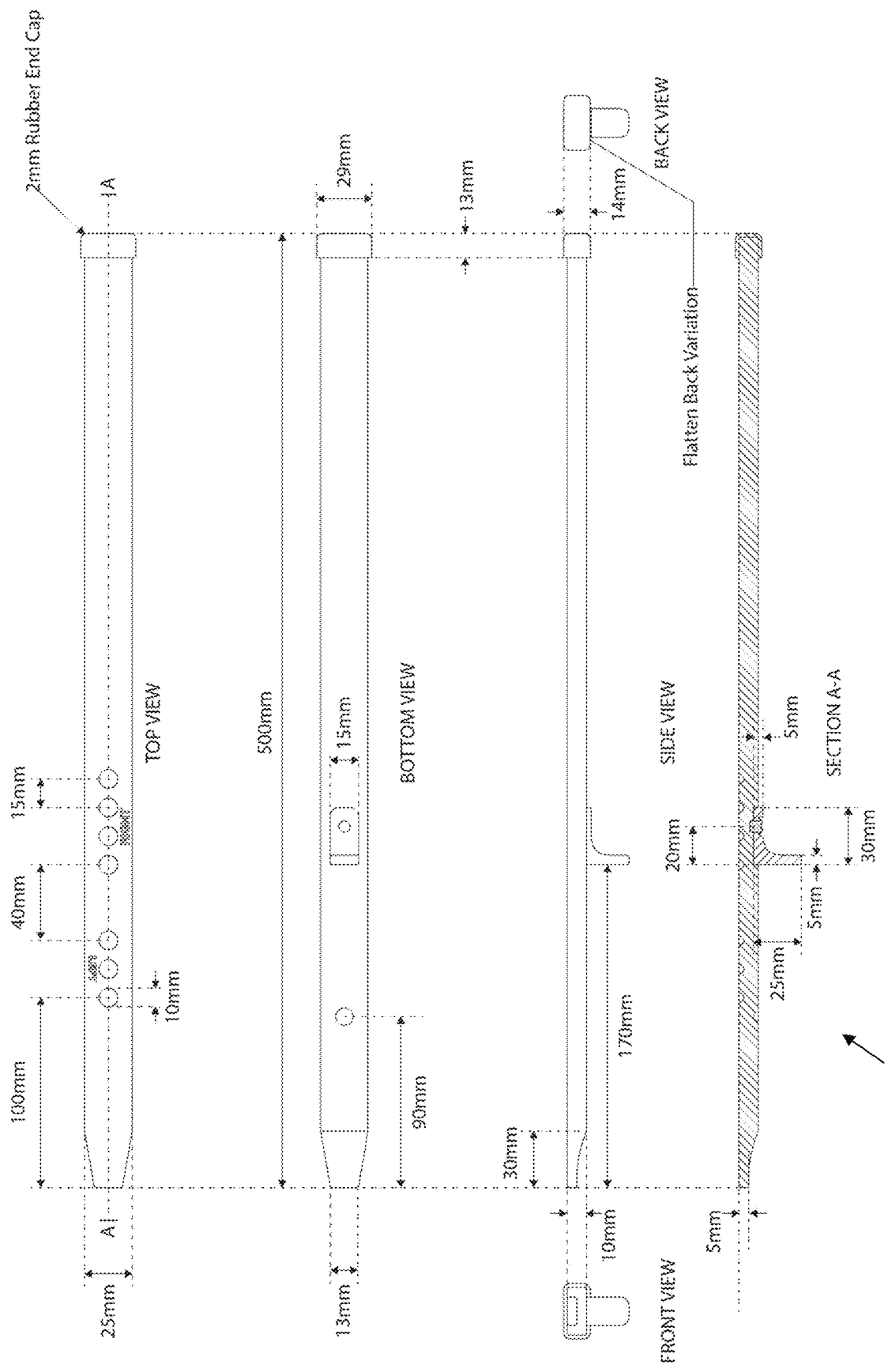
Figure 17E:
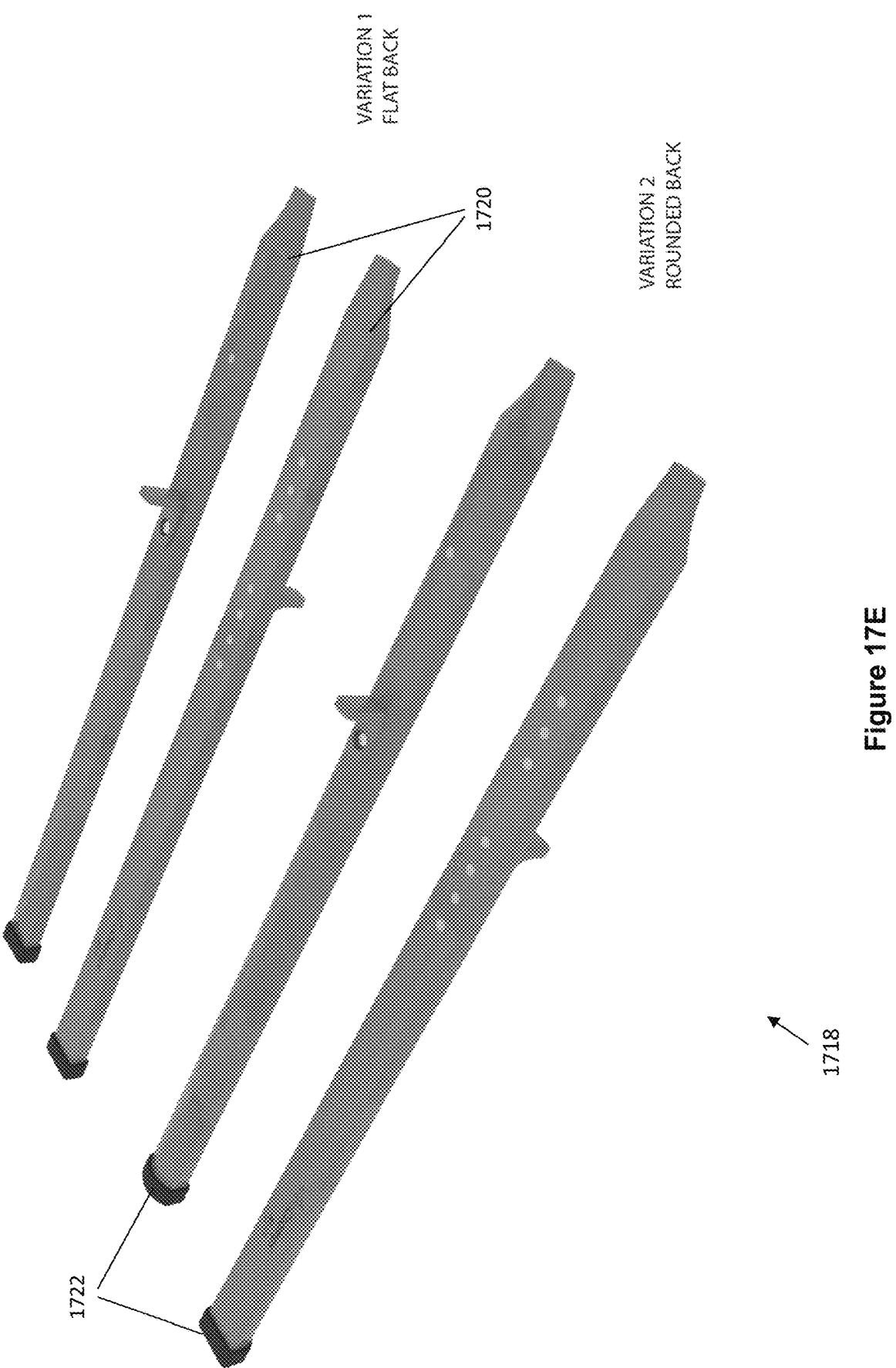

In a variation of the instrument model 1700, the main body may be constructed such that the topside and underside are flat, as shown in main body 1712 of FIG. 17C wherein the underside 1714 is flat. illustration 1716 of FIG. 17D shows example measurements and dimensions of the instrument model 1700 wherein the underside 1714 is flat. Further, illustration 1718 of FIG. 17E shows various renderings of the instrument model 1700 with either a flat underside (e.g. as shown in rendering 1720) or a rounded underside (e.g. as shown in rendering 1722). In the MLMMS-IMMILS curriculum, the instrument model 1700 may be used together with illustrations 700, 712, 714 and 716 of FIGS. 7A-7D for learning how to play a recorder, and may also be used with other similar charts of increasing detail, difficulty and complexity.

Figure 18A:
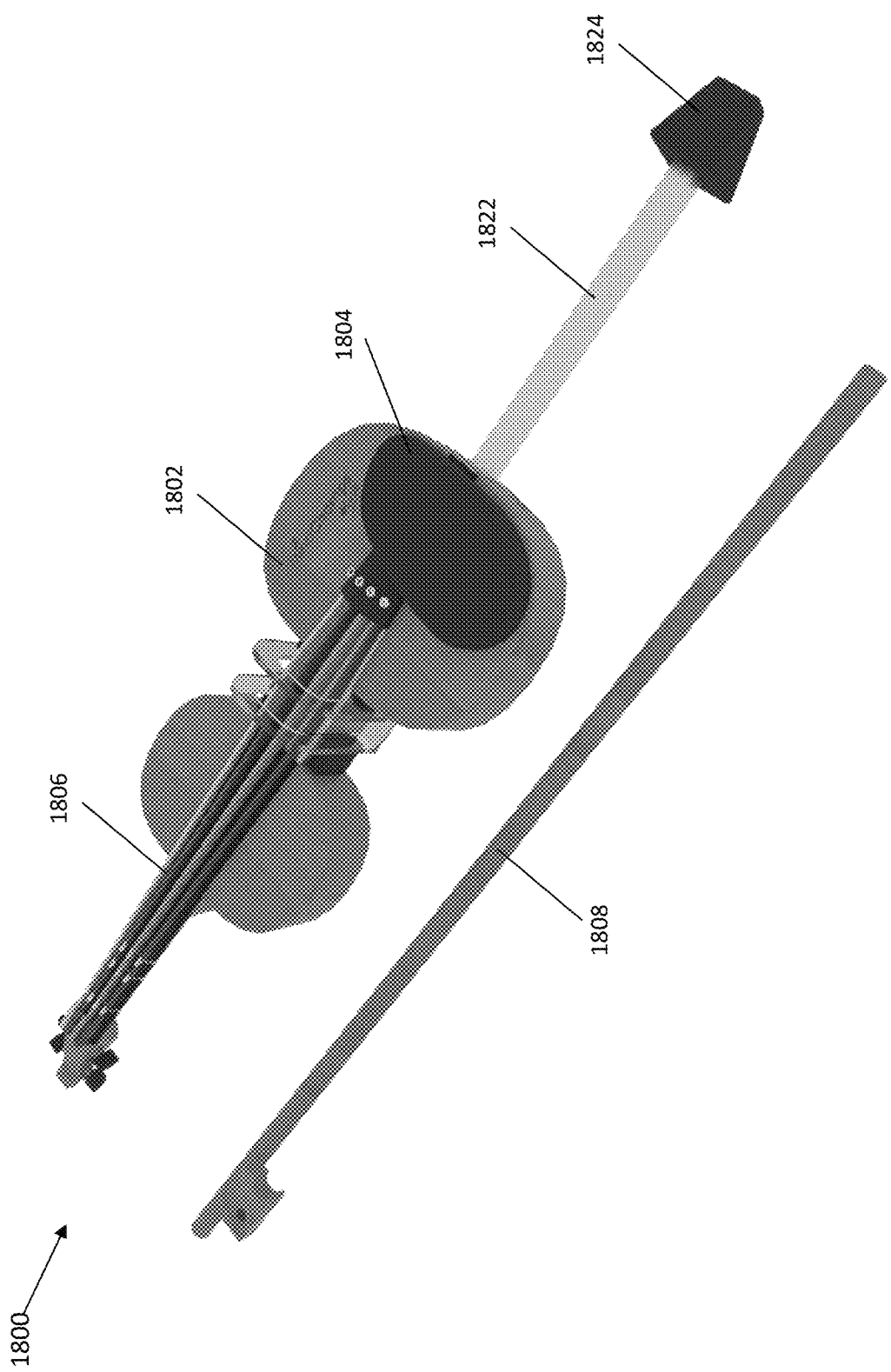
FIGS. 18A-18N show illustrations of an instrument model resembling a violin in accordance with various embodiments.
Figure 18B:
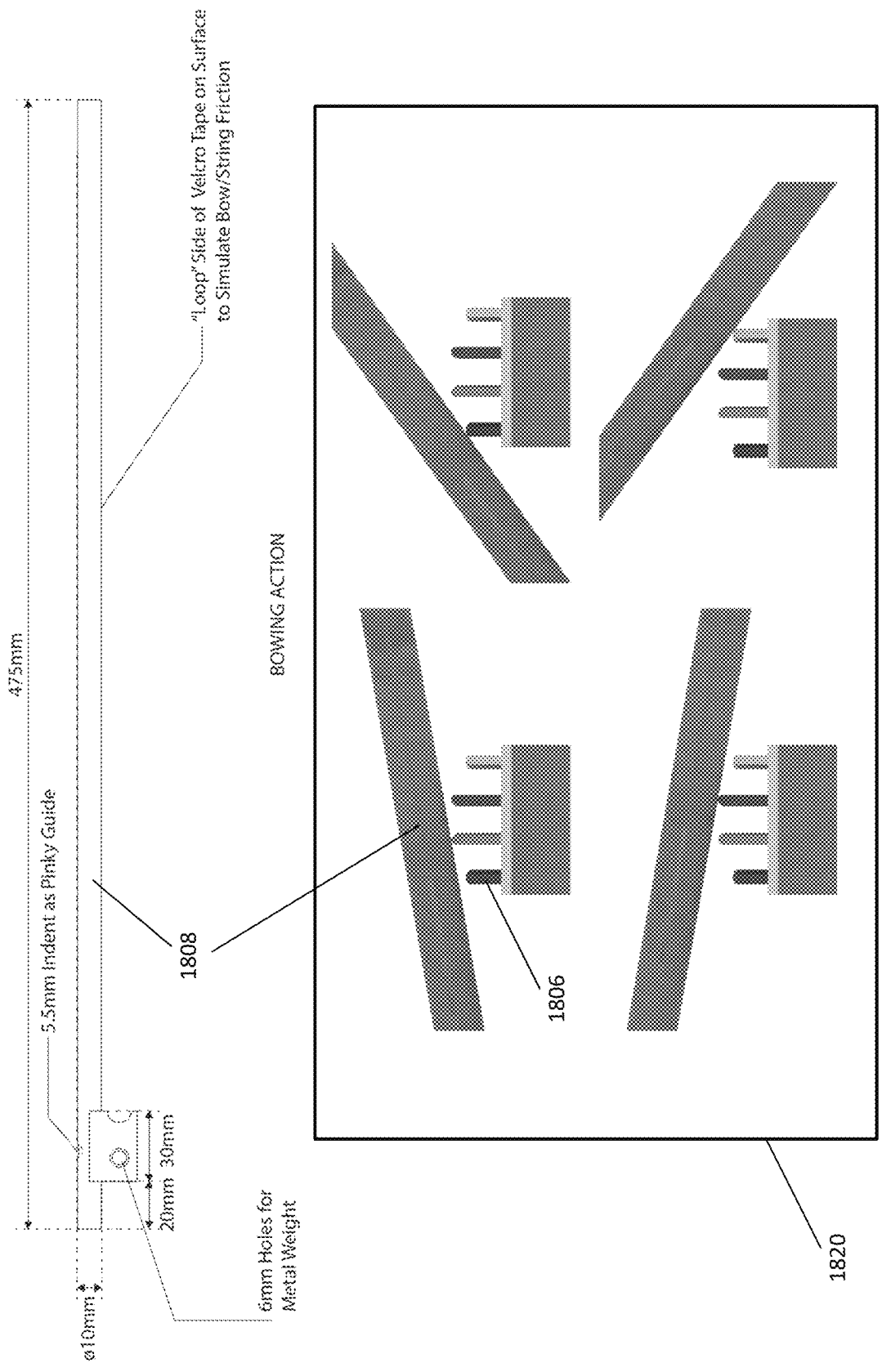
Figure 18C:
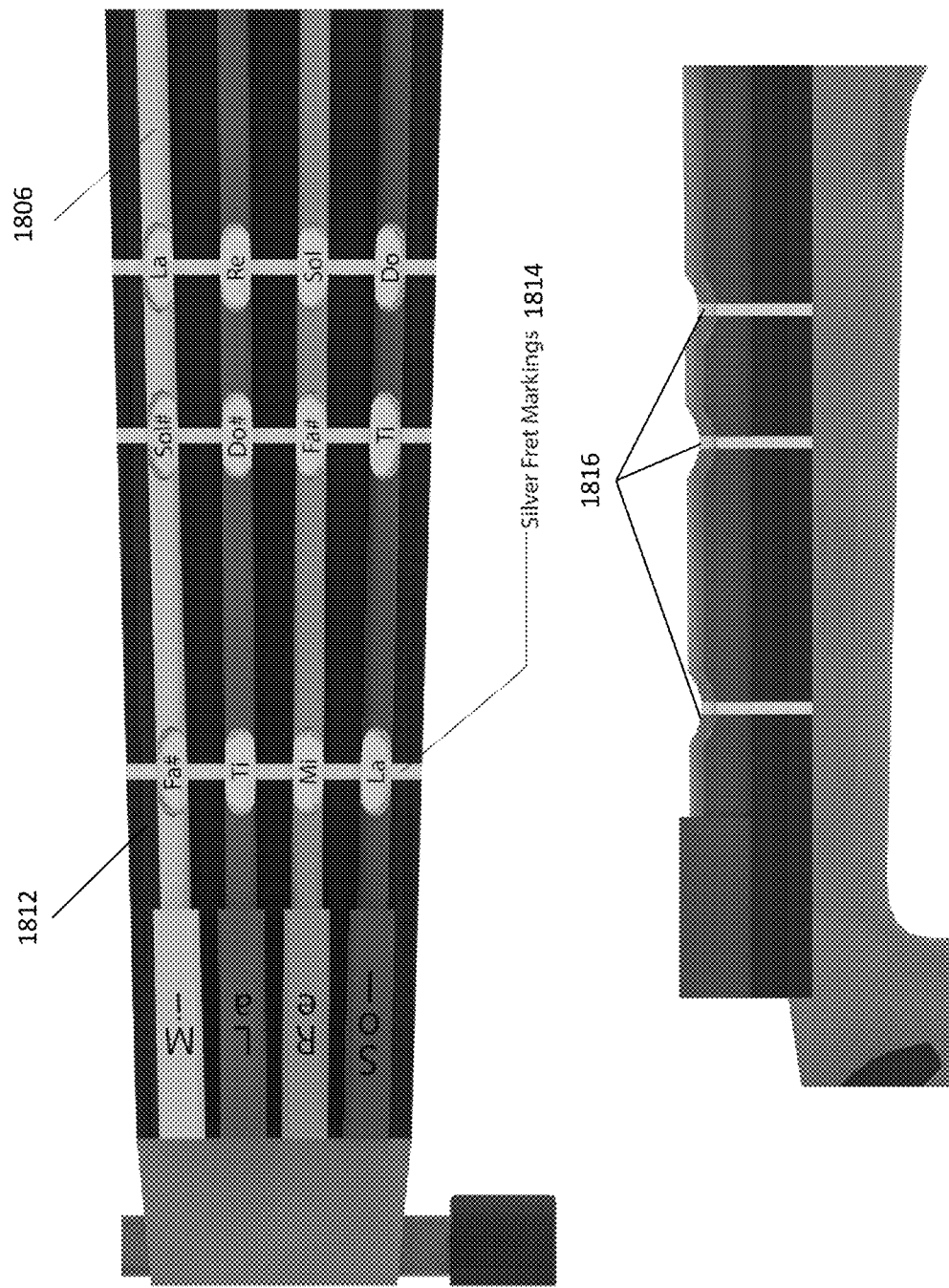
Figure 18D:
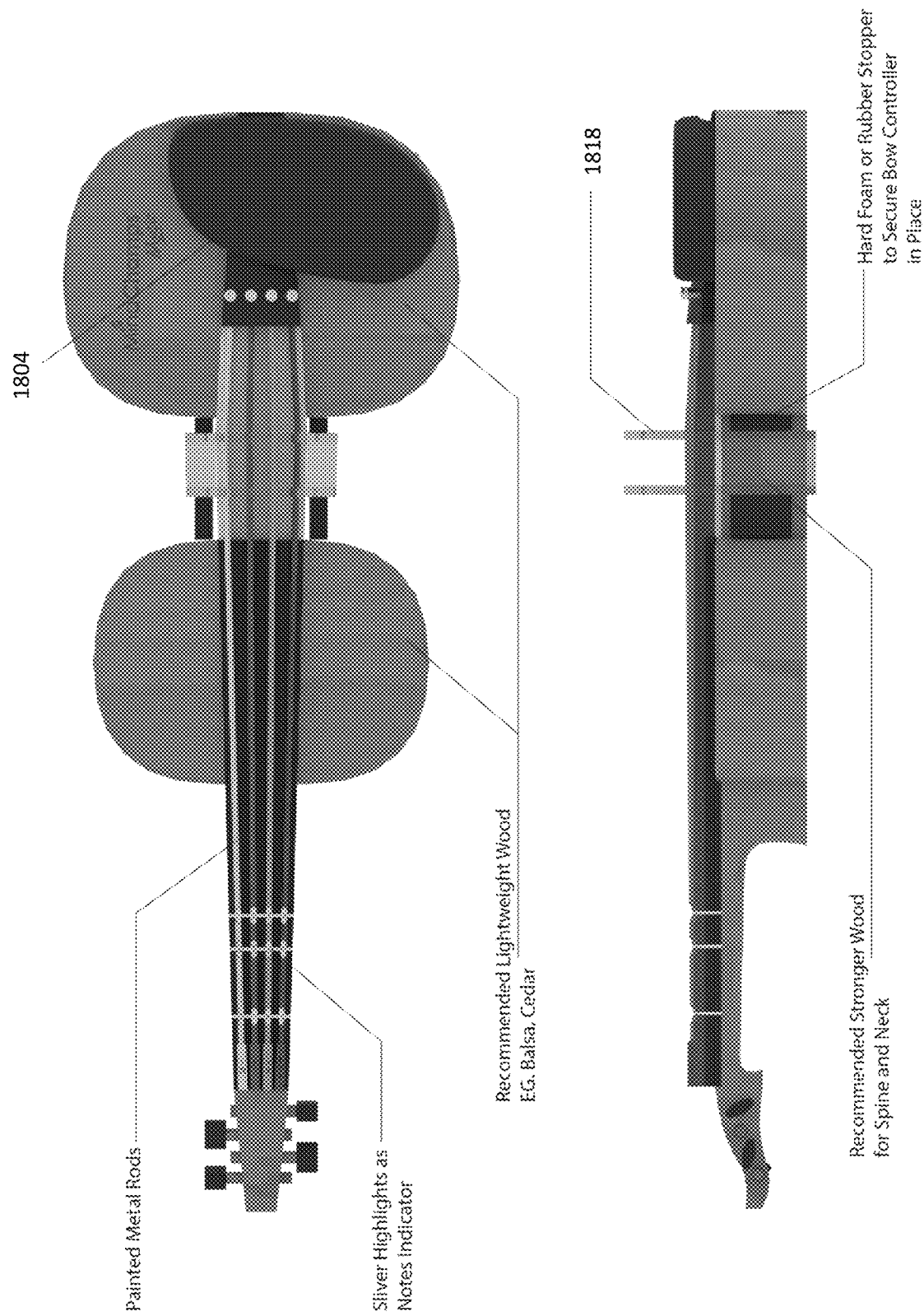
Figure 18E:
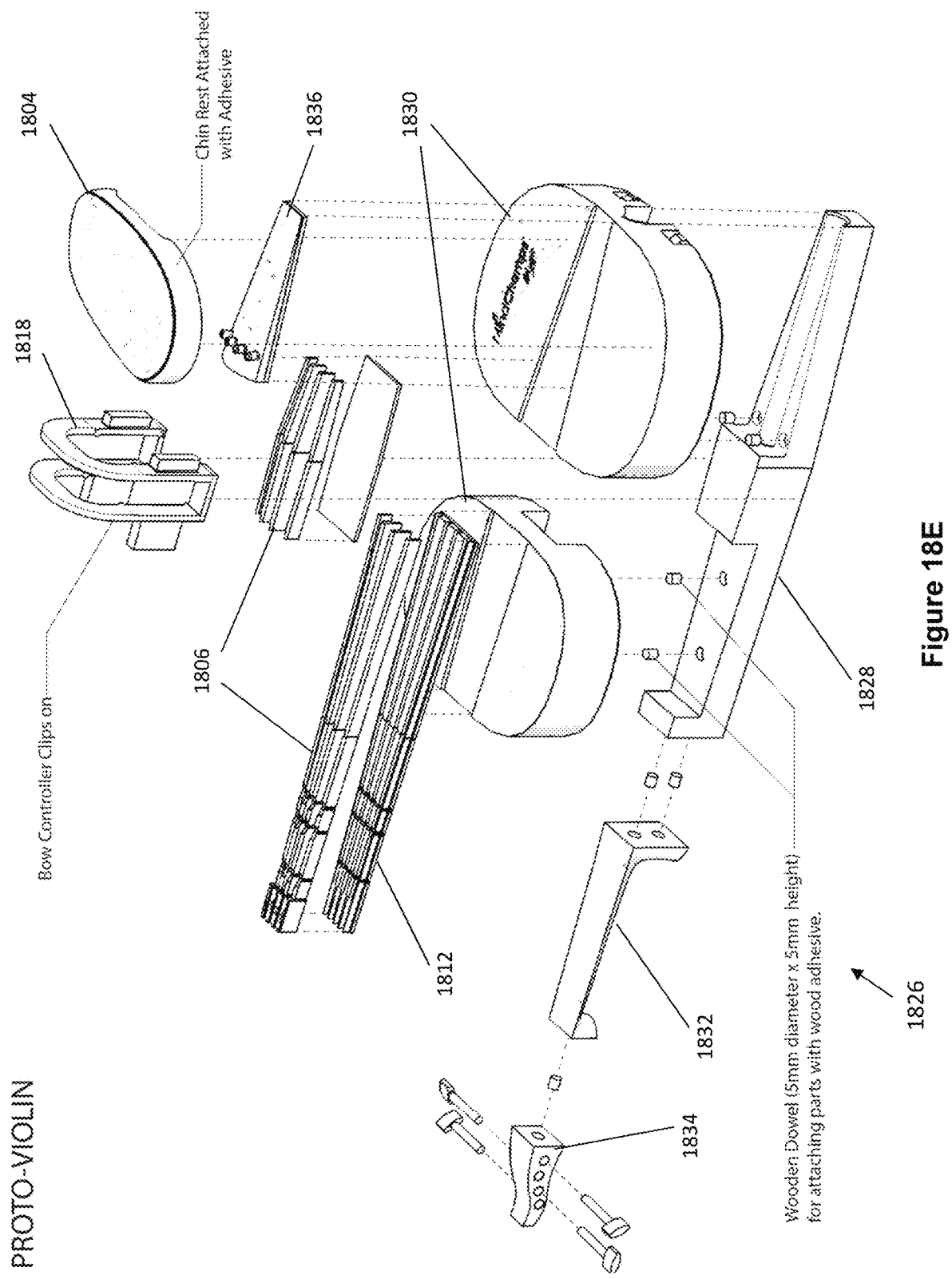
Figure 18F:
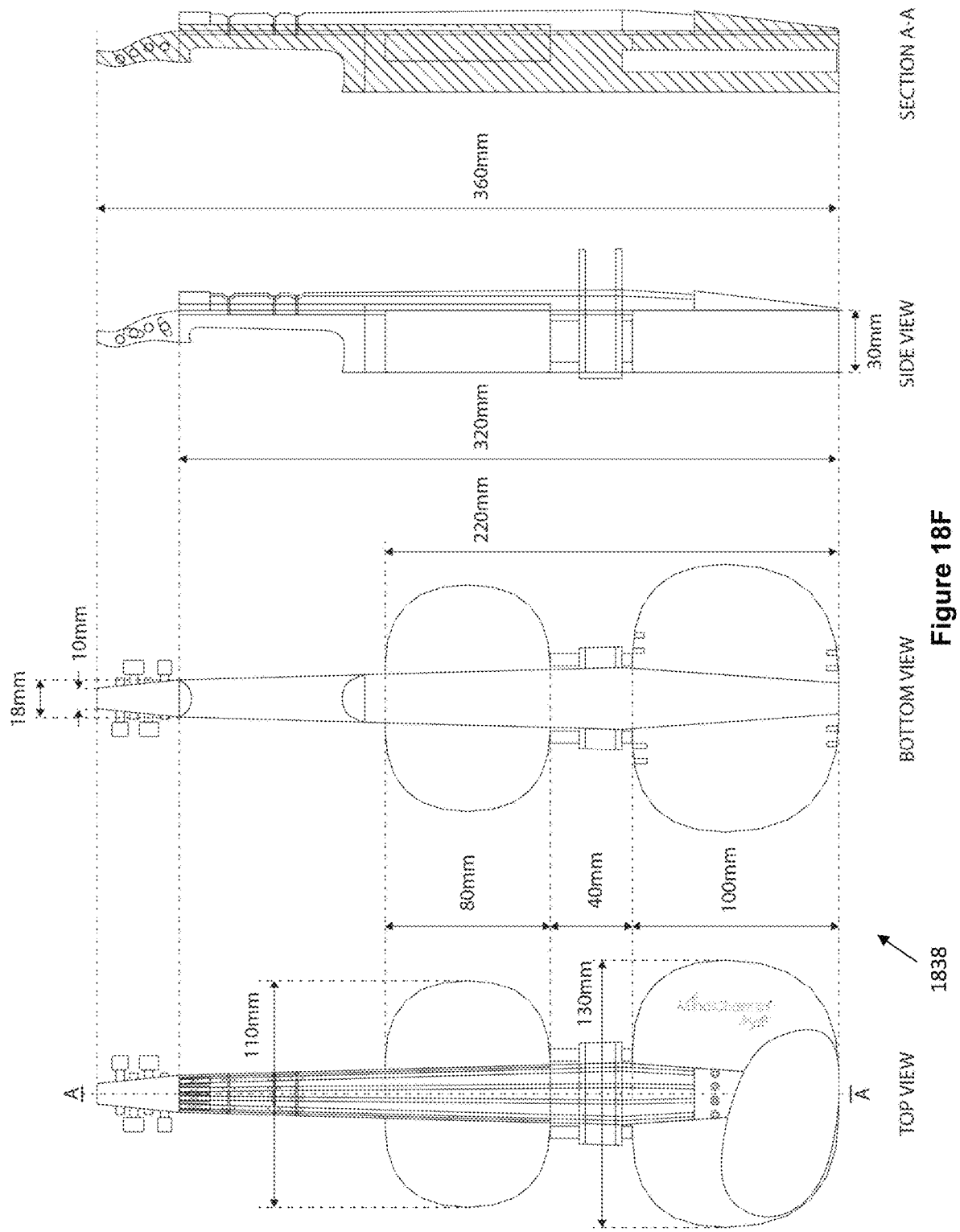
Figure 18G:
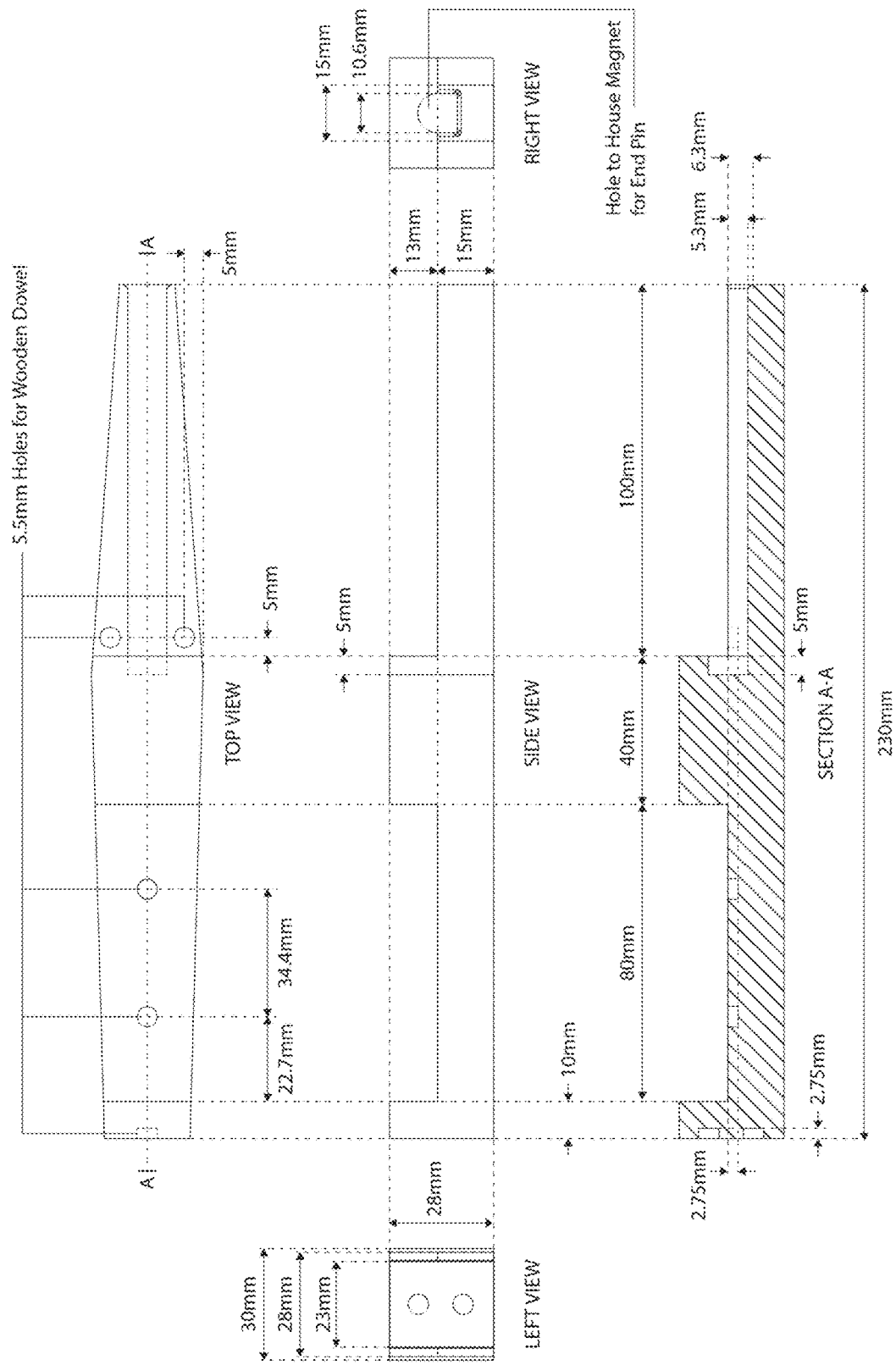
Figure 18H:
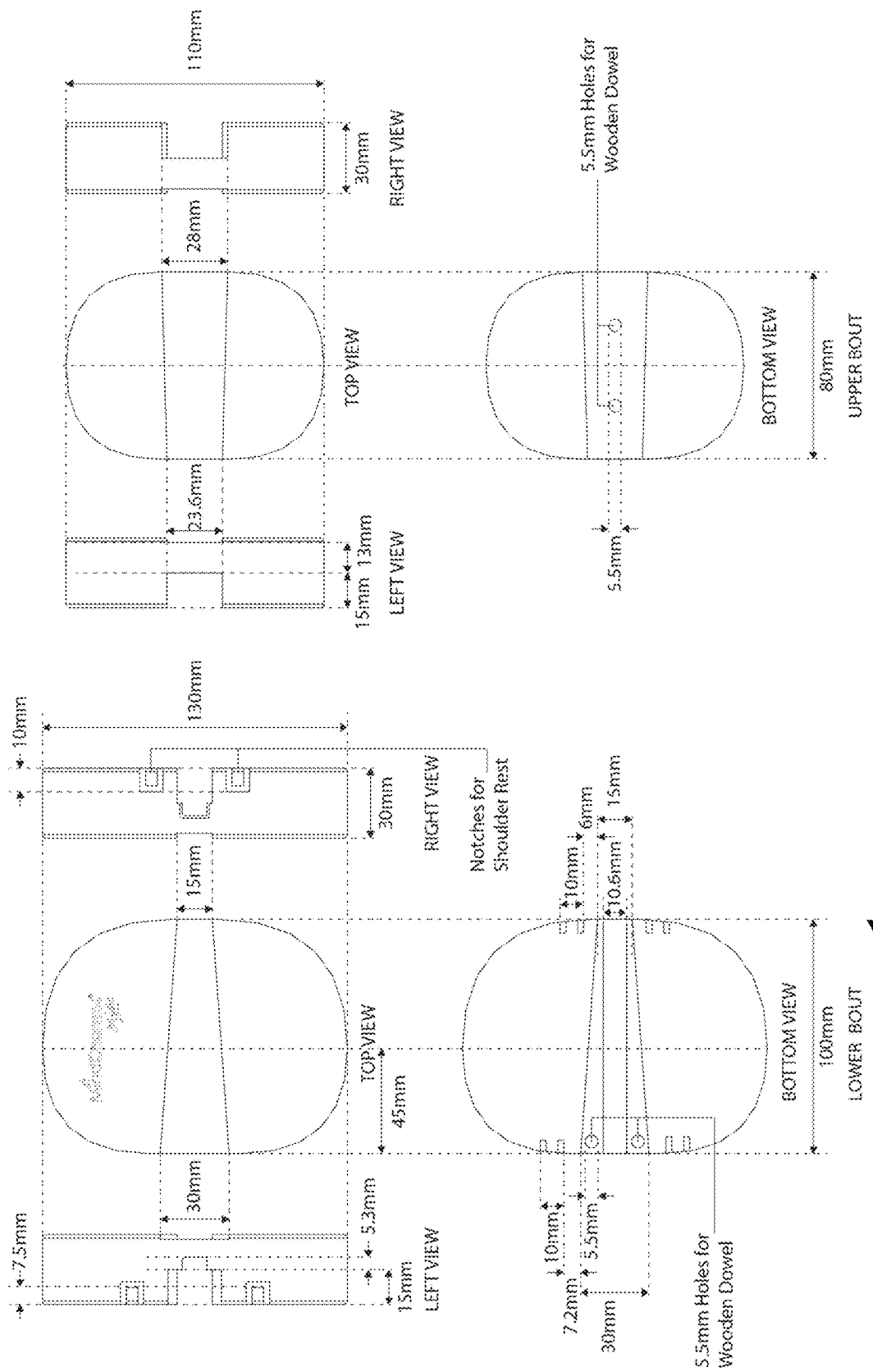
Figure 18I:
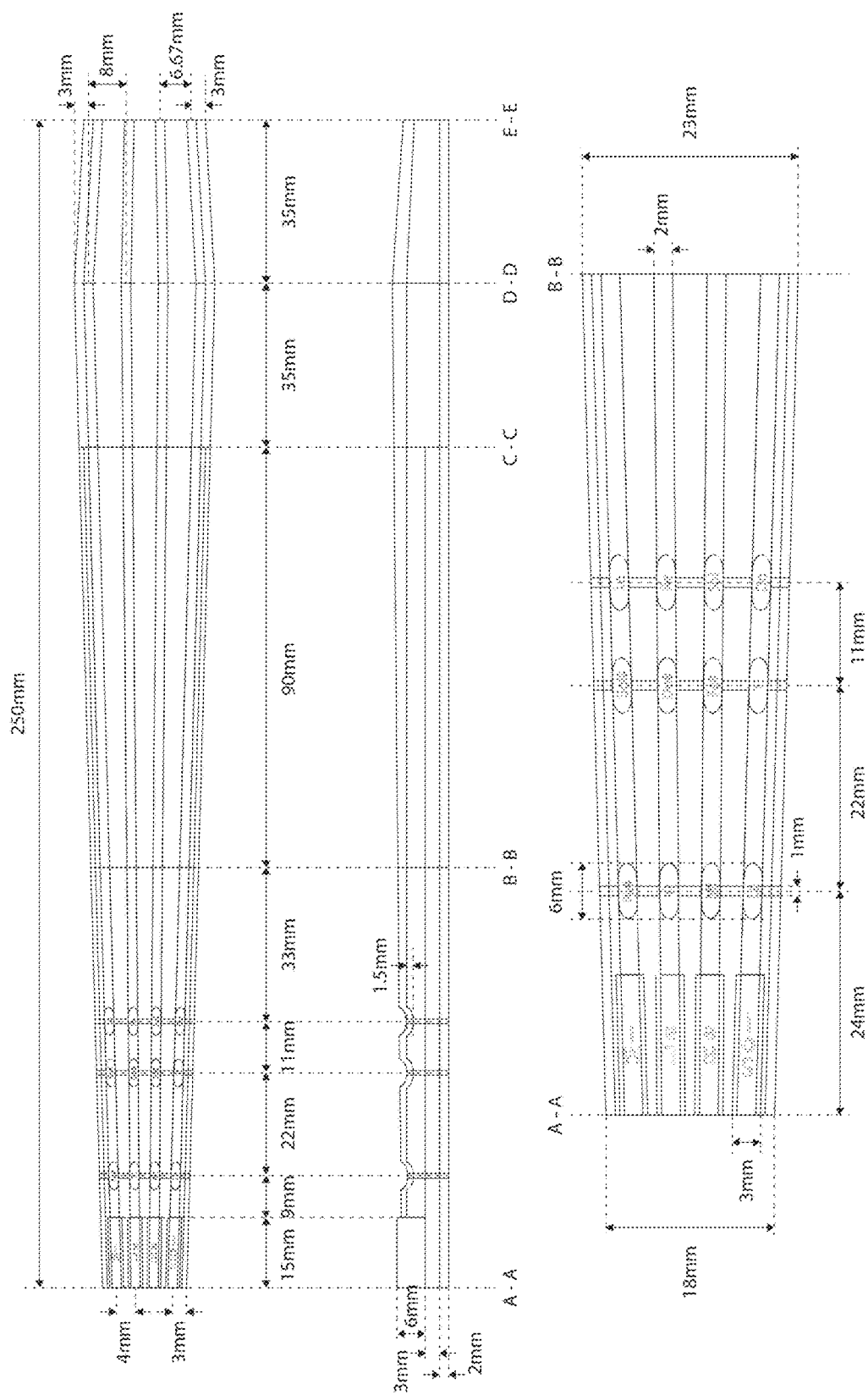
Figure 18J:
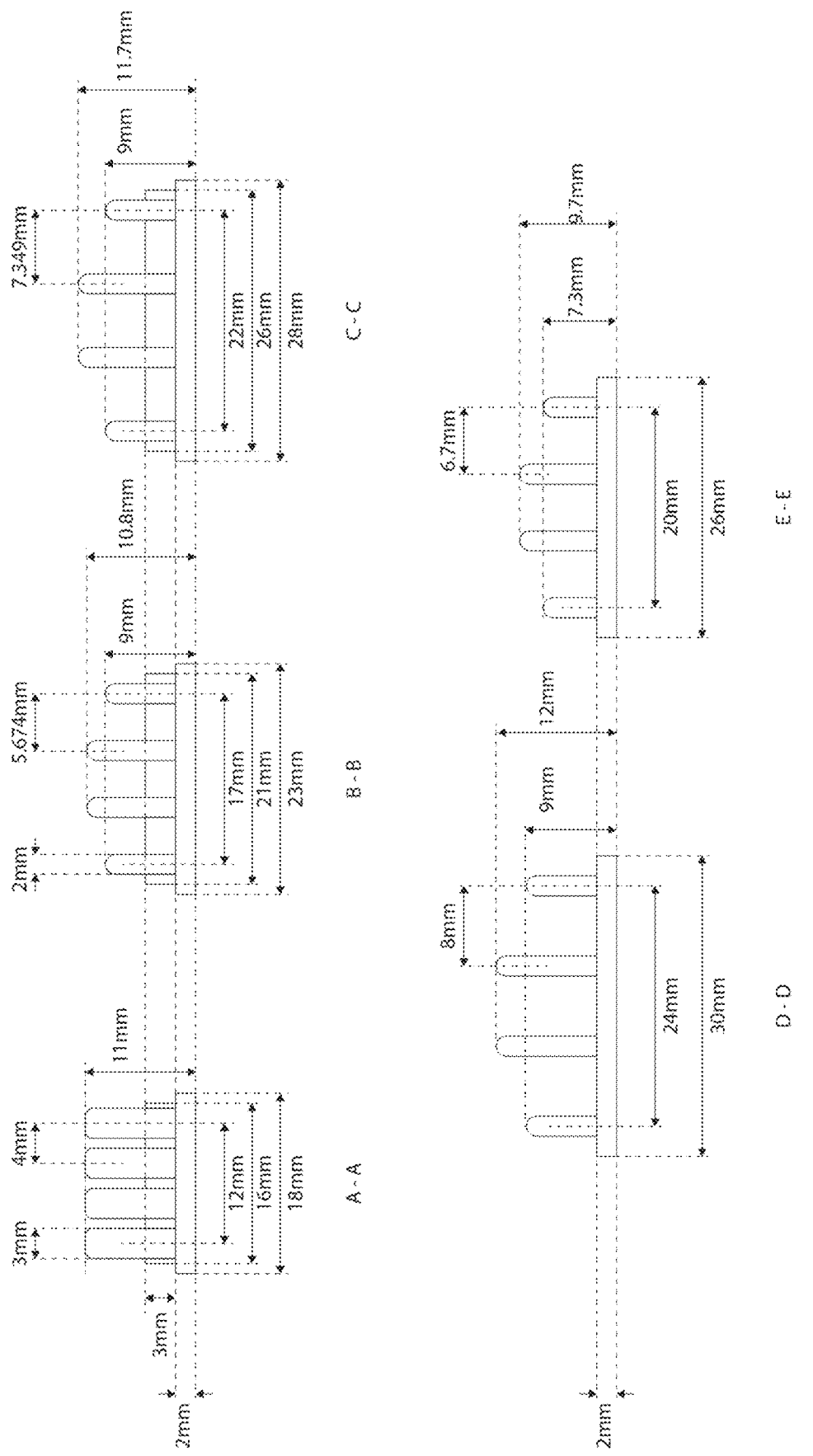
Figure 18K:
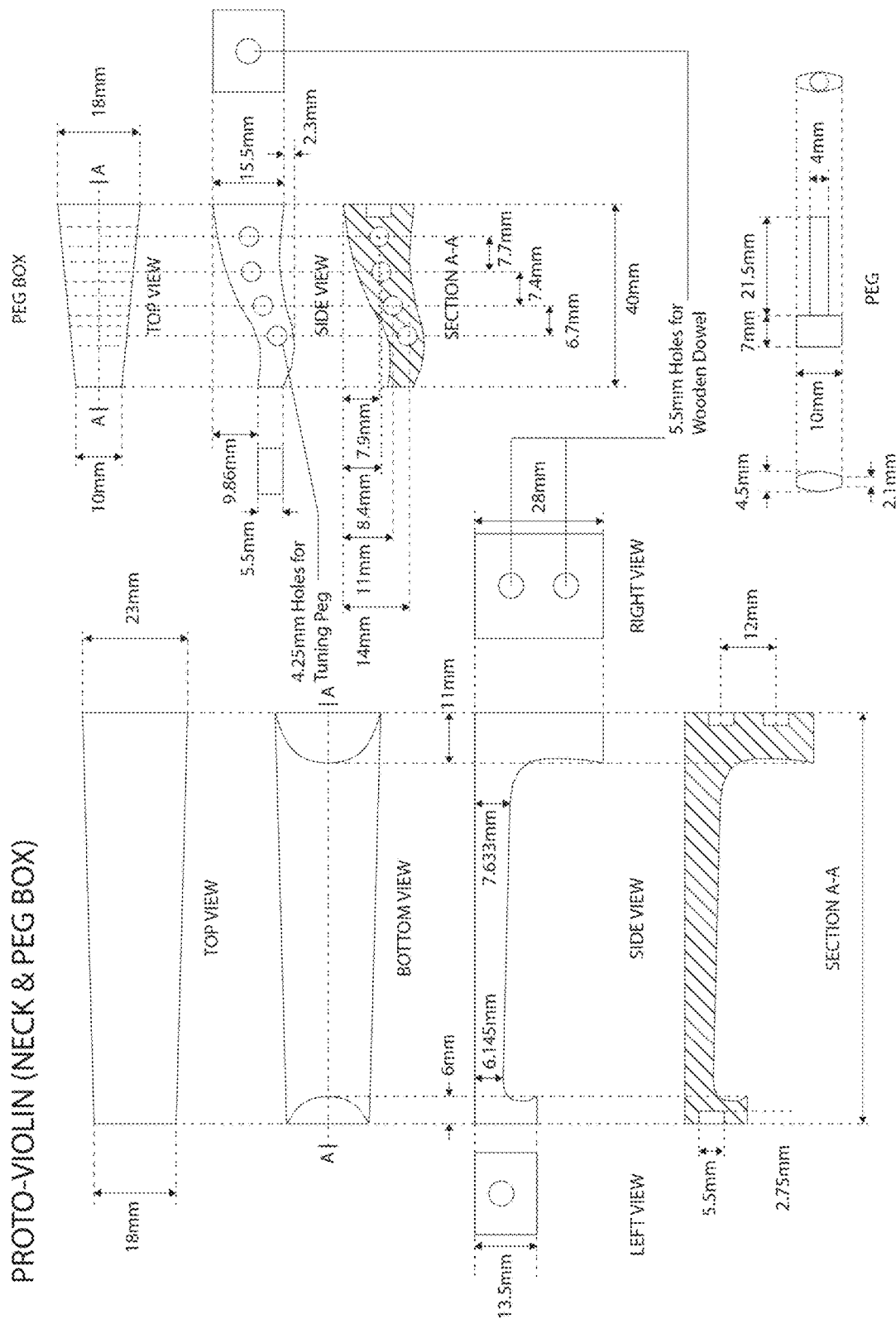
Figure 18L:
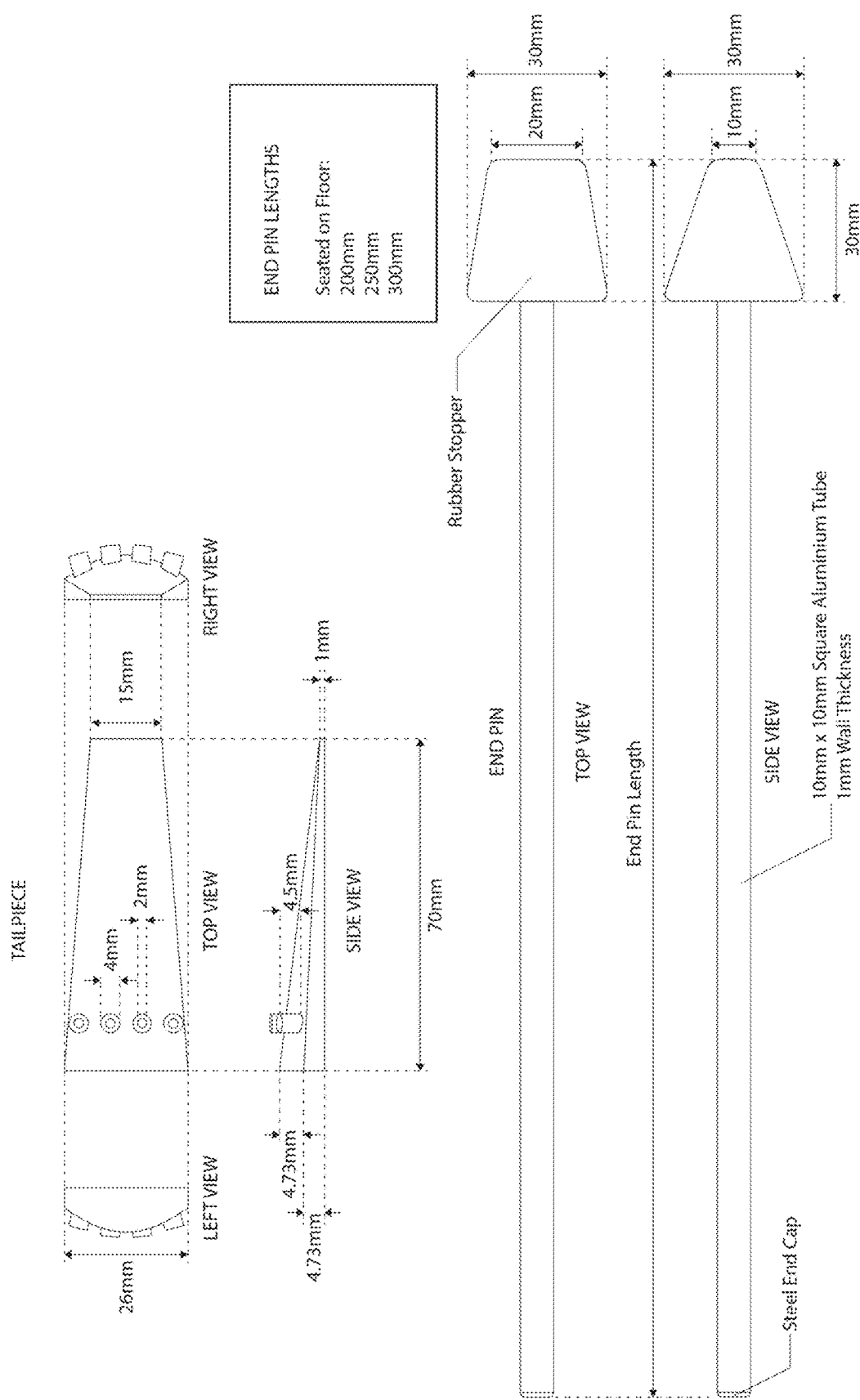
Figure 18M:
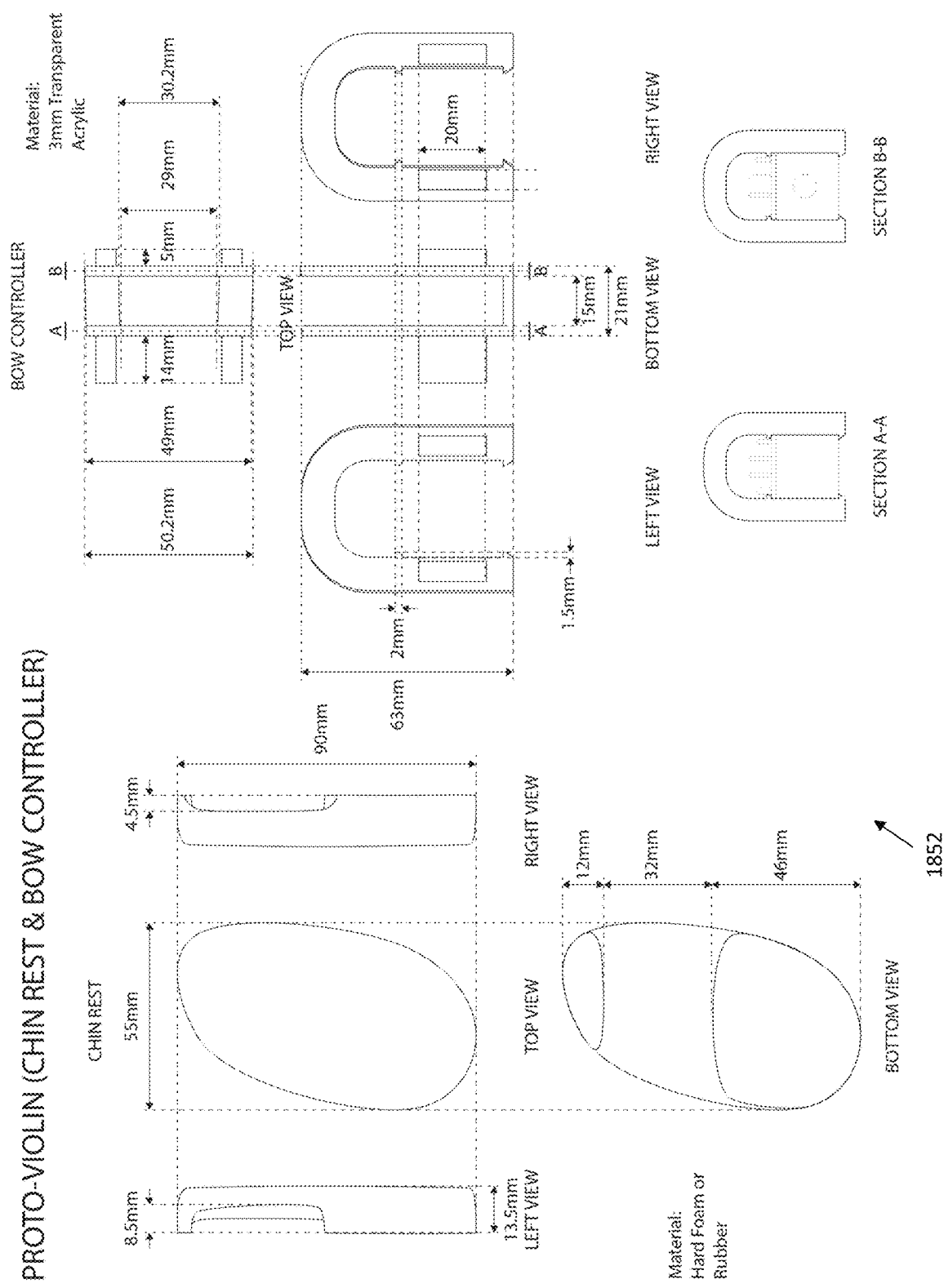
Figure 18N:
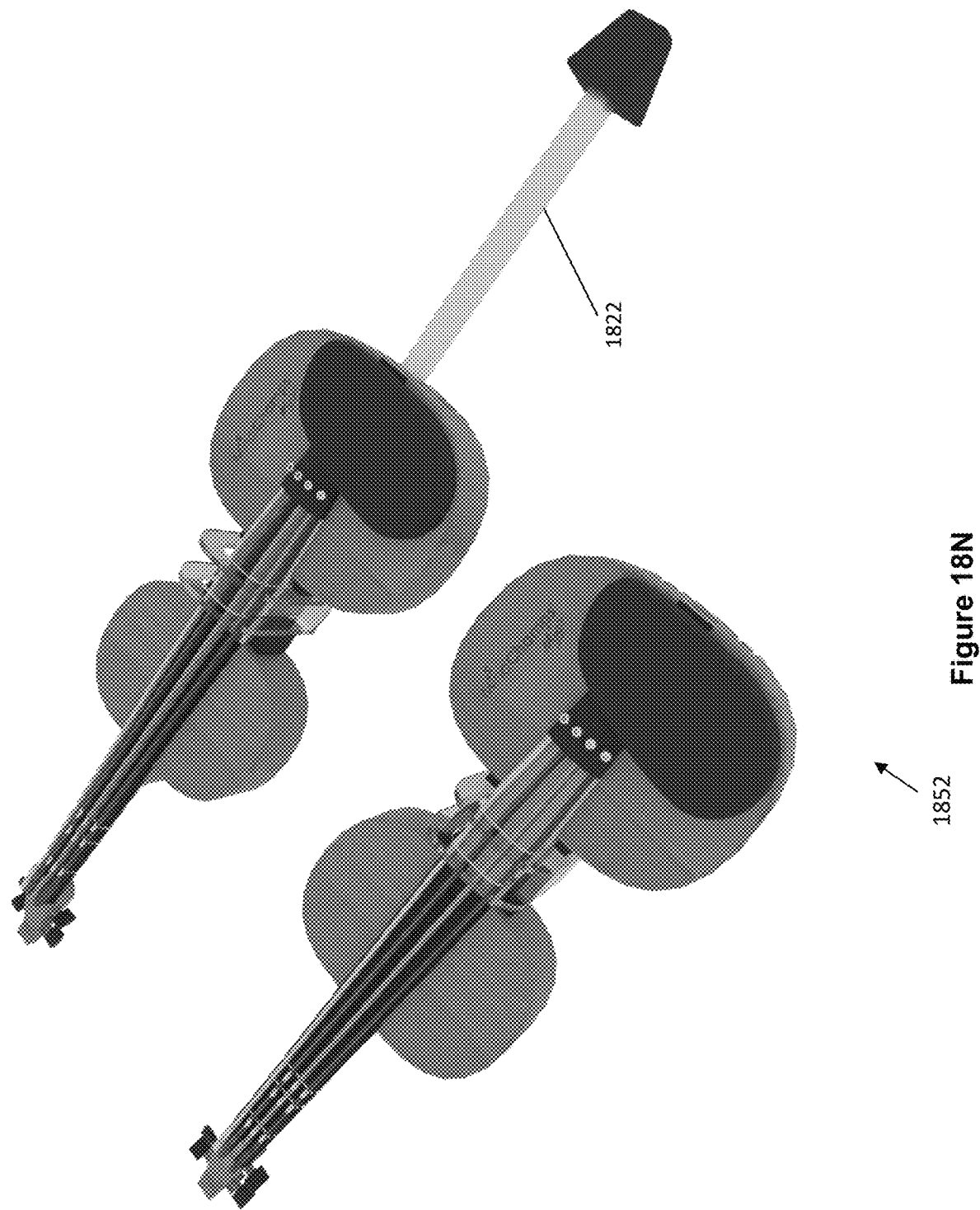

FIGS. 18A-18N shows illustrations of an instrument model 1800 resembling a violin. The instrument model 1800 of FIG. 18A may comprise a main body 1802 that is configured to resemble a shape of a violin, wherein the main body 1802 may be configured to be of a same size, bigger or smaller than a standard violin to suit a relative body size of a user. The main body 1802 may be made of wood, plastic, metal, or a combination thereof. The main body 1802 may comprise a cushion or chin rest 1804 configured to rest a chin of a user of the instrument model 1800. The main body 1802 may further comprise a plurality of strings 1806 running longitudinally along a centre of the instrument model 1800 and a bow model 1808 resembling a violin bow for moving across the strings to mimic playing a violin. The bow model 1808 may be made of wood, plastic, metal, or a combination thereof.

The plurality of strings 1806 may be configured to be disposed at different heights from each other, for example as shown in illustration 1820 of FIG. 18B wherein the strings in the middle are the highest while the strings at the edge are the lowest. As can be seen in illustration 1820, this advantageously enables the bow model 1808 to be easily in contact with each string when a user is mimicking playing a violin with bowing actions over the plurality of strings 1806 of the bow model 1808. The each of the plurality of strings 1806 may be a string made of metal, plastic, nylon or other suitable material, or a metal, plastic or wooden rod running longitudinally along the main body 1802, and may be colour-coded to facilitate guidance of a user via colours. The bow model 1808 may further comprise a hook-and-loop tape on a surface where the bow model 1808 comes in contact with the plurality of strings 1806 during bowing actions to simulate friction between the bow model 1808 and the plurality of strings 1806.

As shown in FIG. 18C, the main body 1802 may further comprise a fingerboard 1812 below the plurality of strings 1806, the fingerboard 1812 comprising labels (e.g. Do, Re, Mi, Fa, etc labels on various parts of the plurality of strings 1806), frets 1814 and divots 1816 configured to guide finger placement of a user on the plurality of strings 1806. The main body 1802 may further comprise a bow controller 1818 which comprises a pair of ridges disposed at a centre of the main body 1802 for guiding movement of the bow model 1808 over the plurality of strings 1806 between the transparent ridges. The ridges may be transparent to enable the user to see how the bow model 1808 interacts with the plurality of strings 1806 during bowing action, and may be made of transparent acrylic. The bow controller 1818 may be configured to be removably clipped onto the main body 1802 such that the bow controller 1818 may be omitted from the main body 1802 during higher difficulty levels of silent practice. The instrument model 1800 may also comprise a support or end pin 1822 with a rubber stopper 1824 that supports the main body 1802 when the instrument model 1800 is to be placed in a cello position. The rubber stopper 1824 is placed on the floor and provides friction support so that the instrument model 1800 does not slip when placed in a cello position.

Illustration 1826 of FIG. 18E shows how the instrument model 1800 may be assembled from its various components such as the chin rest 1804, bow controller 1818, the plurality of strings 1806, a spine 1828, bout 1830, neck 1832, peg box 1834 and tailpiece 1836. Various example measurements and dimensions of these components are illustrated in FIGS. 18F-18M. For example, illustration 1838 in FIG. 18F shows overall measurements and dimensions of the instrument model 1800. Illustration 1840 in FIG. 18G shows example measurements and dimensions of the spine 1828. Illustration 1842 in FIG. 18H shows example measurements and dimensions of the bout 1830. illustration 1844 in FIG. 18I shows example measurements and dimensions of the fingerboard 1812. Illustration 1846 in FIG. 18J shows example measurements and dimensions of the plurality of strings 1808. Illustration 1848 in FIG. 18K shows example measurements and dimensions of the neck 1832 and peg box 1834. Illustration 1850 in FIG. 18L shows example measurements and dimensions of the tailpiece 1836 and the end pin 1822. Illustration 1852 in FIG. 18M shows example measurements and dimensions of the chin rest 1804 and the bow controller 1818. Further, illustration 1854 in FIG. 18N shows rendering for the instrument model 1800 with and without the end pin 1822. In the MLMMS-IMMILS curriculum, the instrument model 1800 may be used together with illustrations 800, 806, 808, 810 and 812 of FIGS. 8A-8E for learning how to play a violin, and may also be used with other similar charts of increasing detail, difficulty and complexity.

The pathway from early music literacy-driven MLMMS skills to instrumental proficiency through IMMILS Practice Silent Charts and Transitional Silent Practice Instruments demonstrates the value of the MLMMS-IMMILS kit. That is, MLMMS-IMMILS together will achieve the goal of integrating vocal and kinesthetic expression of music literacy skills into instrumental skills by having preschool children precisely integrate say-sing-play into musical representations on printable Beginning Silent Practice Charts and Transitional Silent Practice Instruments.

While the MLMMS provides manipulatives and music matrices to facilitate the development of basic vocal pitch and kinesthetic rhythm literacy skills for young children, it is the IMMILS silent practice charts and transitional silent practice instruments that can best ensure that the development of learning multiple instrumental finger and hand techniques benefits from these literacy skill competencies. Thus, the MLMMS-IMMILS tools, curriculum and evaluation methods enable music teachers to better guide preschool students through the three-step process of (1) learning and practicing powerful comprehensive preliminary musical literacy skills for the purpose of (2) executing transferable hand-finger instrumental techniques necessary for (3) the expression of rhythm, pitch, melodic pattern skills into percussion, keyboard, recorder, violin performance skills. Facilitated by the sequence of IMMILS charts that, over time, take advantage of the many similarities among instrument fingering and hand position systems, brings about a high degree of parallel learning transfer experience throughout the entire skill development process that ultimately results in the ability to read, interpret and compose musical literature with growing expertise.

Figure 19:
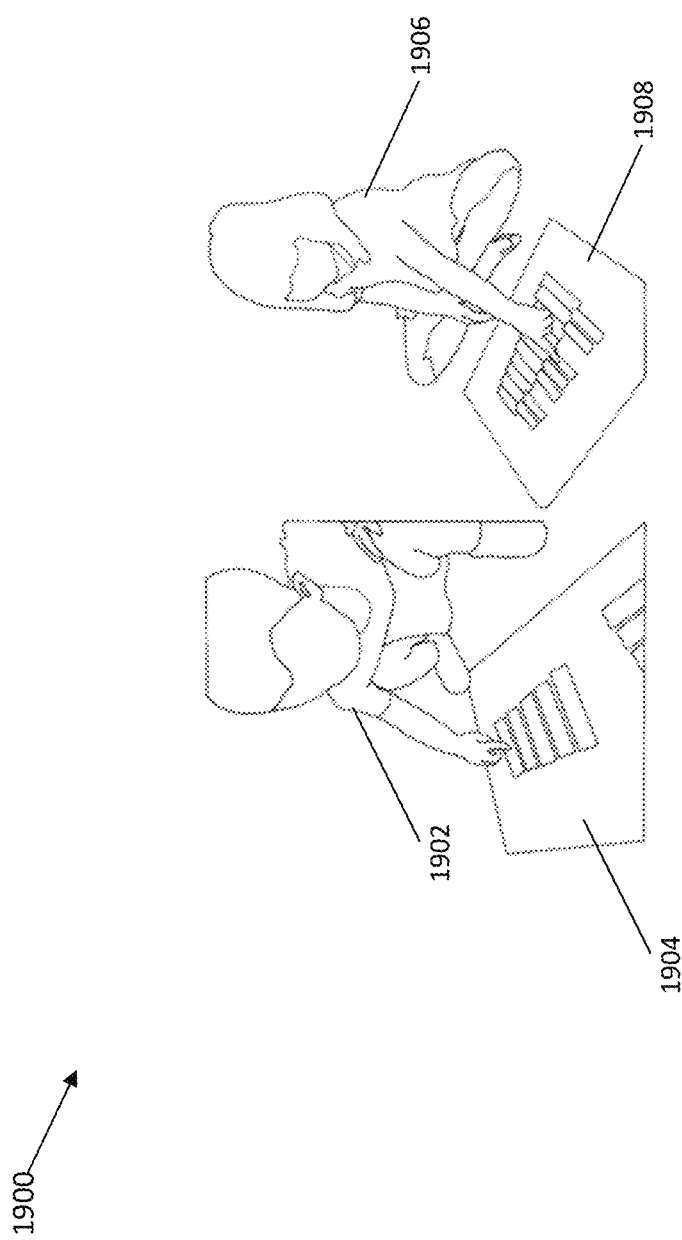
FIG. 19 shows an example of stage 1 practice in accordance with various embodiments.

The IMMILS may be summarized into 3 stages. In a stage 1, IMMILS Beginning Silent Practice methods ensure that the students will be engaged in their application of say-sing preliminary musical literacy skills on several instruments, learning to sing-finger instruments mechanically while having established an internalized understanding of preschool level comprehensive music literacy. It will become progressively clearer to the preschool students that, for example, finger positions and motions on recorder and violin are very similar to one another on the charts as they prepare for later stage IMMILS practice instruments and traditional instruments. An example of stage 1 practice is shown in FIG. 19, wherein a student 1902 is, for example, sing-pointing to an IMMILS tonebar Silent Practice Chart 1904, and another student 1906 is, for example, sing-pointing to a Glockenspiel Silent Practice Chart 1908. The IMMILS Tonebar Silent Practice Chart 1904 may be the chart 500 as shown in FIG. 5A, while the Glockenspiel Silent Practice Chart 1908 may be the chart 510 of FIG. 5C that is configured for practicing with or without a glockenspiel or an instrument model thereof.

Figure 20:
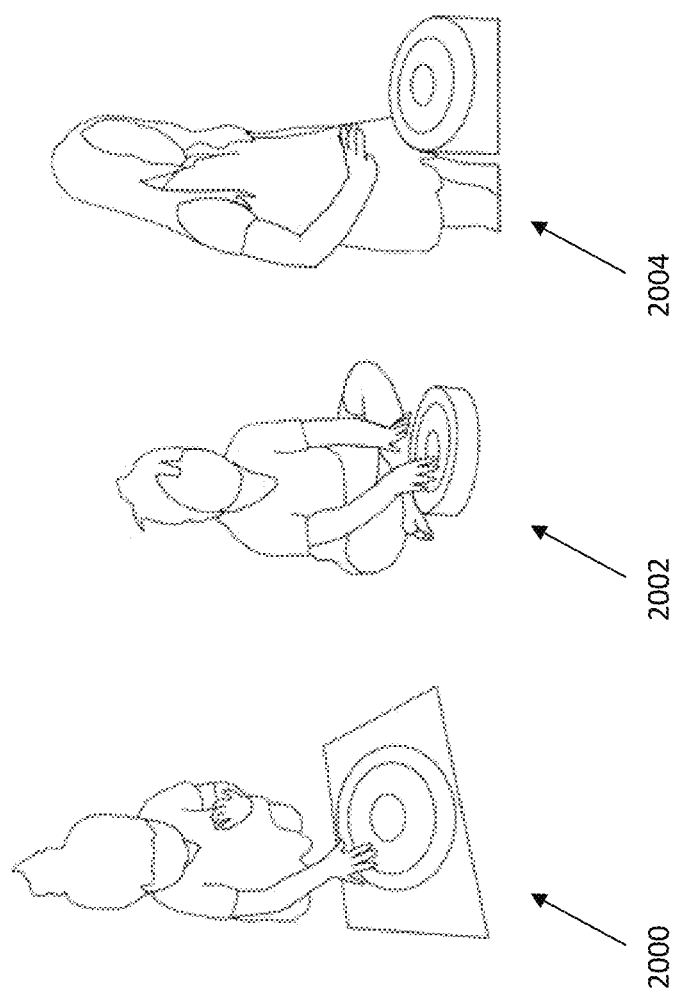
FIG. 20 shows a learning process throughout stages 1-3 in accordance with various embodiments.

In a stage 2, IMMILS manufactured Transitional Silent Practice instruments that include (a) say-clap, say-sing MusicCups (e.g. MusicCup 1000 of FIG. 10) and Cupholders (e.g. CupHolder 1100 of FIG. 11) used to represent and solve rhythm and pitch pattern reading problems, (b) say-play 2-tone and 3-tone hand drumming charts (e.g. illustrations 400 and 408 of FIG. 4 or variation thereof) on floor pan drums (e.g. drum setup 1508 of FIG. 15), (c) sing-finger Interval Box ToneBar (e.g. instrument model 1600 of FIG. 16, used with or without chart 500 of FIG. 5 or variation thereof), GlockBar (e.g. using an advanced and more difficult variation of the chart 500 of FIG. 5 that is configured for practicing with or without a glockbar or an instrument model thereof) and keyboard silent practice (e.g. a turned-off keyboard for silent practice, used with or without chart 600 of FIG. 6 or variation thereof), (d) sing-finger transitional silent practice recorders (e.g. instrument model 1700 of FIG. 17, used with or without chart 700 of FIG. 7 or variation thereof), and sing-finger transitional silent practice violins with say-play rhythm bows in both cello and violin positions (e.g. instrument model 1800 of FIGS. 18A-D, used with or without chart 800 of FIG. 8 or variation thereof). Stage 3 is for a final transfer to the sing-play traditional instruments, but music teachers may return to Stage 1 IMMILS charts and Stage 2 IMMILS practice instruments whenever more scaffolding is needed on preliminary sing-fingering, say-drumming, sing-tonguing, sing-plucking, or sing-bowing the "real" instruments. Therefore, the learning process throughout stages 1-3 may be depicted in FIG. 20, wherein illustration 2000 shows a user utilizing a pan drum chart (e.g. illustrations 400 and 408 of FIG. 4 or variation thereof) at stage 1, illustration 2002 shows a user silent practicing on a pan drum (e.g. drum setup 1508 of FIG. 15A) at stage 2, and illustration 2006 shows a user practicing on a real drum or tubano, or silent practicing on a drum setup 1508 placed on a real drum or tubano at stage 3.

By alternating among all three IMMILS stages, learning new repertoire promotes the myelination of literacy skill guided say, sing, hand-finger techniques. In this way, IMMILS helps music teachers solve the challenge of multiple musical instrument learning by providing a highly scaffolded sequence of transitional skill building practice charts that support users such as young children from the very beginning with the acquisition of foundational musical literacy skills that then foster the development to preschool instrumental mastery, with a particular emphasis on the many techniques shared across the IMMILS Silent Practice Charts and Silent Practice Musical Instruments. From the perspective of the revolutionary IMMILS system, users such as young children can advantageously learn to apply music literacy skills in order to establish an integrated understanding of multiple transferable instrumental techniques as the broad foundation of their musical development.

In sum, the IMMILS system overcomes the problems of conventional early childhood instrumental music instruction because it guides the way for preschool children success by:

Breaking down each step of the learning sequence down into something accessible to users like young children Ensuring the Integration of voice and kinesthetic rhythms (with ConductingScarfs as a foundational conduit for instrumental technique at all stages of instruction in order to maximize internalization of musical expression in multiple ways Supporting learning transfer as the same motions and techniques are required across all instruments (one to five finger/one to two hand positions and techniques)

Creating a teaching and learning growth mindset and the joy of technical and advanced integrative-cognitive orientation that allows IMMILS technical scaffolding and learning transfer tools and strategies (e.g., Bow-Controller, FingerDivot indentations on violin, supporting rod on the recorder) to optimize the development of complex motor skills necessary to master foundational musical skills in any of the IMMILS instrumental paths of musically literacy infused voice, unpitched percussion, pitched percussion, wind and string skill development Encouraging parents and students (a) to approach music learning through the fun of playing multiple instruments (b) to enjoy the sound of singing music while say- or sing-fingering the silent instruments, and (c) to watch children confidently face the challenges of a variety of instruments, musical styes and repertoire.

The MMLMMS-IMMILS kit may comprise a MLMMS-IMMILS Instrumental Skills Digital Curriculum to organize and integrate the use of MLMMS-IMMILS inventions throughout, for example, 5 years of preschool education. The annual digital curriculum may contain, for example, 40 weekly unit plans containing 160 lessons for each of five levels of preschool (ages 18 months to 6 years), is designed to take best advantage of the MLMMS-IMMILS literacy skill matrix manipulatives as optimizers of musical literacy skills and 3-Stage IMMILS Practice Charts and Practice Instruments as ideal preparation for the nearly simultaneous study of traditional instruments throughout the entire 5-year preschool curriculum. The MLMMS both frames the content of the digital curriculum and provides guidance for trained specialists to teach a comprehensive set of preschool musical literacy skills (reading, composing, analysis) that accelerates and strengthens instrumental performance with guidance from trained specialists who are responsible for distributing focus on 6 essential areas of focus in each lesson plan, for example as shown below:

(1) Introduction of lesson activities and goals in discussion with, for example, a 'famous person' puppet(s), (2) rhythm warmups with varied matrices and manipulatives, (3) pitch warmups with varied matrices manipulatives, (4) introduction of new repertoire related to the warmups (5) review of past repertoire with new variants and new orchestration, (6) reflection on the day's and/or week accomplishments with the puppet(s)

Thus, how the Music Literacy Matrix Manipulatives frame and deepen understanding fundamental multiple literacies concepts forms the foundation of the presently disclosed music teaching and learning methods, starting with the ability of music teachers in schools to demonstrate and activate music literacy learning skill development through projected digitally rendered matrices for music classrooms and then enlarge its range of applicability of the projected images to through the employment of hands-on manipulatives (MusicMats, MusicCups, MusicCards, MusicDots/Magnetic MatrixBoards, ConductingScarfs) as illustrated previously.

Figure 21:
FIG. 21 shows the public domain children's song "Hot Cross Buns" (HCB) reinterpreted with various representations of music in accordance with various embodiments.

Throughout the, for example, 200 weekly Unit Planners (800 daily lessons) of the Digital Curriculum across five preschool grade levels, over 1200 projected MusicMatrices of songs, exercises and large ensemble excerpts flexibly accommodate various types of representations within the cells of the matrix, such as Do-Re-Mi syllables, scale degree numbers, alphabet note names, song lyrics, and musical noteheads. For example, example illustration 2100 in FIG. 21 shows the public domain children's song "Hot Cross Buns" (HCB) with various representations of music contained within the matrix cells, exemplifying the philosophy of learning multiple representations of musical elements, concepts, and processes. It will be appreciated that other variations of illustration 2100 in varying levels of detail, difficulty and complexity may be used for the lessons. Further, the number of weekly Unit Planners, daily lessons, MusicMatrices of songs, exercises and large ensemble excerpts may vary based on lesson requirements and further improvements of the MMLMMS-IMMILS curriculum.

The MMLMMS-IMMILS kit further comprises an assessment system MMLSPAS. Under the MMLSPAS, matching MLMMS Hands-On Manipulative tools to preschool levels of music cognitive processes underlying levels of performance make it possible to assess a wide array of levelled preschool assessments of musical processes such as encoding, decoding, performing, reordering, modifying discrete musical patterns. The MMLSPAS provides tools for music educators and school leaders to advantageously make the case for reliable, measurable performance outcomes (a) to determine accountability standards for MCM-based and other teaching methods, (b) to conduct whole-school learning evaluation according to established grade level music literacy benchmarks, (c) to model the statistical association between music literacy and other school academic or social-emotional outcomes.

The MMLSPAS is a MLMMS-IMMILS evaluation tool that features progressively sequenced musical literacy problem-solving tasks in standard and nonstandard notation used to both measure musical literacy skill development and explore the relationships between music learning and other various aspects of the preschool academic curriculum. The MMLSPAS will empower schools, music teachers, classroom teachers and parents to assess children's ability over time to use musical, mathematical, and linguistic representations and symbol systems to solve progressively sequenced music literacy performance assessment tasks from ages 18 months to 6 years. The means the newly developed MMLSPAS will be used to track young children's abilities to respond to musical elements they can sing or clap by coding or decoding these patterns with math and language symbols, is one of the key interdisciplinary cognition objectives of the MCM preschool curriculum.

Example rhythm and pitch tasks from the MMLSPAS are as shown in illustrations 2200 and 2208 in FIG. 22. In the rhythm example 2200, we see that the student must be fluent with multiple representations of musical rhythms, such as animal names 2202, stick notation 2204, and Cha-taki syllables 2206 in order to decode and perform the passage in various ways. In the pitch example 2208, which uses Music-Dots 2210 on a Magnetic MatrixBoard 2212 to represent the pitch pattern contour, students must decode the contours and distances between each dot in order to accurately perform the pitch pattern.

Furthermore, the MMLSPAS advantageously addresses the following needs:
No existing quantitative test exists that reliably measures and tracks the interdisciplinary musical literacy abilities of, for example, young children in preschools or for parents at home.
Measuring the association between music and academic learning at the preschool level
Providing accountability measures for schools with music integration curricula teaching and learning goals.

The MMLSPAS overcomes the problems for users like preschool children (ages 18 months-6 years) listed earlier by making acquiring authentic and foundational musical literacy skills development possible for young children, so that they can:
encode and decode discrete pitch, rhythm, and melodic configurations
read and perform single and multiple melodic lines for ensemble performance:
develop fluency in decoding and performing mutually reinforcing multiple representations and symbol systems of music
apply literacy skills to musical composition and improvisation
become more aware of melodic and harmonic dimensions of musical performance and form The MLMMS-IMMILS kit further comprises a Music Literacy GameBox (MLGB) which is a game-oriented component of the MLMMS that allows the portable, reduced size version of the MLMMS MusicCups, Matrix Mats, MusicDots with Magnetic MatrixBoards and MusicCard Decks to be packaged for use by parents, music educators, and small group learning in schools worldwide independent of the licensed school curricular materials. The application of the MLMMS kit provides innovative ways to teach or learn music literacy skills through a gaming system created to engage children, youth, and adults in a wide variety of introductory tutorial, skill building, and advanced problem-solving strategy games. The MLGB can advantageously be used to introduce, expand, or reinforce music literacy skill learning in schools, intergenerational community centres, or home family music learning environments through portable, gaming style versions of the more formal and larger scale MLMMS materials that can only be used in classrooms.

The MLGB may be configured to challenge young or inexperienced players to develop a working hands-on understanding of basic music literacy skill concepts through "SkillBuilder Tutorial Games" eventually applied to more sophisticated or challenging "Champion Games" to demonstrate the application of skills previously developed in the SkillBuilder games. At every level, the MLGB games foster, expand, and reinforce the principles of musical literacy skill development by using the "multiple representations" (multiple symbol systems) approach to reading, performing, transcribing and composing music. All MLGB games are aimed at providing significant insight into in developmentally appropriate levels of understanding conventional music notation for preschool, primary school, or novice adult players to necessary to play the games; or advanced young or competent adults to enjoy the fun of solving an extensive array of problem-solving tasks in collaboration or competition with similarly levelled players.

A example inventory table for the MLMMS-IMMILS kit may be as shown in Table 1 below:

TABLE 1

Sample Inventory list for MLMMS-IMMILS kit

|  | Stage 1 First Step Tools | Stage 2 Transitional Tools | Stage 3 Applied Tools |
|---|---|---|---|
| Stages of Music Literacy Based Vocal and Instrumental Skill Development | MLMMS Symbolic Interdisciplinary Multi-Representation Systems; IMMILS (say-sing-tap) Hand, Voice and Finger Referenced Beginning Silent Practice Charts (Stage 1) | MLMMS Practice Matrix-Manipulatives; IMMILS (say-sing-finger) Transitional Silent Practice Instruments (Stage 2) | Application of Stages 1-2 Skill Building Tools to MLMMS Digital Curriculum MatrixBooks for Voice and Purchased Percussion, ToneBar, Keyboard, Recorder, Violin & Bow (Stage 3) |
| The Development of Foundational Voice and Kinetic Music Literacy Skills | (31) Total MLMMS Symbolic Interdisciplinary Multi-Representation Systems: (11) Expressive-Linguistic-Musical representations: (say-sing-clap, tap) letters (consonants, vowels), syllables, words, phrases, sentences, form, syntactical markers, stress, accents, prosodic forms, names, etc. (20) Numerical-Graphic-Musical Representations: (say, sing, clap, tap) numbers (scale degrees, finger numbers), proportion sticks, long-short, beats, measures, matrices, staffs, meter, order-sequence, geometric shapes, conducting shapes, contours, section boxes, circle-linear fractions, operands (add, subtract, multiply, divide), rulers, notehead-beams, dots, dice, stick-figures . . . | (15) Total MLMMS (say-sing-clap-foot) MusicMats (A) (say-clap-sing) MusicCups (B)/ MusicCup Holder (C) (say-clap-sing) MiniMusicCups (D)/Mini MusicCup Placement Charts (E)/Mini MusicCupHolders (F) (say-clap-sing) MusicCard Decks (G)/MusicCard Placement Charts (H) (say-clap-sing) Mini MusicCard Decks (i)/Mini MusicCard Placement Charts (J) (say-clap-sing) Magnet MusicDots (K)/Magnet MatrixBoards (L) (say-sing-snap or tap) Two-Hand Beginning Finger ConductPattern Tracing and Silent Practice Charts (O) (say-conduct) Transitional ConductingFlags (P) TempoCastanets (Q) | (4) Purchased Rhythm Sticks, Shakers, TubeWackers, Large Foam Dice, percussion instruments (A, B, C, D) (8) MLMMS (say-sing-conduct) Folk Song Levels 1-3 (A, B, C), Folk Song Ensemble (D), Active Listening Themes/Extracts (E), Vocal Key-Theme Progression (F), Jazz (G), Percussion (H) MatrixBooks |
| Learning Transfer 1: Percussion | IMMLS (say-tap) HandDrum Beginning Silent Practice Chart (A), 3-Tone HandDrum Beginning Silent Practice Chart (B) | IMMILS (say-tap, then say play) 3-Tone Transitional Silent Practice PanDrum (A), then placed on top of purchased Tubano (Djembe) | IMMILS (say-play) Practice 3-Tone Pan Drum from top of purchased (say-play) Tubano (Djembe) Hand Drums (D) MLMMS Percussion (I) Percussion Ensemble (J) Repertoire MatrixBooks (H) |
| Learning Transfer 2: ToneBar, GlockBars | IMMILS (say-finger, sing-finger) Diatonic 5, 8-ToneBar Vertical-Horizontal Silent Beginning Practice Chart (C); Chromatic 13-Tone GlockBar Beginning Silent Practice Chart (D) | IMMILS {say-finger, say-sing-finger) Transitional Silent Practice ToneBar Interval Box (B) (say-finger, sing-finger) purchased ToneBars | (Sing-finger-conduct, sing-play) Purchased ToneBars (E), GlockBars (F) MLMMS ToneBar/ GlockBar Levels 1-3) Repertoire MatrixBooks (I, J, K) |
| Learning Transfer 3: Keyboard | IMMILS (say-finger, sing-finger) LHand-RHand 7-Key Chromatic Keyboard Silent Beginning Practice Charts (E), 13-Key Chromatic Keyboard Beginning Silent Practice Charts (F) | Power OFF (say-finger, sing-finger) Purchased Silent Transitional Silent Practice Electronic Keyboards (C) | Power ON (sing-finger, sing-play-conduct) Purchased Electronic Keyboards (G) (say-sing-conduct) MLMMS Keyboard Repertoire MatrixBooks (L) |
| Learning Transfer 4: Recorder | IMMILS (say-finger, sing-finger) LHand Flat Silent Beginning Practice Chart for small Sopranino, Soprano Recorder (G); Two-Hand Beginning Silent Practice Charts for both small, large Recorders (H) | IMMILS (say-finger, sing-finger) extended length Transitional Silent Practice Sopranino Recorder (D) (practice soprano recorder not needed) | Purchased (say-conduct, sing-finger conduct, play-footmarch) Small Sopranino (H) and Large Soprano Recorders (I) MLMMS Sopranino Recorder (M), Soprano Recorder (N) Mixed Recorder Ensemble [O] Repertoire MatrixBooks [O] |
| Transfer 5: Violin | IMMILS (say-finger-pluck, sing-finger-pluck) LHand "Dulcimer position" Violin Beginning Silent Practice Chart (I) (say-finger, sing-finger-thumb pluck) Violin Beginning Silent Practice Chart in "guitar position" (J), | Viewing IMMILS Practice Charts while (say-finger-pluck-bow, sing-finger-pluck-bow) Violin in "Cello, Guitar, Violin Positions" with IMMILS Violin & Bow (E) Transitional Silent Practice Instrument (E) and Bow (F) includes shoulder rest, chin rest, | Purchased (say-finger-pluck-bow, sing-finger-pluck-bow) Wood Violin & Bow (J) (with shoulder rest, chin rest, pinky holder) endpin, and foot chart (optional purchased Bow Guide |

TABLE 1-continued

Sample Inventory list for MLMMS-IMMILS kit

| Stage 1 First Step Tools | Stage 2 Transitional Tools | Stage 3 Applied Tools |
|---|---|---|
| (say-finger, sing-finger-pluck-bow) Violin Beginning Silent Practice Chart in "cello position" (K) (say-finger-pluck-bow, sing-finger-pluck-bow) Violin Beginning Silent Practice Chart in "violin standard position" (L) | pinky finger holder and end-pin accessories (G) with Violin Transitional Resting-Playing Position Silent Practice FootChart (H) | MLMMS Suzuki adapted Violin Folk Songs (P), Violin Folk Songs Levels 1-2 (Q, R, S), Violin Ensembles (T) Repertoire MatrixBooks |
| (30) MLMMS (say-clap, say sing) Symbolic Interdisciplinary Multi-Representation Systems and (12) Voice and Finger-Hand Referenced (say finger, sing finger) Beginning Silent Practice Charts (Stage 1) | (17) (say-clap, say sing) Matrix-Manipulatives and (say-sing-finger-hand) (8) IMMILS Transitional Silent Practice Instruments (Stage 2) | (12) Purchased Traditional (say-play) Rhythm Sticks, Shakers, TubeWackers, Foam Dice, HandDrum (Tubano), (say-play-pluck-bow, sing-play) ToneBars, GlockBars, Keyboards, Sopranino/Soprano Recorders, Violin & Bow and (21) MLMMS-IMMILS (say-sing-finger-pluck-bow-conduct) MatrixBooks for Voice and (say-sing-finger) All Instruments (Stage 3) |

Further, functional applications of the IMMILS Silent Practice Charts and transitional Silent Practice Instruments are as summarized in Table 2 below:

Table 2: Summary of IMMILS Silent Practice Charts and Transitional Silent Practice Instrument Functional Applications

TABLE 2

Summary of IMMILS Silent Practice Charts and Transitional Silent Practice Instrument Functional Applications

| The inventory of invented IMMILS Beginning and Transitional Silent Practice Charts and Instruments | Essential Features and Functions of the IMMILS Invented Silent Practice Charts, Invented Transitional Silent Practice Instruments, and their application to Young Children acquiring Music Literacy Based Vocal and Traditional Instrumental Performance Skills | Location of Invention Design Measurement, Assembly, Rendering in Supplementary File |
|---|---|---|
| (Say-Play-Tap) Hand Placement PanDrum Beginning Silent Practice Charts (A); (Say-clap, then say-tap) Transitional 3-Tone PanDrum Cover Chart (B) with bottom cushion placed on the Silent Practice PanDrum. | Beginning PanDrum Silent Practice Chart, then later the PanDrum 3-Tone Silent Practice Chart are affixed to the top of the Silent Practice PanDrum (with the cushion below) in order to show hand placement corresponding to three Yellow, Orange, and Red tonal areas of the PanDrum head when say-drumming the rhythm patterns according to animal names, DumPaKa tone placement syllables. Next the Tubano Drum topped by a 3-Tone Silent Practice Chart designed to show hand placement corresponding to say-clap, say-play rhythm syllables (DumPaKa) according to areas printed on the PanDrum drumhead on top of cushion. Finally the PanDrum top is removed so that the Tubano can be played alone or with the Practice Chart as the teacher or player thinks is appropriate. | Silent Practice Charts - #11 Silent Practice Instruments - #12 |
| (Say-Sing-Finger Point) Vertical-Horizontal ToneBar Beginning Silent Practice Charts (C) or GlockBar Beginning Silent Practice Chart (D) | Separable ToneBars and mallets are stored in the ToneBar Interval Boxes (Say-sing- Finger) Separable ToneBars and mallets are used in conjunction with Beginning ToneBar interval Charts Finger placements on the "silent" ToneBars predisposes children to say-finger, then sing-play pitches on ToneBar Silent Practice Charts, the separate tone bars or MatrixBooks pages accurately before playing them Repeating these procedures with the 13-note GlockBars Sing-Finger placements on the "silent" ToneBars prepares children to say-sing pitches on chromatic practice charts and more sophisticated music in the MatrixBooks accurately | Silent Practice Charts - #11 Silent Practice Instruments - #14 |

TABLE 2-continued

Summary of IMMILS Silent Practice Charts and Transitional Silent Practice Instrument Functional Applications

| The inventory of invented IMMILS Beginning and Transitional Silent Practice Charts and Instruments | Essential Features and Functions of the IMMILS Invented Silent Practice Charts, Invented Transitional Silent Practice Instruments, and their application to Young Children acquiring Music Literacy Based Vocal and Traditional Instrumental Performance Skills | Location of Invention Design Measurement, Assembly, Rendering in Supplementary File |
|---|---|---|
| (Say-Sing-Finger) Left Hand, Right Hand, Two-Hand Silent Beginning Keyboard Silent Practice Charts (E) | Accurate say-finger, sing-finger placements on the Beginning Keyboard Silent Practice Charts and MatrixBook repertoire will prepare children to say-finger, sing-finger music on purchased "silent" (turned OFF) Electronic Keyboards<br>Say-finger, sing-finger music accurately on the "silent" (turned OFF) Electronic Keyboard (F) prepares children to say-finger, sing-finger pitches accurately before hearing the pitches on the (turned ON) Electronic Keyboard (G) | Silent Practice Charts - #11 |
| (Say-Finger, Sing-Finger) Beginning Left Hand Sopranino Recorder Silent Practice Chart (H) (Say-Finger, Sing-Finger) Beginning Two-Hand Sopranino, later on the Soprano Recorder Beginning Silent Practice Charts (I) | The Soprano and Sopranino Silent Practice Charts allow students to practice the fingering patterns of the recorder while singing note names, unencumbered by difficulty holding the traditional instrument and producing a clear sound<br>Transfer of the Beginning Recorder Silent Practice Chart skills to the rectangular box style Sopranino Transitional Silent Practice Recorder and then the traditional sopranino and soprano traditional recorders is accomplished through the constancy of the fingering position transfer without having to endure the chaotic, distracting squeaks and out of tune notes due to faulty fingering, tonguing, or air pressure<br>The (Say-Finger, Sing-Finger) Transitional Sopranino Silent Practice Recorder (J) features an extension that allows the recorder to be stabilized while children are seated on the floor<br>Finger indentations (divots) allow children to develop the feel of covering the holes while accurately singing the fixed note name pitches, establishing the coordination necessary for later playing the traditional recorder efficiently, productively, and with good intonation<br>The transitional practice instrument provides time for the preschool child to learn to work on say-sing tonguing pattern techniques without having to be distracted by fingering problems | Silent Practice Charts - #11<br>Silent Practice Instruments - #13 |
| (Sing-Finger-Pluck) Beginning Violin Silent Practice Chart in left hand 'dulcimer position' finger placement (L) (Sing-Finger- Thumb Pluck) Beginning Violin Silent Practice Chart and Transitional Silent Practice Violin in 'guitar position' (M) (Sing-Finger-Pluck-Bow) Beginning Violin Silent Practice Chart and Transitional Silent Practice Violin and EndPin in 'cello position' (N) (Sing-Finger-Pluck-Bow) Beginning Violin Silent Practice Chart and Transitional Silent Practice Violin and Bow without EndPin in 'standard violin position' (O) | The Violin silent practice charts allow students to practice the fingering patterns of the violin without the challenges of holding or producing sound on the traditional instrument. Once this stage has been mastered, students move on to the Transitional Practice violin as an intermediate step towards the wooden violin.<br>Body of the 1/10 size Transitional Practice violin is light, strong, and not easily broken. The novel features (string bridge, built-in BowController, labelled finger frets and divots, color-coded strings, built-in chin rest) fully function to support the efficacy of the Silent Practice Violin while still keeping traditional dimensions of a violin in all respects except the scroll for the purpose of learning to play the violin in the context of say-sing-finger-bowing coordinated with the silent instrument before say-sing-finger-bowing the traditional wooden violin.<br>Color-coded strings, built-in labels, frets, divots, Built-in Transparent BowController allows children to more easily identify where to place their fingers and visualize how the consistently straight bow should be going<br>Deep Divot Indentations on the rigid plastic strings allow children to feel the proper placement of their left-hand fingers while playing<br>Students progress from floor hand position in "dulcimer position", to "guitar position" with thumb plucking, to "cello and bow position" (with the EndPin magnetic extension rod inserted), to the traditional violin and bow "standard position" with the EndPin rod removed - all achieved through the transfer of constantly using the same fingering and bowing skills at different body angles<br>Rounded FrictionBow allows student to feel precise durational contact with the string while say-bowing or sing-bowing the music<br>Strings are of different heights to allow children to bow individual strings without needing a bridge on the violin, a feature we call the StringBridge<br>The transparent, unobtrusive BowController keeps the bowing arm steady while children are still able to see how their bow is touching the strings<br>The transitional practice violin has a built-in soft chin rest on the top of the body and pegs for holding rubber band for the shoulder rest below the violin<br>The bow features a rounded top, and otherwise replicating the measurements, weight and balance of an 1/10 size violin bow | Silent Practice Charts - #11<br>Silent Practice Instruments - #15 |

TABLE 2-continued

Summary of IMMILS Silent Practice Charts and Transitional Silent Practice Instrument Functional Applications

| The inventory of invented IMMILS Beginning and Transitional Silent Practice Charts and Instruments | Essential Features and Functions of the IMMILS Invented Silent Practice Charts, Invented Transitional Silent Practice Instruments, and their application to Young Children acquiring Music Literacy Based Vocal and Traditional Instrumental Performance Skills | Location of Invention Design Measurement, Assembly, Rendering in Supplementary File |
|---|---|---|
| | Mastering the say-sing-pluck-bow techniques on the IMMILS Transitional Silent Practice Violin in all four 'positions' ensures that all children develop the posture, feel of covering the frets, keeping the bow within the BowController while accurately singing note name pitches, establishing the optimal learning transfer conditions for playing the traditional violin efficiently, productively and with good intonation | |

Further provided are sample MatrixBooks, sample MML-SPAS tests and sample curriculum pages (e.g. for teachers and facilitators of the MLMMS-IMMILS curriculum) that may be used in the MLMMS-IMMILS curriculum, that are incorporated herein by reference from priority Singapore patent application no. 10202103163W.

It will be appreciated by a person skilled in the art that numerous variations and/or modifications may be made to the present disclosure as shown in the specific embodiments without departing from the scope of the specification as broadly described. The present embodiments are, therefore, to be considered in all respects to be illustrative and not restrictive.

What is claimed is:

1. A kit for music literacy learning, the kit comprising:
a receptacle comprising planar walls, joints between the walls' side edges an open base, wherein the receptacle is configured to represent a music note, rhythm or both music note and rhythm, and wherein the receptacle comprises upper edges of the planar walls, the edges having slots; and
a modifier card configured to be inserted into two slots of the receptacle for modifying an accent, volume, articulation, or chromatic alteration of the music note or rhythm, based on a design of the modifier card.

2. The kit of claim 1, wherein:
the receptacle comprises four side walls;
wherein a first end of each side wall forms the open base of the receptacle and a second end of each side wall is opposite the first end and attaches to an end cap to form a closed top of the receptacle;
wherein the one or more slots are disposed at the closed top or on at least one of the four side walls of the receptacle;
wherein the receptacle comprises a color of a plurality of colors, wherein each color of the plurality of colors indicates a different modification of at least one of an accent, volume, articulation, or chromatic alteration of the music note or rhythm.

3. The kit according to claim 1, further comprising one or more boards, each board comprising one or more linearly aligned indentations, the one or more linearly aligned indentations representing a rhythm, pitch pattern or a whole/half step scale structure, wherein the receptacle is one of a plurality of receptacles configured to be placed in any one of the indentations as an indication for a user to perform the music note represented by the receptacle, its position on the boards, and the modifier card when inserted into one of the one or more slots.

4. The kit according to claim 3, wherein each of the one or more boards comprises one or more magnets disposed on each side of each board for magnetically linking one or more boards together to extend the rhythm, pitch pattern or whole-half step scale structure represented by the one or more boards.

5. The kit according to claim 1, further comprising:
a first set of cards configured to facilitate teaching rhythm patterns, each card of the first set of cards representing at least one of a syllable, music note, or a rhythm modifier for performing along with or modifying a rhythm, wherein each card serves as an indication for a user to perform the at least one of a syllable, music note, or modified rhythm represented by the card;
a second set of cards configured to facilitate teaching pitch, each card of the second set of cards representing at least one of a syllable, music note, or a pitch modifier for performing along with or modifying a pitch, wherein each card serves as an indication for a user to perform the at least one of a syllable, music note, or modified pitch represented by the card; and
a third set of cards configured to facilitate teaching melody patterns, each card of the third set of cards representing at least one of a syllable, music note, or a pitch modifier for performing along with or modifying a melody pattern, wherein each card serves as an indication for a user to perform the at least one of a syllable, music note, or modified melody pattern represented by the card.

6. The kit according to claim 5, wherein each of the first, second and third set of cards are further divided into two or more decks of cards in order of difficulty of modifying the rhythm, pitch or melody pattern.

7. The kit according to claim 6, wherein the modifier card is a card from the first or second set of cards, wherein the modification is based on the syllable, music note, pitch modifier, or rhythm modifier represented by the card.

8. The kit according to claim 7, further comprising:
a separate magnetic board comprising a grid having one or more cells arranged in an X and Y axis, each axis representing a measure of beats in a rhythm or a measure of a pitch; and
one or more magnets configured to be placed in the one or more cells for plotting or modifying a rhythm pattern, pitch pattern or melodic pattern with reference to the X and Y axis, wherein each of the one or more magnets represents at least one of a syllable, music note, stick notation, start of a rhythm or start of a scalar pattern, wherein the rhythm pattern, pitch pattern or melodic pattern is plotted on the grid or modified based on the represented syllable, music note, stick notation, start of a rhythm or start of a scalar pattern, wherein the one or more magnets placed on the grid serves as an indication for a user to perform the plotted or modified rhythm pattern, pitch pattern or melodic pattern.

9. The kit according to claim 1, further configured to facilitate learning of a musical instrument, wherein the kit further comprises:
- a separate instrument model, the instrument model resembling a musical instrument; and
- one or more charts comprising instructions for hand placement and movement on the instrument model that mimic playing of the musical instrument.

10. The kit according to claim 9, wherein the instrument model resembles a violin, the instrument model configured for learning to coordinate and internalize bowing, plucking, and fingering techniques for the dulcimer, guitar, cello, and standard violin positions, the instrument model comprising:
- a cushion configured to rest a chin of a user of the instrument model;
- a plurality of color-coded rounded strips representing violin strings running longitudinally along a center of the instrument model, the plurality of color-coded strings disposed at different heights from each other;
- a fingerboard below the plurality of color-coded rounded strips representing violin strings, the fingerboard and strips comprising labels, frets, and divots configured to guide finger placement on the plurality of color-coded rounded strips representing violin strings;
- a bow model resembling a violin bow for moving across the strips to mimic playing a violin, with a resistance-textured surface on the flat side of the bow to simulate bow/string friction when pulled across strips; and
- a bow controller comprising a pair of transparent ridges disposed at a center of the violin model for stabilizing bowing technique in the cello and violin orientations, by restricting the angle of the bow's lateral movement, relative to an orientation of the fingerboard, guiding movement of the bow model over the plurality of strips between the transparent ridges and defining where strings are plucked with a right hand; and
- optionally, a retractable end-pin for extension to the floor in cello position to stabilize the instrument and allow for the user to simulate the cello bowing technique.

11. The kit according to claim 9, wherein the instrument model resembles a drum, the instrument model configured for learning how to play the drum, comprising:
- a cylindrical part comprising or resembling a tubano (djembe) drum;
- a drum cover configured to be fittingly placed over a top of the cylindrical part to prevent sound from being emitted by the cylindrical part when the drum cover is struck; and
- a piece of fabric configured to be placed over the drum cover, the piece of fabric comprising two or more colors indicating parts of the drum cover on which the instrument model should be struck to mimic playing the drum.

12. The kit of claim 9, wherein the instrument model resembles a recorder, the instrument model configured for learning how to play the recorder, comprising:
- a straight body with a flat, rectangular cross-section comprising a plurality of indentations along the body that correspond to the positions of holes in a recorder, the indentations configured and labeled to guide finger placement to mimic playing a recorder;
- a tapered end on one end of the body resembling a recorder mouthpiece; and
- a ledge for resting a thumb of a user of the instrument model.

13. The kit according to claim 9, wherein the instrument model resembles a xylophone or percussion instrument comprising tone-bars, the instrument model for learning how to play the xylophone or percussion instrument, comprising:
- a main body comprising a plurality of indentations sized to accept a plurality of tone-bars;
- the plurality of tone-bars configured to be placed in the plurality of indentations, wherein the plurality of tone-bars can be removed from the main body; and
- a pair of mallets for striking on the plurality of tone-bars for producing music, or over the plurality of indentations to mimic playing on the xylophone or percussion instrument.

14. The kit of claim 1, wherein the receptacle is in the shape of a truncated square pyramid.

15. The kit of claim 14,
- wherein the receptacle comprises four congruent trapezoid-shaped side walls;
- wherein a first end of each side wall forms the open base of the receptacle;
- wherein a second end of each side wall is opposite the first end, narrower than the first end, and attaches to a square end-cap to form a closed top of the receptacle;
- wherein the one or more slots is disposed at the closed top or on at least one side wall of the receptacle; and
- wherein the receptacle comprises a color of a plurality of colors, wherein each color of the plurality of colors indicates a different modification of at least one of an accent, volume, articulation, or chromatic alteration of the music note or rhythm.

16. The kit of claim 1, wherein the design of the modifier card comprises a picture, word, symbol, number, and/or color of a plurality of pictures, words, symbols, numbers, and colors, wherein each picture, word, symbol, number, and/or color indicates a different modification of at least one of an accent, volume, articulation, or chromatic alteration of the music note or rhythm to instruct a user to perform the modified music note or rhythm.

17. The kit of claim 9, further comprising one or more charts comprising a plurality of matrix-based representations of one or more of pitch, rhythm, and melody; rhythm syllables; and fingering, tonguing, and bowing information.

18. The kit of claim 12, wherein the body of the instrument model comprises an extended length with a rubber end cap on one end, wherein the instrument model facilitates a user to master fingering technique while simultaneously holding and orienting the instrument.

* * * * *